US012596095B2

(12) United States Patent
Dowdell

(10) Patent No.: US 12,596,095 B2
(45) Date of Patent: Apr. 7, 2026

(54) ELECTROCHEMICAL CELL DEVICES AND METHODS OF MANUFACTURING

(71) Applicant: MESO SCALE TECHNOLOGIES, LLC., Rockville, MD (US)

(72) Inventor: Scott Dowdell, Cascade, MD (US)

(73) Assignee: MESO SCALE TECHNOLOGIES, LLC., Rockville, MD (US)

( * ) Notice: Subject to any disclaimer, the term of this patent is extended or adjusted under 35 U.S.C. 154(b) by 532 days.

(21) Appl. No.: 18/149,553

(22) Filed: Jan. 3, 2023

(65) Prior Publication Data

US 2023/0213476 A1 Jul. 6, 2023

Related U.S. Application Data

(60) Provisional application No. 63/296,287, filed on Jan. 4, 2022.

(51) Int. Cl.
*G01N 27/416* (2006.01)
*B01L 3/00* (2006.01)

(52) U.S. Cl.
CPC .......... *G01N 27/416* (2013.01); *B01L 3/5085* (2013.01); *B01L 2300/0645* (2013.01); *B01L 2300/0829* (2013.01)

(58) Field of Classification Search
CPC .... G01N 27/416; G01N 21/253; G01N 21/69; G01N 27/403; G01N 21/76; B01L 3/5085; B01L 2300/0645; B01L 2300/0829
See application file for complete search history.

(56) References Cited

U.S. PATENT DOCUMENTS

| | | | |
|---|---|---|---|
| 7,842,246 B2 | 11/2010 | Wohlstadter et al. | |
| 2004/0022677 A1* | 2/2004 | Wohlstadter | G01N 21/253 |
| | | | 422/52 |
| 2014/0191109 A1* | 7/2014 | Chamberlin | G02B 7/36 |
| | | | 250/206 |
| 2020/0324289 A1* | 10/2020 | Chen | B01L 3/502715 |

FOREIGN PATENT DOCUMENTS

WO 2011/154591 A1 12/2011

* cited by examiner

*Primary Examiner* — Alexander W Keeling
*Assistant Examiner* — Kaylee Tseng
(74) *Attorney, Agent, or Firm* — Edell, Shapiro & Finnan, LLC

(57) ABSTRACT

A multi-well assay plate is provided. The multi-well assay plate includes at least a top plate that defines a plurality of wells and a base plate having a substrate with well electrode structures patterned thereon. The well electrode structures are arranged in a plurality of sector electrical structures, each including a working electrode bus bar and a portion of an auxiliary electrode pattern. The substrate further includes at least one working electrode contact patterned on a bottom surface and an auxiliary electrode contact pattern disposed on the bottom surface.

18 Claims, 83 Drawing Sheets

100

101

103

104          102

102

120

Z-DIRECTION

X-DIRECTION

Y-DIRECTION

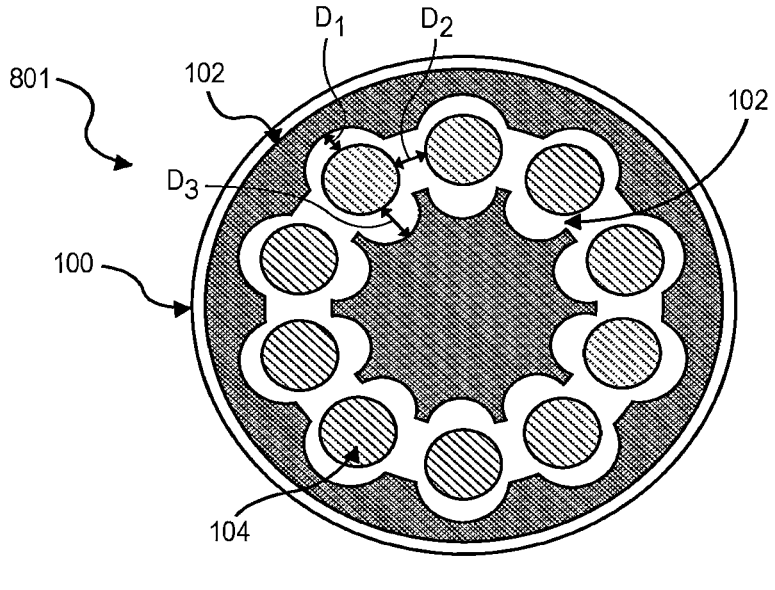
FIG. 8A
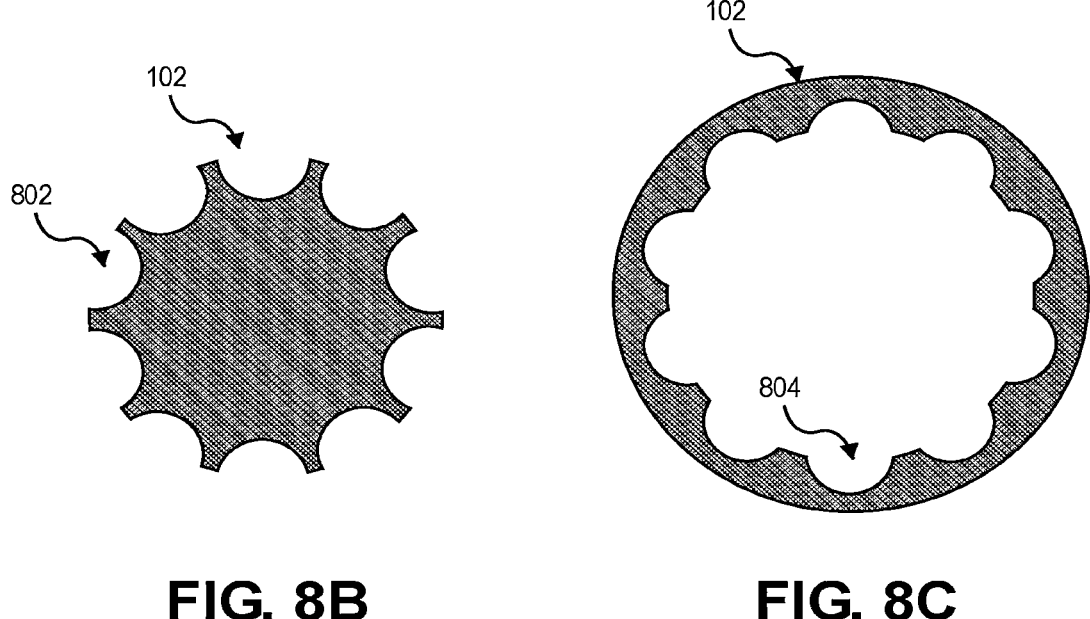
FIG. 8B          FIG. 8C

1102    Apply a voltage pulse to one or more working electrode zones or one or more auxiliary electrodes in a well.

1104    Measure a potential difference between the one or more working electrodes and the one or more auxiliary electrodes.

1106    Perform analysis based on the potential difference and other data.

1100

1302 — Apply a voltage pulse to one or more working electrode zones or an auxiliary electrode in a well of an ECL apparatus.

1304 — Capture luminescence data from the reduction-oxidation reaction over a period of time.

1306 — Perform ECL analysis on the luminescence data.

1300

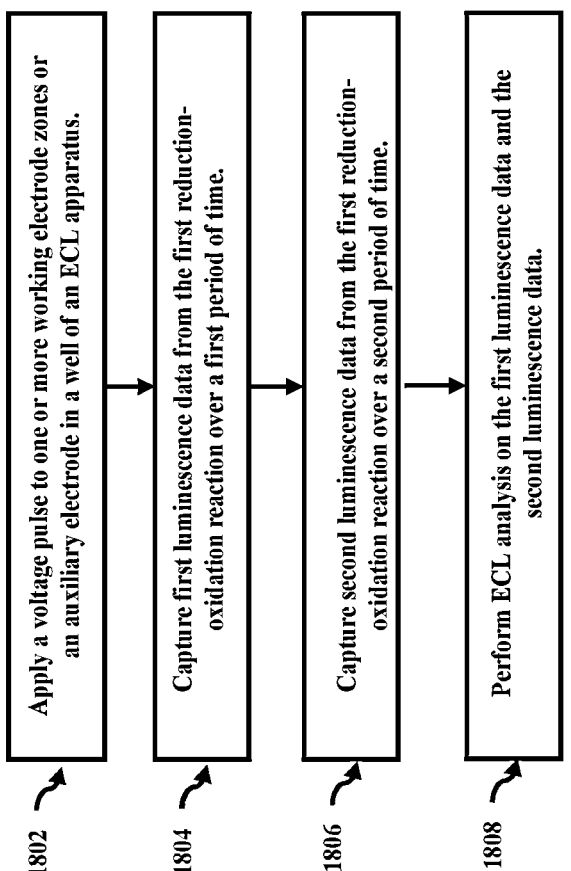

Apply a voltage pulse to one or more working electrode zones or an auxiliary electrode in a well of an ECL apparatus.

1802

Capture first luminescence data from the first reduction-oxidation reaction over a first period of time.

1804

Capture second luminescence data from the first reduction-oxidation reaction over a second period of time.

1806

Perform ECL analysis on the first luminescence data and the second luminescence data.

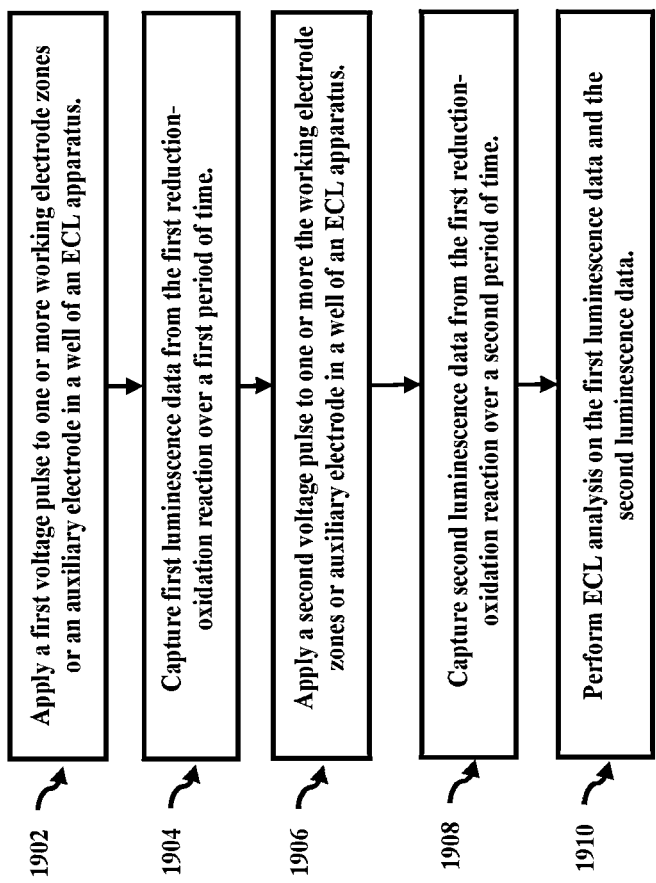

Apply a first voltage pulse to one or more working electrode zones or an auxiliary electrode in a well of an ECL apparatus.

1902

Capture first luminescence data from the first reduction-oxidation reaction over a first period of time.

1904

Apply a second voltage pulse to one or more the working electrode zones or auxiliary electrode in a well of an ECL apparatus.

1906

Capture second luminescence data from the first reduction-oxidation reaction over a second period of time.

1908

Perform ECL analysis on the first luminescence data and the second luminescence data.

2002 — Forming one or more working electrodes on a substrate

2004 — Forming one or more auxiliary electrodes on the substrate.

2006 — Applying an electrically insulting material to electrically insulate the one or more auxiliary electrodes from the one or more working electrodes 2008 — Forming additional electrical components on the substrate

2000

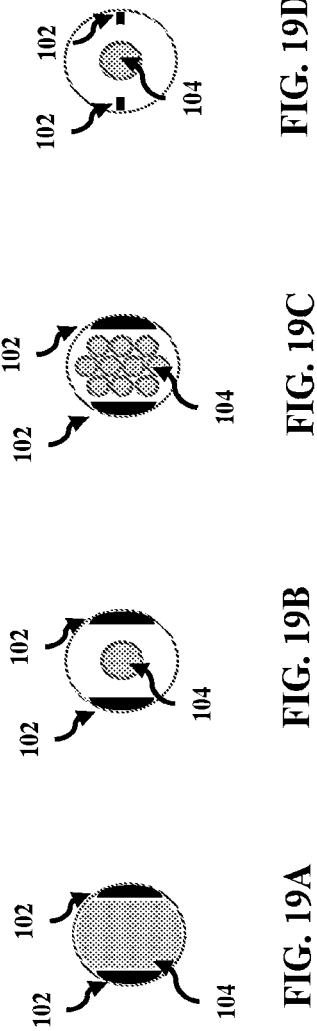

3991

3180

3100

3150

3101
3175
3176
3180

3191

3754
3751
3753

3750

3100

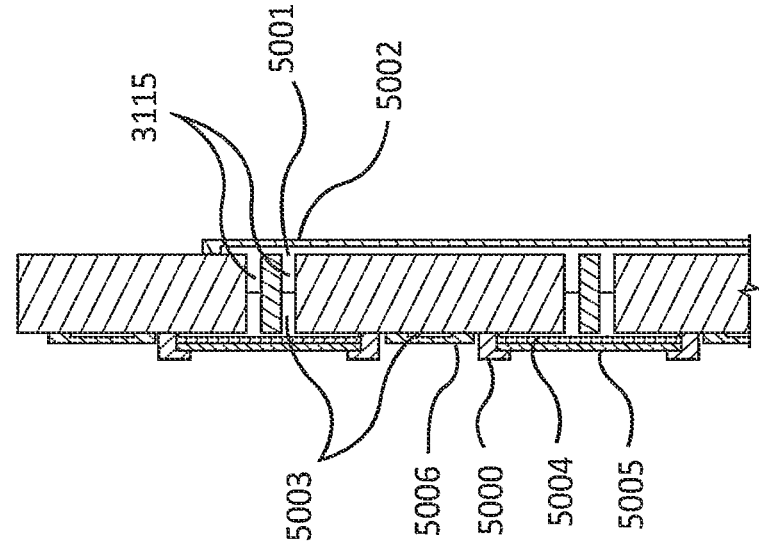
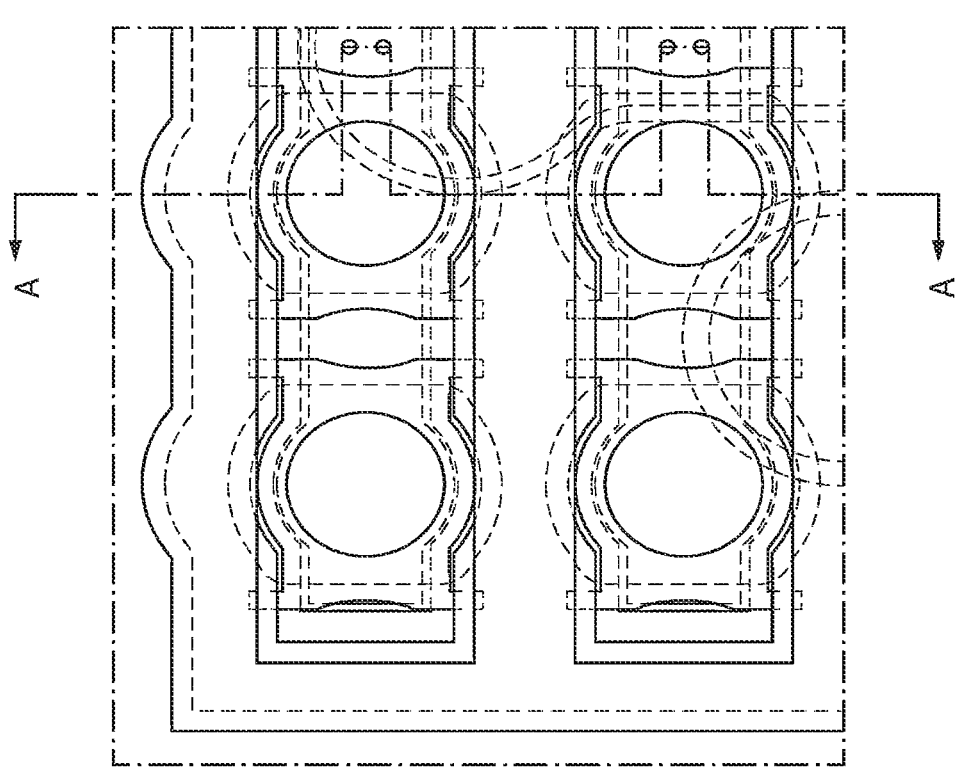
FIG. 220

5001

3100

3210

3100

3210

5001

4103

4003

4104

4005

4005

4006

5003

3100

3180

FIG. 23FFF
3100
3180
4006
5003

4008

5004

3100

3180

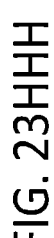
FIG. 23HHH

4009

4108

4010
5006
3100
3180
FIG. 23JJJ

4110

4011

4012

5005

3100

3180

FIG. 23LLL
5005
4012
3100
3180

4112

4013

4014

5010

3100

3180

4015

4114

4016

5000

3100

3180

ELECTROCHEMICAL CELL DEVICES AND METHODS OF MANUFACTURING

CROSS-REFERENCE TO RELATED APPLICATONS

The present application claims the benefit of U.S. Provisional Application No. 63/296,287, filed Jan. 4, 2022, the disclosure of which is incorporated by reference herein in its entirety.

TECHNICAL FIELD

Embodiments hereof relate to systems, devices, and methods employing electrochemical cells in the performance of chemical, biochemical, and biological assays and analysis, and methods for manufacturing the same.

BACKGROUND

An assay is an investigative (analytic) procedure in chemistry, laboratory medicine, pharmacology, environmental biology, molecular biology, etc. for qualitatively assessing or quantitatively measuring the presence, amount, or functional activity of a target entity (e.g., an analyte). An assay system may use electrochemical properties and procedures to assess a target entity qualitatively and quantitatively. For example, the assay system may assess a target entity by measuring electrical potential, electrical current, and/or luminance in a sample area containing the target entity that are caused by electrochemical process and by performing various analytical procedures (e.g., potentiometry, coulometry, voltammetry, optical analysis, etc.) on the measured data.

An assay system, utilizing electrochemical properties and procedures, may include sample areas (e.g., a well, wells in a multi-well plates, etc.) that have one or more electrodes (e.g., working electrodes, counter electrodes, and references electrodes) for initiating and controlling the electrochemical processes and for measuring the resultant data. Depending on the design and configuration of the electrodes, assay systems may be classified as referenced and unreferenced systems. For example, the working electrode is the electrode in the assay system on which the reaction of interest is occurring. The working electrode is used in conjunction with the counter electrode to establish potential differences, current flow, and/or electric fields in the sample area. The potential difference may be split between interfacial potentials at the working and counter electrodes. In an unreferenced system, an interfacial potential (the force that drives the reactions at an electrode) applied to the working electrode is not controlled or known. In the referenced system, the sample area includes a reference electrode, which is separate from the working and counter electrode. The reference electrode has a known potential (e.g., reduction potential), which can be referenced during reactions occurring in the sample area.

One example of these assay systems is an electrochemiluminescence (ECL) immunoassay. ECL immunoassay involves a process that uses ECL labels designed to emit light when electrochemically stimulated. Light generation occurs when a voltage is applied to an electrode, located in a sample area that holds a material under testing. The voltage triggers a cyclical oxidation and reduction reaction, which causes light generation and emission. In ECL, the electrochemical reactions responsible for ECL are driven by applying a potential difference between the working and counter electrodes.

BRIEF SUMMARY

In accordance with an embodiment hereof, a multi-well assay plate is disclosed. The multi-well assay plate comprises a top plate having top plate opening defining wells of the multi-well assay plate arranged in a well pattern, each well being defined by a well area, a base plate including a substrate having a top surface and a bottom surface, the top surface being mated to the top plate, and a plurality of sector electrode structures forming a plurality of well electrode structures, each of the plurality of sector electrode structures including a plurality of sector electrode structures forming a plurality of well electrode structures, each of the plurality of sector electrode structures including at least one working electrode bus bar deposited on the top surface and a portion of an auxiliary electrode pattern deposited on the top surface; at least one working electrode contact patterned on the bottom surface in electrical communication with the at least one working electrode bus bar; and an auxiliary electrode contact pattern disposed on the bottom surface in electrical communication with the auxiliary electrode pattern, the auxiliary electrode contact pattern including a first plurality of cut-outs and a second plurality of cut-outs. The first plurality of cut-outs are configured to accommodate the at least one working electrode contact and the second plurality of cut-outs are configured to create a plurality of isolation zones.

In accordance with an embodiment hereof, a method of using a multi-well assay plate is disclosed. The multi-well assay plate includes a plurality of wells arranged in a well pattern, a plurality of sector electrode structures forming a plurality of well electrode structures corresponding to the plurality of wells, each of the plurality of sector electrode structures including: at least one working electrode bus bar deposited on a top surface of a substrate of the multi-well assay plate forming a plurality of working electrode zones; and a portion of an auxiliary electrode pattern deposited on the top surface forming a plurality of auxiliary electrode zones, an auxiliary electrode contact pattern in communication with the auxiliary electrode pattern and including a first plurality of cut-outs and a second plurality of cut-outs, a plurality of working electrode contacts deposited on a bottom surface of the multi-well assay plate in the first plurality of cut-outs and electrically connected to corresponding working electrode bus bars, and a plurality of isolation zones disposed within the second plurality of cut-outs. The method includes generating a voltage potential between the plurality of working electrode zones formed by the at least one working electrode bus bar associated with a selected sector electrode structure and the plurality of auxiliary electrode zones associated with the selected sector electrode structure, maintaining substantial electrical isolation between the plurality of working electrode zones of the selected sector electrode structure and a remainder of working electrode zones of a remainder of sector electrode structures, and measuring a response to the voltage potential.

In accordance with an embodiment hereof, a method of making a multi-well assay plate including a plurality of wells is disclosed. The method includes forming a plurality of holes in a substrate, applying a first conductive layer of material on a first side of the substrate, the first conductive layer filling the plurality of holes to form a plurality of vias and provide a plurality of working electrode contact bases and an auxiliary electrode contact pattern base, applying a second conductive layer of material on the first side of the substrate, the second conductive layer overlaying the first conductive layer to form a plurality of working electrode contacts and an auxiliary electrode contact pattern having a first plurality of cut-outs and a second plurality of cut-outs, the working electrode contacts being formed within the first plurality of cut-outs and isolation zones being formed with the second plurality of cut-outs, applying a third conductive layer of material on a second side of the substrate, the third conductive layer forming a plurality of working electrode bus bar bases and an auxiliary electrode pattern base, applying a fourth conductive layer of material on the second side of the substrate, the fourth conductive layer forming a plurality of working electrode bus bar carbon layers, applying a fifth conductive layer of material overlaying the fourth conductive layer on the second side of the substrate forming a plurality of working electrode bus bars, applying a sixth conductive layer of material overlaying the auxiliary electrode pattern base on the second side of the substrate, the sixth conductive layer forming an auxiliary electrode pattern, applying an insulating layer of material on the second side of the substrate, the insulating layer exposing a plurality of auxiliary electrode zones and a plurality of working electrode zones and insulating a remainder of the plurality of wells, and adhering the substrate to a top plate having top plate openings defining the wells of the multi-well assay plate arranged in a well pattern, each well being defined by a well area.

In accordance with an embodiment hereof, a substrate having a top surface and a bottom surface is disclosed. The substrate comprises a plurality of electrochemical cells disposed on the top surface for performing electrochemical analysis, the plurality of electrochemical cells each including: one or more working electrode zones disposed on a surface of the cell, wherein each of the one or more working electrode zones are in electrical communication with one another, and at least one auxiliary electrode disposed on the surface of the cell, and an auxiliary electrode contact pattern disposed on the bottom surface and in electrical communication with the at least one auxiliary electrode, the auxiliary electrode contact pattern including a first plurality of cut-outs and a second plurality of cut-outs, wherein the first plurality of cut-outs are configured to accommodate at least one working electrode contact in electrical communication with the one or more working electrode zones, and the second plurality of cut-outs are configured to create a plurality of isolation zones.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

The foregoing and other features and advantages of the present invention will be apparent from the following description of embodiments hereof as illustrated in the accompanying drawings. The accompanying drawings, which are incorporated herein and form a part of the specification, further serve to explain the principles of various embodiments described herein and to enable a person skilled in the pertinent art to make and use various embodiments described herein. The drawings are not necessarily drawn to scale.

FIGS. 3A-3F, 4A-4F, 5A-5C, 6A-6F, 7A-7F, and 8A-8D illustrate several examples of designs of electrodes for use in the electrochemical cell of FIGS. 1A-1C or the multi-well plate of FIGS. 2A-2C, according to an embodiment disclosed herewith.

FIG. 14 illustrates a process of performing an ECL analysis using pulsed waveforms, according to an embodiment disclosed herewith.

FIG. 15 illustrates a process of performing an ECL analysis using pulsed waveforms, according to an embodiment disclosed herewith.

FIGS. 19A-19D illustrate several examples of electrode configuration in which tests were performed, according to an embodiment disclosed herewith.

DETAILED DESCRIPTION

Specific embodiments of the present invention are now described with reference to the figures. The following detailed description is merely exemplary in nature and is not intended to limit the present invention or the application and uses thereof. Furthermore, there is no intention to be bound by any expressed or implied theory presented in the preceding technical field, background, brief summary or the following detailed description.

Embodiments of the present disclosure are directed to electrochemical cells including an auxiliary electrode design and electrochemical analysis apparatuses and devices including the electrochemical cells. In embodiments, the auxiliary electrodes are designed to include a redox couple (e.g., Ag—AgC1) that provides a stable interfacial potential. In certain embodiments, materials, compounds, etc., can be doped to create a redox couple, although other manners of creating redox couples are contemplated as well. The auxiliary electrodes with a reduction-oxidation couple that defines a stable interfacial potential allows the auxiliary electrodes to serve as dual-function electrodes. That is, the one or more auxiliary electrodes operate concurrently as a counter electrode and a reference electrode. Because the auxiliary electrodes operate as dual-function electrodes, the space occupied by the auxiliary electrodes in an electrochemical cell is reduced thereby allowing additional configurations and numbers of working electrode zones to be included in the electrochemical cell.

In embodiments, the utilization of the one or more auxiliary electrodes also improves read times for electrochemical analysis apparatuses and devices during electrochemical analysis processes, for example, ECL processes. While it is common in conventional unreferenced ECL systems to employ slow voltage ramps that pass through the voltage that provides maximum ECL to provide tolerance to variability in the potential at the auxiliary electrode. The use of the auxiliary electrodes of the inventions, such as auxiliary electrode comprising a redox couple, provides improved control over this potential and enables the use of more efficient and faster waveforms such as short voltage pulses or fast voltage ramps.

Figures 1A, 1B:
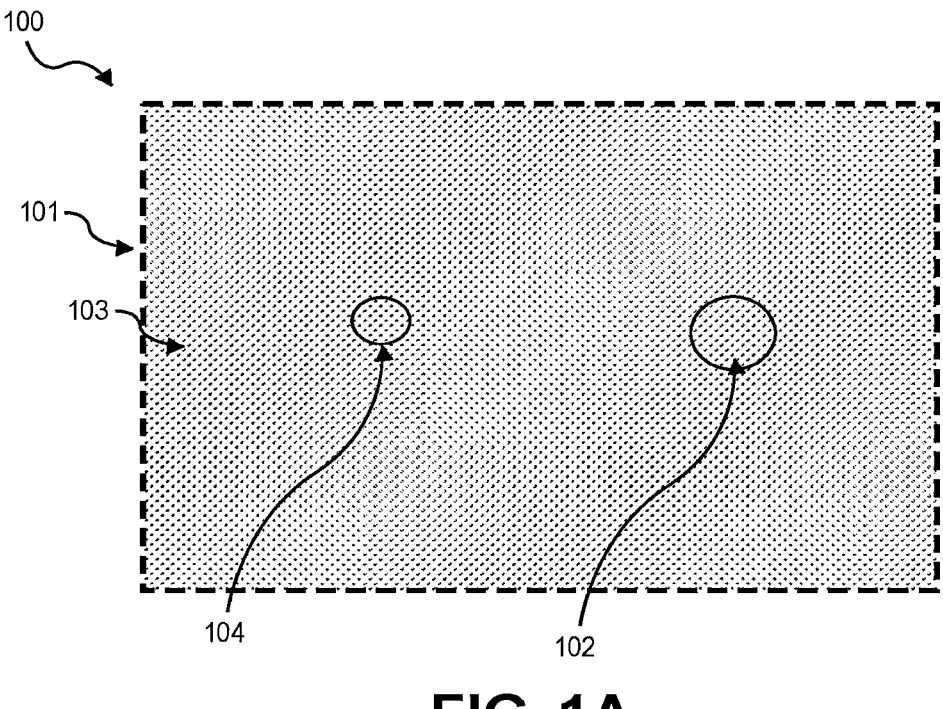
FIGS. 1A-1C illustrate several views of an electrochemical cell, according to an embodiment disclosed herewith

FIG. 1A illustrates an example of an electrochemical cell 100 in accordance with an embodiment hereof. As illustrated in FIG. 1A, the electrochemical cell 100 defines a working space 101 in which electrical energy is utilized to cause one or more chemical reactions. Within the working space (or sample area) 101, the electrochemical cell 100 may include one or more auxiliary electrodes 102 and one or more working electrode zones 104. The auxiliary electrode 102 and the working electrode zone 104 may be in contact with an ionic medium 103. The electrochemical cell 100 can operate through reduction-oxidation (redox) reactions caused by introducing electrical energy via the auxiliary electrode 102 and the working electrode zone 104. In some embodiments, the ionic medium 103 may include an electrolyte solution such as water or other solvent in which ions are dissolved, such as salts. In some embodiments, as described below in further detail, the ionic medium 103 or a surface of working electrode zone 104 may include luminescent species that generate and emit photons during the redox reaction. During operation of the electrochemical cell 100, an external voltage may be applied to one or more of auxiliary electrode 102 and the working electrode zone 104 to cause redox reactions to occur at these electrodes.

As described herein, when in use an auxiliary electrode will have an electrode potential that may be defined by the redox reactions occurring at the electrode. The potential may be defined, according to certain non-limiting embodiments, by: (i) a reduction-oxidation (redox) couple confined to the surface of the electrode or (ii) a reduction-oxidation (redox) couple in solution. As described herein, a redox couple includes a pair of elements, chemical substances, or compounds that interconvert through redox reactions, e.g., one element, chemical substance, or compound that is an electron donor and one element, chemical substance, or compound that is an electron acceptor. Auxiliary electrodes with a reduction-oxidation couple that defines a stable interfacial potential can serve as a dual-function electrodes. That is, the one or more auxiliary electrodes 102 may provide the functionality associated with both the counter and reference electrodes in a three electrode electrochemical system by providing high current flow (the function of the counter electrode in the 3 electrode system) while providing the ability to define and control the potential at the working electrodes (the function of the reference electrode in the 3 electrode system). The one or more auxiliary electrodes 102 may operate as a counter electrode by providing a potential difference with one or more of the one or more working electrode zones 104 during redox reactions that occur in the electrochemical cell 100 in which the one or more auxiliary electrodes 102 are located. Based on a chemical structure and composition of the one or more auxiliary electrodes 102, the one or more auxiliary electrodes 102 may also operate as a reference electrode for determining a potential difference with one or more of the working electrode zones 104.

In embodiments, the auxiliary electrode 102 may be formed of a chemical mixture of elements and alloys with a chemical composition permitting the auxiliary electrode 102 to function as a reference electrode. The chemical mixture (e.g., the ratios of elements and alloys in the chemical composition of the auxiliary electrode) can provide a stable interfacial potential during a reduction of the chemical mixture, such that a quantifiable amount of charge is generated throughout the reduction-oxidation reactions occurring in the electrochemical cell 100. In some embodiments, the chemical mixture of the one or more auxiliary electrodes 102 may include an oxidizing agent that provides a stable interfacial potential during a reduction of the chemical mixture, and an amount of the oxidizing agent in the chemical mixture may be greater than or equal to an amount of oxidizing agent required to provide for the entirety of the reduction-oxidation reactions in the electrochemical cell that occur during electrochemical reactions. In embodiments, the auxiliary electrode 102 is formed of a chemical mixture that provides an interfacial potential during a reduction of the chemical mixture, such that a quantifiable amount of charge is generated throughout the reduction-oxidation reactions occurring in the electrochemical cell 100. The chemical mixture of an auxiliary electrode 102 includes an oxidizing agent that supports redox reactions during operations of the electrochemical cell 100, e.g., during biological, chemical, and/or biochemical assays and/or analysis, such as, ECL generation and analysis.

In an embodiment, an amount of an oxidizing agent in a chemical mixture of the one or more auxiliary electrodes 102 is greater than or equal to an amount of oxidizing agent required for an entirety of a redox reaction that is to occur in the electrochemical cell 100, e.g., during one or more biological, chemical, and/or biochemical assays and/or analysis, such as ECL generation. For example, a sufficient amount of the chemical mixture in the one or more auxiliary electrodes 102 will still remain after a redox reaction occurs for an initial biological, chemical, and/or biochemical assays and/or analysis, thus allowing one or more additional redox reactions to occur throughout subsequent biological, chemical, and/or biochemical assays and/or analysis.

In some embodiments, an amount of an oxidizing agent in a chemical mixture of the one or more auxiliary electrodes 102 is based at least in part on a ratio of an exposed surface area (also referred to as areal surface area) of each of the one or more working electrode zones 104 to an exposed surface area of the one or more auxiliary electrode 102. As described herein, exposed surface area (also referred to as areal surface area) of the one or more auxiliary electrodes 102 refers to a two-dimensional (2D) cross-sectional area of the one or more auxiliary electrodes 102 that is exposed to the ionic medium 103. That is, as illustrated in FIG. 1B, an auxiliary electrode 102 may be formed in a three-dimensional (3D) shape that extends from a bottom surface of the electro-chemical cell 100 in the Z-direction. The exposed surface area of the auxiliary electrode 102 may correspond to a 2D cross-sectional area taken in the X-Y plane. In embodiments, the 2D cross-sectional area may be taken at any point of the auxiliary electrode 102, for example, at the interface with the bottom surface 120. While FIG. 1B illustrates the auxiliary electrode 102 being a regularly shaped cylinder, the auxiliary electrode 102 may have any shape whether regular or irregular. Likewise, the exposed surface area of the one or more working electrode zones 104 refers to a 2D cross-sectional area of the one or more auxiliary electrode zones 104 that is exposed to the ionic medium 103, for example, similar to the 2D cross-sectional area of the auxiliary electrode 102 described in FIG. 1B. In certain embodiments, the areal surface area (exposed surface area) can be distinguished from the true surface area, which would include the actual surface of the electrode, accounting for any height or depth in the z-dimension. Using these examples, the areal surface area is less than or equal to the true surface area.

In embodiments, the one or more auxiliary electrodes 102 may be formed of a chemical mixture that includes a redox couple that provides an interfacial potential that is at or near the standard reduction potential for the redox couple. In some embodiments, the one or more auxiliary electrodes 102 may including a mixture of silver (Ag) and silver chloride (AgCl), or other suitable metal/metal halide couples. In some embodiments, the one or more auxiliary electrodes 102, formed of a mixture of Ag—AgCl can provide an interfacial potential that is at or near the standard reduction potential for Ag—AgCl, approximately 0.22 V. Other examples of chemical mixtures may include metal oxides with multiple metal oxidation states, e.g., manganese oxide, or other metal/metal oxide couples, e.g., silver/silver oxide, nickel/nickel oxide, zinc/zinc oxide, gold/gold oxide, copper/copper oxide, platinum/platinum oxide, etc.) In some embodiments, the chemical mixture may provide an inter-facial potential that ranges from approximately 0.1 V to approximately 3.0 V. Table 1 lists examples of reduction potentials of redox couples for chemical mixtures, which may be included in the one or more auxiliary electrodes 102. One skilled in the art will realize that the examples of reduction potentials are approximate values and may vary by, for example, +/−5.0% based on chemical composition, temperature, impurities in the chemical mixture, or other conditions.

TABLE 1

| Reduction Potential at approximately 25 degrees Celsius | |
| --- | --- |
| Redox Couple | Approximate Reduction Potential (V) |
| Ag—AgCl | 0.22 |
| Ag—$Ag_2O$ | 1.17 |
| Ag—$Ag_2O_3$ | 1.67 |
| Ag—AgO | 1.77 |
| Mn—$MnO_2$ | 1.22 |
| Ni—$NiO_2$ | 1.59 |
| Fe—$Fe_2O_3$ | 0.22 |
| Au—$AuCl_2$ | 1.15 |
| Pt—$PtCl_6$ | 0.73 |

TABLE 1-continued

| Reduction Potential at approximately 25 degrees Celsius | |
| --- | --- |
| Redox Couple | Approximate Reduction Potential (V) |
| Au—$AuCl_4$ | 0.93 |
| Pt—$PtCl_4$ | 0.73 |

In embodiments, the chemical mixture of the redox couple in the one or more auxiliary electrodes can be based on a molar ratio of the redox couple that falls within a specified range. In some embodiments, the chemical mixture has a molar ratio of Ag to AgCl within a specified range, for example, approximately equal to or greater than 1. In some embodiments, the one or more auxiliary electrodes 102 may maintain a controlled interfacial potential until all of one or more chemical moieties, involved in the redox reaction, have been oxidized or reduced.

In some embodiments, the one or more auxiliary elec-trodes 102 may include a redox couple that maintains an interface potential of between −0.15 V to −0.5 V while passing a charge of approximately $1.56\times10^{-5}$ to $5.30\times10^{-4}$ C./$mm^2$ of electrode surface area. In some embodiments, the one or more auxiliary electrodes 102 may include a redox couple that passes approximately 0.5 mA to 4.0 mA of current throughout a redox reaction of the redox couple to generate ECL at a range of approximately 1.4 V to 2.6 V. In some embodiments, the one or more auxiliary electrodes 102 may include a redox couple that passes an average current of approximately 2.39 mA throughout a redox reac-tion to generate ECL at a range of approximately 1.4 V to 2.6 V.

In embodiments, the one or more auxiliary electrodes 102 may an amount of an oxidizing agent in the redox couple is greater than or equal to an amount of charge required to pass through the auxiliary electrode to complete the electro-chemical analysis. In some embodiments, the one or more auxiliary electrodes 102 may include approximately $3.07\times10^{-7}$ to $3.97\times10^{-7}$ moles of oxidizing agent. In some embodiments, the one or more auxiliary electrodes 102 may include between approximately $1.80\times10^{-7}$ to $2.32\times10^{-7}$ moles of oxidizing agent per $mm^2$ of exposed surface area. In some embodiments, the one or more auxiliary electrodes 102 may include at least approximately $3.7\times10^{-9}$ moles of oxidizing agent per $mm^2$ of total (or aggregate) exposed surface area of the one or more working electrode zones 104. In some embodiments, the one or more auxiliary electrodes may include at least approximately $5.7\times10^{-9}$ moles of oxi-dizing agent per $mm^2$ of total (or aggregate) exposed surface area of the one or more working electrode zones 104.

In embodiments, the one or more auxiliary electrodes 102 may include a redox couple where, when a voltage or potential is applied, a reaction of a species in the redox couple is a predominate redox reaction occurring at the one or more auxiliary electrodes 102. In some embodiments, the applied potential is less than a defined potential required to reduce water or perform electrolysis of water. In some embodiments, less than 1 percent of current is associated with the reduction of water. In some embodiments, less than 1 of current per unit area (exposed surface area) of the one or more auxiliary electrodes 102 is associated with the reduction of water.

In embodiments, the one or more auxiliary electrodes 102 (and the one or more working electrode zones 104) may be formed using any type of manufacturing process, e.g., printing, deposition, lithography, etching etc. In embodiments, a form of the chemical mixture of metal/metal halide can depend on the manufacturing process. For example, if one or more auxiliary electrodes 102 (and the one or more working electrode zones 104) are printed, the chemical mixture may be in the form of an ink or paste.) In some embodiments, one or more additional substances may be added to the one or more auxiliary electrodes 102 and/or the one or more working electrode zones 104 utilizing a doping process.

The working electrode zones 104 may be locations on an electrode on which a reaction of interest can occur. Reactions of interest may be chemical, biological, biochemical, electrical in nature (or any combination of two or more of these types of reactions). As described herein, an electrode (auxiliary electrode and/or working electrode) may be a continuous/contiguous area for which a reaction can occur, and an electrode "zone" may be a portion (or the whole) of the electrode on which a particular reaction of interest occurs. In certain embodiments, a working electrode zone 104 may comprise an entire electrode, and in other embodiments, more than one working electrode zone 104 may be formed within and/or on a single electrode. For example, the working electrode zones 104 may be formed by individual working electrodes. In this example, the working electrode zones 104 may be configured as a single electrode formed of one or more conducting materials. In another example, the working electrode zones 104 may be formed by isolating portions of a single working electrode. In this example, a single working electrode may be formed of one or more conducting materials, and the working electrode zones may be formed by electrically isolating areas ("zones") of the single working electrode using insulating materials such as a dielectric. In any embodiment, the working electrode zones 104 may be formed of any type of conducting materials such as metals, metal alloys, carbon compounds, doped metals, etc. and combinations of conducting and insulating materials.

In embodiments, the working electrode zones 104 may be formed of a conductive material. For example, the working electrode zones 104 may include a metal such as gold, silver, platinum, nickel, steel, iridium, copper, aluminum, a conductive alloy, or the like. In some embodiments, the working electrode zones 104 may include oxide coated metals (e.g., aluminum oxide coated aluminum). In some embodiments, the working electrode zones 104 may be formed of carbon-based materials such as carbon, carbon black, graphitic carbon, carbon nanotubes, carbon fibrils, graphite, carbon fibers and mixtures thereof. In some embodiments, the working electrode zones 104 may be formed of conducting carbon-polymer composites, conducting particles dispersed in a matrix (e.g., carbon inks, carbon pastes, metal inks), and/or conducting polymers. In some embodiments, as disclosed below in further detail, the working electrode zones 104 may be formed of carbon and silver layers fabricated using screen printing of carbon inks and silver inks. In some embodiments, the working electrode zones 104 may be formed of semiconducting materials (e.g., silicon, germanium) or semi-conducting films such as indium tin oxide (ITO), antimony tin oxide (ATO) and the like.

Figure 1C:
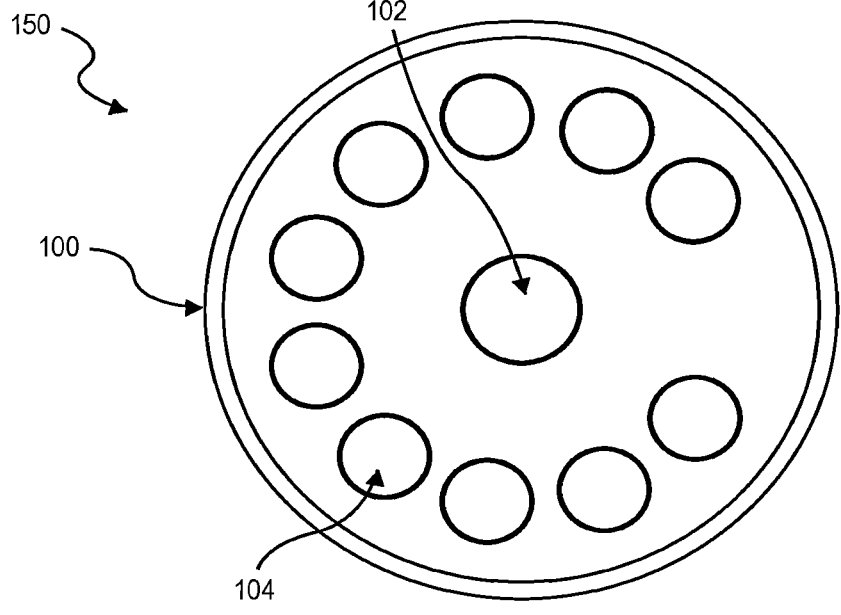

In embodiments, as described below in further detail, the one or more auxiliary electrodes 102 and the one or more working electrode zones 104 may be formed in different electrode designs (e.g., different sizes and/or shapes, different numbers of auxiliary electrodes 102 and working electrode zones 104, different positioning and patterns within the electrochemical cell 100, etc.) to improve electrochemical properties and analysis (e.g., ECL analysis) performed by apparatus and devices containing the electrochemical cell. FIG. 1C illustrates one example of an electrode design 150 for the electrochemical cell 100 including multiple working electrode zones. As illustrated in FIG. 1C, the electrochemical cell 100 may include ten (10) working electrode zones 104 and a single auxiliary electrode 102. Various other examples of the electrode design are discussed below in reference to FIGS. 3A-3F, 4A-4F, 5A-5C, 6A-6F, 7A-7F, and 8A-8D.

In embodiments, a configuration and placement of the working electrodes zones 104 within the electrochemical cell 100 can be defined according to an adjacency between the working electrode zones 104 and/or adjacency between the working electrode zones 104 and the one or more auxiliary electrodes 102. In some embodiments, adjacency can be defined as a relative number of neighboring working electrode zones 104 and/or the one or more auxiliary electrodes 102. In some embodiments, adjacency can be defined as a relative distance between the working electrode zones 104 and/or the one or more auxiliary electrodes 102. In some embodiments, adjacency can be defined as a relative distance from the working electrode zones 104 and/or the one or more auxiliary electrodes 102 to other features of the electrochemical cell 100 such as a perimeter of the electrochemical cell.

In embodiments in accordance herewith, for example, the one or more auxiliary electrodes 102 and the one or more working electrode zones 104 of a respective electrochemical cell 100 may be formed to have respective sizes such that a ratio of an aggregate of exposed surface area of the one or more working electrode zones 104 to an exposed surface area of the one or more auxiliary electrodes 102 is greater than 1, although other ratios are contemplated as electrochemical cell 100 (e.g., ratios equal to or less than or greater than 1). In some embodiments in accordance herewith, for example, each of the one or more auxiliary electrodes 102 and/or the one or more working electrode zones 104 may be formed in a circular shape having surface area that substantially defines a circle, although other shapes (e.g., rectangles, squares, ovals, clovers, or any other regular or irregular geometric shape).

In embodiments in accordance herewith, for example, the one or more auxiliary electrodes 102 and/or the one or more working electrode zones 104 may be formed in a wedge shape having a wedged-shape surface area. That is, the one or more auxiliary electrodes 102 and/or the one or more working electrode zones 104 may be formed having two opposing boundaries that have different dimensions, and two side boundaries that connect the two opposing boundaries. For example, the two opposing boundaries may include a wide boundary and a narrow boundary, where the wide boundary has a length that is longer than the narrow boundary. In some embodiments, the wide boundary and/or the narrow boundary may be blunt, e.g., rounded corners at a connection to the side boundaries. In some embodiments, the wide boundary and/or the narrow boundary may be sharp, e.g., angular corner at a connection to the side boundaries. In embodiments, the wedge shape may be utilized to maximize the available area at the bottom surface 120 of the electrochemical cell. For example, if the working area 101 of the electrochemical cell is circular, one or more working electrode zones 104, with the wedge shape, can be arranged such that the wide boundary is adjacent to an outer perimeter of the working area 101 and the narrow boundary is adjacent to a center of the working area 101.

In embodiments, the electrochemical cell 100 may be included in an apparatus or device for performing electrochemical analysis. In some embodiments, the electrochemical cell 100 can form a portion of a well for an assay device that performs electrochemical analysis, such as an ECL immunoassay, as described below. In some embodiments, the electrochemical cell 100 may form a flow cell in a cartridge that is used in an analysis device or apparatus, e.g., flow cytometer. One skilled in the art will realize that the electrochemical cell 100 may be utilized in any type of apparatus or device in which a controlled redox reaction is performed.

Figure 2A:
FIG. 2A illustrates a top view of a multi-well plate including multiple sample areas, according to an embodiment disclosed herewith.
Figure 2B:
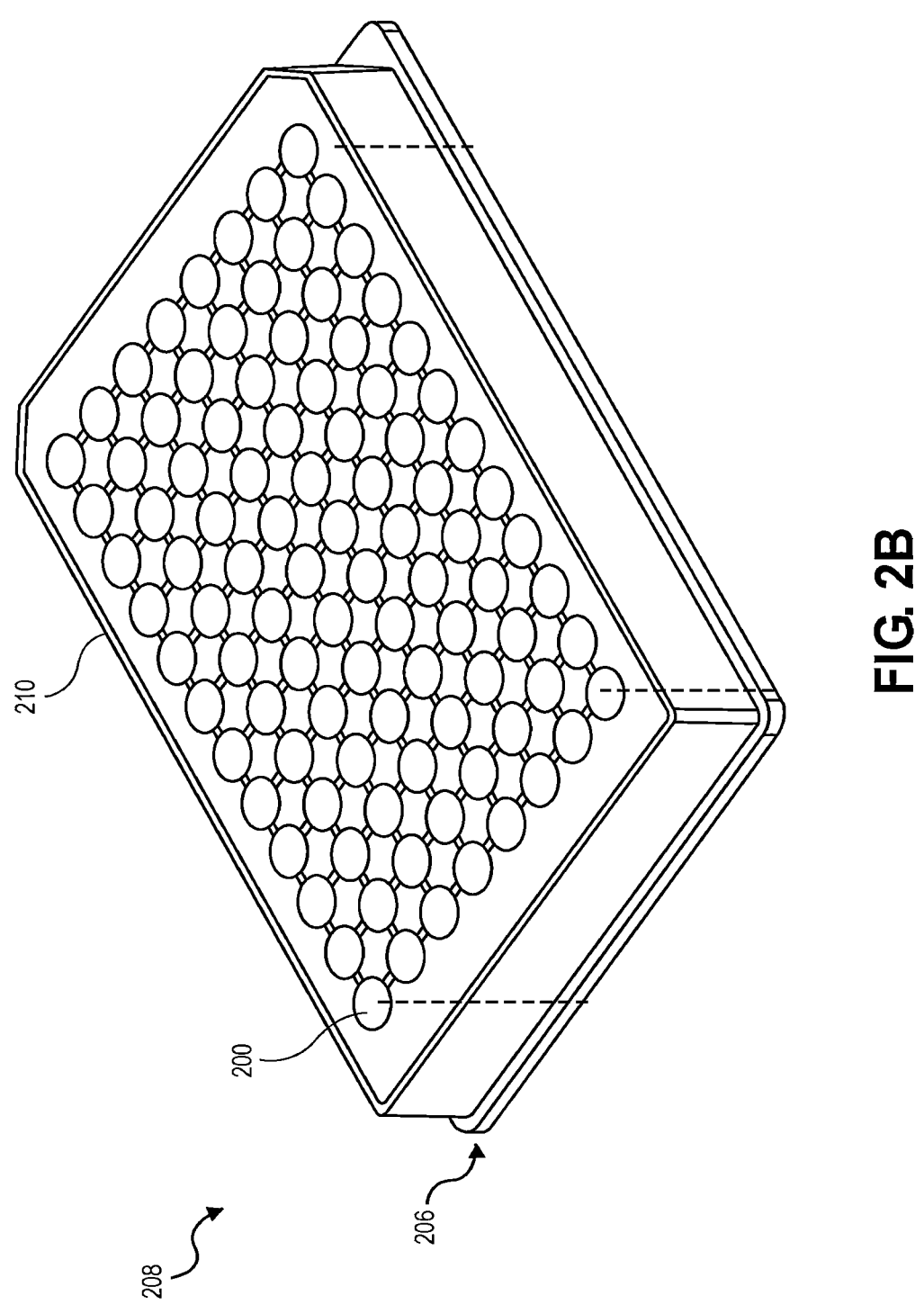
FIG. 2B illustrates a multi-well plate for use in an assay device including multiple sample areas, according to an embodiment disclosed herewith.
Figure 2C:
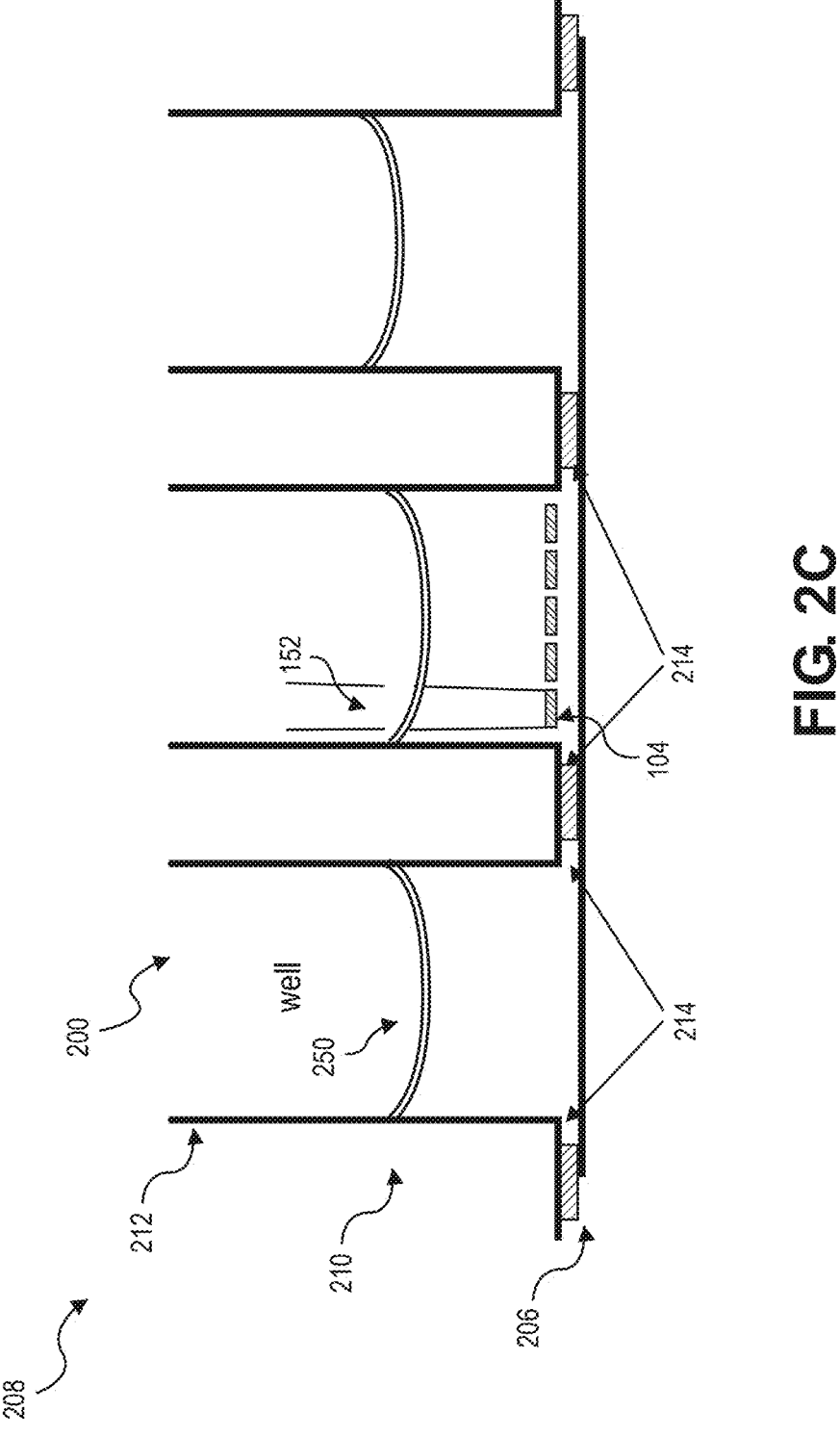
FIG. 2C illustrates a side view of a sample area of the multi-well plate of FIG. 1C, according to an embodiment disclosed herewith.

FIGS. 2A-2C illustrate several views of a sample area ("well") 200 including an electrochemical cell (e.g., electrochemical cell 100), including an auxiliary electrode design, for use in an assay device for biological, chemical, and/or biochemical analysis in accordance with an embodiment hereof. One skilled in the art will realize that FIGS. 2A-2C illustrate one example of wells in an assay device and that existing components illustrated in FIGS. 2A-2C may be removed and/or additional components may be added without departing from the scope of embodiments described herein. Furthermore, although the wells 200 shown in FIGS. 2A-2C are circular in nature, other well shapes may be included as well. For example, square wells, square wells with rounded corners, oval wells, rectangular wells, rectangular wells with rounded corners, triangular wells, hexagonal wells, etc.

As illustrated in FIG. 2A, which is a top view, a base plate 206 of a multi-well plate 208 (illustrated in FIG. 2B) may include multiple wells 200. The base plate 206 may form a bottom of each well 200 and may include one or more auxiliary electrodes 102 and one or more working electrode zones 104 disposed on and/or within a surface of the base plate 206 of the multi-well plate 208. As illustrated in FIG. 2B, which is a perspective view, the multi-well plate 208 may include a top plate 210 and the base plate 206. The top plate 210 may define the wells 200 that extend from a top surface of the top plate 210 to the base plate 206, where the base plate 206 forms a bottom surface 207 of each well 200. In operation, light generation occurs when a voltage is applied across the one or more working electrode zones 104 and the one or more auxiliary electrodes 102 located in a well 200 that holds a material under testing. The applied voltage triggers a cyclical oxidation and reduction reaction, which causes photon (light) generation and emission. The emitted photon may then be measured to analyze the material under testing.

Depending on whether the reaction occurring at a working electrode zone 104 is accepting or supplying electrons, the reaction at the working electrode zone 104 is a reduction or an oxidation, respectively. In embodiments, the working electrode zones 104 may be derivatized or modified, for example, to immobilize assay reagents such as binding reagents on electrodes. For example, the working electrode zones 104 may be modified to attach antibodies, fragments of antibodies, proteins, enzymes, enzyme substrates, inhibitors, cofactors, antigens, haptens, lipoproteins, liposaccharides, bacteria, cells, sub-cellular components, cell receptors, viruses, nucleic acids, antigens, lipids, glycoproteins, carbohydrates, peptides, amino acids, hormones, protein-binding ligands, pharmacological agents, and/or combinations thereof. Likewise, for example, the working electrode zones 104 may be modified to attach non-biological entities such as, but not limited to polymers, elastomers, gels, coatings, ECL tags, redox active species (e.g., tripropylamine, oxalates), inorganic materials, chemical functional groups, chelating agents, linkers etc. Reagents may be immobilized on the one or more working electrode zones

104 by a variety of methods including passive adsorption, specific binding and/or through the formation of covalent bonds to functional groups present on the surface of the electrode.

For example, ECL species may be attached to the working electrode zones 104 that may be induced to emit ECL for analytical measurements to determine the presence of a substance of interest in a fluid in the well 200. For example, species that may be induced to emit ECL (ECL-active species) have been used as ECL labels. Examples of ECL labels include: (i) organometallic compounds where the metal is from, for example, the noble metals that are resistant to corrosion and oxidation, including Ru-containing and Os-containing organometallic compounds such as the tris-bipyridyl-ruthenium (RuBpy) moiety and ii) luminol and related compounds. Species that participate with the ECL label in the ECL process are referred to herein as ECL coreactants. Commonly used coreactants include tertiary amines such as triisopropylamine (TPA), oxalate, and persulfate for ECL from RuBpy and hydrogen peroxide for ECL from luminol. The light generated by ECL labels may be used as a reporter signal in diagnostic procedures. For instance, an ECL label may be covalently coupled to a binding agent such as an antibody or nucleic acid probe; the participation of the binding reagent in a binding interaction may be monitored by measuring ECL emitted from the ECL label. Alternatively, the ECL signal from an ECL-active compound may be indicative of the chemical environment.

In embodiments, the working electrode zones 104 and/or the auxiliary electrodes 102 (or other components of the well 200) can also be treated (e.g., pretreated) with materials and/or processes that improve attachment (e.g., absorption) of materials, used in the electrochemical processes (e.g., reagents, ECL species, labels, etc.), to the surface of the working electrode zones 104 and/or the auxiliary electrodes. In some embodiments, the working electrode zones 104 and/or the auxiliary electrodes 102 (or other components of the well 200) may be treated using a process (e.g., plasma treatment) that causes a surface of the working electrode zones 104 and/or the auxiliary electrodes 102 (or other components of the well 200) to exhibit hydrophilic properties (also referred to herein as "High Bind" or "HB"). In some embodiments, the working electrode zones 104 and/or the auxiliary electrodes 102 (or other components of the well 200) may be untreated or treated using a process that causes a surface of the working electrode zones 104 and/or the auxiliary electrodes 102 (or other components of the well 200) to exhibit hydrophobic properties (also referred to herein as "Standard" or "Std").

As illustrated in FIG. 2C, which is a side sectional view of a portion of the multi-well plate 208 of FIG. 2B, a number of the wells 200 may be included on the multi-well plate 208—three of which are shown in FIG. 2C. Each well 200 may be formed by the top plate 210 that includes one or more sidewalls 212 that form a boundary of the electrochemical cell 100. The one or more sidewalls 212 extend from a bottom surface of the top plate 210 to the top surface of the top plate 210. The wells 200 may be adapted to hold one or more fluids 250, such as an ionic medium as described above. In certain embodiments, one or more wells 200 may be adapted to hold gases and/or solids in place of or in addition to the one or more fluids 250. In embodiments, the top plate 210 may be secured to the base plate 206 with an adhesive 214 or other connection material or device.

The multi-well plate 208 may include any number of the wells 200. For example, as illustrated in FIGS. 2A and 2B, the multi-well plate 208 may include 96 wells 200. One skilled in the art will realize that the multi-well plate 208 may include any of number of the wells 200 such as 6 wells, 24, 384, 1536, etc., formed in a regular or irregular pattern. In other embodiments, the multi-well plates 208 may be replaced by a single-well plate or any other apparatus suitable for conducting biological, chemical, and/or biochemical analysis and/or assays. Although wells 200 are depicted in FIGS. 2A-2C in a circular configuration (thus forming cylinders) other shapes are contemplated as well, including ovals, squares, and/or other regular or irregular polygons. Further, the shape and configuration of multi-well plate 108 can take multiple forms and are not necessarily limited to a rectangular array as illustrated in these figures.

In some embodiments, as discussed above, the working electrode zones 104 and/or the auxiliary electrodes 102 used in the multi-well plate 108 may be non-porous (hydrophobic). In some embodiments, the working electrode zones 104 and/or the auxiliary electrodes 102 may be porous electrodes (e.g., mats of carbon fibers or fibrils, sintered metals, and metals films deposited on filtration membranes, papers or other porous substrates). When configured as porous electrodes, the working electrode zones 104 and/or the auxiliary electrodes 102 can employ filtration of solutions through the electrode so as to: i) increase mass transport to the electrode surface (e.g., to increase the kinetics of binding of molecules in solution to molecules on the electrode surface); ii) capture particles on the electrode surface; and/or iii) remove liquid from the well.

In embodiments as discussed above, each of the auxiliary electrodes 102 in the wells 200 is formed of a chemical mixture that provides a defined potential during a reduction of the chemical mixture, such that a quantifiable amount of charge is generated throughout the reduction-oxidation reactions occurring in the well 200. The chemical mixture of an auxiliary electrode 102 includes an oxidizing agent that supports reduction-oxidation reaction, which can be used during biological, chemical, and/or biochemical assays and/or analysis, such as, for example, ECL generation and analysis. In an embodiment, an amount of an oxidizing agent in a chemical mixture of an auxiliary electrode 102 is greater than or equal to an amount of oxidizing agent required for the amount of charge that will pass through the auxiliary electrode, and/or the amount of charge needed to drive the electrochemical reactions at the working electrodes in the at least one well 200 during one or more biological, chemical, and/or biochemical assays and/or analysis, such as ECL generation. In this regard, a sufficient amount of the chemical mixture in the auxiliary electrode 102 will still remain after a redox reaction occurs for an initial biological, chemical, and/or biochemical assays and/or analysis, thus allowing one or more additional redox reactions to occur throughout subsequent biological, chemical, and/or biochemical assays and/or analysis. In another embodiment, an amount of an oxidizing agent in a chemical mixture of an auxiliary electrode 102 is at least based in part on a ratio of an exposed surface area of each of the plurality of working electrode zones to an exposed surface area of the auxiliary electrode.

In embodiments, the one or more auxiliary electrodes 102 of the well 200 may be formed of a chemical mixture that includes a redox couple, as discussed above. In some embodiments, the one or more auxiliary electrodes 102 of the well 200 may be formed of a chemical mixture that includes a mixture of silver (Ag) and silver chloride (AgCl), or other suitable metal/metal halide couples. Other examples of chemical mixtures can include metal oxides with multiple metal oxidation states, e.g., manganese oxide, or other metal/metal oxide couples, e.g., silver/silver oxide, nickel/ nickel oxide, zinc/zinc oxide, gold/gold oxide, copper/copper oxide, platinum/platinum oxide, etc.) In embodiments, the auxiliary electrodes 102 (and the working electrode zones 104) may be formed using any type of manufacturing process, e.g., printing, deposition, lithography, etching etc. In embodiments, the form of the chemical mixture of metal/metal halide may depend on the manufacturing process. For example, if the auxiliary electrodes are printed, the chemical mixture may be in the form of an ink or paste.

For certain applications, such as ECL generation, various embodiments of the auxiliary electrodes 102 could be adapted to prevent polarization of the electrode throughout ECL measurements by including a sufficiently high concentration of accessible redox species. The auxiliary electrodes 102 may be formed by printing the auxiliary electrodes 102 on the multi-well plate 208 using an Ag—AgCl chemical mixture (e.g., ink, paste, etc.) that has a defined ratio of Ag to AgCl. In an embodiment, an amount of oxidizing agent in a chemical mixture of an auxiliary electrode is at least based in part of a ratio of Ag to AgCl in the chemical mixture of the auxiliary electrode. In an embodiment, a chemical mixture of an auxiliary electrode having Ag and AgCl comprises approximately 50 percent or less AgCl, for example, 34 percent, 10 percent, etc.

In some embodiments, the one or more auxiliary electrodes 102 in a well 200 may include at least approximately $3.7 \times 10^{-9}$ moles of oxidizing agent per $mm^2$ of total working electrode area in the well 200. In some embodiments, the one or more auxiliary electrodes 102 in a well 200 may include at least approximately $5.7 \times 10^{-9}$ moles of oxidizing agent per $mm^2$ of total working electrode area in the well.

In various embodiments, the one or more auxiliary electrodes 102 and the working electrode zones 104 may be formed in different electrode designs (e.g., different sizes and/or shapes, different numbers of auxiliary electrodes 102 and working electrode zones 104, different positioning and patterns within the well, etc.) to improve electrochemical analysis (e.g., ECL analysis) performed by an assay device including one or more of the wells 200, examples of which are discussed below in reference to FIGS. 3A-3F, 4A-4F, 5A-5C, 6A-6F, 7A-7F, and 8A-8D. In embodiments in accordance herewith, for example, the one or more auxiliary electrodes 102 and the one or more working electrode zones 104 of a respective well 200 may be formed to have respective sizes such that a ratio of an aggregate of exposed surface area of the working electrode zones 104 to an exposed surface area of the auxiliary electrodes 102 is greater than 1, although other ratios are contemplated as well (e.g., ratios equal to or less than or greater than 1). In embodiments in accordance herewith, for example, each of the auxiliary electrodes 102 and/or the working electrode zones 104 may be formed in a circular shape having surface area that substantially defines a circle, although other shapes (e.g., rectangles, squares, ovals, clovers, or any other regular or irregular geometric shape). In embodiments in accordance herewith, for example, the auxiliary electrodes 102 and/or the working electrode zones 104 may be formed in a wedge shape having a wedged-shape surface area, where a first side or end of the wedged-shape surface area, adjacent to a sidewall of the well 200, is greater than a second side or end of the wedged-shape surface area, adjacent a center of the well 200. In other embodiments the second side or end of the wedged-shape surface area is greater than the first side or end of the wedged-shape surface. For example, the auxiliary electrodes 102 and the working electrode zones 104 may be formed in a pattern that maximizes space available for the auxiliary electrodes 102 and the working electrode zones 104.

In some embodiments, the one or more auxiliary electrodes 102 and/or the one or more working electrode zones 104 may be formed having a wedge shape, where two opposing boundaries that have different dimensions, and two side boundaries that connect the two opposing boundaries. For example, the two opposing boundaries may include a wide boundary and a narrow boundary, where the wide boundary has a length that is longer than the narrow boundary. In some embodiments, the wide boundary and/or the narrow boundary may be blunt, e.g., rounded corners at a connection to the side boundaries. In some embodiments, the wide boundary and/or the narrow boundary may be sharp, e.g., angular corner at a connection to the side boundaries. In embodiments, the wedge shape may be utilized to maximize the available area at the bottom surface 120 of the electrochemical cell. For example, if the working area 101 of the electrochemical cell is circular, one or more working electrode zones 104, with the wedge shape, can be arranged such that the wide boundary is adjacent to an outer perimeter of the working area 101 and the narrow boundary is adjacent to a center of the working area 101.

In embodiments in accordance herewith, auxiliary electrodes 102 and one or more working electrode zones 104 of a respective well 200 may be formed in the bottom of a well 200 according to different positioning configurations or patterns. The different positioning configuration or patterns may improve electrochemical analysis (e.g., ECL analysis) performed by an assay device including one or more of the wells 200, examples of which are discussed below in reference to FIGS. 3A-3F, 4A-4F, 5A-5C, 6A-6F, 7A-7F, and 8A-8D. The auxiliary electrodes 102 and the working electrode zones 104 may be positioned within the well according to a desired geometric pattern. For example, the auxiliary electrodes 102 and the working electrode zones 104 may be formed in a pattern that minimizes the number of working electrode zones 104 that are adjacent to one another for each of the working electrode zones 104 among the total number of working electrode zones 104. This may allow for more working electrode zones to be positioned adjacent to an auxiliary electrode 102. For instance, as illustrated in FIGS. 3A-3F and described in detail below, the working electrode zones 104 may be formed in a circular or semicircular shape that minimizes the number of working electrode zones 104 that are adjacent to one another.

Figures 5A, 5B:
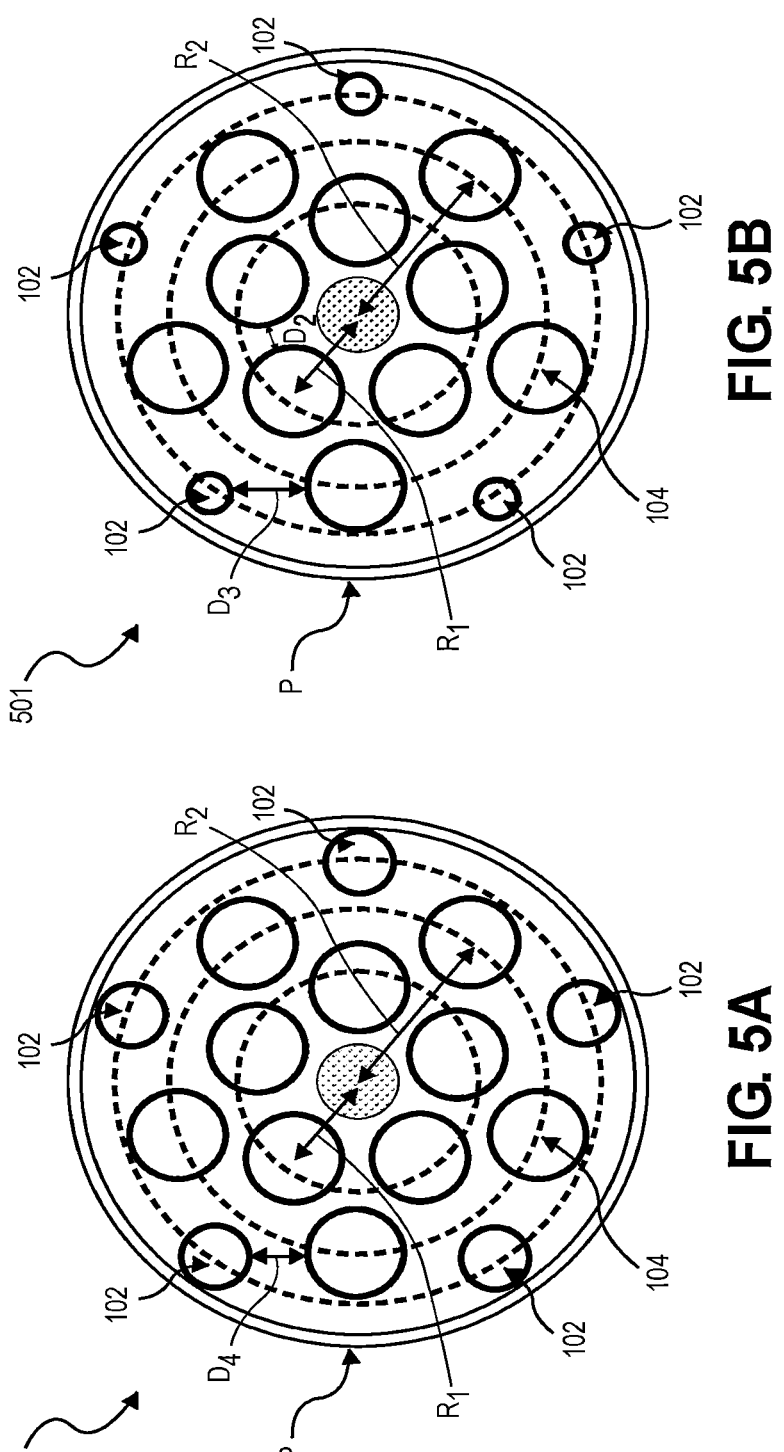
Figure 5C:
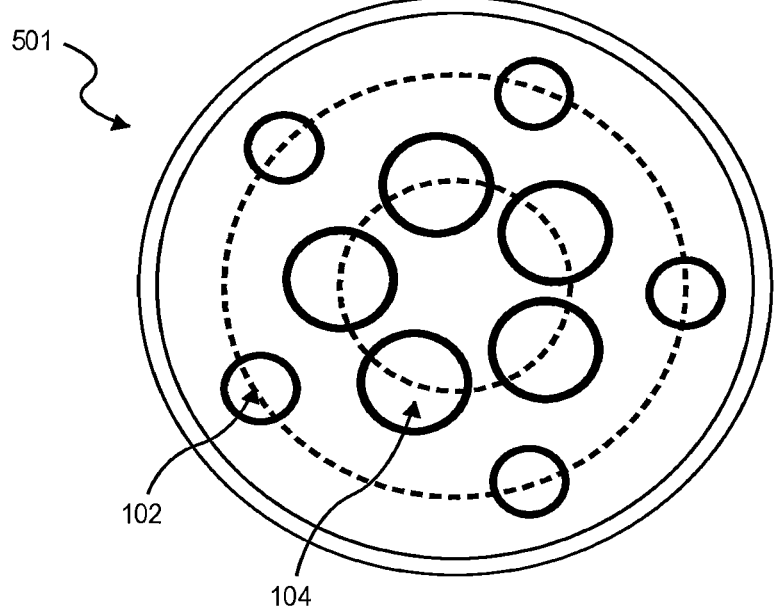

In another example, as illustrated in FIGS. 3A-3F, the auxiliary electrodes 102 and the working electrode zones 104 of a respective well 200 may be formed in a pattern where a number of the working electrode zones 104 that are adjacent to one another is no greater than two. For example, the working electrode zones 104 may be formed in a circular or semi-circular pattern adjacent to a parameter of a well (e.g., the sidewalls 212) such that at most two working electrode zones 104 are adjacent. In this example, the working electrode zones 104 form an incomplete circle such that two of the working electrode zones 104 have only one adjacent or neighboring working electrode zone 104. In another example, an auxiliary electrodes 102 and the working electrode zones 104 of a respective well 200 may be formed in a pattern where at least one of the working electrode zones 104 is adjacent to three or more other working electrode zones 104 among the total number of working electrode zones 104. For instance, as illustrated in FIGS. 5A-5C described in detail below, the auxiliary electrode 102 and the working electrode zones 104 may be formed in a star-shaped pattern where the number of adjacent the auxiliary electrodes 102 and/or the working electrode zones 104 is dependent on the number of points in the star-shaped pattern.

In an embodiment in accordance herewith, an auxiliary electrodes 102 and one or more working electrode zones 104 of a respective well 200 may be formed in a pattern where the pattern is configured to improve mass transport of a substance to each of the working electrode zones 104. For example, during orbital shaking or mixing, mass transport of substances to a zone at the center of the well 200 may be relatively slow compared to zone away from the center, and the pattern may be configured to improve mass transport by minimizing or eliminating the number of the working electrode zones 104 disposed at a center of a well 200. That is, during operations, the wells 200 may undergo orbital motion or "shaking" in order to mix or combine fluids contained within the wells 200. The orbital motion may cause a vortex to occur within the wells 200, e.g., leading to more liquid and faster liquid motion near the sidewalls 212 (perimeter) of the wells 200. For instance, as illustrated in FIGS. 2A-2F, 3A-3F, 5A-5F, 6A-6F, and 7A-7D describe in detail below, the working electrode zones 104 may be formed in a circular or semicircular shape and located near a perimeter of the well 200.

In an embodiment in accordance herewith, auxiliary electrodes 102 and one or more working electrode zones 104 of respective wells 200 may be formed in a pattern where the pattern is configured to reduce meniscus effects caused by introducing liquid into one or more of the wells 200 of the multi-well plate 108. For example, as illustrated in FIG. 2C, the fluid 250 in the well 200 may form a curved upper surface or meniscus 252 within the well 200. The curved upper surface may be caused by several factors, such as surface tension, electrostatic effects, and fluid motion (e.g., due to orbital shaking), and the like. Due to the meniscus effects, photons (light) emitted during luminescence undergoes different optical effects (e.g., refraction, diffusion, scattering, etc.) based on the photons optical path through the liquid. That is, as light is emitted from the substances in the well 200, the different levels of the liquid may cause different optical effects (e.g., refraction, diffusion, scattering, etc.) in the emitted light that is dependent on where the light travels through and exits the liquid. The pattern may mitigate meniscus effects by disposing each of the working electrode zones 104 at an approximate equal distance from each sidewall 212 of the well 200. As such, photons emitted from the working electrode zones 104 travel a similar optical path through the liquid. In other words, the pattern ensures that all working electrode zones 104 are equally affected by meniscus effects, e.g., minimizes potential disparate effects of the meniscus. Thus, if the working electrode zones 104 are positioned at difference locations relative to the level of the liquid in the well 200, the emitted light may undergo differing optical distortions. For instance, as illustrated in FIGS. 3A-3F, 4A-4F, 6A-6F, 7A-7F, and 8A-8D describe in detail below, the working electrode zones 104 may be formed in a circular or semicircular shape and located near a perimeter of the well 200. As such, light emitted at the working electrode zones 104 may undergo the same optical distortion and be equally addressed.

In an embodiment in accordance herewith, an auxiliary electrode 102 and one or more working electrode zones 104 of respective wells 200 may be formed in a pattern configured to minimize the mass transport differences to working electrode zones during mixing of liquids (e.g., vortices formed in cylindrical wells using an orbital shaker) in one or more of the wells 200 of the multi-well plate 208. For example, the pattern may be configured to reduce vortex effects by minimizing or eliminating the number of working electrode zones 104 disposed at or near the center of a respective well 200. For instance, as illustrated in FIGS. 2A-2F, 3A-3F, 5A-5F, 6A-6F, 7A-7D, and 8A describe in detail below, the working electrode zones 104 may be formed in a circular or semicircular shape and located near a perimeter of the well 200.

In an embodiment in accordance herewith, an auxiliary electrode 102 and one or more working electrode zones 104 of a respective well 200 may be formed in a geometric pattern. For example, the geometric pattern may include a circular or semi-circular pattern of working electrode zones 104, wherein each of the working electrode zones 104 may be disposed at an approximately equal distance from a sidewall of the well 200, and an auxiliary electrodes 102 that may be disposed within a perimeter (either the entire perimeter or just a portion of it) defined by the circular or the semi-circular pattern of the working electrode zones 104, although other shapes and/or patterns are contemplated as well. For example, when well 200 is embodied as a square-shaped well, the working electrode zones 104 may be arranged in a square- or rectangular-shaped ring pattern around the entire or just a portion of the perimeter of the well 200.

In another embodiment, for example, a geometric pattern may include a pattern where the working electrode zones 104 define a star-shaped pattern, wherein an auxiliary electrode 102 may be disposed between two adjacent working electrode zones 104 that define two adjacent points of the star-shaped pattern. For example, the star-shaped pattern may be formed with the auxiliary electrodes 102 forming the "points" of the star-shaped pattern and the working electrode zones 104 forming the inner structure of the star-shaped pattern. For instance, in a five point star pattern, the auxiliary electrodes 102 may form the five "points" of the star-shaped pattern and the working electrode zones 104 may form the inner "pentagon" structure, as illustrated in FIG. 5A-5C described below in further detail. In some embodiment, the star pattern may also be defined as one or more concentric circles, where the one or more working electrodes 104 and/or the one or more auxiliary electrodes may be placed in a circular pattern around the one or more concentric circles, as illustrated in FIG. 5A-5C described below in further detail.

Figures 3A, 3B:
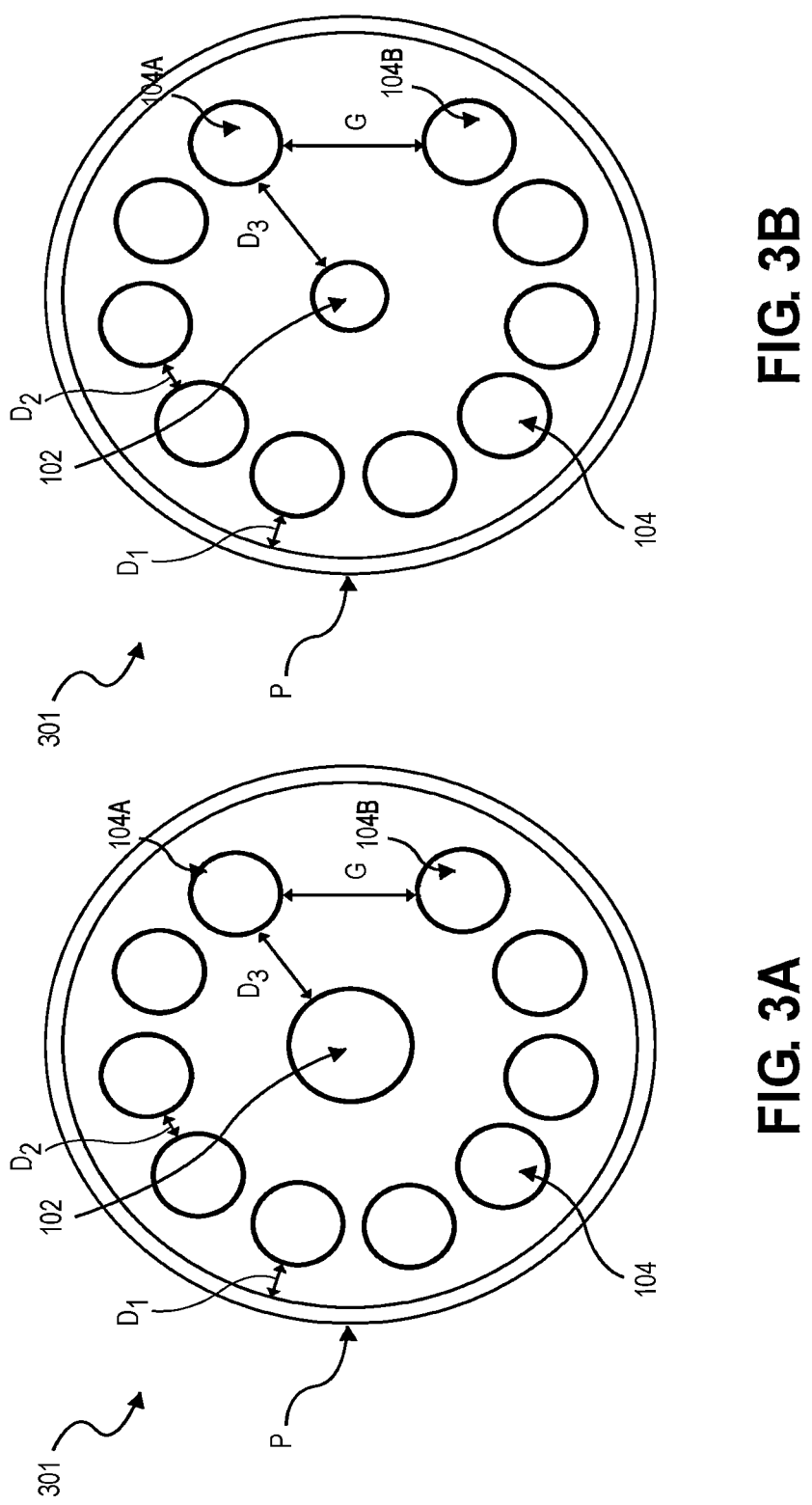

FIGS. 3A and 3B illustrate embodiments of an electrode design 301 of a well 200 that has circular-shaped working electrode zones 104 disposed in an open ring pattern. According to the exemplary, non-limiting embodiment illustrated in FIG. 3A, a bottom 207 of the well 200 may include a single auxiliary electrode 102. In other embodiments, more than one (1) auxiliary electrode 102 may be included in well 200 (e.g., 2, 3, 4, 5, etc.) In embodiments, the auxiliary electrode 102 may be formed to have an approximate circular shape. In other embodiments, the auxiliary electrode 102 may be formed to have other shapes (e.g., rectangles, squares, ovals, clovers, or any other regular or irregular geometric shape).

In embodiments, the well 200 may include ten (10) working electrode zones 104. In other embodiments, fewer or more than ten working electrode zones 104 may be included in well 200 (e.g., 1, 2, 3, 4, etc.) In embodiments, the working electrode zones 104 may be formed to have an approximate circular shape. In other embodiments, the working electrode zones 104 may be formed to have other shapes (e.g., rectangles, squares, ovals, clovers, or any other regular or irregular geometric shape).

The working electrode zones 104 may be positioned with respect to each other in a semi-circular or substantially "C-shaped" pattern adjacent to a perimeter "P" of the well 200 at a distance "$D_1$." In some embodiments, the distance, $D_1$, may be a minimum distance between a boundary of the working electrode zones 104 and the perimeter, P. That is, each of the working electrode zones 104 may be positioned an equal distance, $D_1$, from the perimeter, P, of the well 200 and each of the working electrode zones 104 is equally spaced from another by a distance, "$D_2$," (also referred to as working electrode (WE-WE) pitch). In some embodiments, the distance, $D_2$, may be a minimum distance between a boundary of two adjacent working electrode zones 104. In some embodiments, two working electrode zones 104A, 104B may be spaced apart from each other a sufficient distance so as to form a gap "G." In certain embodiments, the gap, G, may allow electrical traces or contacts to be electrically coupled to the auxiliary electrode 102 without electrically interfering with the working electrode zones 104, thereby maintaining electrical isolation of the auxiliary electrode 102 and the working electrode zones 104. For example, the gap, G, may be formed with a suffice distance to allow an electrical trace to be formed between adjacent working electrode zones 104.

In certain embodiments, distance $D_1$ may not be equal between one or more working electrode zones 104 and perimeter P of well 200. In further embodiments, distance, $D_2$, may not be equal between two or more of the working electrode zones 104. The auxiliary electrode 102 may be positioned in a center of the C-shaped pattern at an equal distance, "$D_3$," (also referred to as WE-AUXILIARY pitch) from each of the working electrode zones 104, although in other embodiments, distance $D_3$ may vary for one or more of the working electrode zones 104 as measured to the auxiliary electrode 102. In certain embodiments, as illustrated, the distance, $D_1$, the distance, $D_2$, the distance, $D_3$, and the distance, G, may be measured from a closest relative point on a perimeter of the respective feature (e.g., working electrode zone 104, auxiliary electrode 102, or perimeter P). In some embodiments, the distance, $D_3$, may be a minimum distance between a boundary of a working electrode zones 104 and a boundary of an auxiliary electrode. One skilled in the art will realize that the distances may be measured from any relative point on a feature in order to produce a repeatable pattern, for example, a geometric pattern.

Figures 3C, 3D, 3E, 3F:
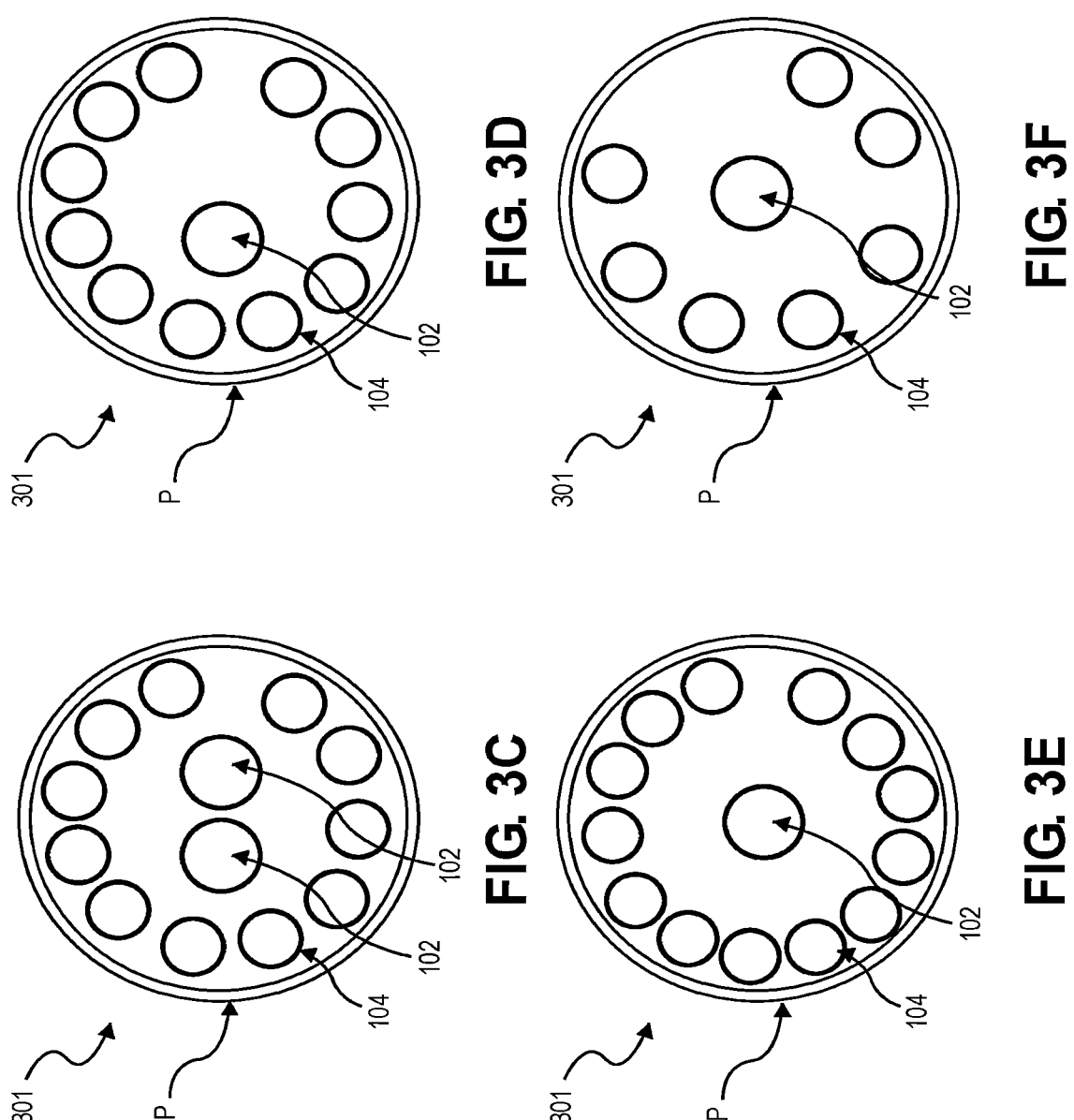

Although these figures depict a single auxiliary electrode 102, more than one may be included as well, as illustrated in FIG. 3C. Further, although auxiliary electrode 102 is depicted in these figures as being disposed at an approximate (or true) center of well 200, auxiliary electrode 102 may be disposed at other locations of the well 200 as well, as illustrated in FIG. 3D. Additionally, while these figures illustrate ten (10) working electrode zones 104, greater or fewer number of working electrode zones 104 may be included, as illustrated in FIG. 3E and 3F.

In embodiments, the size of the auxiliary electrode 102 and/or the working electrode zones 104 may be varied. For example, the size of each of the working electrode zones 104 may be equal, and the size of the auxiliary electrode 102 may be varied such as by varying a diameter thereof, as shown in Table 2. One skilled in the art will realize that the dimensions included in Table 2 are approximate values and may vary by, for example, +/-5.0% based on conditions such as manufacturing tolerances.

TABLE 2

Exemplary dimensions for working electrode zones 104 and auxiliary electrode
102 according to certain embodiments with ten (10) working electrode zones

| WE Zone Diameter (in) | WE Zone Exposed Surface Area (sq in) | Total WE Spot Area (10 spots - sq in) | Auxiliary Electrode Diameter (in) | Auxiliary Electrode Exposed Surface Area (sq in) | WE/ Auxiliary Electrode Area Ratio | Spot Edge to Plate Wall (in) | $D_2$ (in) |
|---|---|---|---|---|---|---|---|
| 0.037 | 0.00106 | 0.0106 | 0.048 | 0.00181 | 5.85 | 0.0200 | 0.0120 |
| 0.037 | 0.00106 | 0.0106 | 0.044 | 0.00152 | 6.96 | 0.0200 | 0.0120 |
| 0.037 | 0.00106 | 0.0106 | 0.040 | 0.00126 | 8.42 | 0.0200 | 0.0120 |
| 0.037 | 0.00106 | 0.0106 | 0.036 | 0.00102 | 10.39 | 0.0200 | 0.0120 |
| 0.037 | 0.00106 | 0.0106 | 0.032 | 0.00080 | 13.16 | 0.0200 | 0.0120 |
| 0.037 | 0.00106 | 0.0106 | 0.028 | 0.00062 | 17.18 | 0.0200 | 0.0120 |
| 0.020 | 0.00031 | 0.0031 | 0.040 | 0.00126 | 2.50 | 0.0280 | 0.0290 |
| 0.020 | 0.00031 | 0.0031 | 0.060 | 0.00283 | 1.11 | 0.0280 | 0.0290 |
| 0.020 | 0.00031 | 0.0031 | 0.080 | 0.00503 | 0.62 | 0.0280 | 0.0290 |
| 0.020 | 0.00031 | 0.0031 | 0.100 | 0.00785 | 0.40 | 0.0280 | 0.0290 |
| 0.020 | 0.00031 | 0.0031 | 0.120 | 0.01131 | 0.28 | 0.0280 | 0.0290 |
| 0.020 | 0.00031 | 0.0031 | 0.140 | 0.01539 | 0.20 | 0.0280 | 0.0290 |
| 0.028 | 0.00062 | 0.0074 | 0.125 | 0.01227 | 0.60 | 0.0200 | 0.0150 |
| 0.028 | 0.00062 | 0.0074 | 0.100 | 0.00785 | 0.94 | 0.0200 | 0.0150 |
| 0.028 | 0.00062 | 0.0074 | 0.060 | 0.00283 | 2.61 | 0.0200 | 0.0150 |
| 0.028 | 0.00062 | 0.0074 | 0.040 | 0.00126 | 5.88 | 0.0200 | 0.0150 |
| 0.028 | 0.00062 | 0.0074 | 0.030 | 0.00071 | 10.46 | 0.0200 | 0.0150 |
| 0.028 | 0.00062 | 0.0074 | 0.025 | 0.00049 | 15.05 | 0.0200 | 0.0150 |

Figures 4A, 4B:
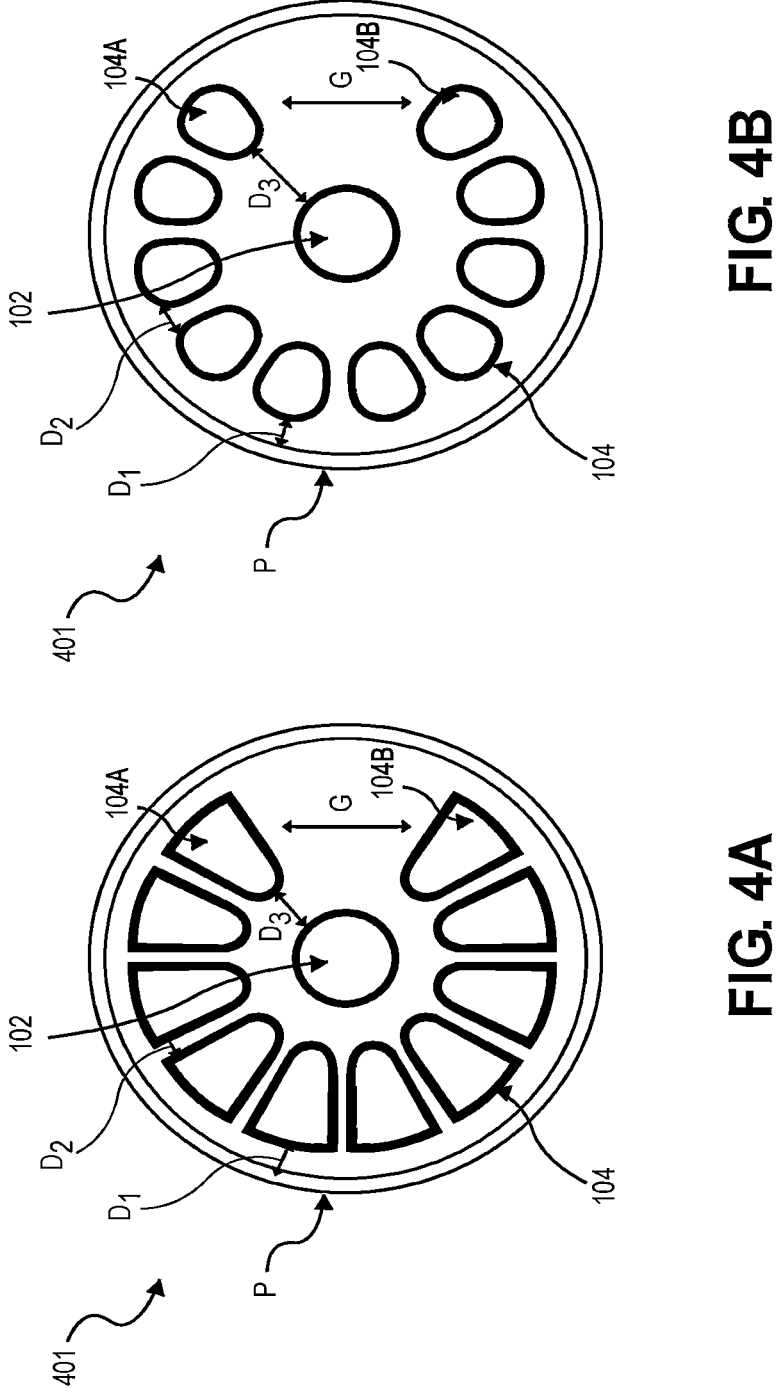

FIGS. 4A and 4B illustrate non-limiting, exemplary embodiments of an electrode design 401 of a well 200 that has noncircular-shaped working electrode zones 104 disposed in the well in an open ring pattern, as similarly described above with reference to FIGS. 3A and 3B. In embodiments, the noncircular-shaped working electrode zones 104 may allow for improved usage of the area within the well 200. The use of the noncircular-shaped working electrode zones 104 may allow larger working electrode zones 104 to be formed within the well 200 and/or more working electrode zones 104 to be formed within the well 200. By forming these non-circular shapes, the working electrode zones 104 may be packed in more tightly within a well 200. As such, the ratios of the working electrode zones 104 to the auxiliary electrode 102 may be maximized. Additionally, because the working electrode zones 104 may be formed larger, the working electrode zones 104 may be more reliably manufactured, e.g., more reliably printed.

As illustrated in FIG. 4A, the well 200 may include a single auxiliary electrode 102. In other embodiments, more than one (1) auxiliary electrode 102 may be included in well 200 (e.g., 2, 3, 4, 5, etc.) In embodiments, the auxiliary electrode 102 may be formed to have an approximate circular shape. In other embodiments, the auxiliary electrode 102 may be formed to have other shapes (e.g., rectangles, squares, ovals, clovers, or any other regular or irregular geometric shape).

In embodiments, the well 200 may include ten (10) working electrode zones 104. In other embodiments, fewer or more than ten working electrode zones 104 may be included in well 200 (e.g., 1, 2, 3, 4, etc.) Each of the working electrode zones 104 may be formed to have a noncircular shape, for example, a wedge shape or a triangular shape with one or more rounded or radiused corners, although in other embodiments, the corners are not rounded, thus forming polygon shapes, such as triangles.

The working electrode zones 104 may be positioned with respect to each other in a semi-circular or substantially "C-shaped" pattern adjacent to a perimeter "P" of the well 200 at a distance "$D_1$." In some embodiments, the distance, $D_1$, may be a minimum distance between a boundary of the working electrode zones 104 and the perimeter, P. That is, each of the working electrode zones 104 may be positioned an equal distance, $D_1$, from the perimeter P of the well 200 and each of the working electrode zones 104 is equally spaced from another by a distance, "$D_2$." In some embodiments, the distance, $D_2$, may be a minimum distance between a boundary of two adjacent working electrode zones 104. In some embodiments, two working electrode zones 104A, 104B may be spaced apart from each other a sufficient distance so as to form a gap "G." In certain embodiments, distance $D_1$ may not be equal between one or more working electrode zones 104 and perimeter P of well 200. In further embodiments, distance, $D_2$, may not be equal between two or more of the working electrode zones 104. The auxiliary electrode 102 may be positioned in a center of the C-shaped pattern at an equal distance, "$D_3$," from each of the working electrode zones 104, although in other embodiments, distance $D_3$ may vary for one or more of the working electrode zones 104 as measured to the auxiliary electrode 102. In certain embodiments, as illustrated, the distance, $D_1$, the distance, $D_2$, the distance, $D_3$, and the distance, G, may be measured from a closest point on a perimeter of the respective feature (e.g., working electrode zone 104, auxiliary electrode 102, or perimeter P). In some embodiments, the distance, $D_3$, may be a minimum distance between a boundary of a working electrode zones 104 and a boundary of an auxiliary electrode One skilled in the art will realize that the distances may be measured from any relative point on a feature in order to produce a repeatable pattern, for example, a geometric pattern.

Figures 4C, 4D, 4E, 4F:
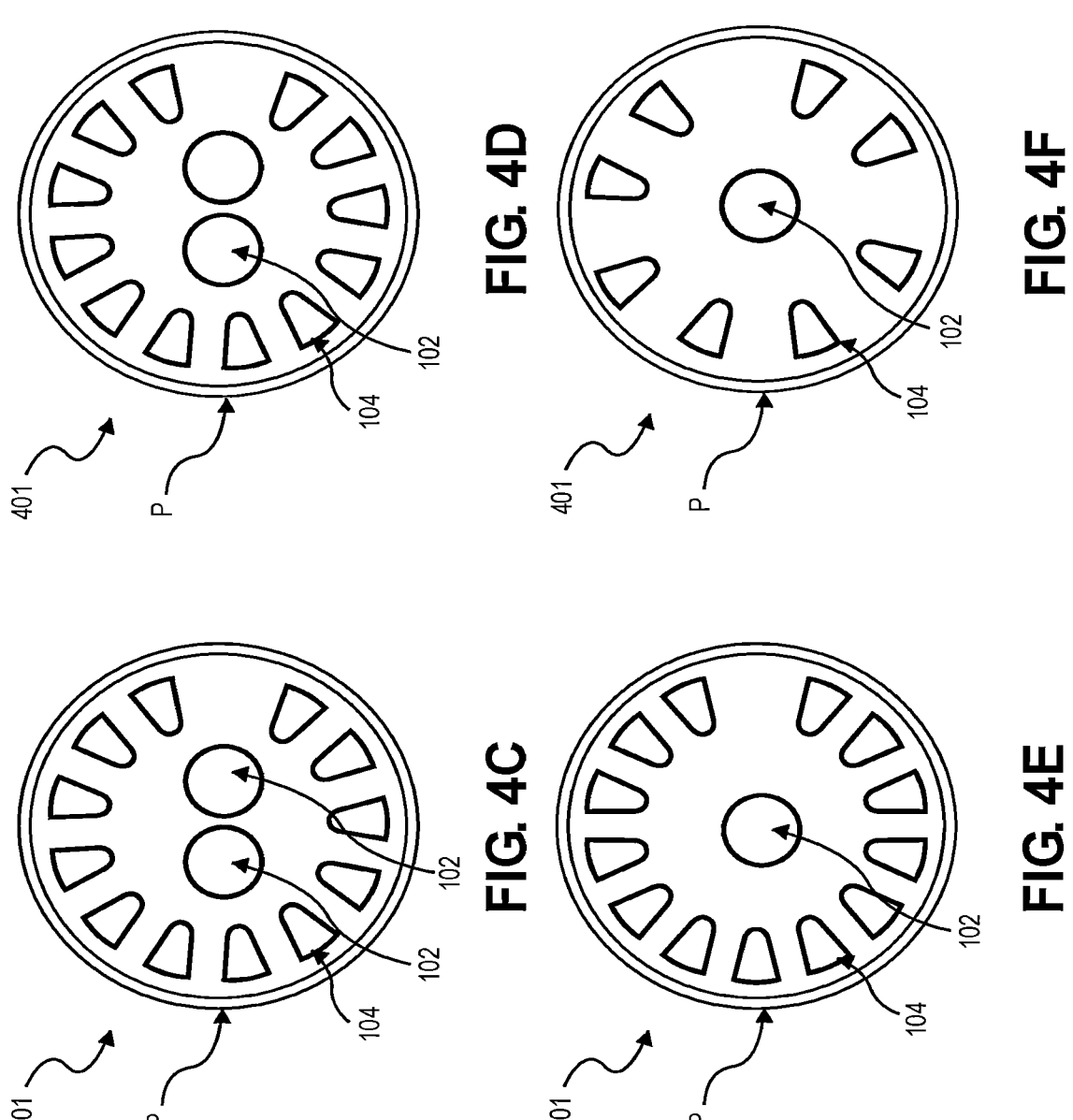

Although these figures depict a single auxiliary electrode 102, more than one may be included as well, as illustrated in FIG. 4C. Further, although auxiliary electrode 102 is depicted in these figures as being disposed at an approximate (or true) center of well 200, auxiliary electrode 102 may be disposed at other locations of the well 200 as well, as illustrated in FIG. 4D. Additionally, while these figures illustrate ten (10) working electrode zones 104, greater or fewer number of working electrode zones 104 may be included, as illustrated in FIG. 4E and 4F.

In certain embodiments, the size of the auxiliary electrode 102 and/or the working electrode zones 104 may be equal. In other embodiments, the size of the auxiliary electrode 102 and/or the working electrode zones 104 may be varied. In one example, the size of the auxiliary electrode 102 may be constant, and the size of the working electrode zones 104 may be varied such as by varying the radius of the auxiliary electrode 102. Table 3 includes examples of dimensions for the working electrode zones 104 and the auxiliary electrodes 102 for the embodiments illustrated in FIGS. 4A-4F. One skilled in the art will realize that the dimensions included in Table 3 are approximate values and may vary by, for example, +/−5.0% based on conditions such as manufacturing tolerances.

circle. Each of the working electrode zones 104 in the inner circle may be spaced a distance, "$R_1$," from the center of the well 200. Each of the working electrode zones 104 in the outer circle may be spaced a distance, "$R_2$," from the center of the well 200. In the star-shaped pattern, each auxiliary electrode 102 may be positioned at an equal distance, "$D_4$," relative to two of the working electrode zones 104 positioned in the outer circle.

In certain embodiments, as illustrated, the distance, $R_1$, the distance, $R_2$, and the distance, $D_4$, may be measured from a closest point on a perimeter of the respective feature (e.g., working electrode zone 104, auxiliary electrode 102, or perimeter P). One skilled in the art will realize that the distances may be measured from any relative point on a feature in order to produce a repeatable geometric pattern.

While these figures illustrate ten (10) working electrode zones 104, greater or fewer number of working electrode zones 104 may be included, as illustrated in FIG. 5C. Additionally, while FIGS. 5A-5C illustrate circular shaped working electrode zones 104, the working electrode zones

TABLE 3

| | WE Zone Exposed Surface Area (sq in) | Total WE Spot Area (10 spots - sq in) | Auxiliary Electrode Diameter (in) | Auxiliary Electrode Exposed Surface Area (sq in) | WE/ Auxiliary Electrode Area Ratio | Spot Edge to Plate Wall (in) | |
|---|---|---|---|---|---|---|---|
| WE Zone Diameter (in) | | | | | | | $D_2$ (in) |
| — | 0.00158 | 0.0158 | 0.048 | 0.00181 | 8.73 | 0.0200 | 0.0120 |
| — | 0.00156 | 0.0156 | 0.048 | 0.00181 | 8.63 | 0.0200 | 0.0120 |
| — | 0.00154 | 0.0154 | 0.048 | 0.00181 | 8.49 | 0.0200 | 0.0120 |
| — | 0.00139 | 0.0139 | 0.048 | 0.00181 | 7.68 | 0.0200 | 0.0120 |
| — | 0.00114 | 0.0114 | 0.048 | 0.00181 | 6.29 | 0.0200 | 0.0120 |
| — | 0.00114 | 0.0114 | 0.100 | 0.00785 | 1.45 | 0.0200 | 0.0120 |
| — | 0.00114 | 0.0114 | 0.080 | 0.00503 | 2.27 | 0.0200 | 0.0120 |
| — | 0.00114 | 0.0114 | 0.060 | 0.00283 | 4.03 | 0.0200 | 0.0120 |
| — | 0.00114 | 0.0114 | 0.050 | 0.00196 | 5.80 | 0.0200 | 0.0120 |
| — | 0.00114 | 0.0114 | 0.040 | 0.00126 | 9.06 | 0.0200 | 0.0120 |
| — | 0.00114 | 0.0114 | 0.035 | 0.00096 | 11.84 | 0.0200 | 0.0120 |
| — | 0.00114 | 0.0114 | 0.030 | 0.00071 | 16.11 | 0.0200 | 0.0120 |

Exemplary dimensions for working electrode zones 104 and auxiliary electrode 102 according to certain embodiments with ten (10) working electrode zones FIGS. 5A and 5B illustrate non-limiting, exemplary embodiments of an electrode design 401 of a well 200 that has working electrode zones 104 disposed in a star-shaped pattern with the working electrode zones 104 being circular-shaped. As illustrated in FIG. 5A, the well 200 may include five (5) auxiliary electrodes 102, and each of the auxiliary electrodes 102 may be formed in an approximate circular shape (although other numbers of auxiliary electrodes, different shapes, etc. are contemplated as well). In this example, the well 200 may also include ten (10) working electrode zones 104, and each of the working electrode zones 104 may be formed in an approximate circular shape. The star-shaped pattern may be created by a plurality of working electrode zones 104 being positioned in one of an inner circle and an outer circle relative to each other, wherein each working electrode zone 104 positioned in the outer circle is disposed at an angular midpoint relative to two adjacent working electrode zones 104 positioned in the inner 104 may be formed to have other shapes (e.g., rectangles, squares, ovals, clovers, or any other regular or irregular geometric shape). Other embodiments can include hybrid designs of electrode configurations, such as, for example, a star shape pattern that includes wedge-shaped working electrode zones and/or auxiliary electrodes, etc.

In certain embodiments, the size of the auxiliary electrode 102 and/or the working electrode zones 104 may be equal. In other embodiments, a size of the auxiliary electrode 102 and/or the working electrode zones 104 may be varied. In one example, the size of the working electrode zones 104 may be constant, and the size of the auxiliary electrode 102 may be varied such as varying the diameter, as shown in Table 4. One skilled in the art will realize that the dimensions included in Table 4 are approximate values and may vary by, for example, +/−5.0% based on conditions such as manufacturing tolerances.

TABLE 4

Exemplary dimensions for working electrode zones 104 and auxiliary electrode
102 according to certain embodiments with ten (10) working electrode zones

| WE Zone Diameter (in) | WE Zone Exposed Surface Area (sq in) | Total WE Spot Area (10 spots - sq in) | Auxiliary Electrode Diameter (in) | Auxiliary Electrode Exposed Surface Area (sq in) | WE/ Auxiliary Electrode Area Ratio | Spot Edge to Plate Wall (in) | $D_2$ (in) |
|---|---|---|---|---|---|---|---|
| 0.0420 | 0.00139 | 0.01385 | 0.030 | 0.00354 | 3.92 | 0.0200 | 0.0125 |
| 0.0420 | 0.00139 | 0.01385 | 0.027 | 0.00287 | 4.83 | 0.0200 | 0.0125 |
| 0.0420 | 0.00139 | 0.01385 | 0.024 | 0.00226 | 6.13 | 0.0200 | 0.0125 |
| 0.0420 | 0.00139 | 0.01385 | 0.021 | 0.00173 | 8.01 | 0.0200 | 0.0125 |
| 0.0420 | 0.00139 | 0.01385 | 0.018 | 0.00127 | 10.91 | 0.0200 | 0.0125 |
| 0.0420 | 0.00139 | 0.01385 | 0.015 | 0.00089 | 15.65 | 0.0200 | 0.0125 |

Figures 6A, 6B:
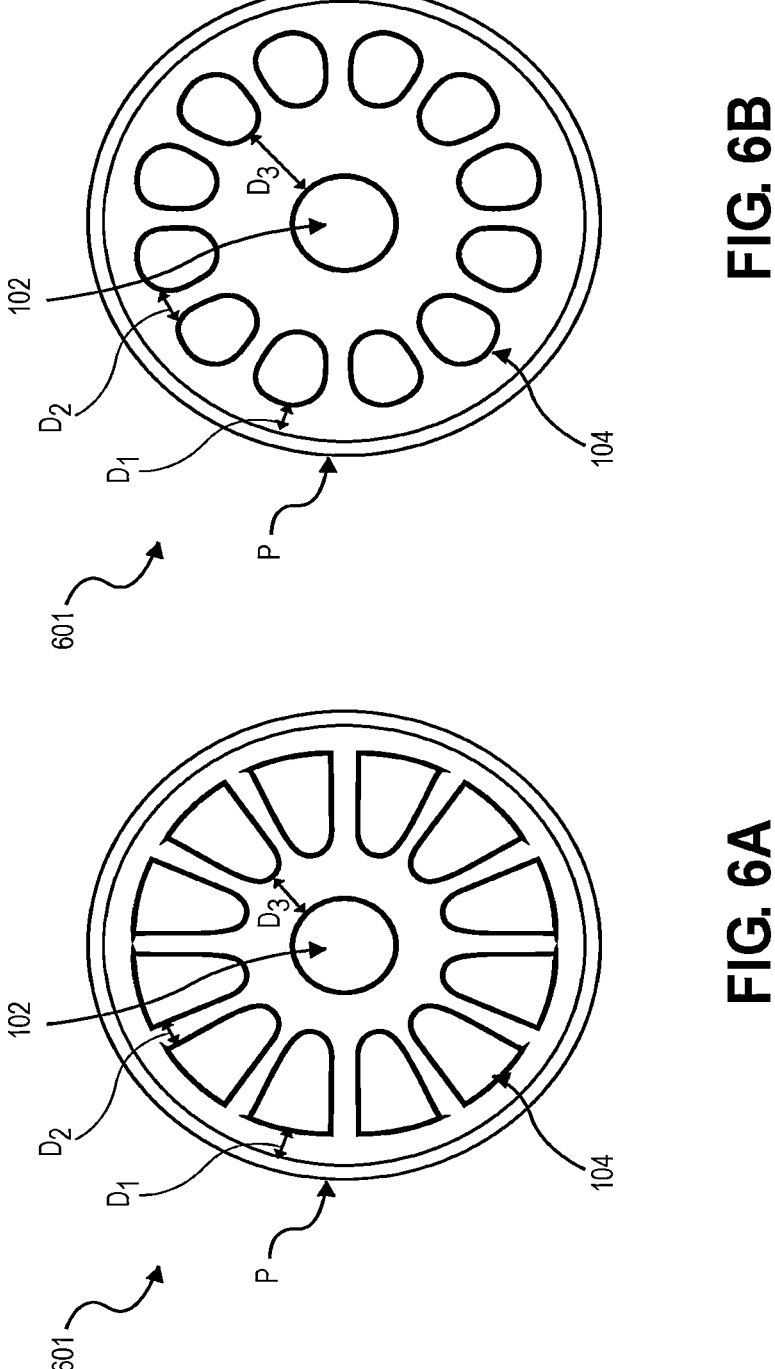

FIGS. 6A and 6B illustrate exemplary, non-limiting embodiments of an electrode design 601 of a well 200 that has noncircular-shaped working electrode zones 104 disposed in a closed ring pattern. As illustrated in FIG. 6A, the well 200 may include a single auxiliary electrode 102. In other embodiments, more than one (1) auxiliary electrode 102 may be included in well 200 (e.g., 2, 3, 4, 5, etc.) In embodiments, the auxiliary electrode 102 may be formed to have an approximate circular shape. In other embodiments, the auxiliary electrode 102 may be formed to have other shapes (e.g., rectangles, squares, ovals, clovers, or any other regular or irregular geometric shape).

In embodiments, the well 200 may also include ten (10) working electrode zones 104. The working electrode zones 104 may be formed to have a noncircular shape, for example, a wedge shape or a triangular shape with one or more rounded or radiused corners. In the closed ring pattern, the working electrode zones 104 may be positioned in a circular shape around the perimeter of the well 200 such that each is at pattern adjacent to a perimeter "P" of the well 200 at a distance "$D_1$." In some embodiments, the distance, $D_1$, may be a minimum distance between a boundary of the working electrode zones 104 and the perimeter, P. That is, each of the working electrode zones 104 may be positioned an equal distance, $D_1$, from the perimeter P of the well 200 and each of the working electrode zones 104 may be equally spaced from another by a distance, "$D_2$." In some embodiments, the distance, $D_2$, may be a minimum distance between a boundary of two adjacent working electrode zones 104. In certain embodiments, distance $D_1$ may not be equal between one or more working electrode zones 104 and perimeter P of well 200. The auxiliary electrode 102 may be positioned in a center of the C-shaped pattern at an equal distance, "$D_3$," from each of the working electrode zones 104, although in other embodiments, distance $D_3$ may vary for one or more of the working electrode zones 104 as measured to the auxiliary electrode 102. In some embodiments, the distance, $D_3$, may be a minimum distance between a boundary of a working electrode zones 104 and a boundary of an auxiliary electrode. In certain embodiments, as illustrated, the distance, $D_1$, the distance, $D_2$, and the distance, $D_3$, may be measured from a closest point on a perimeter of the respective feature (e.g., working electrode zone 104, auxiliary electrode 102, or perimeter P). One skilled in the art will realize that the distances may be measured from any relative point on a feature in order to produce a repeatable pattern, for example, a geometric pattern.

Figures 6C, 6D, 6E, 6F:
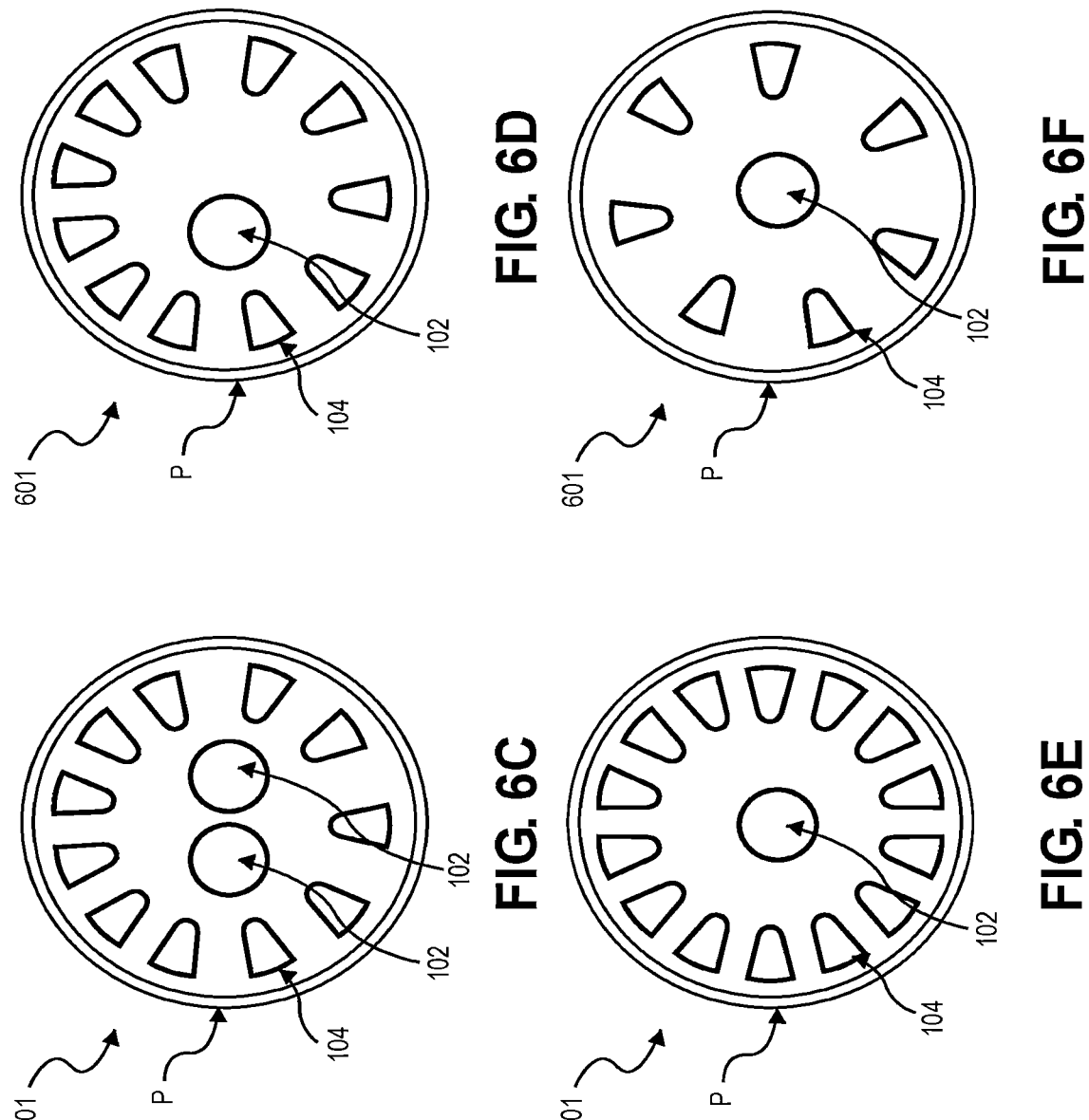

Although these figures depict a single auxiliary electrode 102, more than one may be included as well, as illustrated in FIG. 6C. Further, although auxiliary electrode 102 is depicted in these figures as being disposed at an approximate (or true) center of well 200, auxiliary electrode 102 may be disposed at other locations of the well 200 as well, as illustrated in FIG. 6D. Additionally, while these figures illustrate ten (10) working electrode zones 104, greater or fewer number of working electrode zones 104 may be included, as illustrated in FIG. 6E and 6F.

In certain embodiments, the size of the auxiliary electrode 102 and/or the working electrode zones 104 may be equal. In other embodiments, the size of the auxiliary electrode 102 and/or the working electrode zones 104 may be varied. In one example, the size of the auxiliary electrode 102 may be constant, and the size of the working electrode zones 104 may be varied such as varying the radius of the auxiliary electrode 102. Table 5 includes examples of dimensions for the working electrode zones 104 and the auxiliary electrodes 102 for the embodiments illustrated in FIGS. 6A-6F. One skilled in the art will realize that the dimensions included in Table 5 are approximate values and may vary by, for example, +/−5.0% based on conditions such as manufacturing tolerances.

TABLE 5

Exemplary dimensions for working electrode zones 104 and auxiliary electrode
102 according to certain embodiments with ten (10) working electrode zones

| WE Zone Diameter (in) | WE Zone Exposed Surface Area (sq in) | Total WE Spot Area (10 spots - sq in) | Auxiliary Electrode Diameter (in) | Auxiliary Electrode Exposed Surface Area (sq in) | WE/ Auxiliary Electrode Area Ratio | Spot Edge to Plate Wall (in) |
|---|---|---|---|---|---|---|
| 0.00219 | 0.0219 | 0.048 | 0.00181 | 12.08 | 0.0200 | 0.0120 |
| 0.00218 | 0.0218 | 0.048 | 0.00181 | 12.06 | 0.0200 | 0.0120 |
| 0.00217 | 0.0217 | 0.048 | 0.00181 | 11.98 | 0.0200 | 0.0120 |

TABLE 5-continued

Exemplary dimensions for working electrode zones 104 and auxiliary electrode
102 according to certain embodiments with ten (10) working electrode zones

| WE Zone Diameter (in) | WE Zone Exposed Surface Area (sq in) | Total WE Spot Area (10 spots - sq in) | Auxiliary Electrode Diameter (in) | Auxiliary Electrode Exposed Surface Area (sq in) | WE/ Auxiliary Electrode Area Ratio | Spot Edge to Plate Wall (in) |
|---|---|---|---|---|---|---|
| 0.00214 | 0.0214 | 0.048 | 0.00181 | 11.83 | 0.0200 | 0.0120 |
| 0.00202 | 0.0202 | 0.048 | 0.00181 | 11.17 | 0.0200 | 0.0120 |
| 0.00182 | 0.0182 | 0.048 | 0.00181 | 10.04 | 0.0200 | 0.0120 |
| 0.00182 | 0.0182 | 0.082 | 0.00528 | 3.44 | 0.0200 | 0.0120 |
| 0.00182 | 0.0182 | 0.075 | 0.00442 | 4.11 | 0.0200 | 0.0120 |
| 0.00182 | 0.0182 | 0.068 | 0.00363 | 5.00 | 0.0200 | 0.0120 |
| 0.00182 | 0.0182 | 0.055 | 0.00238 | 7.65 | 0.0200 | 0.0120 |
| 0.00182 | 0.0182 | 0.040 | 0.00126 | 14.46 | 0.0200 | 0.0120 |
| 0.00182 | 0.0182 | 0.030 | 0.00071 | 25.70 | 0.0200 | 0.0120 |

Figure 7B:
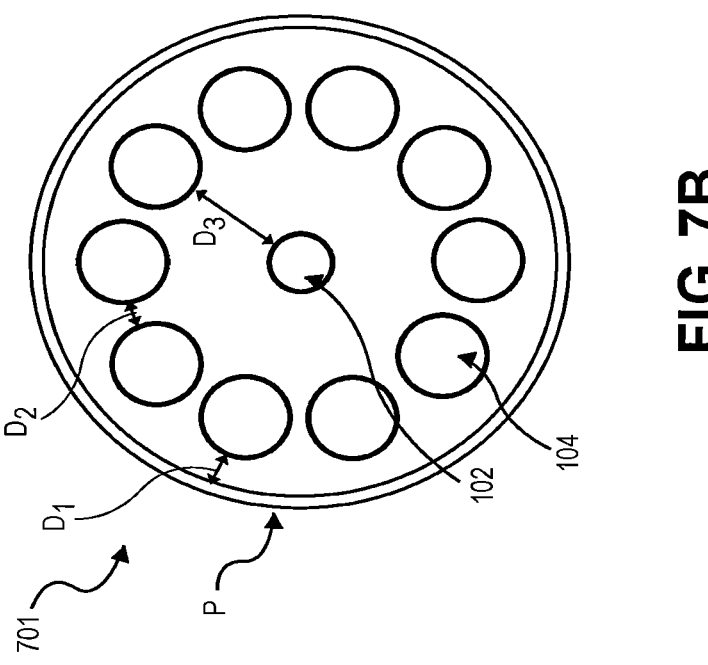
Figure 7A:
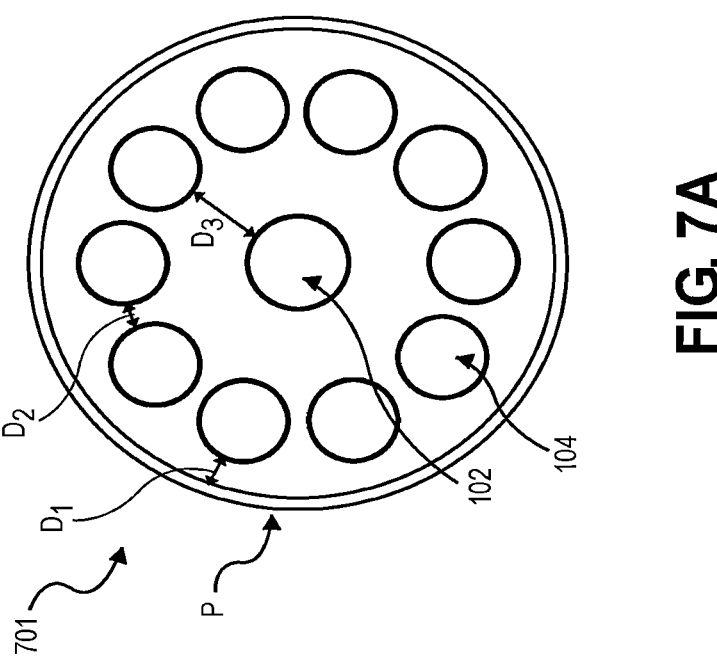

FIGS. 7A and 7B illustrate exemplary, non-limiting embodiments of an electrode design 701 of a well 200 that has a closed ring design with circular-shaped electrodes. As illustrated in FIG. 7A, the well 200 may include a single auxiliary electrode 102. In other embodiments, more than one (1) auxiliary electrode 102 may be included in well 200 (e.g., 2, 3, 4, 5, etc.) In embodiments, the auxiliary electrode 102 may be formed to have an approximate circular shape. In other embodiments, the auxiliary electrode 102 may be formed to have other shapes (e.g., rectangles, squares, ovals, clovers, or any other regular or irregular geometric shape).

In embodiments, the well 200 may include ten (10) working electrode zones 104. In other embodiments, fewer or more than ten working electrode zones 104 may be included in well 200 (e.g., 1, 2, 3, 4, etc.) In embodiments, the working electrode zones 104 may be formed to have an approximate circular shape. In other embodiments, the working electrode zones 104 may be formed to have other shapes (e.g., rectangles, squares, ovals, clovers, or any other regular or irregular geometric shape).

In the closed ring pattern, the working electrode zones 104 may be positioned in a circular shape around the perimeter of the well 200 such that each is at pattern adjacent to a perimeter "P" of the well 200 at a distance "$D_1$." In some embodiments, the distance, $D_1$, may be a minimum distance between a boundary of the working electrode zones 104 and the perimeter, P. That is, each of the working electrode zones 104 may be positioned an equal distance, $D_1$, from the perimeter P of the well 200 and each of the working electrode zones 104 is equally spaced from another by a distance, "$D_2$," (also referred to as working electrode (WE-WE) pitch). In some embodiments, the distance, $D_2$, may be a minimum distance between a boundary of two adjacent working electrode zones 104. In certain embodiments, distance $D_1$ may not be equal between one or more working electrode zones 104 and perimeter P of well 200. In further embodiments, distance, $D_2$, may not be equal between two or more of the working electrode zones 104. The auxiliary electrode 102 may be positioned in a center of the ring pattern at an equal distance, "$D_3$," (as referred to as WE-AUXILIARY pitch) from each of the working electrode zones 104, although in other embodiments, distance $D_3$ may vary for one or more of the working electrode zones 104 as measured to the auxiliary electrode 102. In some embodiments, the distance, $D_3$, may be a minimum distance between a boundary of a working electrode zones 104 and a boundary of an auxiliary electrode. In certain embodiments, as illustrated, the distance, $D_1$, the distance, $D_2$, and the distance, $D_3$, may be measured from a closest relative point on a perimeter of the respective feature (e.g., working electrode zone 104, auxiliary electrode 102, or perimeter P). One skilled in the art will realize that the distances may be measured from any relative point on a feature in order to produce a repeatable pattern, for example, a geometric pattern.

Figures 7C, 7D, 7E, 7F:
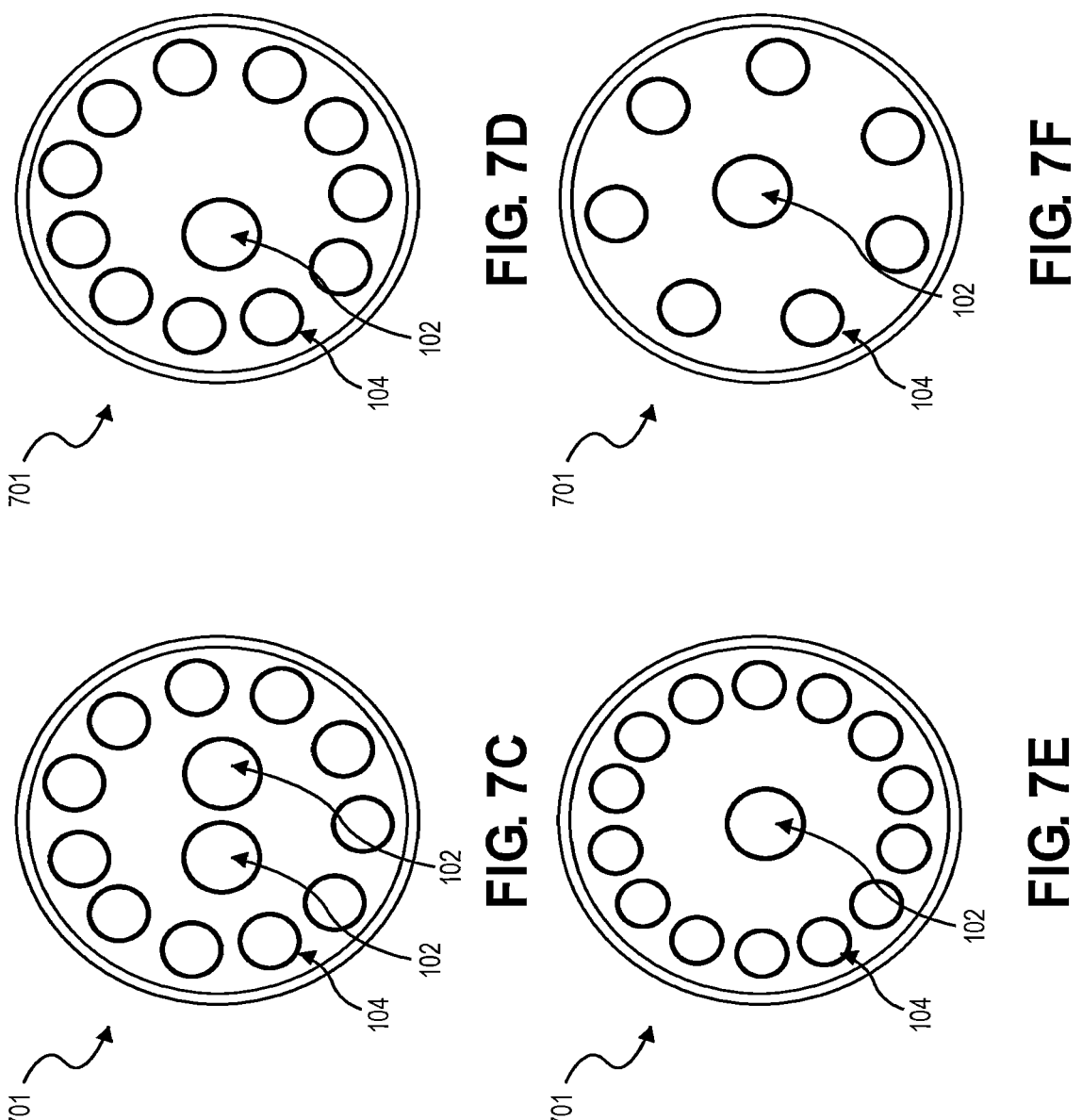

Although these figures depict a single auxiliary electrode 102, more than one may be included as well, as illustrated in FIG. 7C. Further, although auxiliary electrode 102 is depicted in these figures as being disposed at an approximate (or true) center of well 200, auxiliary electrode 102 may be disposed at other locations of the well 200 as well, as illustrated in FIG. 7D. Additionally, while these figures illustrate ten (10) working electrode zones 104, greater or fewer number of working electrode zones 104 may be included, as illustrated in FIG. 7E and 7F.

In certain embodiments, the size of the auxiliary electrode 102 and/or the working electrode zones 104 may be equal. In other embodiments, the size of the auxiliary electrode 102 and/or the working electrode zones 104 may be varied. In one example, the size of the working electrode zones 104 may be constant, and the size of the auxiliary electrode 102 may be varied such as varying the diameter, as shown in Table 6. One skilled in the art will realize that the dimensions included in Table 6 are approximate values and may vary by, for example, +/−5.0% based on conditions such as manufacturing tolerances.

TABLE 6

Exemplary dimensions for working electrode zones 104 and auxiliary electrode
102 according to certain embodiments with ten (10) working electrode zones

| WE Zone Diameter (in) | WE Zone Exposed Surface Area (sq in) | Total WE Spot Area (10 spots - sq in) | Auxiliary Electrode Diameter (in) | Auxiliary Electrode Exposed Surface Area (sq in) | WE/ Auxiliary Electrode Area Ratio | Spot Edge to Plate Wall (in) | $D_2$ (in) |
|---|---|---|---|---|---|---|---|
| 0.041 | 0.00131 | 0.0131 | 0.048 | 0.00181 | 7.25 | 0.0200 | 0.0120 |
| 0.041 | 0.00131 | 0.0131 | 0.044 | 0.00152 | 8.63 | 0.0200 | 0.0120 |
| 0.041 | 0.00131 | 0.0131 | 0.040 | 0.00126 | 10.44 | 0.0200 | 0.0120 |
| 0.041 | 0.00131 | 0.0131 | 0.036 | 0.00102 | 12.89 | 0.0200 | 0.0120 |
| 0.041 | 0.00131 | 0.0131 | 0.032 | 0.00080 | 16.32 | 0.0200 | 0.0120 |
| 0.041 | 0.00131 | 0.0131 | 0.028 | 0.00062 | 21.30 | 0.0200 | 0.0120 |
| 0.040 | 0.00130 | 0.0130 | 0.048 | 0.00181 | 7.18 | 0.0200 | 0.0120 |
| 0.036 | 0.00100 | 0.0100 | 0.048 | 0.00181 | 5.52 | 0.0200 | 0.0120 |
| 0.032 | 0.00080 | 0.0080 | 0.048 | 0.00181 | 4.42 | 0.0200 | 0.0120 |
| 0.028 | 0.00060 | 0.0060 | 0.048 | 0.00181 | 3.31 | 0.0200 | 0.0120 |
| 0.024 | 0.00050 | 0.0050 | 0.048 | 0.00181 | 2.76 | 0.0200 | 0.0120 |

Figure 8D:
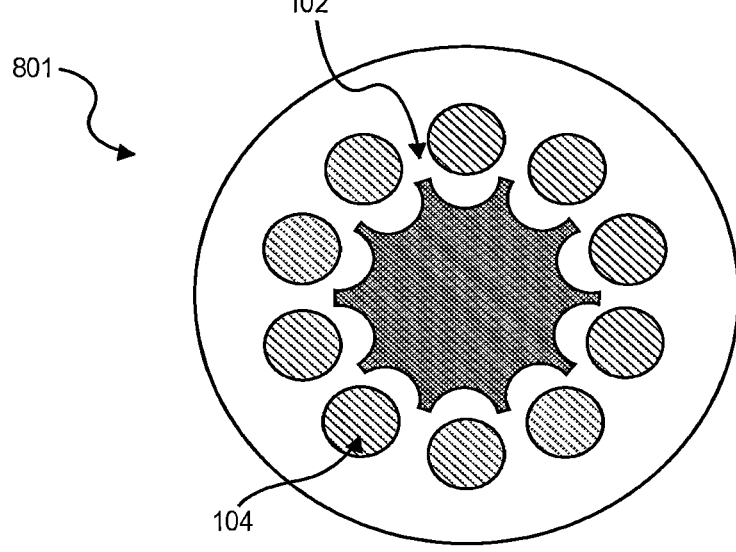

FIGS. 8A-8D illustrate exemplary, non-limiting embodiments of an electrode design 801 of a well 200 that has a closed ring design with circular-shaped working electrode zones and complex-shaped auxiliary electrodes 102. As illustrated in FIG. 8A, the well 200 may include two complex-shaped auxiliary electrodes 102. In other embodiments, fewer (or greater) than two auxiliary electrodes 102 may be included in well 200, as illustrated in FIG. 8D. In embodiments, the auxiliary electrodes 102 may be formed to have a complex shape, such as a "gear," "cog," "annulus," "washer" shape, "oblong" shape, "wedge" shape, etc., as described above. For example, as illustrated in FIG. 8B, the inner of the auxiliary electrodes 102 may be formed in a circular shape having exterior semicircular spaces 802 (e.g., "gear" or "cog" shaped) that correspond to the working electrode zones 104. Likewise, for example, as illustrated in FIG. 8C, the outer of the auxiliary electrodes 102 may be formed in a hollow ring shape having interior semicircular spaces 804 (e.g., "washer" shaped) that correspond to the working electrode zones 104.

In embodiments, the well 200 may include ten (10) working electrode zones 104. In other embodiments, fewer or more than ten working electrode zones 104 may be included in well 200 (e.g., 1, 2, 3, 4, etc.) In embodiments, the working electrode zones 104 may be formed to have an approximate circular shape. In other embodiments, the working electrode zones 104 may be formed to have other shapes (e.g., rectangles, squares, ovals, clovers, or any other regular or irregular geometric shape).

In embodiments, the working electrode zones 104 may be positioned in a circular shape between the two (2) auxiliary electrodes 102. In this configuration exterior semicircular spaces 802 and the interior semicircular spaces 804 allow the two (2) auxiliary electrodes 102 to partially surround the working electrode zones. The outer of the two (2) auxiliary electrodes 102 may be spaced at a distance "$D_1$," from the working electrode zones 104, where $D_1$ is measured from the midpoint of the interior semicircular spaces to a boundary of the working electrode zones 104. In some embodiments, the distance, $D_1$, may be a minimum distance between the outer of the two auxiliary electrodes 102 and the working electrode zones 104. In certain embodiments, distance $D_1$ may not be equal between one or more working electrode zones 104 and the outer of the two (2) auxiliary electrodes 102. Each of the working electrode zones 104 may be equally spaced from another by a distance, "$D_2$." In some embodiments, the distance, $D_2$, may be a minimum distance between a boundary of two adjacent working electrode zones 104. In further embodiments, distance, $D_2$, may not be equal between two or more of the working electrode zones 104. The inner of the two (2) auxiliary electrodes 102 may be spaced at a distance "$D_3$," from the working electrode zones 104, where $D_3$ is measured from the midpoint of the exterior semicircular spaces to an edge of the working electrode zones 104. In some embodiments, the distance, $D_3$, may be a minimum distance between a boundary of a working electrode zones 104 and a boundary of an auxiliary electrode. In certain embodiments, distance $D_1$ may not be equal between the one or more working electrode zones 104 and the inner of the two (2) auxiliary electrodes 102.

In certain embodiments, as illustrated, the distance, $D_1$, the distance, $D_2$, and the distance, $D_3$, may be measured from a closest relative point on a perimeter of the respective feature (e.g., working electrode zone 104 or auxiliary electrode 102). One skilled in the art will realize that the distances may be measured from any relative point on a feature in order to produce a repeatable geometric pattern.

Figure 9A:
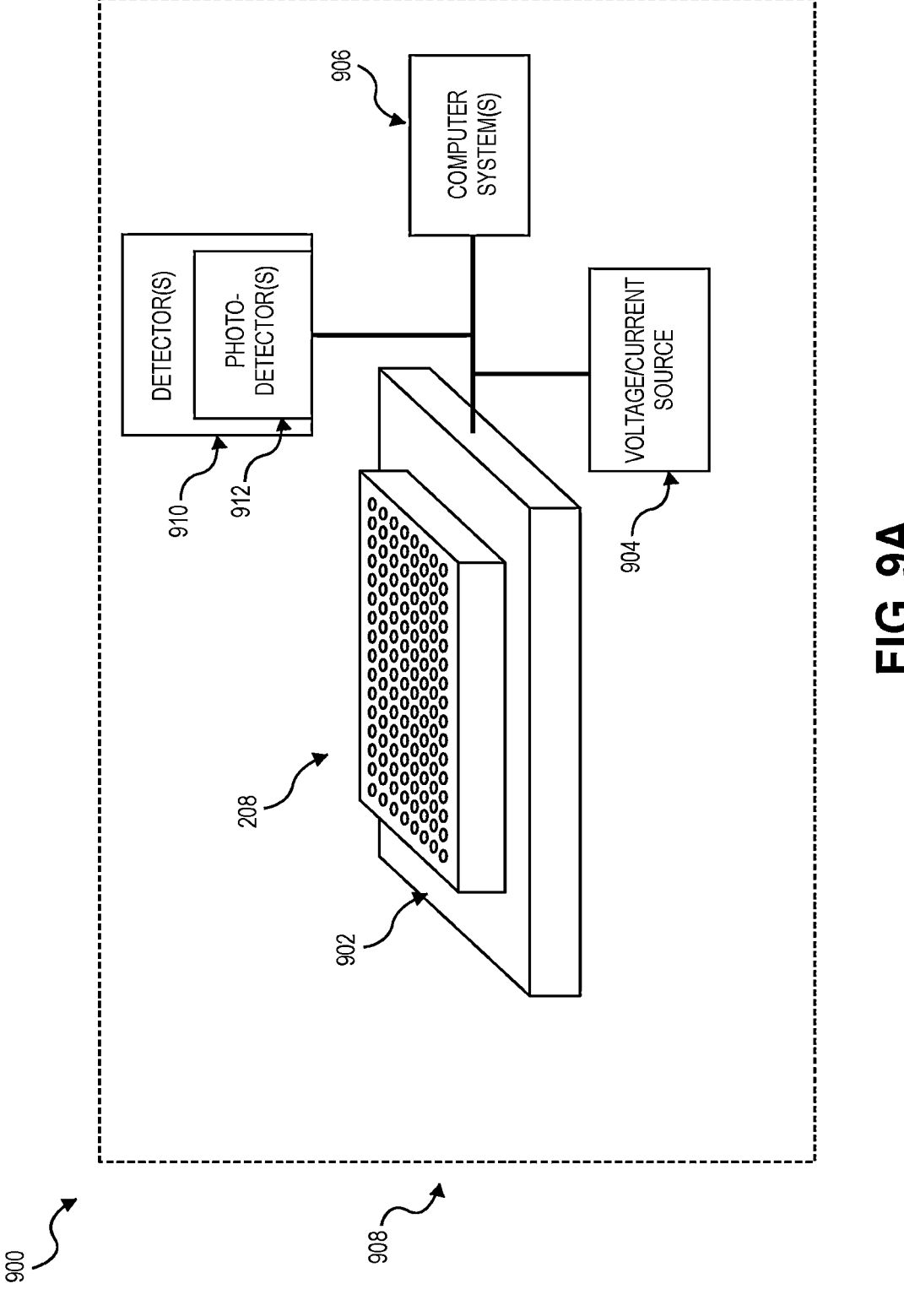
FIGS. 9A and 9B illustrates an example of an assay apparatus, according to an embodiment disclosed herewith.
Figure 9B:
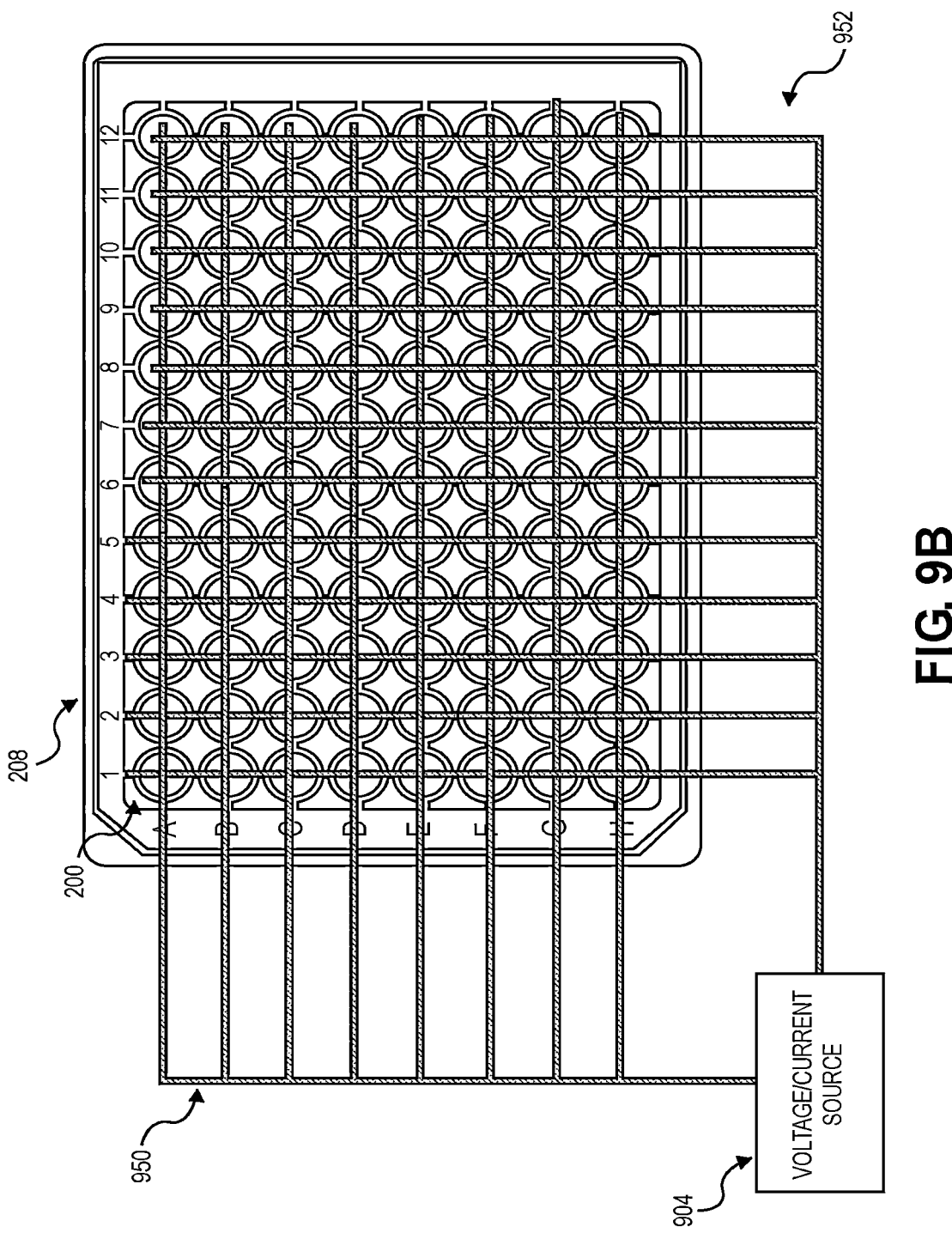

As discussed above, the electrochemical cell 100 may be utilized in devices and apparatus for performing electrochemical analysis. For example, the multi-well plate 208 including wells 200 described above, may be used in any type of apparatus that assists with the performance of biological, chemical, and/or biochemical assays and/or analysis, e.g., an apparatus that performs ECL analysis. FIGS. 9A-9B illustrate a generalized assay apparatus 900 in which the multi-well plate 208 including wells 200 may be used for electrochemical analysis and procedures in accordance with an embodiment hereof. One skilled in the art will realize that FIGS. 9A-9B illustrate one example of an assay apparatus and that existing components illustrated in FIGS. 9A-9B may be removed and/or additional components may be added to the assay apparatus 900 without departing from the scope of embodiments described herein.

As illustrated in FIGS. 9A-9B, the multi-well plate 208 may be electrically coupled to a plate electrical connector 902. The plate electrical connector 902 may be coupled to a voltage/current source 904. The voltage/current source 904 may be configured to selectively supply a controlled voltage and/or current to the wells 200 of the multi-well plate 208 (e.g., the electrochemical cells 100), through the plate electrical connector 902. For example, the plate electrical connector 902 may be configured to match and/or mate with electrical contacts of the multi-well plate 208, which are coupled to the one or more auxiliary electrodes 102 and/or the one or more working electrode zones 104, to allow voltage and/or current to be supplied to the wells 200 of the multi-well plate 208.

In some embodiments, the plate electrical connector 902 may be configured to allow the one or more wells 200 to be activated simultaneously (including one or more of working electrode zones and the auxiliary electrode), or two or more of the working electrode zones and/or auxiliary electrode can be activated individually. In certain embodiments, a device, such as one used to carry out scientific analysis, could be electrically coupled to one or more apparatuses (such as, for example, plates, flow cells, etc.). The coupling between the device the one or more apparatuses could include the entire surface of the apparatus (e.g., entire bottom of a plate) or a portion of the apparatus. In some embodiments, the plate electrical connector 902 may be configured to allow one or more of the wells 200 to be selectively addressable, e.g., voltage and/or current selectively applied to ones of the wells 200 and signals read from the detectors 910. For example, as illustrated in FIG. 9B, the multi-well plate 208 may include 96 of the wells 200 that are arranged in Rows labeled "A"-"H" and Columns labeled "1"-"12". In some embodiments, the plate electrical connector 902 may include a single electrical strip that connects all of the wells 200 in one of Rows A-H or one of the columns 1-12. As such, all of the wells 200 in one of Rows A-H or one of the columns 1-12 may be activated simultaneously, e.g., a voltage and/or current to be supplied by the voltage/current source 904. Likewise, all of the wells 200 in one of Rows A-H or one of the columns 1-12 may be read simultaneously, e.g., a signal read by the detectors 910.

In some embodiments, the plate electrical connector 902 may include a matrix of individual electrical connections, vertical electrical lines 952 and horizontal electrical lines 950, that connect individual wells 200 in the Rows A-H and the columns 1-12. The plate electrical connector 902 (or voltage/current supply 904) may include a switch or other electrical connection device that selectively establishes an electrical connection to the vertical electrical lines 952 and horizontal electrical lines 950. As such, one or more wells 200 in one of Rows A-H or one of the columns 1-12 may be individually activated, e.g., a voltage and/or current to be supplied by the voltage/current source 904, as illustrated in FIG. 9B. Likewise, one or more wells 200 in one of Rows A-H or one of the columns 1-12 may be individually read simultaneously, e.g., by a signal read by the detectors 910. In this example, the one or more wells 200 individually activated by be selected based on the index of the one or more wells 200, e.g., well A1, well A2, etc.

In some embodiments, the plate electrical connector 902 may be configured to allow the one or more working electrode zones 104 and/or the one or more auxiliary electrodes 102 to be activated simultaneously. In some embodiments, the plate electrical connector 902 may be configured to allow one or more of the auxiliary electrodes 102 and/or working electrode zones 104 of each of the wells 200 to be selectively addressable, e.g., voltage and/or current selectively applied to individual ones of the auxiliary electrodes 102 and/or working electrode zones 104 and signals read from the detectors 910. Similar to the wells 200 as described above, for each well 200, the one or more working electrode zones 104 may include a separate electrical contact that allows the plate electrical connector 902 to be electrically to each of the one or more working electrode zones 104 of a well 200. Likewise, for each well 200, the one or more auxiliary electrodes 102 may include a separate electrical contact that allows the plate electrical connector 902 to be electrically to each of the one or more auxiliary electrodes 102 of a well 200.

While not illustrated, the plate electrical connector 902 (or other components of the assay apparatus 900) may include any number of electrical components, e.g., electrical lines, switches, multiplexers, transistors, etc., to allow particular wells 200, auxiliary electrodes 102, and/or working electrode zones 104 to be selectively, electrically coupled to the voltage/current source 904 to allow the voltage and/or current to be selectively applied. Likewise, while not illustrated, the plate electrical connector 902 (or other components of the assay apparatus 900) may include any number of electrical components, e.g., electrical lines, switches, multiplexers, transistors, etc., to allow particular wells 200, auxiliary electrodes 102, and/or working electrode zones 104 to allow signals to be selectively read from the detectors 910.

To control the voltage and/or current supplied, in certain embodiments, a computer system or systems 906 may be coupled to the voltage/current source 904. In other embodiments, the voltage/current source 904 may supply potential and/or current without the aid of a computer system, e.g., manually. The computer system 906 may be configured to control the voltage and/or current supplied to the wells 200. Likewise, in embodiments, the computer systems 906 may be utilized to store, analyze, display, transmit, etc. the data measured during the electrochemical processes and procedures.

The multi-well plate 208 may be housed within a housing 908. The housing 908 may be configured to support and contain the components of assay apparatus 900. In some embodiments, the housing 908 may be configured to maintain experimental conditions (e.g., air tight, light tight, etc.) to accommodate the operations of the assay apparatus 900.

In embodiments, the assay apparatus 900 may include one or more detectors 910 that measure, capture, store, analyze, etc. data associated with the electrochemical processes and procedures of the assay apparatus 900. For example, the detectors 910 may include photo-detectors 912 (e.g., cameras, photodiodes, etc.), voltmeters, ammeters, potentiometers, temperature sensors, etc. In some embodiments, one or more of the detectors 910 may be incorporated into other components of the assay apparatus 900, for example, the plate electrical connector 902, the voltage current source 904, the computer systems 906, the housing 908, etc. In some embodiments, one or more of the detectors 910 may be incorporated into the multi-well plate 208. For example, one or more heaters, temperature controllers, and/or temperature sensors may be incorporated into electrode design of each of the wells 200, as described below.

In embodiments, the one or more photo-detectors 912 may be, for example, film, a photomultiplier tube, photodiode, avalanche photo diode, charge coupled device ("CCD"), or another light detector or camera. The one or more photo-detectors 912 may be a single detector to detect sequential emissions or may include multiple detectors to detect and spatially resolve simultaneous emissions at single or multiple wavelengths of emitted light. The light emitted and detected may be visible light or may be emitted as non-visible radiation such as infrared or ultraviolet radiation. The one or more photo-detectors 912 may be stationary or movable. The emitted light or other radiation may be steered or modified in transit to the one or more photo-detectors 912 using, for example, lenses, mirrors and fiberoptic light guides or light conduits (single, multiple, fixed, or moveable) positioned on or adjacent to any component of the multi-well plate 208. In some embodiments, surfaces of the working electrode zones 104 and/or the auxiliary electrodes 102, themselves, may be utilized to guide or allow transmission of light.

In embodiments, the one or more photo-detectors 912 may include one or more cameras (e.g., charge coupled devices (CCDs), complementary metal-oxide-semiconductor (CMOS) image sensors, etc.) that capture images of the wells 200 to capture photons emitted during operations of the assay apparatus 900. In some embodiments, the one or more photo-detectors 912 may include a single camera that captures images of all the wells 200 of the multi-well plate 208, a single camera that captures images of a sub-set of the wells 200, multiple cameras that capture images of all of the wells 200, or multiple cameras that capture images of a sub-set of the wells 200. In some embodiments, each well 200 of the multi-well plate 208 may include a camera that captures images of the well 200. In some embodiments, each well 200 of the multi-well plate 208 may include multiple cameras that capture images of a single working electrode zone104 or a sub-set of the working electrodes zones 104 in each well 200. In any embodiment, the computer system 906 may include hardware, software, and combination thereof that includes logic to analyze images captured by the one or more photo-detectors 912 and extract luminance data for performing the ECL analysis. In some embodiments, the computer system 906 may include hardware, software, and combinations thereof that include logic for segmenting and enhancing images, for example, to focus on a portion of an image containing one or more of the wells 200, one or more of the working electrode zones104, and the like, when an image contains data for multiple wells 200, multiple working electrode zones 104, etc. Accordingly, the assay apparatus 900 may provide flexibility because the photo-detectors 912 may capture all the light from multiple working electrode zones 104, and the computer system 906 may use imaging processing to resolve the luminescence data for each working electrode zone 104. As such, the assay apparatus 900 may operate in various modes, for example, in a singleplex mode (e.g., 1 working electrode zone), 10-plex mode (e.g., all working electrodes zones 104 for a 10-working electrode zone well 200), or multiplex mode in general (e.g., a subset of all working electrode zones, including within a single well 200 or among multiple wells 200 at the same time, such as 5 working electrode zones 104 for multiple 10 working electrode zone wells at simultaneously.)

In some embodiments, the one or more photo-detectors 912 may include one or more photodiodes for detecting and measuring photons emitted during chemical luminance. In some embodiments, each well 200 of the multi-well plate 208 may include a photodiode for detecting and measuring photons emitted in the well 200. In some embodiments, each well 200 of the multi-well plate 208 may include multiple photodiodes for detecting and measuring photons emitted from a single working electrode zone104 or a sub-set of the working electrode zones104 in each well 200. As such, the assay apparatus 900 may operate in various modes. For example, in a sequential or "time-resolve" mode, the assay apparatus 900 may apply a voltage and/or current to 5 working electrode zones 104 individually. The photodiodes may then sequentially detect/measure the light coming from each of the 5 working electrode zones 104. For instance, a voltage and/or current may be applied to a first of the 5 working electrode zones 104 and the emitted photons may be detected and measured by a corresponding photodiode.

This may be repeated sequentially for each of the 5 working electrode zones 104. Likewise, in this example, sequential mode of operation may be performed for working electrode zones 104 within the same well 200, may be performed for working electrode zones 104 located in different wells 200, may be performed for working electrode zones 104 located within sub-sets or "sectors" of multiple wells 200, and combinations thereof. Likewise, in some embodiments, the assay apparatus 900 may operate in a multiplex mode in which one or more working electrode zones 104 are activated simultaneously by the application of a voltage and/or current, and the emitted photons are detected and measured by multiple photodiodes to multiplex. The multiplex mode of operation may be performed for working electrode zones 104 within the same well 200, may be performed for working electrode zones 104 located in different wells 200, may be performed for working electrode zones 104 located with sub-sets or "sectors" of wells 200 from the multi-well plate 208, combinations thereof. As used herein, the term "sectors" may refer to wells 200 that are addressable in groups. Sectors may include one well or multiple wells in any configuration. A sector of wells includes one or more wells that are contiguous with one another, e.g., a 2×1, 2×2, 3×3, 4×4, 8×8, and/or any other size or shape array of wells, and are concurrently addressable, either through electrical communication between well aspects within a multi-well plate or through electrical communication arranged via hardware designed to contact the multi-well plate.

Figure 10A:
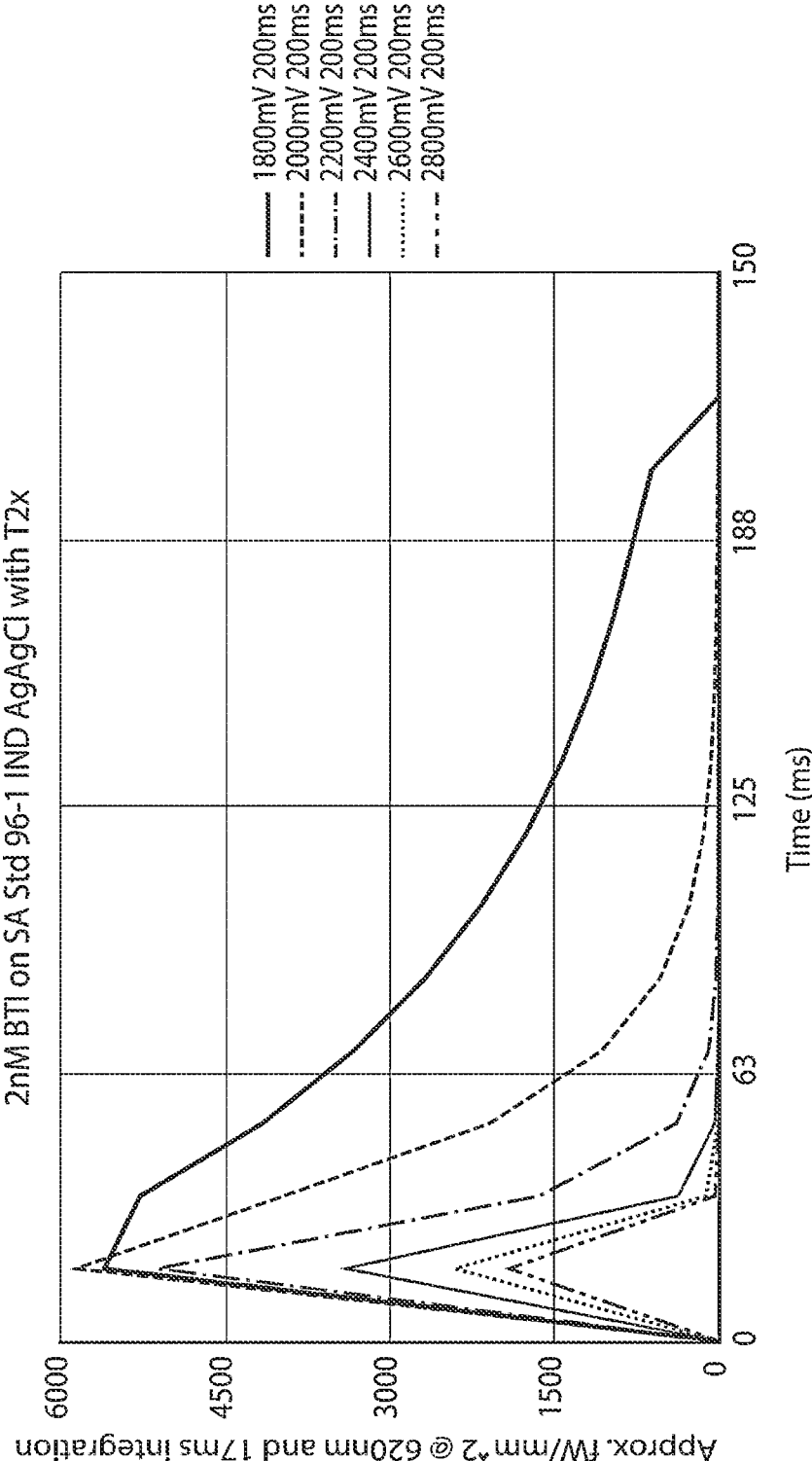
FIGS. 10A and 10B illustrate decay times for an auxiliary electrode, according to an embodiment.
Figure 10B:
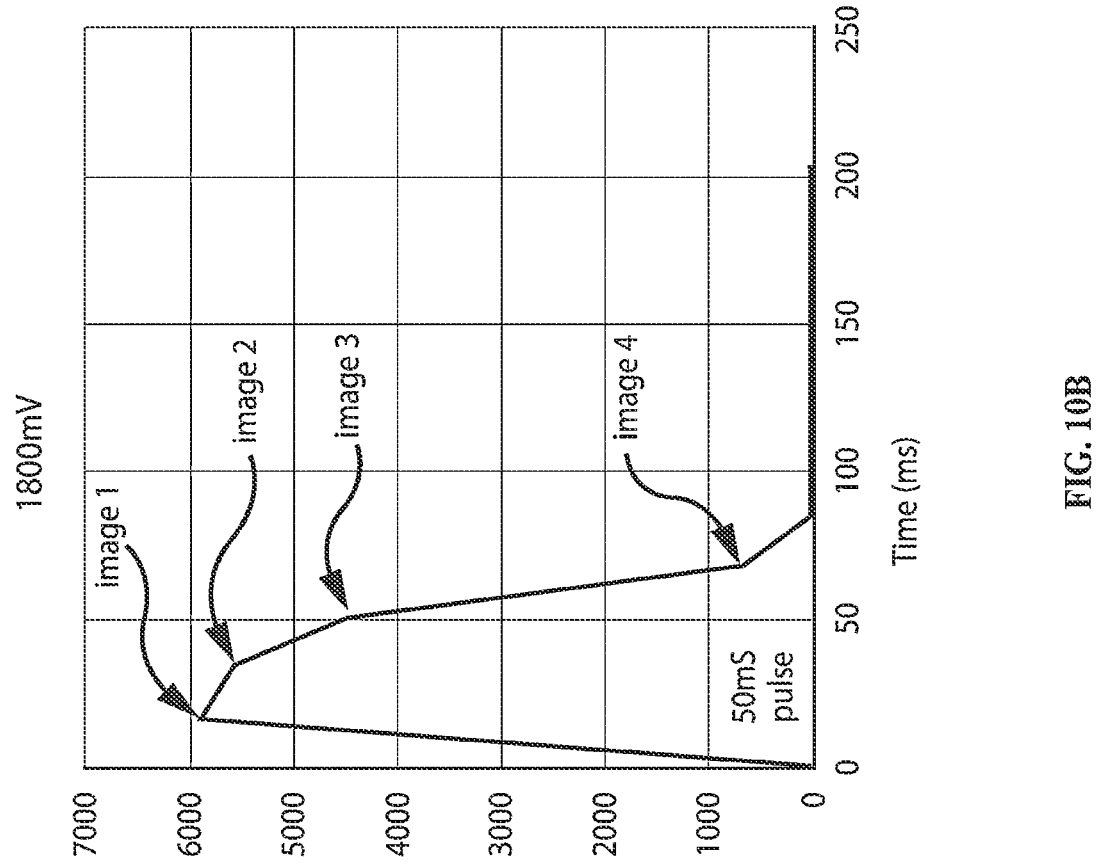

In the embodiments described above, the working electrode zones 104 experience a natural decay in intensity of the emitted photons after the voltage supplied to the working electrode zones 104 is removed. That is, when a voltage is applied to the working electrode zones 104, a redox reaction occurs and photons are emitted at an intensity determined by the voltage applied and the substances undergoing the redox reaction. When the applied voltage is removed, the substance that underwent the redox reaction continues to emit photons, at a decaying intensity, for a period of time based on the chemical properties of the substances. As such, when the working electrode zones 104 are activated in sequence, the assay apparatus 900 (e.g., the computer system 906) may be configured to implement a delay in activating sequential working electrode zones 104. The assay apparatus 900 (e.g., the computer system 906) may determine and implement a delay in activating sequential working electrode zones 104 in order to prevent photons from the previously fired working electrode zones 104 from interfering with photons emitted from a currently activated working electrode zone 104. For example, FIG. 10A shown the decay of ECL during various voltage pulses, and FIG. 10B illustrates the ECL decay time using a pulse of 50 ms. In the example of FIG. 10B, intensity data was determined by taking multiple images during and after the end of a 50 ms long voltage pulse at 1800 mV. To improve the temporal resolution, image frames were taken (or photons detected) every 17 ms. The 50 ms voltage pulse, as illustrated in FIG. 10B, was imaged with 3 frames (e.g., Image 1-3; 3 times 17 ms=51 ms). Any emitted photons, e.g., ECL signal, after image 3 would be due to the decay of an intensity of photons (e.g., ECL) after the working electrode zone 104 was turned off. In FIG. 10B, image 4 captured additional ECL signal after the working electrode zone 104 was turned off, suggesting that there may be some small continuing light generating chemistry after the driving force for this chemistry (e.g., applied voltage potential) is deactivated. That is, because the working electrode zone 104 switches to 0 mV for 1 ms after the end of the 1800 mV voltage pulse, the effects of polarization likely have no effect on the delay. In embodiments, the assay apparatus 900 (e.g., the computer system 906) may be configured to utilize such data for different voltage pulses to delay the activation of sequential working electrode zones 104. As such, an implementation of a delay allows the assay apparatus 900 to minimize cross-talk between working electrode zones 104 and/or wells 200, have high throughput in performing ECL operations, etc.

In any embodiment, the utilization of the one or more auxiliary electrodes 102 improves the operation of the assay apparatus 900. In some embodiments, the utilization of the one or more auxiliary electrodes 102 improves read times for the detectors 910. For example, the use of Ag—AgCl in the one or more auxiliary electrodes 102 improves read times of ECL for several reasons. For example, the use of an electrode (e.g., an auxiliary electrode 102) having a redox couple (in this particular embodiment, Ag—AgCl) can provide a stable interfacial potential to allow electrochemical analysis processes to utilize voltage pulses, rather than voltage ramps. The use of voltage pulses improves the read collection (e.g., adjusting binning to adjust dynamic range, etc.). The "Current Plate RT" column includes read times for non-auxiliary electrodes (e.g., carbon electrodes). The last three columns of the table include the difference in read times between the non-auxiliary electrode read times and the auxiliary electrode (e.g., Ag—AgCl) read times. For time-resolved measurements (using these examples with 10 working electrode zones per well in both Table 7 and Table 8), the read time for subplexes will be in between 1 working electrode zone (WE) and 10 WE read times. For the "B" experiments, read time improvement was not calculated because the non-auxiliary electrode plates cannot operate in a time resolved mode. the Table 8 includes similar data in which the assay apparatus 900 includes photodiodes, as discussed above. One skilled in the art will realize that the values included in Tables 7 and 8 are approximate values and may vary by, for example, +/−5.0% based on conditions such as operating conditions and parameters of the assay apparatus.

TABLE 7

| | | Read times (seconds) for imaging-based devices | | | | | | | | |
|---|---|---|---|---|---|---|---|---|---|---|
| Experiment (Exp.) | Working electrode design/ operating mode (number of WE/WE mode) | 50 ms pulse | 100 ms pulse | 200 ms pulse | Current Plate RT (non-auxiliary electrodes) | Current Exposure | Overhead | 50 ms Read time improvement of auxiliary electrode | 100 ms Read time improvement of auxiliary electrode | 200 ms Read time improvement of auxiliary electrode |
| Exp. 1A | 1-WE/ 10-WE spatial | 66 | 71 | 81 | 157 | 96 | 61 | 91 | 86 | 76 |
| Exp. 1B | 10-WE time-resolved | 114 | 162 | 258 | | | | n/a | n/a | n/a |
| Exp. 2A | 1-WE/ 10-WE spatial | 45 | 47 | 49 | 92 | 48 | 44 | 47 | 45 | 43 |
| Exp. 2B | 10-WE time-resolved | 57 | 69 | 93 | | | | n/a | n/a | n/a |
| Exp. 3A | 1-WE/ 10-WE spatial | 51 | 52 | 52 | 69 | 18 | 51 | 18 | 17 | 17 |
| Exp. 3B | 10-WE time-resolved | 54 | 57 | 63 | | | | n/a | n/a | n/a | times because the entire pulsed waveform can be applied at a voltage potential that generates the ECL throughout the entire duration of the waveform. Tables 7 and 8 below include improved read times (in seconds) for various configuration of the assay apparatus 900 utilizing the one or more auxiliary electrodes 102. The examples in these tables are the total read times of all well of a 96-well plate (each well containing either a single working electrode (or single working electrode zone) or 10 working electrodes (or 10 working electrode zones)). For these read times, analysis was performed on all working electrode (or working electrode zones) (either 1 or 10 depending on the experiment) from all 96 wells. In Table 7 below, "spatial" refers to an operating mode in which all working electrode zones 104 are activated concurrently, and images are captured and processed to resolve them. "Time-resolve," refers to a sequential mode as described above. Time-resolve has the added benefit of permitting adjustments to the ECL image

TABLE 8

| | Read times (seconds) for non-imaging-based devices | | | |
|---|---|---|---|---|
| Detector Type | Working electrode design (number of WE) | 50 ms pulse | 50 ms pulse | 50 ms pulse |
| Photodiode | 1-WE | 66 | 71 | 81 |
| Photodiode | 10-WE (time-resolved) | 114 | 162 | 258 |

For Tables 7 and 8, "WE" can refer to either working electrodes or working electrode zones.

In contrast, with a voltage ramp in ECL applications, there are periods of time when voltage is applied but ECL is not generated (e.g., a portion of the beginning of the ramp and/or a portion at the end of the ramp). With this waveform, there are periods of time in which ECL is not being generated despite a potential being applied. Put another way, when applying a ramp waveform, there are percentages of the overall waveform duration (e.g., 5%, 10%, 15%, etc.) for which ECL is not generated for which a potential is being applied. Those percentages vary based on several factors, including types of materials used to form the electrodes, relative and absolute sizes of electrodes, etc.

In any of the embodiments described above, the utilization of working electrode zones 104 with different sizes and configuration provides various advantages for the assay apparatus 900. For ECL applications, the optimal working electrode sizes and locations may depend on the exact nature of the application and they type of light detector used for detecting ECL. In binding assays employing binding reagents immobilized on the working electrodes, binding capacity and binding efficiency and speed will generally increase with increasing size for the working electrode zones. For ECL instruments employing imaging detectors (e.g., CCD or CMOS devices), the benefits of larger working electrode zones on binding capacity and efficiency may be balanced by improved sensitivity of these devices in terms of total number of photons, when the light is generated at smaller working electrode zones, and is imaged on a smaller number of imaging device pixels. The position of the working electrode zones 104 may have an impact on the performance of the assay apparatus 900. In some embodiments, spot location, size, and geometry may affect the amount of reflection, scatter or loss of photons on the well sidewalls and influence both the amount of the desired light that is detected, as well as the amount of undesired light (e.g., stray light from adjacent working electrode zones or wells) that is detected as having come from a working electrode zone of interest. In some embodiments, the performance of the assay apparatus 900 may be improved by having a design with no working electrode zone 104 located in the center of a well 200 as well as having the working electrode zones 104 located a uniform distance from the center of the well 200. In some embodiments, the one or more working electrode zones 104 being positioned at radially symmetric positions within the well 200 may improve operation of the assay apparatus 900 because optical light collection and meniscus interaction is the same for all of the one or more working electrode zones 104 in the well 200, as discussed above. The one or more working electrode zones 104 being arranged in at a fixed distance (e.g., circle pattern) allows the assay apparatus to utilize shortened pulsed waveforms, e.g., reduced pulse width. In embodiments, a design in which the one or more working electrode zones 104 have a nearest neighbor as the one or more auxiliary electrodes 102 (e.g., no working electrode zone interposed between) improves the performance of the assay apparatus 900.

In embodiments, as briefly described above, the assay apparatus 900 (e.g., the computer system 906 may be configured to control the voltage/current source 904 to supply voltage and/or current in a pulsed waveform, e.g., direct current, alternating current, DC emulating AC, etc., although other waveforms of varying period, frequency, and amplitude are contemplated as well (e.g., negative ramp sawtooth waveforms, square waveforms, rectangular waveforms, etc. These waveforms may include various duty cycles as well, e.g., 10%, 20%, 50%, 65%, 90%, or any other percentage between 0 and 100. The computer system 906 may selectively control a magnitude of the pulsed waveform and a duration of the pulsed waveform, as further described below. In an embodiment, as discussed above, the computer system 906 may be configured to selectively provide the pulsed waveform to one or more of the wells 200. For example, the voltage and/or current may be supplied to all of the wells 200. Likewise, for example, a pulsed waveform may be supplied to selected wells 200 (e.g., on an individual or sector basis, such as a grouping of a subset of well—e.g., 4, 16, etc.). For example, as discussed above, the wells 200 may be individually addressable, or addressable in groups of two or more wells. In an embodiment, the computer system 906 may also be configured to selectively provide the pulsed waveform to one or more of the working electrode zones 104 and/or the auxiliary electrodes 102 in as the manner described above (e.g., individually addressable or addressable in groups of two or more auxiliary electrodes). For example, the pulsed waveform may be supplied to all the working electrode zones 104 within a well 200 and/or addressed to one or more selected working electrode zones 104 within a well 200. Likewise, for example, the pulsed waveform may be supplied to all the auxiliary electrodes 102 and/or addressed to one or more selected auxiliary electrodes 102.

Figure 11:
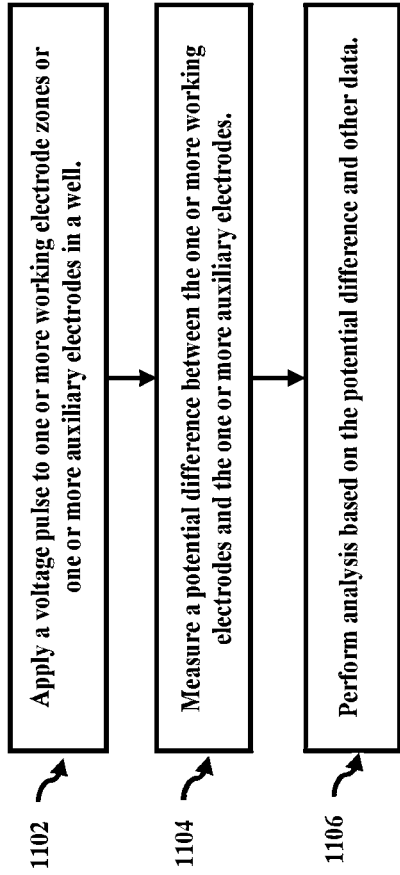
FIG. 11 illustrates a process of performing an electrochemical analysis and procedures using pulsed waveforms, according to an embodiment disclosed herewith.

In embodiments, a pulsed waveform supplied by a voltage/current source 904 may be designed to improve electrochemical analysis and procedures of the assay apparatus 900. FIG. 11 depicts a flow chart showing a process 1100 for operating an assay apparatus using pulsed waveforms, in accordance with an embodiment hereof.

In an operation 1102, the process 1100 includes applying a voltage pulse to one or more working electrode zones 104 or one or more auxiliary electrodes 102 in a well. For example, the computer system 906 may control the voltage/current source 904 to supply a voltage pulse to one or more working electrode zones 104 or one or more auxiliary electrodes 102.

Figures 12A, 12B:
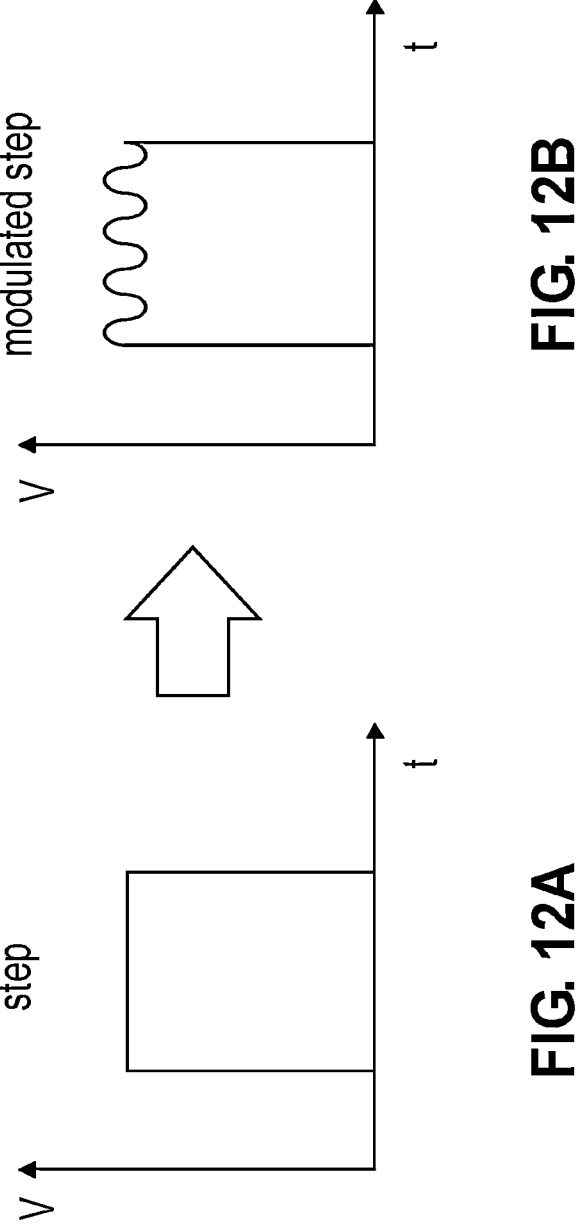
FIGS. 12A and 12B illustrate examples of a pulsed waveform, according to an embodiment disclosed herewith.

In embodiments, the pulsed waveform may include various waveform types, such as direct current, alternating current, DC emulating AC, etc., although other waveforms of varying period, frequency, and amplitude are contemplated as well (e.g., negative ramp sawtooth waveforms, square waveforms, rectangular waveforms, etc. These waveforms may include various duty cycles as well, e.g., 10%, 20%, 50%, 65%, 90%, or any other percentage between 0 and 100. FIGS. 12A and 12B illustrate two examples of a pulsed waveform. As illustrated in FIG. 12A, the pulsed waveform may be a square wave having a voltage, V, for a time, T. Examples of voltage pulses include e.g., 1800 mV at 500 ms, 2000 mV at 500 ms, 2200 mV at 500 ms, 2400 mV at 500 ms, 1800 mV at 100 ms, 2000 mV at 100 ms, 2200 mV at 100 ms, 2400 mV at 100 ms, 1800 mV at 50 ms, 2000 mV at 50 ms, 2200 mV at 50 ms, 2400 mV at 50 ms, etc. While FIGS. 12A and 12B illustrate examples of a pulsed waveform, one skilled in the art will realize that the pulsed waveform may have any structure in which potential is raised to a defined voltage (or range of voltages) for a predefined period of time. One skilled in the art will realize that parameters for the voltage pulses and pulsed waveforms (e.g., durations, duty cycle, and pulse height in volts) described herein are approximate values and may vary by, for example, +/−5.0% based on conditions such as operating parameters of the voltage/current source.

In an operation 1104, the process 1100 includes measuring a potential difference between the one or more working electrode zones 104 and the one or more auxiliary electrodes 102. For example, the detectors 910 may measure the potential difference between the working electrodes zones 104 and the auxiliary electrodes 102 in the wells 200. In some embodiments, the detectors 910 may supply the measured data to the computer systems 906.

In an operation 1106, the process 1100 includes performing an analysis based on the measured potential differences and other data. For example, the computer systems 906 may perform the analysis on the potential difference and other data. The analysis may be any process or procedure such as potentiometry, coulometry, voltammetry, optical analysis (explained further below), etc. In embodiments, the use of the pulsed waveform allows specific types of analysis to be performed. For example, many different redox reactions may occur in a sample that is activated when the applied potential exceeds a specific level. By using a pulsed waveform of a specified voltage, the assay apparatus 900 may selectively activate some of these redox reactions and not others.

In one embodiment, the disclosure provided herein may be applied to a method for conducting ECL assays. Certain examples of methods for conducting ECL assays are provided in U.S. Pat. Nos. 5,591,581; 5,641,623; 5,643,713; 5,705,402; 6,066,448; 6,165,708; 6,207,369; 6,214,552; and 7,842,246; and Published PCT Applications WO87/06706 and WO98/12539, which are hereby incorporated by reference.

Figure 13:
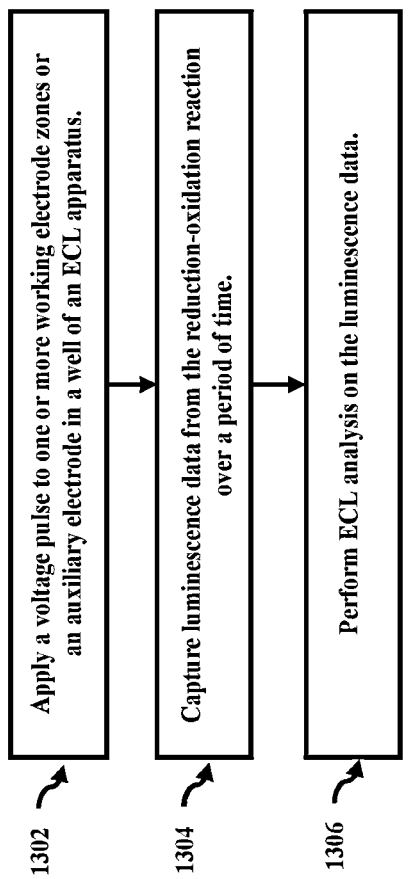
FIG. 13 illustrates a process of performing an ECL analysis and procedures using pulsed waveforms, according to an embodiment disclosed herewith.

In embodiments, a pulsed waveform supplied by a voltage/current source 904 may be designed to improve the ECL emitted during ECL analysis. For example, the pulsed waveform may improve the ECL emitted during ECL analysis by providing a stable and constant voltage potential thereby producing a stable and predictable ECL emission. FIG. 13 depicts a flow chart showing a process 1300 for operating an ECL apparatus using pulsed waveforms, in accordance with an embodiment hereof.

In an operation 1302, the process 1300 includes applying a voltage pulse to one or more working electrode zones 104 or an auxiliary electrode 102 in a well of an ECL apparatus. For example, the computer system 906 may control the voltage/current source 904 to supply a voltage pulse to one or more working electrode zones 104 or the one or more auxiliary electrodes 102. In embodiments, the one or more auxiliary electrodes 102 may include a redox couple where, when a voltage or potential is applied, a reaction of a species in the redox couple is a predominate redox reaction occurring at the one or more auxiliary electrodes 102. In some embodiments, the applied potential is less than a defined potential required to reduce water or perform electrolysis of water. In some embodiments, less than 1 percent of current is associated with the reduction of water. In some embodiments, less than 1 of current per unit area (exposed surface area) of the one or more auxiliary electrodes 102 is associated with the reduction of water.

In embodiments, the pulsed waveform may include various waveform types, such as direct current, alternating current, DC emulating AC, etc., although other waveforms of varying period, frequency, and amplitude are contemplated as well (e.g., negative ramp sawtooth waveforms, square waveforms, rectangular waveforms, etc. FIG. 12A and 12B discussed above illustrate two examples of pulsed waveforms. The pulsed waveform may be a square wave having a voltage, V, for a time, T.

In an operation 1304, the process 1300 includes capturing luminescence data from the electrochemical cell over a period of time. For example, the one or more photo-detectors 912 may capture luminescence data emitted from the wells 200 and communicate the luminescence data to the computer system 906. In an embodiment, the period of time may be selected to allow the photo-detectors collect the ECL data. In some embodiments, the one or more photo-detectors 912 may include a single camera that captures images of all the wells 200 of the multi-well plate 208 or multiple cameras that capture image of a sub-set of the wells 200. In some embodiments, each well 200 of the multi-well plate 208 may include a camera that captures images of the well 200. In some embodiments, each well 200 of the multi-well plate 208 may include multiple cameras that capture images of a single working electrode zone104 or a sub-set of the working electrodes zones 104 in each well 200. Accordingly, the assay apparatus 900 may provide flexibility because the camera may capture all the light from multiple working electrode zones 104, and the computer system 906 may use imaging processing to resolve the luminesce data for each working electrode zone 104. As such, the assay apparatus 900 may operate in various modes, for example, in a singleplex mode (e.g., 1 working electrode zone), 10-plex mode (e.g., all working electrodes zones 104 for a 10-working electrode zone well 200), or multiplex mode in general (e.g., a subset of all working electrode zones, including within a single well 200 or among multiple wells 200 at the same time, such as 5 working electrode zones 104 for multiple 10 working electrode zone wells at simultaneously.)

In some embodiments, each well 200 of the multi-well plate 208 may include a photodiode for detecting and measuring photons emitted in the well 200. In some embodiments, each well 200 of the multi-well plate 208 may include multiple photodiodes for detecting and measuring photons emitted from a single working electrode zone104 or a sub-set of the working electrode zones 104 in each well 200. As such, the assay apparatus 900 may operate in various modes. For example, the assay apparatus 900 may apply a voltage and/or current to one or more of the working electrode zones 104 from the multi-well plate 208, for example 5 working electrode zones 104, individually. The working electrode zones 104 may be located within a single well 200, located in different wells 200, and combination thereof. The photodiodes may then sequentially detect/measure the light coming from each of the 5 working electrode zones 104. For instance, a voltage and/or current may be applied to a first of the 5 working electrode zones 104 and the emitted photons may be detected and measured by a corresponding photodiode. This may be repeated sequentially for each of the 5 working electrode zones 104. Likewise, in this example, sequential mode of operation may be performed for working electrode zones 104 within the same well 200, may be performed for working electrode zones 104 located in different wells 200, may be performed for working electrode zones 104 located with sub-sets or "sectors" of wells 200, and combinations thereof. Likewise, in some embodiments, the assay apparatus 900 may operate in a multiplex mode in which one or more working electrode zones 104 are activated simultaneously by the application of a voltage and/or current, and the emitted photons may be detected and measured by multiple photodiodes to multiplex. The multiplex mode of operation may be performed for working electrode zones 104 within the same well 200, may be performed for working electrode zones 104 located in different wells 200, may be performed for working electrode zones 104 located with sub-sets or "sectors" of wells 200 from the multi-well plate 208, combinations thereof.

In embodiments, by applying a pulsed waveform to generate ECL, read time and/or exposure time may be improved by more quickly and efficiently generating, collecting, observing, and analyzing ECL data. Further, various exposure approaches may be employed (e.g., single exposure, dual exposure, triple exposure (or greater)) that can utilize disparate exposure times (or equal exposure times) to improve ECL collection, collecting, observing, and analysis by improving, for example, the dynamic range extension (DRE), binning, etc. For example, as discussed above, the utilization of the one or more auxiliary electrodes 102 improves the operation of the assay apparatus 900. In some embodiments, the utilization of the one or more auxiliary electrodes 102 improves read times for the detectors 910. For example, the use of Ag—AgCl in the one or more auxiliary electrodes 102 improves read times of ECL for several reasons For example, the use of an electrode (e.g., an auxiliary electrode 102) having a redox couple (in this particular embodiment, Ag—AgCl) can provide a stable interfacial potential to allow electrochemical analysis processes to utilize voltage pulses, rather than voltage ramps. The use of voltage pulses improves the read times because the entire pulsed waveform can be applied at a voltage potential that generates the ECL throughout the entire duration of the waveform. Moreover, "Time-resolve," or sequential mode has the added benefit of permitting adjustments to the ECL image collection (e.g., adjusting binning to adjust dynamic range, etc.) Further, as discussed above, the assay apparatus 900 (e.g., the computer system 906) may be configured to utilize such data for different voltage pulses to delay the activation of sequential working electrode zones 104. As such, an implementation of a delay allows the assay apparatus 900 to minimize cross-talk between working electrode zones 104 and/or wells 200, have high throughput in performing ECL operations, etc.

In an operation 1306, the process 1300 includes performing ECL analysis on the luminescence data. For example, the computer systems 906 may perform the ECL analysis on the luminescence data. In some embodiments, luminescence data, e.g., signals, arising from a given target entity on a binding surface of the working electrode zones 104 and/or auxiliary electrode 102, e.g., binding domain, may have a range of values. These values may correlate with quantitative measurements (e.g., ECL intensity) to provide an analog signal. In other embodiments, a digital signal (yes or no signal) may be obtained from each working electrode zone 104 to indicate that an analyte is either present or not present. Statistical analysis may be used for both techniques and may be used for translating a plurality of digital signals so as to provide a quantitative result. Some analytes may require a digital present/not present signal indicative of a threshold concentration. Analog and/or digital formats may be utilized separately or in combination. Other statistical methods may be utilized, for example, technique to determine concentrations through statistical analysis of binding over the concentration gradient. Multiple linear arrays of data with concentration gradients may be produced with a multiplicity of different specific binding reagents being used in different wells 200 and/or with different working electrode zones 104. The concentration gradients may consist of discrete binding domains presenting different concentrations of the binding reagents.

In embodiments, control assay solutions or reagents, e.g., read buffers, may be utilized on the working electrode zones of the wells 200. The control assay solutions or reagents may provide uniformity to each analysis to control for signal variation (e.g., variations due to degradations, fluctuations, aging of the multi-well plate 208, thermal shifts, noise in electronic circuitry and noise in the photodetection device, etc.) For example, multiple redundant working electrode zones 104 (containing identical binding reagents or different binding reagents that are specific for the same analyte) for the same analyte may be utilized. In another example, analytes of known concentration may be utilized or control assay solutions or reagents may be covalently linked to a known quantity of an ECL label or a known quantity of ECL label in solution is used.

In embodiments, the data collected and produced in the process 1300 may be utilized in a variety of applications. The data collected and produced may be stored, e.g., in the form of a database consisting of a collection of clinical or research information. The data collected and produced may also be used for rapid forensic or personal identification. For example, the use of a plurality of nucleic acid probes when exposed to a human DNA sample may be used for a signature DNA fingerprint that may readily be used to identify clinical or research samples. The data collected and produced may be used to identify the presence of conditions (e.g., diseases, radiation level, etc.), organisms (e.g., bacteria, viruses, etc.), and the like.

The above describes an illustrative flow of an example process 1300. The process as illustrated in FIG. 13 is exemplary only, and variations exist without departing from the scope of the embodiments disclosed herein. The steps may be performed in a different order than that described, additional steps may be performed, and/or fewer steps may be performed, as described above. In embodiments, the use of the pulsed waveform in combination with auxiliary electrodes produces various advantages to ECL assays. The auxiliary electrodes allows luminescence to be generated quicker without the use of a ramp.

In embodiments, a pulsed waveform supplied by a voltage/current source 904 may be designed to allow the ECL apparatus to capture different luminescence data over time to improve the ECL analysis. FIG. 14 depicts a flow chart showing another process 1800 for operating an ECL apparatus using pulsed waveforms, in accordance with an embodiment hereof.

In an operation 1802, the process 1800 includes applying a voltage pulse to one or more working electrode zones 104 or an auxiliary electrode 102 in a well of an ECL apparatus, the voltage pulse causing a reduction-oxidation reaction to occur in the well. For example, the computer system 906 may control the voltage/current source 904 to supply one or more voltage pulses to one or more working electrode zones 104 or the auxiliary electrode 102.

In embodiments, the voltage pulse may be configured to cause a reduction-oxidation reaction between the one or more working electrode zones 104 and the one or more auxiliary electrodes 102. As discussed above, based on a predefined chemical composition (e.g., mixture of Ag:AgCl) of the one or more auxiliary electrodes 102, the one or more auxiliary electrodes 102 may operate as reference electrodes for determining the potential difference with the one or more working electrode zones 104 and as counter electrodes for the working electrode zones 104. For example, the predefined chemical mixture (e.g., the ratios of elements and alloys in the chemical composition) may provide an interfacial potential during a reduction of the chemical mixture, such that a quantifiable amount of charge is generated throughout the reduction-oxidation reactions occurring in the well 200. That is, the amount of charge passed during a redox reaction is quantifiable by measuring the current, for example, at the working electrode zones 104. In some embodiments, the one or more auxiliary electrode 102 may dictate the total amount of charge that may be passed at the applied potential difference because, when the AgCl has been consumed, the interfacial potential at the auxiliary electrode 102 will shift more negative to the potential of water reduction. This causes the working electrode zone 104 potential to shift to a lower potential (maintaining the applied potential difference) turning off the oxidation reactions that occurred during the AgCl reduction.

In embodiments, the pulsed waveform may include various waveform types, such as direct current, alternating current, DC emulating AC, etc., although other waveforms of varying period, frequency, and amplitude are contemplated as well (e.g., negative ramp sawtooth waveforms, square waveforms, rectangular waveforms, etc. FIG. 12A and 12B discussed above illustrate two examples of pulsed waveforms. The pulsed waveform may be a square wave having a voltage, V, for a time, T.

In an operation 1804, the process 1800 includes capturing first luminescence data from the first reduction-oxidation reaction over a first period of time. In an operation 1806, the process 1800 includes capturing second luminescence data from the second reduction-oxidation reaction over a second period of time, wherein the first period time is not of equal duration to the second period of time. For example, the one or more photo-detectors 910 may capture first and second luminescence data emitted from the wells 200 and communicate the first and second luminescence data to the computer system 906. For example, in an embodiment, the wells 200 may include substances of interest that require different time periods for the photo-detectors 912 to capture the luminescence data. Thus, the photo-detectors 912 may capture the ECL data over two different periods of time. For instance, one of the time periods may be a short time period (e.g., short camera exposure time of the light generated from ECL), and one of the time periods may be a longer time period. These periods of time could be affected by, for example, light saturation throughout ECL generation. From there, depending on the captured photons, the assay apparatus 900 may either use the long exposure, the short exposure, or a combination of the two. In some embodiments, the assay apparatus 900 may use the long exposure, or the sum of the long and short. In some embodiments, if the captured photons are above a dynamic range of the photo-detectors 912, the assay apparatus 900 may use the short exposure. By adjusting/optimizing these we may potentially increase the dynamic range by an order of magnitude or two. In certain embodiments, the dynamic range could be improved but implementing various multi-pulse and/or multi-exposure schemes. For example, a short exposure could be taken followed by a longer exposure (e.g., exposure of a single working electrode, single working electrode zone, two or more single working electrodes or working electrode zones (either within a single well or across multiple wells), exposure of a single well, of two or more wells, or a sector, or two or more sectors, etc.). In these examples, it may be beneficial to use the longer exposure unless the exposure has become saturated. In that case, for example, the shorter exposure could be utilized. By making these adjustments (either manually or through the aid of hardware, firmware, software, an algorithm, computer readable medium, a computing device, etc.), the dynamic range can be improved. In other examples, a first, short pulse (e.g., 50 ms, although other durations are contemplated as well) can be applied to an electrode or collection of two or more electrodes followed by a second, longer pulse (e.g., 200 ms, although other durations are contemplated as well) for each electrode or collection of electrodes. Other approaches could include reading an entire plate (e.g., 96 wells) using one or more first, short pulses (e.g., 50 ms, although other durations are contemplated as well) followed by reading the entire plate a second time with a second, longer pulse (e.g., 200 ms, although other durations are contemplated as well). In addition to one or more discrete pulses, composite or hybrid functions could be employing using these, or other, durations to, for example, determine and/or model responses in transition regions (e.g., while transitioning between pulses). Moreover, in the above examples, the longer pulse can be use first before a shorter pulse. Moreover, waveforms and/or capture windows can be adjusted to improve the dynamic range as well.

Moreover, if additional information is known about the one or more individual working electrodes and/or working electrode zones (e.g., a particular working electrode zone is known to contain a high abundance analyte), exposure times can be optimized to prevent camera saturation by utilizing this information before taking a reading and/or sample. Using the high abundance analyte example above, because the signals would be expected to be high in dynamic range, a shorter exposure time can be employed (and vice versa for electrodes for which a low signal is expected), thus exposure times, pulse durations, and/or pulse intensity can be customized and/or optimized for individual wells, electrodes, etc. to improve overall read times. Moreover, pixels from one or more ROIs could be continuously sampled to obtain an ECL curve over time, which can be further employed to determine a manner in which to truncate exposure time and extrapolate an ECL generation curve above saturation.

Additional techniques could be employed as well for which the waveform and/or exposure remain constant. For example, the intensity of pixels within one or more ROIs could be measured, and if pixel saturation is observed, other aspects of ECL generation and/or measuring can be utilized to optimize reading and/or read times (e.g., current-ECL correlation, dark mask schemes that obverse dark mask regions around the ROI, which can be used to update the estimated ECL for the saturated electrode and/or portion of an electrode, etc.). These solutions obviate the need for fast analysis and/or reaction times to adjust waveforms and/or durations of exposure over relatively short periods of time (e.g., milliseconds). This is, for example, because ECL generation and/or captures can be performed the same and/or a similar way and analysis can be performed at the end.

Other techniques could be employed to improve dynamic range as well. For example, if applied to an electrochemiluminescence (ECL) application, because ECL labels fluoresce, a pre-flash and/or pre-exposure could be performed to obtain information related to how much label is present in one or more wells, working electrodes, working electrode zones, etc. The information obtained from the pre-flash and/or pre-exposure can be used to optimize the exposure and/or pulse durations to realize additional improvements in dynamic range and/or read times. In other embodiments, in particular as it relates to ECL, because a correlation can exist between current and one or more of the electrodes and the ECL signal, the signature of the signal could inform camera exposure times and/or the applied waveforms (e.g., stop the waveform, decrease the waveform, increase the waveform, etc.). This can be further optimized by improving the precision and update rate of current measurements and optimization of current paths to provide better correlation between current and ECL signal.

Additional improvements in dynamic range can be realized for certain imaging devices according to certain embodiments. Using CMOS-based imaging device in an ECL application, for example, particular regions of interest (ROIs) could be sampled and read out at different points in time within one or more exposures to optimize exposure times. For example, a ROI (e.g., a part of or the entire working electrode and/or a working electrode zone) could comprise a fixed or variable number of pixels or a certain sample percentage of the electrodes area (e.g., 1%, 5%, 10%, etc., although other percentages are contemplated as well). In this example, the pixels and/or sample percentage could be read out early during the exposure. Depending on the signals read from the ROIs, exposure times could be adjusted and/or optimized for particular working electrodes, working electrode zones, wells, etc. In a non-limiting illustrative example, if 1% of the pixels for a single working electrode zone exhibited a strong signal over a particular exposure time (e.g., 3 seconds, although other durations greater or less than 3 seconds are contemplated as well), the exposure duration could be reduced (e.g., 2 seconds, although other durations greater or less than 3 seconds are contemplated as well) and vice versa (e.g., if the signal is weak, the duration can be increased). These adjustments can be made either manually or through the aid of hardware, firmware, software, an algorithm, computer readable medium, a computing device, etc.

In embodiments, different pulsed waveforms may also be used for the first and the second periods of time. In embodiments, the pulsed waveforms may differ in amplitude (e.g., voltage), duration (e.g., time period), and/or waveform type (e.g., square, sawtooth, etc.) Using different pulsed waveform may be beneficial if multiple types of electro-active species are used as ECL labels which may require different activation potentials and may emit light at different wavelengths. For example, such ECL labels may be complexes based on ruthenium, osmium, hassium, iridium, etc.

In an operation 1808, the process 1800 includes performing ECL analysis on the first luminescence data and the second luminescence data. For example, the computer systems 906 may perform the ECL analysis on the luminescence data. These values may correlate with quantitative measurements (e.g., ECL intensity) to provide an analog signal. In other embodiments, a digital signal (yes or no signal) may be obtained from each working electrode zone 104 to indicate that an analyte is either present or not present. Statistical analysis may be used for both techniques and may be used for translating a plurality of digital signals so as to provide a quantitative result. Some analytes may require a digital present/not present signal indicative of a threshold concentration. Analog and/or digital formats may be utilized separately or in combination. Other statistical methods may be utilized, for example, technique to determine concentrations through statistical analysis of binding over the concentration gradient. Multiple linear arrays of data with concentration gradients may be produced with a multiplicity of different specific binding reagents being used in different wells 200 and/or with different working electrode zones 104. The concentration gradients may consist of discrete binding domains presenting different concentrations of the binding reagents.

In embodiments, control assay solutions or reagents, e.g., read buffers, may be utilized on the working electrode zones of the wells 200. The control assay solutions or reagents may provide uniformity to each analysis to control for signal variation (e.g., variations due to degradations, fluctuations, aging of the multi-well plate 208, thermal shifts, noise in electronic circuitry and noise in the photodetection device, etc.) For example, multiple redundant working electrode zones 104 (containing identical binding reagents or different binding reagents that are specific for the same analyte) for the same analyte may be utilized. In another example, analytes of known concentration may be utilized or control assay solutions or reagents may be covalently linked to a known quantity of an ECL label or a known quantity of ECL label in solution is used.

In embodiments, the data collected and produced in the process 1800 may be utilized in a variety of applications. The data collected and produced may be stored, e.g., in the form of a database consisting of a collection of clinical or research information. The data collected and produced may also be used for rapid forensic or personal identification. For example, the use of a plurality of nucleic acid probes when exposed to a human DNA sample may be used for a signature DNA fingerprint that may readily be used to identify clinical or research samples. The data collected and produced may be used to identify the presence of conditions (e.g., diseases., radiation level, etc.), organisms (e.g., bacteria, viruses, etc.), and the like.

In embodiments, while the above process 1800 includes capturing luminescence data during two time periods, the process 1800 may be utilized to capture luminescence data during any number of time periods, e.g., 3 time period, 4 time period, 5 period, etc. In this embodiment, different pulsed waveforms may also be used for some of the time periods or all of the time periods. In embodiments, the pulsed waveforms may differ in amplitude (e.g., voltage), duration (e.g., time period), and/or waveform type (e.g., square, sawtooth, etc.)

The above describes an illustrative flow of an example process 1800. The process as illustrated in FIG. 14 is exemplary only, and variations exist without departing from the scope of the embodiments disclosed herein. The steps may be performed in a different order than that described, additional steps may be performed, and/or fewer steps may be performed.

In embodiments, different configurations of pulsed waveforms supplied by a voltage/current source 904 may be utilized together to improve the ECL emitted during ECL analysis. FIG. 15 depicts a flow chart showing another process 1900 for operating an ECL apparatus using pulsed waveforms, in accordance with an embodiment hereof.

In an operation 1902, the process 1900 includes applying a first voltage pulse to one or more working electrode zones 104 or an auxiliary electrode 102 in a well of an ECL apparatus, the first voltage pulse causing a first reduction-oxidation reaction to occur in the well. In an operation 1904, the process 1900 includes capturing first luminescence data from the first reduction-oxidation reaction over a first period of time.

In an operation 1906, the process 1900 includes applying a second voltage pulse to the one or more working electrode zones or the auxiliary electrode in the well, the second voltage pulse causing a second reduction-oxidation reaction to occur in the well. In an operation 1908, the process 1900 includes capturing second luminescence data from the second reduction-oxidation reaction over a second period of time, wherein the first period time is not of equal duration to the second period of time.

In an embodiment, the voltage level (amplitude or magnitude) or pulse width (or duration) for the first voltage pulse and/or the second voltage pulse may be selected to cause a first reduction-oxidation reaction to occur, wherein the first luminescence data corresponds to the first reduction-oxidation reaction that occurs. In an embodiment, the voltage level (amplitude or magnitude) or pulse width (or duration) may be selected for the first voltage pulse and/or the second voltage pulse to cause the second reduction-oxidation reaction to occur, wherein the second luminescence data correspond to the second reduction-oxidation reaction that occurs. In an embodiment, a magnitude of at least one of the first voltage pulse and second voltage pulse may be selected based at least in part on a chemical composition of the counter electrode.

In an operation 1910, the process 1900 includes performing ECL analysis on the first luminescence data and the second luminescence data. For example, the computer systems 906 may perform the ECL analysis on the luminescence data. In some embodiments, luminescence data, e.g., signals, arising from a given target entity on a binding surface of the working electrode zones 104 and/or auxiliary electrode 102, e.g., binding domain, may have a range of values. These values may correlate with quantitative measurements (e.g., ECL intensity) to provide an analog signal. In other embodiments, a digital signal (yes or no signal) may be obtained from each working electrode zone 104 to indicate that an analyte is either present or not present. Statistical analysis may be used for both techniques and may be used for translating a plurality of digital signals so as to provide a quantitative result. Some analytes may require a digital present/not present signal indicative of a threshold concentration. Analog and/or digital formats may be utilized separately or in combination. Other statistical methods may be utilized, for example, technique to determine concentrations through statistical analysis of binding over the concentration gradient. Multiple linear arrays of data with concentration gradients may be produced with a multiplicity of different specific binding reagents being used in different wells 200 and/or with different working electrode zones 104. The concentration gradients may consist of discrete binding domains presenting different concentrations of the binding reagents.

In embodiments, control assay solutions or reagents, e.g., read buffers, may be utilized on the working electrode zones of the wells 200. The control assay solutions or reagents may provide uniformity to each analysis to control for signal variation (e.g., variations due to degradations, fluctuations, aging of the multi-well plate 208, thermal shifts, noise in electronic circuitry and noise in the photodetection device, etc.) For example, multiple redundant working electrode zones 104 (containing identical binding reagents or different binding reagents that are specific for the same analyte) for the same analyte may be utilized. In another example, analytes of known concentration may be utilized or control assay solutions or reagents may be covalently linked to a known quantity of an ECL label or a known quantity of ECL label in solution is used.

In embodiments, the data collected and produced in the process 1900 may be utilized in a variety of applications. The data collected and produced may be stored, e.g., in the form of a database consisting of a collection of clinical or research information. The data collected and produced may also be used for rapid forensic or personal identification. For example, the use of a plurality of nucleic acid probes when exposed to a human DNA sample may be used for a signature DNA fingerprint that may readily be used to identify clinical or research samples. The data collected and produced may be used to identify the presence of conditions (e.g., diseases., radiation level, etc.), organisms (e.g., bacteria, viruses, etc.), and the like.

The above describes an illustrative flow of an example process 1900. The process as illustrated in FIG. 15 is exemplary only, and variations exist without departing from the scope of the embodiments disclosed herein. The steps may be performed in a different order than that described, additional steps may be performed, and/or fewer steps may be performed.

In any of the processes 1300, 1800, and 1900 described above, the voltage pulses may be selective applied to the one or more working electrode zones 104 and/or one or more auxiliary electrodes 102. For example, the voltage pulses may be supplied to all the working electrode zones 104 and/or the auxiliary electrodes 102 in one or more wells 200 of the multi-well plate 208. Likewise, for example, the voltage pulses may be supplied to selected (or "addressable") sets of the working electrode zones 104 and/or the auxiliary electrodes 102 in one or more wells 200 of the multi-well plate 208 (e.g., on a zone-by-zone basis, well-by-well basis, sector-by-sector basis (e.g., groups of one or more wells), etc.) The systems, devices, and methods described herein may be applied in various contexts. For example, the systems, devices, and methods may be applied to improve various aspects of ECL measurement and reader devices. Exemplary plate readers include the MESO SECTOR S 600 (www.mesoscale.com/en/products_and_services/instrumentation/sector_s_600) and the MESO QUICKPLEX SQ 120 (www.mesoscale.com/en/products_and_services/instrumentation/quickplex_sq_120), both available from Meso Scale Diagnostics, LLC., and the plate readers described in U.S. Pat. No. 6,977,722 and U.S. Provisional Patent Appl. No. 62/874,828, Titled: "Assay Apparatuses, Methods and Reagents" by Krivoy et al., filed Jul. 16, 2019 and International Patent Publication No. WO 2021/011630, each of which is incorporated by reference herein in its entirety. Other exemplary devices are described in U.S. Pat. No. 10,936,163, Titled "Graphical User Interface System" by Wohlstadter et al., filed Jul. 16, 2019 and U.S. patent application Ser. No. 16/929,757, Titled "Assay Apparatuses, Methods, and Reagents" by Krivoy et al., filed Jul. 15, 2020, each of which is incorporated by reference herein in its entirety.

For instance, by applying one or more voltage pulses to generate ECL as described herein, read time and/or exposure time may be improved by more quickly and efficiently generating, collecting, observing, and analyzing ECL data. Further, the improved exposed times (e.g., single exposure, dual (or greater) exposures utilizing disparate exposure times (or equal exposure times) will help improve ECL generation, collecting, observing, and analysis by improving, for example, the dynamic range extension (DRE), binning, etc. For example, in an embodiment, substances of interest that require different time periods for capturing the luminescence data. Thus, emitted photons may be captured as the ECL data over multiple different periods of time, which could be affected by, for example, light saturation levels throughout ECL generation. The dynamic range could be improved but implementing various multi-pulse and/or multi-exposure schemes. For example, a short exposure could be taken followed by a longer exposure (e.g., exposure of a single working electrode, single working electrode zone, two or more single working electrodes or working electrode zones (either within a single well or across multiple wells), exposure of a single well, of two or more wells, or a sector, or two or more sectors, etc.). In these examples, it may be beneficial to use the longer exposure unless the exposure has become saturated. In that case, for example, the shorter exposure could be utilized. By making these adjustments (either manually or through the aid of hardware, firmware, software, an algorithm, computer readable medium, a computing device, etc.), the dynamic range can be improved, as discussed above in greater detail.

Further, the systems, devices, and methods described herein may be leveraged in various manners to allow for the optimization of software, firmware, and/or control logic to the hardware instruments, such as the readers described above. For example, because the systems, devices, and methods described herein allow for the faster and more efficient generation, collection, observation, and/or analysis of ECL, instruments may be optimized through improved software, firmware, and/or control logic to lower the cost of hardware required to perform ECL analysis (e.g., cheaper lens, fewer and/or cheaper motors to drive the instruments, etc.) The examples provided herein are merely exemplary and additional improvements to these instruments are contemplated as well.

In embodiments as described above, the wells 200 of the multi-well plate 208 may include one or more fluids (e.g., reagents) for conducting ECL analysis. For example, the fluids may include ECL coreactants (e.g., TPA), read buffers, preservatives, additives, excipients, carbohydrates, proteins, detergents, polymers, salts, biomolecules, inorganic compounds, lipids, and the like. In some embodiments, the chemical properties of the fluids in the well 200 during ECL processes may alter the electrochemistry/ECL generation. For example, a relationship between ionic concentration of fluid and electrochemistry/ECL generation may be dependent on different liquid types, read buffers, etc. In embodiments, the one or more auxiliary electrodes may provide a constant interfacial potential regardless of the current being passed, as described above. That is, a plot of the current vs potential would yield infinite current at a fixed potential.

In some embodiments, the fluids utilized (e.g., in the wells 200 of the multi-well plate 208) may include ionic compounds such as NaCl (e.g., salts). In some embodiments, for example, higher NaCl concentrations in the fluids contained in the wells 200 may improve control ECL generation throughout ECL processes. For example, current vs potential plots of the auxiliary electrode 102 having a redox couple such as Ag—AgCl have defined slopes. In some embodiments, the slope is dependent upon the salt composition and concertation in the fluid contained in the wells 200. As the Ag+ is reduced, the charge balance within the redox couple of the auxiliary electrode 102 may need to be balanced, requiring ions from the fluid to diffuse to the electrode surface. In some embodiments, the composition of the salts may alter the slope of the current vs potential curve which then impacts the reference potential at an interface of the auxiliary electrode 102, for example, containing Ag—AgCl for the current being passed. As such, in embodiments, the concentration of ions, such as salts, may be modified and controlled in order to maximize a current generated for an applied voltage.

In embodiments, a volume of the fluids in the well 200 during ECL processes may alter the electrochemistry/ECL generation. In some embodiments, relationship between a volume of the fluids in the well 200 may be dependent on the design of the electrochemical cell 100. For example, a working electrode zones 104 and an auxiliary electrode 102, which are separated by a relatively thick fluid layer, may have a more ideal electrochemical behavior, e.g., spatially consistent interfacial potentials). Conversely, a working electrode zones 104 and an auxiliary electrode 102, which are separated by a relatively thin fluid layer covering both, may have non-ideal electrochemical behavior due to spatial gradients in the interfacial potentials across both electrodes) In some embodiments, the design and the layout of the one or more working electrode zones 104 and the one or more auxiliary electrodes 102 may be to maximize a spatial distance between a working electrode zones 104 and an auxiliary electrode 102. For example, as illustrated in FIG. 3A, the working electrode zones 104 and the auxiliary electrode 102 may be positioned to maximize the spatial distance, $D_1$. The spatial distance may be maximized by reducing the number of working electrode zones 104, reducing an exposed surface area of the working electrode zones 104, reducing an exposed surface area of the auxiliary electrode 102, etc. While not discussed, the spatial distance may maximization of the spatial distance may be applied to the designs illustrated in FIGS. 3A-3F, 4A-4F, 5A-5C, 6A-6F, 7A-7F, and 8A-8D.

In embodiments, the multi-well plate 208 described above may form part of one or more kits for use in conducting assays, such as ECL assays, on the assay apparatus. A kit may include an assay module, e.g., the multi-well plate 208, and at least one assay component selected from the group consisting of binding reagents, enzymes, enzyme substrates and other reagents useful in carrying out an assay. Examples include, but are not limited to, whole cells, cell surface antigens, subcellular particles (e.g., organelles or membrane fragments), viruses, prions, dust mites or fragments thereof, viroids, antibodies, antigens, haptens, fatty acids, nucleic acids (and synthetic analogs), proteins (and synthetic analogs), lipoproteins, polysaccharides, lipopolysaccharides, glycoproteins, peptides, polypeptides, enzymes (e.g., phosphorylases, phosphatases, esterases, trans-glutaminases, transferases, oxidases, reductases, dehydrogenases, glycosidases, protein processing enzymes (e.g., proteases, kinases, protein phophatases, ubiquitin-protein ligases, etc.), nucleic acid processing enzymes (e.g., polymerases, nucleases, integrases, ligases, helicases, telomerases, etc.)), enzyme substrates (e.g., substrates of the enzymes listed above), second messengers, cellular metabolites, hormones, pharmacological agents, tranquilizers, barbiturates, alkaloids, steroids, vitamins, amino acids, sugars, lectins, recombinant or derived proteins, biotin, avidin, streptavidin, luminescent labels (preferably electrochemiluminescent labels), electrochemiluminescence coreactants, pH buffers, blocking agents, preservatives, stabilizing agents, detergents, desiccants, hygroscopic agents, read buffers, etc. Such assay reagents may be unlabeled or labeled (preferably with a luminescent label, most preferably with an electrochemiluminescent label). In some embodiments, the kit may include an ECL assay module, e.g., the multi-well plate 208, and at least one assay component selected from the group consisting of: (a) at least one luminescent label (preferably electrochemiluminescent label); (b) at least one electrochemiluminescence coreactant); (c) one or more binding reagents; (d) a pH buffer; (e) one or more blocking reagents; (f) preservatives; (g) stabilizing agents; (h) enzymes; (i) detergents; (j) desiccants and (k) hygroscopic agents.

Figure 16:
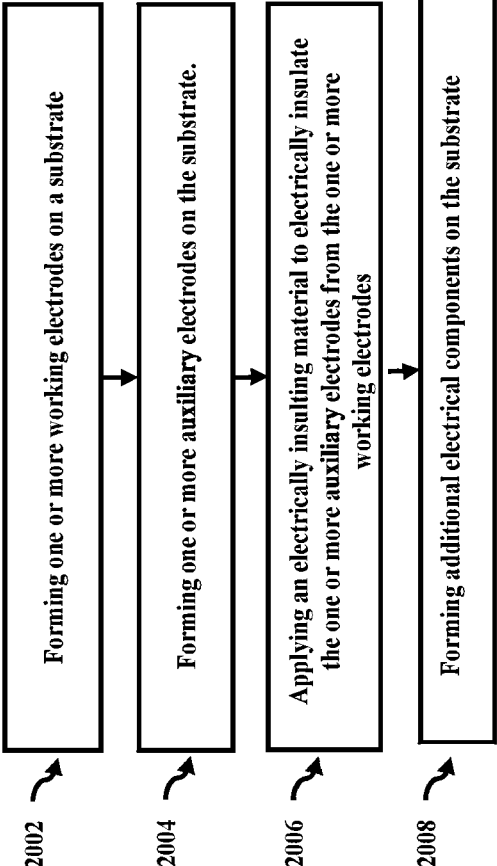
FIG. 16 illustrates a process of manufacturing a well, according to an embodiment disclosed herewith.

FIG. 16 depicts a flow chart showing a process 2000 for manufacturing wells including working and auxiliary electrodes, in accordance with an embodiment hereof. For example, the process 2000 may be utilized to manufacture one or more of the wells 200 of the multi-well plate 208 that includes one or more working electrode zones 104 and one or more auxiliary electrodes 102.

In an operation 2002, the process 2000 includes forming one or more working electrode zones 104 on a substrate. In embodiments, the one or more working electrodes may be formed using any type of manufacturing process, e.g., screen-printing, three dimensional (3D) printing, deposition, lithography, etching, and combinations thereof. In embodiments, the one or more working electrode zones 104 may be formed as multi-layered structures that may be deposed and patterned.

In embodiments, the one or more working electrodes may be a continuous/contiguous area for which a reaction may occur, and an electrode "zone," may be a portion (or the whole) of the electrode for which a particular reaction of interest occurs. In certain embodiments, a working electrode zone may comprise an entire working electrode, and in other embodiments, more than one working electrode zone may be formed within and/or on a single working electrode. For example, the working electrode zones may be formed by individual working electrodes. In this example, the working electrode zones may be configured as a single working electrode formed of one or more conducting materials. In another example, the working electrode may be formed by isolating portions of a single working electrode. In this example, a single working electrode may be formed of one or more conducting materials, and the working electrode zones may be formed by electrically isolating areas ("zones") of the single working electrode using insulating materials such as a dielectric. In any embodiment, the working electrode may be formed of any type of conducting materials such as metals, metal alloys, carbon compounds, etc. and combinations of conducting and insulating materials.

In an operation 2004, the process 2000 includes forming one or more auxiliary electrodes 102 on the substrate. In embodiments, the one or more auxiliary electrodes may be formed using any type of manufacturing process, e.g., screen-printing, three dimensional (3D) printing, deposition, lithography, etching, and combinations thereof. In embodiments, the auxiliary electrodes 102 may be formed as multi-layered structures that may be deposed and patterned. In embodiments, the one or more auxiliary electrodes may be formed of a chemical mixture that provides a interfacial potential during a reduction of the chemical mixture, such that a quantifiable amount of charge is generated throughout the reduction-oxidation reactions occurring in the well. The one or more auxiliary electrodes includes an oxidizing agent that supports reduction-oxidation reaction, which may be used during biological, chemical, and/or biochemical assays and/or analysis, such as, for example, ECL generation and analysis. In an embodiment, an amount of an oxidizing agent in a chemical mixture of the one or more auxiliary electrodes is greater than or equal to an amount of oxidizing agent required for an entirety of a reduction-oxidation reaction ("redox") that is to occur in at least one well during one or more biological, chemical, and/or biochemical assays and/or analysis, such as ECL generation. In this regard, a sufficient amount of the chemical mixture in the one or more auxiliary electrodes will still remain after a redox reaction occurs for an initial biological, chemical, and/or biochemical assays and/or analysis, thus allowing one or more additional redox reactions to occur throughout subsequent biological, chemical, and/or biochemical assays and/or analysis. In another embodiment, an amount of an oxidizing agent in a chemical mixture of one or more auxiliary electrodes is at least based in part on a ratio of an exposed surface area of each of the plurality of working electrode zones to an exposed surface area of the auxiliary electrode.

For example, the one or more auxiliary electrodes may be formed of a chemical mixture that includes a mixture of silver Ag and silver chloride AgCl, or other suitable metal/metal halide couples. Other examples of chemical mixtures may include metal oxides with multiple metal oxidation states, e.g., manganese oxide, or other metal/metal oxide couples, e.g., silver/silver oxide, nickel/nickel oxide, zinc/zinc oxide, gold/gold oxide, copper/copper oxide, platinum/platinum oxide, etc.)

In an operation 2006, the process includes forming an electrically insulating material to electrically insulate the one or more auxiliary electrodes form the one or more working electrodes. In embodiments, the electrically insulating material may be formed using any type of manufacturing process, e.g., screen-printing, 3D printing, deposition, lithography, etching, and combinations thereof. The electrically insulating materials may include dielectrics.

In an operation 2008, the process 2000 includes forming additional electrical components on the substrate. In embodiments, the one or more auxiliary electrodes may be formed using any type of manufacturing process, e.g., screen-printing, 3D printing, deposition, lithography, etching, and combinations thereof. The additional electrical components may include through holes, electrical traces, electrical contacts, etc. For example, the through holes are formed within the layers or materials forming the working electrode zones 104, the auxiliary electrodes 102, and the electrically insulating materials so that electrical contact may be made with the working electrode zones 104 and the auxiliary electrodes 102 without creating a short with other electrical components. For instance, one or more additional insulating layers may be formed on the substrate in order to support electrical traces that are coupled through while isolating the electrical traces.

In embodiments, the additional electrical components may include an electrical heater, a temperature controller, and/or a temperature sensor. The electrical heater, temperature controller, and/or temperature sensor may assist in the electrochemical reaction, e.g., ECL reaction, and electrode performance may be temperature dependent. For example, a screen-printed resistance heater may be integrated into the electrode design. The resistance heater may be powered and controlled by temperature controller, and/or temperature sensor, whether integrated or external. These are self-regulating and formulated to generate a certain temperature when a constant voltage is applied. The inks may assist in controlling temperature during an assay or during the plate read-out. The inks (and/or the heater) may also be useful in cases where elevated temperatures are desired during an assay (e.g., in assays with a PCR component). A temperature sensor may also be printed onto the electrode (working and/or auxiliary electrode) to provide actual temperature information.

Figure 17C:
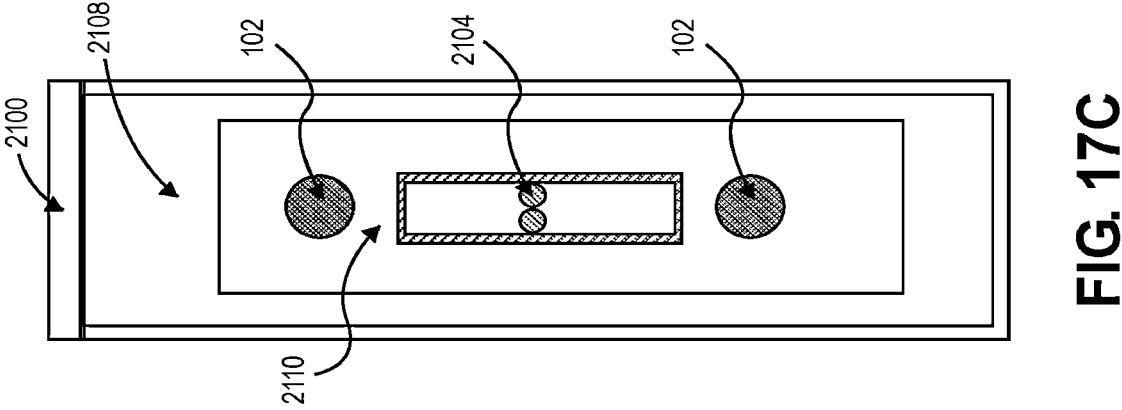
FIG. 17A-17F and 18A illustrates exemplary stages in a process of manufacturing a well, according to an embodiment disclosed herewith.
Figure 17B:
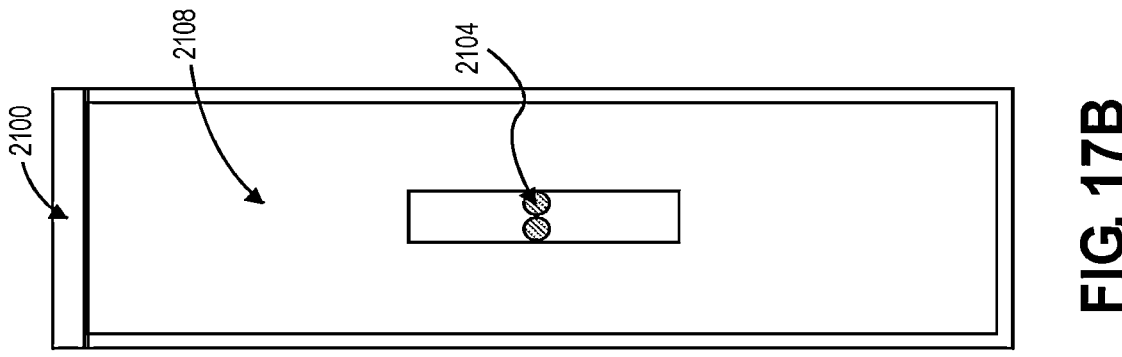

FIGS. 17A-17F illustrate non-limiting example of a process of forming working electrode zones 104 and auxiliary electrodes 102 in one or more wells 200, in accordance with an embodiment hereof. While FIGS. 17A-17F illustrate the formation of two (2) wells (as illustrated in FIG. 18A), one skilled in the art will realize that the process illustrated in FIGS. 17A-17F may be applied to any number of wells 200. Moreover, while FIGS. 17A-17F illustrate the formation of the auxiliary electrodes 102 and the working electrode zones 104 in an electrode design similar to the electrode design 701 illustrated in FIGS. 7A-7F, one skilled in the art will realize that the process illustrated in FIGS. 17A-17F may be utilized on an electrode design described herein.

The process for manufacturing the auxiliary electrodes 102, the working electrode zones 104, and other electrical components may be performed utilizing screen-printing processes as discussed below, where the different materials are formed using inks or paste. In embodiments, the auxiliary electrodes 102 and the working electrode zones 104 may be formed using any type of manufacturing process, e.g., 3D printing, deposition, lithography, etching, and combinations thereof.

Figure 17A:
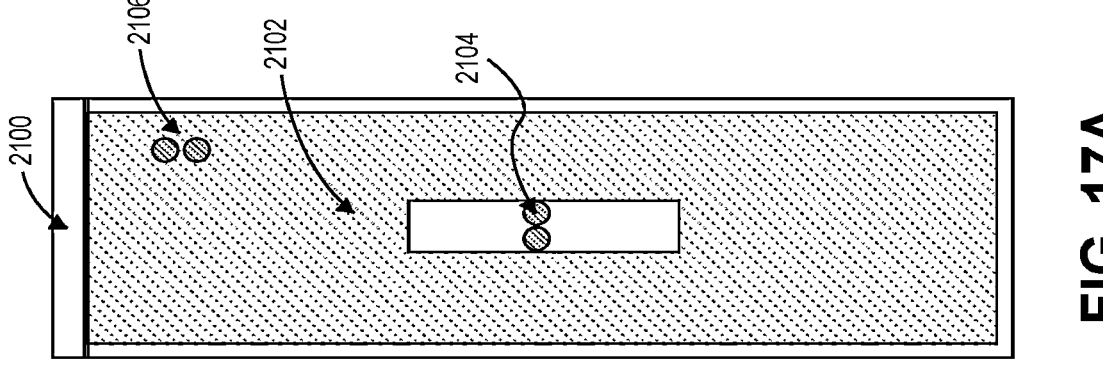
Figure 18A:
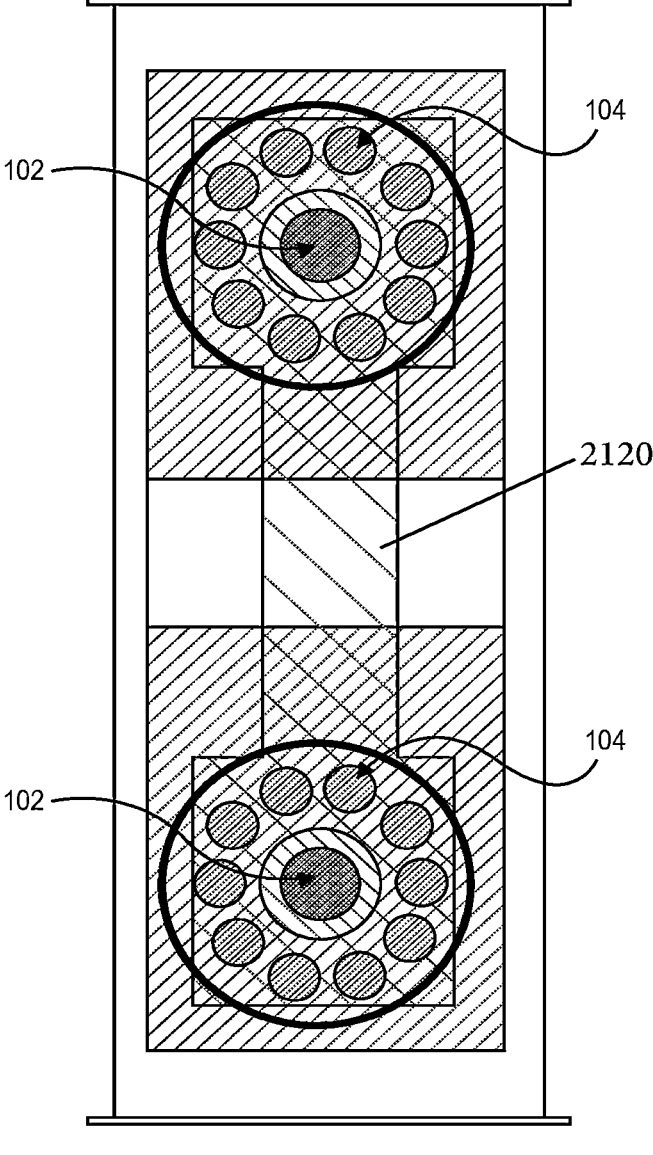

As illustrated in FIG. 17A, a first conductive layer 2102 may be printed on a substrate 2100. In embodiments, the substrate 2100 may be formed of any material (e.g., insulating materials) that provides a support to the components of the well 200. In some embodiments, the first conductive layer 2102 may be formed of a metal, for example, silver. Other examples of the first conductive layer 2102 may include metals such as gold, silver, platinum, nickel, steel, iridium, copper, aluminum, a conductive alloy, or the like. Other examples of the first conductive layer 2102 may include oxide coated metals (e.g., aluminum oxide coated aluminum). Other examples of the first conductive layer 2102 may include carbon-based materials such as carbon, carbon black, graphitic carbon, carbon nanotubes, carbon fibrils, graphite, carbon fibers and mixtures thereof. Other examples of the first conductive layer 2102 may include conducting carbon-polymer composites.

The substrate 2100 may also include one or more through holes or other type of electrical connections (e.g., traces, electrical contacts, etc.) for connecting the components of the substrate 2100 and providing locations where electrical connections may be made to the components. For example, as illustrated, the substrate 2100 may include first through holes 2104 and second through holes 2106. The first through holes 2104 may be electrically isolated from the first conductive layer 2102. The second through holes 2106 may be electrically coupled to the first conductive layer 2102. Fewer or greater numbers of holes are contemplated as well. For example, the through holes may be formed within the layers or materials forming the working electrode zones 104, the auxiliary electrodes 102, and the electrically insulating materials so that electrical contact may be made with the working electrode zones 104 and the auxiliary electrodes 102 without creating a short with other electrical components. For instance, one or more additional insulating layers may be formed on the substrate in order to support electrical traces that are coupled through while isolating the electrical traces.

As illustrated in FIG. 17B, a second conductive layer 2108 may be printed on the first conductive layer 2102. In embodiments, the second conductive layer 2108 may be formed of a chemical mixture that includes a mixture of silver (Ag) and silver chloride (AgCl), or other suitable metal/metal halide couples. Other examples of chemical mixtures may include metal oxides as discussed above. In some embodiments, the second conductive layer 2108 may be formed to be the approximate dimension of the first conductive layer 2102. In some embodiments, the second conductive layer 2108 may be formed to dimensions that are larger or smaller than the first conductive layer 2102. The second conductive layer 2108 may be formed by printing second conductive layer 2108 using an Ag—AgCl chemical mixture (e.g., ink, paste, etc.) that has a defined ratio of Ag to AgCl. In an embodiment, an amount of oxidizing agent in a chemical mixture of an auxiliary electrode is at least based in part of a ratio of Ag to AgCl in the chemical mixture of the auxiliary electrode. In an embodiment, a chemical mixture of an auxiliary electrode having Ag and AgCl comprises approximately 50 percent or less AgCl, for example, 34 percent, 10 percent, etc. While not illustrated, one or more additional intervening layers (e.g., insulating layers, conductive layers, and combination thereof) may be formed in between the second conductive layer 2108 and the first conductive layer 2102.

As illustrated in FIG. 17C, a first insulating layer 2110 may be printed on the second conductive layer 2108. The first insulating layer 2110 may be formed of any type of insulating material, for example, a dielectric, polymers, glass, etc. The first insulating layer 2110 may be formed in a pattern to expose two portions ("spots") of the second conductive layer 2108, thereby forming two (2) auxiliary electrodes 102. The exposed portions may correspond to a desired shape and size of the auxiliary electrodes 102. In embodiments, the auxiliary electrodes 102 may be formed to any number, size, and shape, for example, as those described in the electrode designs described above with reference to FIGS. 3A-3F, 4A-4F, 5A-5C, 6A-6F, 7A-7F, and 8A-8D.

Figure 17F:
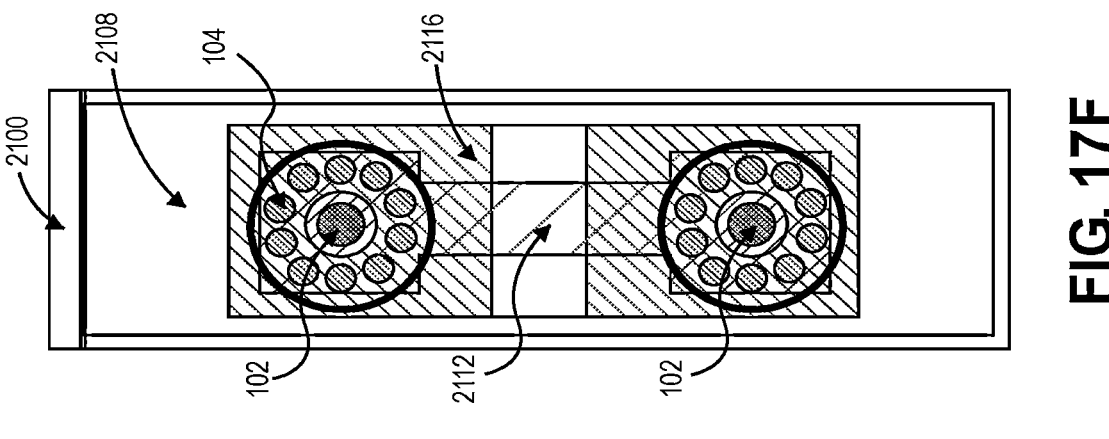
Figure 17E:
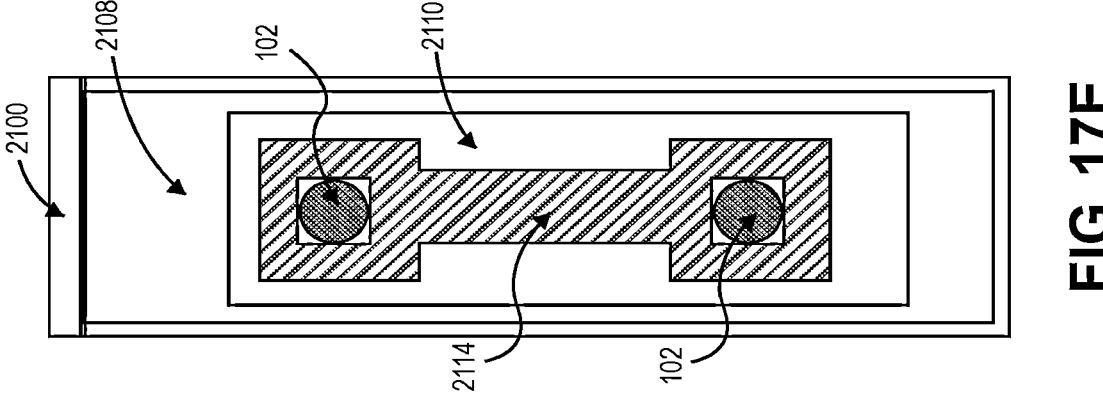
Figure 17D:
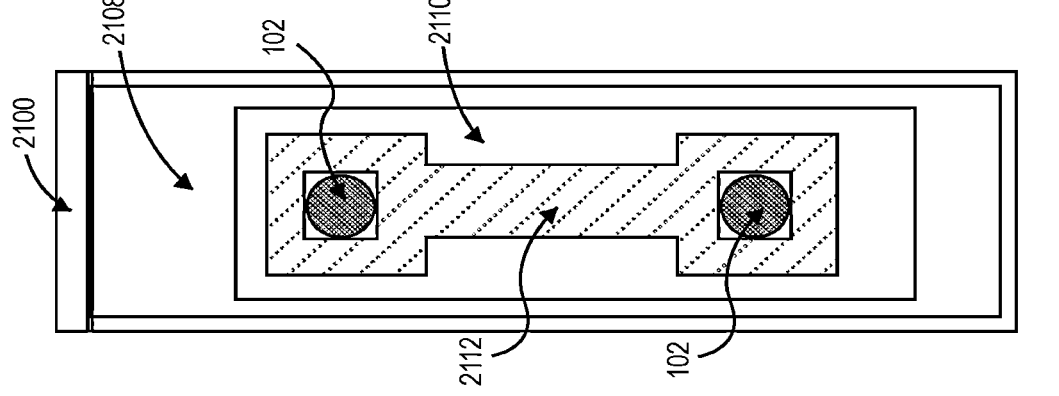

As illustrated in FIG. 17D and 17E, a third conductive layer 2112 may be printed on the insulating layer 2110, and, subsequently, a fourth conductive layer 2114 may be printed on the third conductive layer 2112. In embodiments, the third conductive layer 2112 may be formed of a metal, for example, Ag. In embodiments, the fourth conductive layer 2114 may be formed of a composite material, for example, a carbon composite. Other examples of the first conductive layer 2102 may include metals such as gold, silver, platinum, nickel, steel, iridium, copper, aluminum, a conductive alloy, or the like. Other examples of the first conductive layer 2102 may include oxide coated metals (e.g., aluminum oxide coated aluminum). Other examples of the first conductive layer 2102 may include other carbon-based materials such as carbon, carbon black, graphitic carbon, carbon nanotubes, carbon fibrils, graphite, carbon fibers and mixtures thereof. Other examples of the first conductive layer 2102 may include conducting carbon-polymer composites. The third conductive layer 2112 and fourth conductive layer 2114 may be formed in a pattern to form a base of the working electrode zones and provide electrical coupling to the first through holes 2104. In embodiments, through holes may be formed to any number, size, and shape, for example, as those described in the electrode designs described above with reference to FIGS. 3A-3F, 4A-4F, 5A-5C, 6A-6F, 7A-7F, and 8A-8D.

As illustrated in FIG. 17F, a second insulating layer 2116 may be printed on the fourth conductive layer 2114. The second insulating layer 2116 may be formed of any type of insulating material, for example, a dielectric. The second insulating layer 2116 may be formed in a pattern to expose a plurality of portions (also referred to throughout as "spots") of the fourth conductive layer 2114 (e.g., twenty (20) portions), thereby forming ten (10) working electrode zones 104 for each well 200, as illustrated in FIG. 18A. The exposed portions may correspond to a desired shape and size of the working electrode zones 104. In embodiments, the working electrode zones 104 may be formed to any number, size, and shape, for example, as those described in the electrode designs described above with reference to FIGS. 3A-3F, 4A-4F, 5A-5C, 6A-6F, 7A-7F, and 8A-8D. In certain embodiments, one of more of the described layers can be formed in particular order to minimize contamination of layers (e.g., the carbon-based layers, etc.).

Figure 18B:
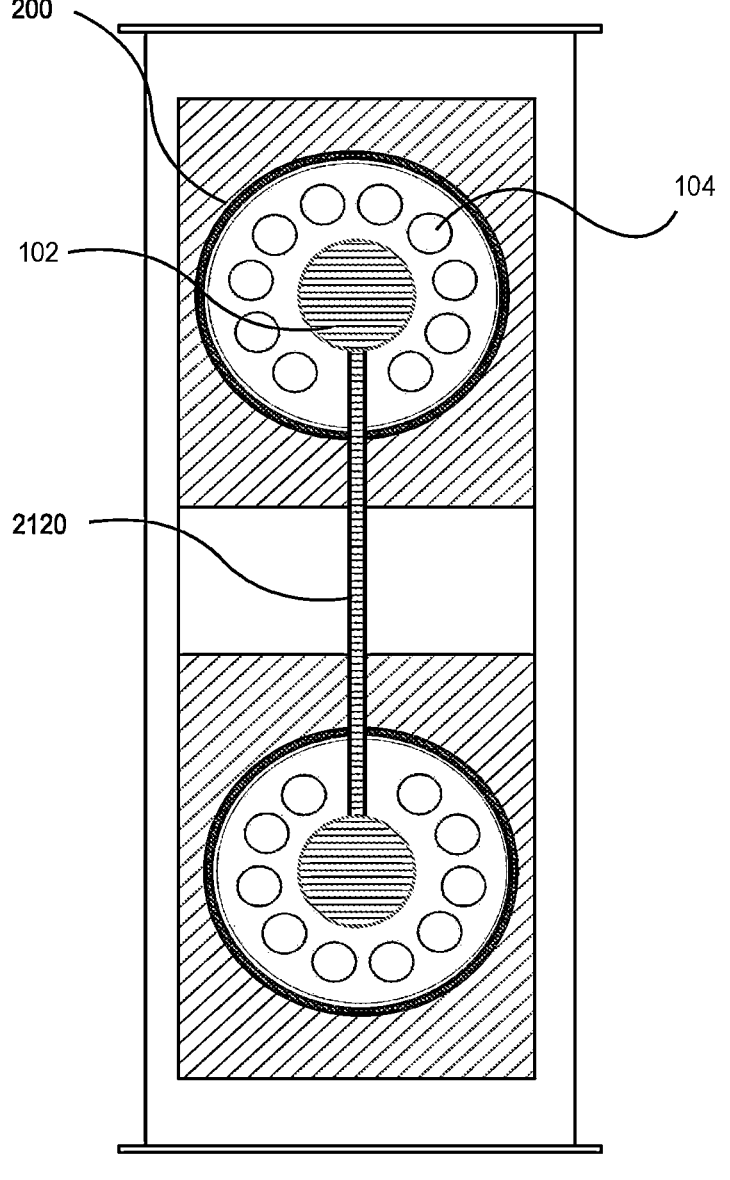
FIG. 18B illustrates an embodiment of a well according to the present disclosure.

In the method described above, conductivity between the auxiliary electrodes 102 is maintained through the conductive layer 2108 which is then masked by the insulating layer 2110. This design permits the conductive connection between the auxiliary electrodes 102 to run underneath the working electrode zones 104. FIG. 18B illustrates a further embodiment of wells 200 as produced by a manufacturing method somewhat similar to that described above with respect to FIGS. 17A-17F and 22A. As shown in FIG. 18B, the working electrode zones 104 may be arranged in a circular pattern having a gap, e.g., in a C-shape. Each well 200 may have, for example, ten working electrode zones. In further embodiments, any suitable number of working electrode zones may be included. The gap in the working electrode zone 104 pattern permits a conductive trace 2120 to run between the auxiliary electrodes 102 of the two wells

US 12,596,095 B2

53

200. Because the conductive trace 2120 runs between the auxiliary electrodes 102 and does not cross over them, the auxiliary electrodes 102, working electrode zones 104, and conductive trace 2120 may be printed on a same layer during a manufacturing process. For example, in embodiments that include individually addressable working electrode zones 104, each of the auxiliary electrodes 102, working electrode zones 104, and conductive trace 2120 may be printed as individual features on a same layer of a substrate. The C-shape design of the electrodes depicted in FIG. 18B is not limited to use in a dual-well layout. Other layouts including different numbers of wells are consistent with embodiments hereof. For example, a single well layout may include the C-shaped electrode layout. In other examples, four or more wells 200 may be laid out with the C-shaped electrode layout and have multiple conductive traces 2120 connecting the auxiliary electrodes 102 of each well 200 in the layout.

In embodiments, electrochemical cells as described herein may be provided with sector addressable wells. As discussed throughout, electrochemical cells consistent with the present disclosure include working electrodes and auxiliary electrodes arranged according to specific positioning and patterning. In embodiments, multi-well assay plates may include one or more wells addressable as a group, e.g., as a sector. Accordingly, the multiple wells (and one or more individual spots therein) of a sector may be addressed, e.g., electrically activated or excited) concurrently. A multi-well assay plate may include multiple sectors of wells, wherein the wells of each sector may be concurrently addressable. Embodiments consistent with sector addressable multi-well assay plates are discussed below with respect to FIGS. 20A and 20B, 21A-21D, 22A-22O, and 23A-23PP other sectors in the multi-well assay plate. In embodiments, as described below, working electrode zones of a given sector are in electrical communication with each other, facilitating concurrent addressability.

In some embodiments, multi-assay plates that include individually isolated working electrode zones may be sector addressable due to specific hardware and/or software arrangements made in an apparatus designed to facilitate the electrical connection between the multi-well assay plate and a plate reader system.

Figure 20A:
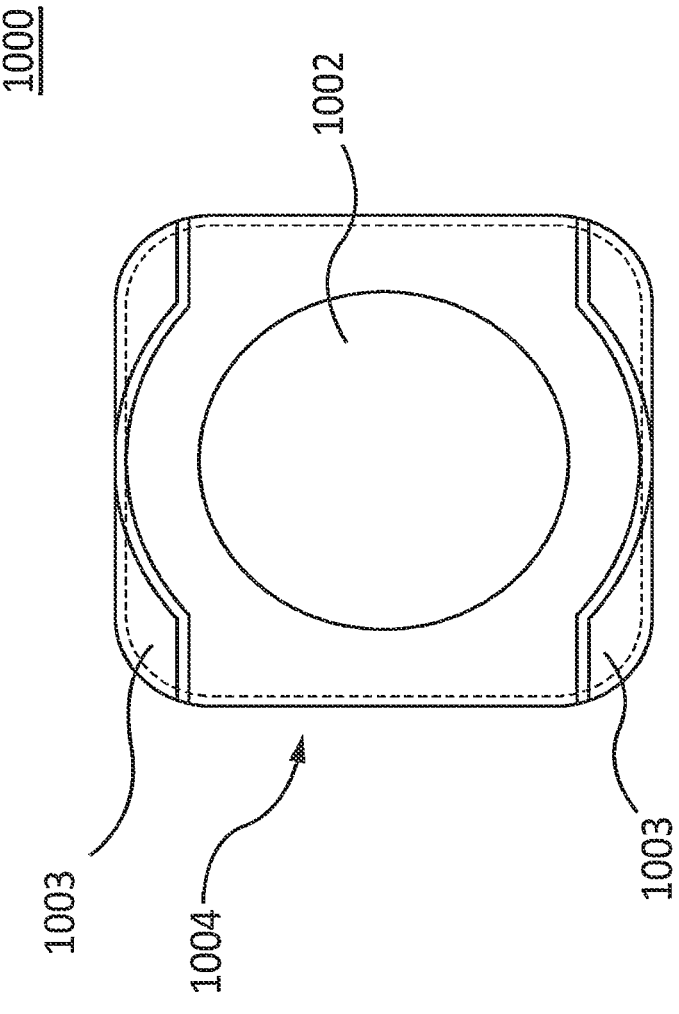
FIGS. 20A and 20B illustrate electrochemical cells having electrodes according to embodiments disclosed herein.
Figure 20B:
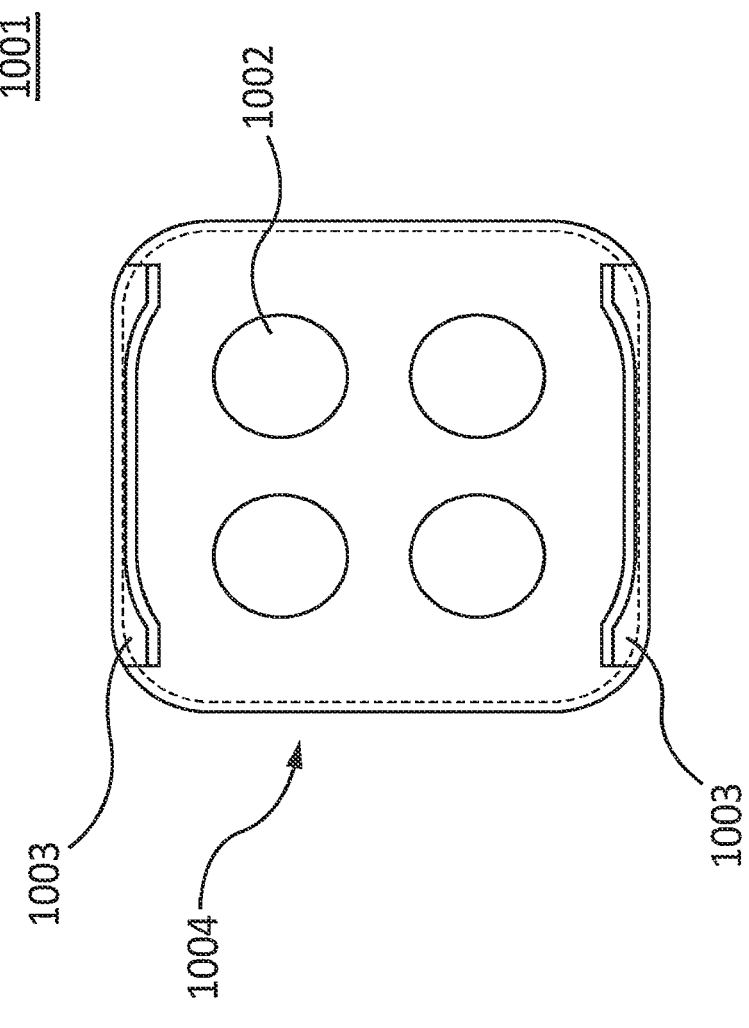

FIGS. 20A and 20B illustrate electrochemical cells having working electrode zones according to embodiments enclosed herein. FIG. 20A illustrates a single spot electrochemical cell 1000 while FIG. 20B illustrates a multi-spot electrochemical cell 1001. The electrochemical cell 1000 includes a single working electrode zone 1002, at least one auxiliary electrode zone 1003, and an electrochemical cell border 1004. The electrochemical cell 1001 includes a plurality of working zones 1002 and at least one auxiliary electrode zone 1003, and an electrochemical cell border 1004. In an example, the electrochemical cell 1001 of FIG. 20B may include four working electrode zones 1002 and two auxiliary electrode zones 1003. In other embodiments, fewer or greater working electrode zones 1002 can be alternatively provided (e.g., 1, 2, 3, 6, 7, 8, etc.). The following discussion of electrochemical cells refers to both the four working electrode zone design electrochemical cell 1001 and the single working electrode zone electrochemical cell 1000 (also referred to throughout as a four-spot design and a one spot-design). However, the devices, systems, and methods disclosed herein related to the electrode electrochemical cells are understood to not be limited to the specific single and four working electrode zone design and may be applied, as appropriate, to other patterns and position of electrode zones including at least those disclosed herein.

As discussed above, a working electrode zone may comprise an entire electrode, and in other embodiments, more than one working electrode zone may be formed within and/or on a single electrode or two or more electrodes. For example, in the electrochemical cell 1001 and the electrochemical cell 1000 formed by a well electrode structure 3101 discussed below with reference, for example, to FIG. 22A, multiple working electrode zones 1002 may be formed by individually isolating surface zones, areas, or portions of a single working electrode to form the working electrode zones 1002. In such an embodiment, the multiple working electrode zones 1002 sharing a same working electrode may be in electrical communication with one another. In this example, a single working electrode may be formed of one or more conducting materials, and the working electrode zones 1002 may be formed by electrically isolating areas ("zones") of the single working electrode using insulating materials such as a dielectric. In embodiments, as discussed in greater detail below, a multi-well assay plate may include several sectors of wells wherein each of the working electrode zones 1002 in the sector are in electrical communication through having a common working electrode. In further embodiments, sectors of wells may include multiple working electrode zones 1002 not in direct electrical communication via the assay plate. In such embodiments, sector addressability may be achieved via concurrent energization of the multiple working electrode zones 1002 by a plate reader or other system configured to use the assay plates discussed herein.

Similarly, the auxiliary electrode zones 1003 of the electrochemical cells 1000/10001 may be formed from individually isolated surface areas ("zones") of a larger, continuous auxiliary electrode pattern or structure. Accordingly, the multiple auxiliary electrode zones 1003 of a continuous auxiliary electrode pattern or structure may each be in electrical communication with one another. Multiple auxiliary electrode zones 1003, as discussed below, may isolated by sector in a multi-well assay plate and/or may be in electrical communication with all other auxiliary electrode zones 1003 of an assay plate.

Figure 21A:
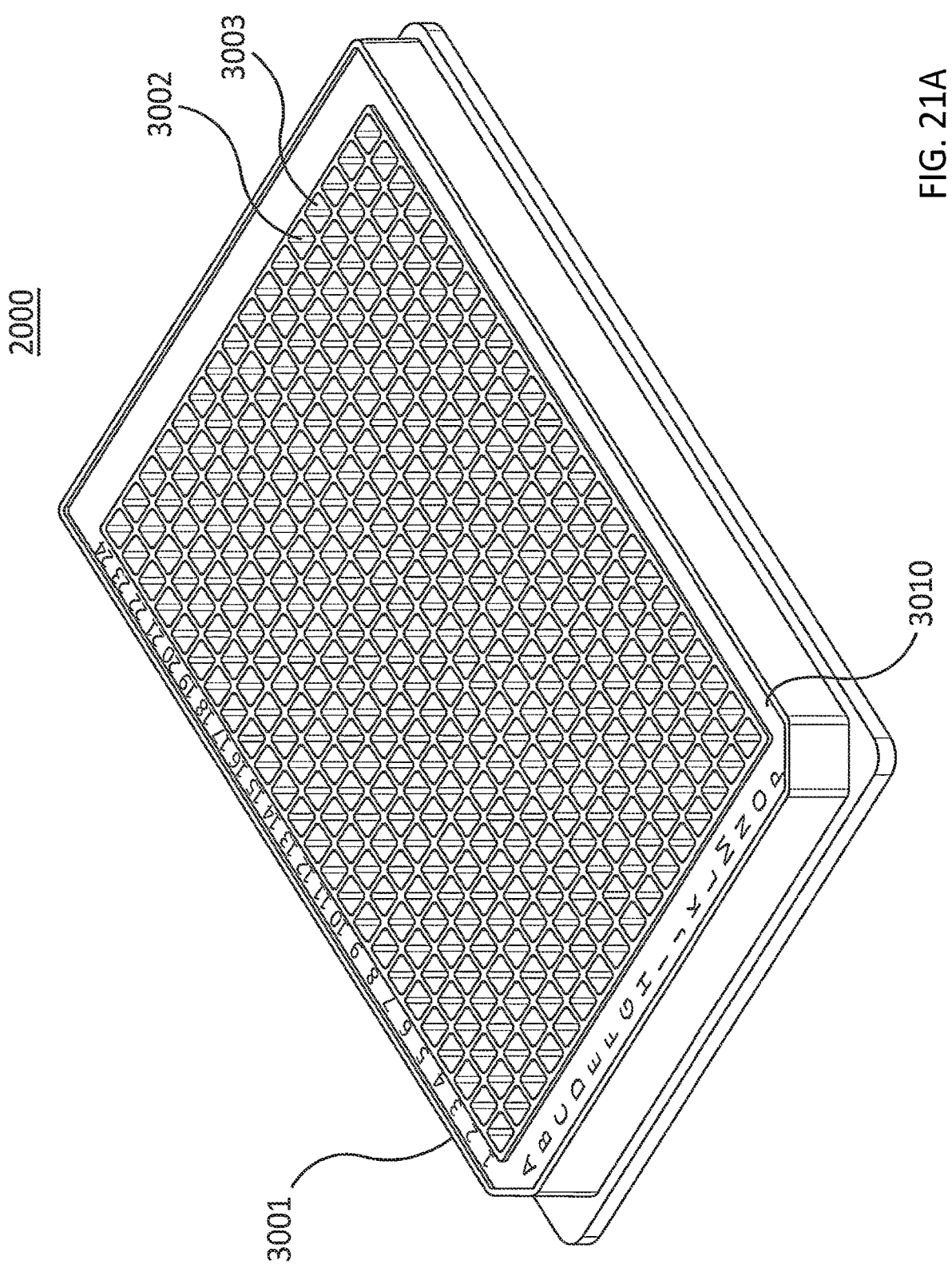
FIGS. 21A-21D illustrate portions of a multi-well plate having wells including electrochemical cells according to embodiments disclosed herein.
Figure 21B:
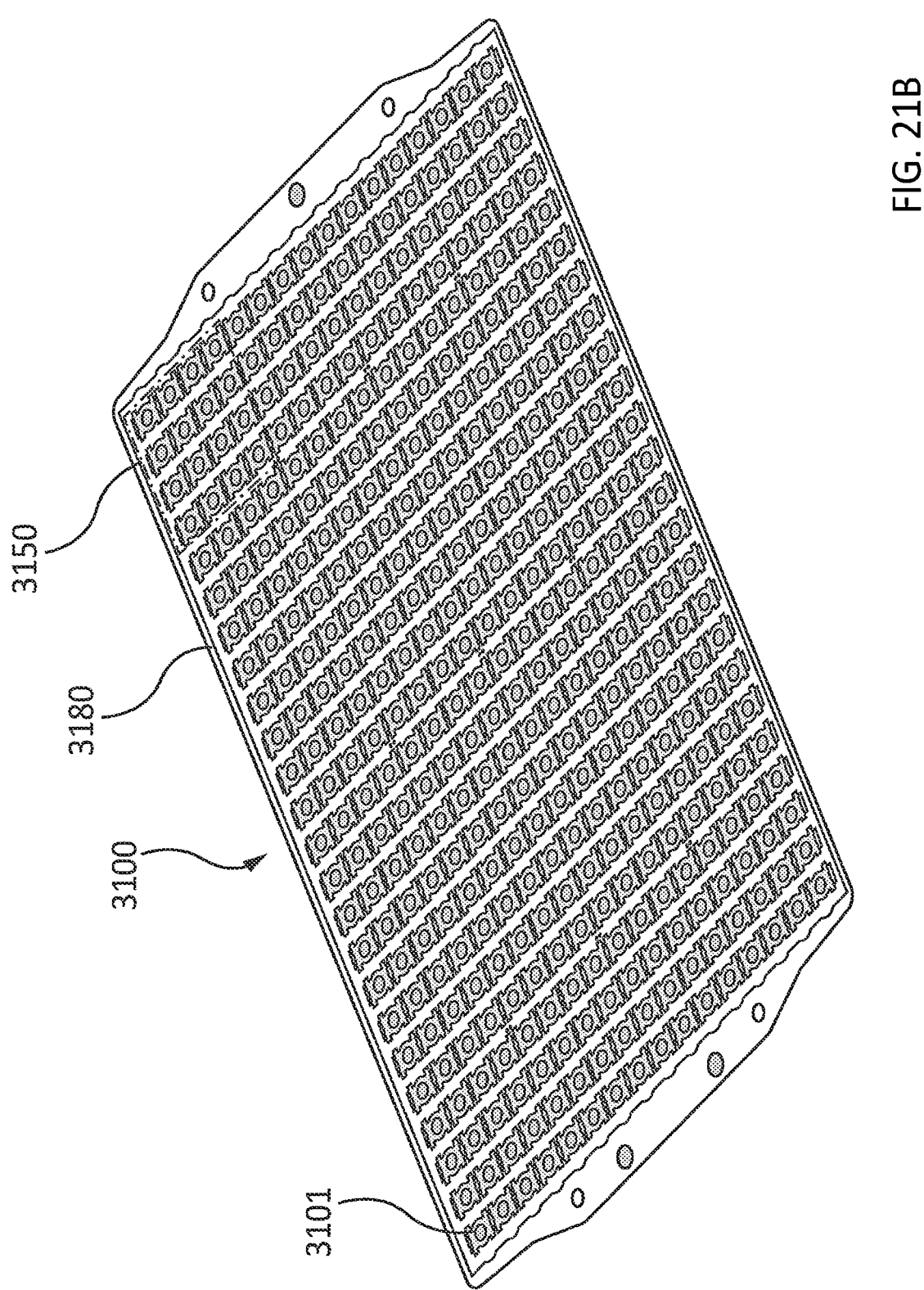

FIGS. 21A-21D illustrate portions of a multi-well assay plate having wells including electrochemical cells according to embodiments disclosed herein. FIG. 21A is a perspective top view of a multi-well plate 2000. FIG. 21A illustrates a top plate 3001 having top plate openings 3002 defining wells 3003 of the multi-well assay plate 2000 arranged in a well pattern, each well being defined by a well area, as discussed further below. FIG. 21A also illustrates a base plate 3010, which includes a substrate 3100, as shown in FIG. 21B.

Figure 21C:
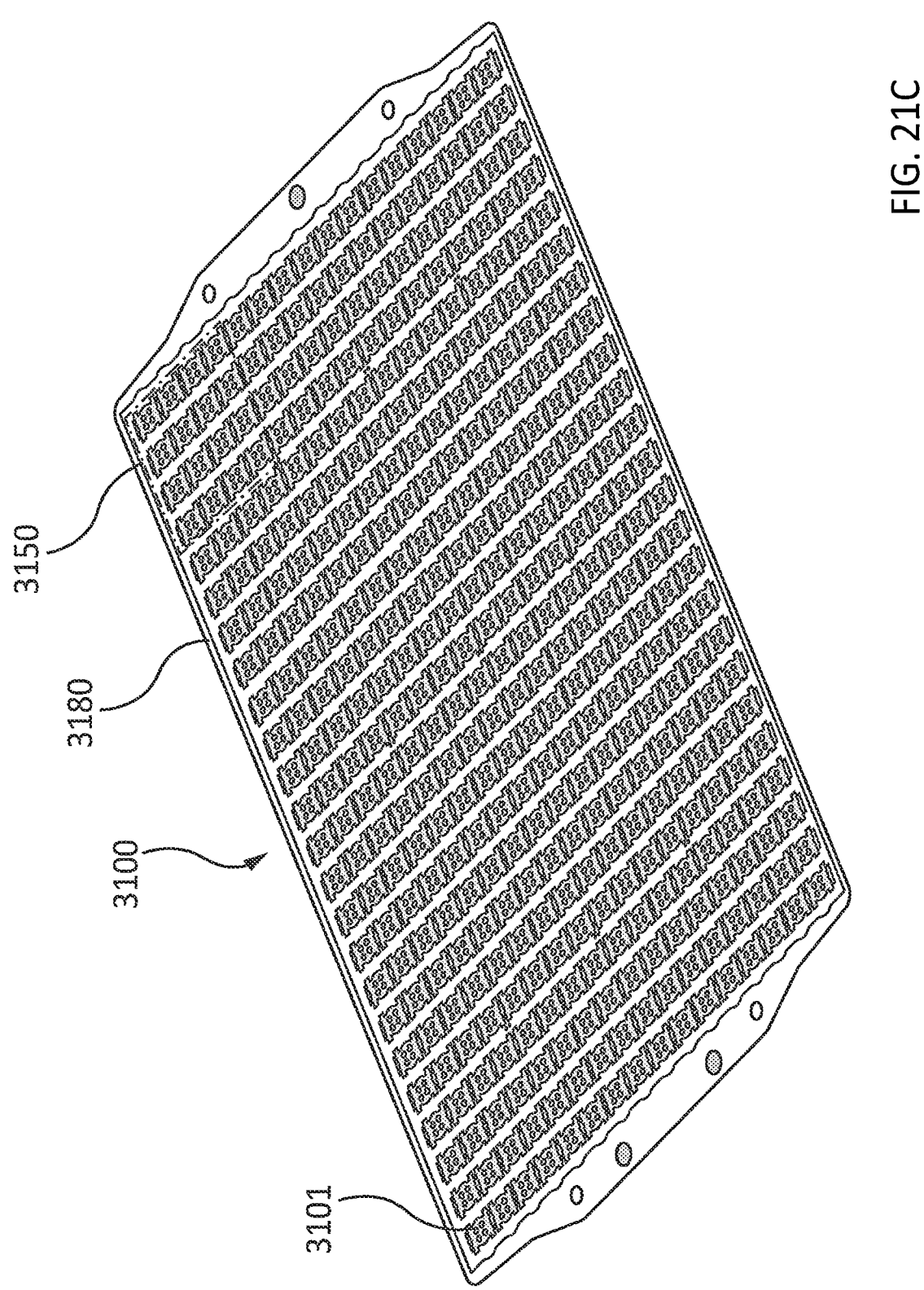

FIGS. 21B and 21C illustrate a substrate 3100 and its top surface 3180. In the example multi-well assay plate 2000 illustrated in FIG. 21A, the top surface 3180 is mated to the top plate 3001. FIGS. 21B and 21C illustrate various elements visible in the top surface 3180 of the substrate 3100 that combine to form a plurality of sector electrode structures 3150 and well electrode structures 3101. Further elements of the sector electrode structures 3150 and well electrode structures 3101 and additional description is provided below. The sector electrode structures 3150 and well electrode structures 3101 help define the electrochemical cells 1000/1001 (FIGS. 20A/20B), which comprise a plurality of working electrode zones 1002 and at least one auxiliary electrode zone 1003. FIG. 21B illustrates well electrode structures 3101 defining one-spot electrochemical cells 1000 while FIG. 21C illustrates well electrode structures 3101 defining four-spot electrochemical cells 1001.

Figure 21D:

FIG. 21D illustrates a substrate 3100 and its bottom surface 3210. The bottom surface 3210 of the substrate 3100 features a plurality of working electrode contacts 3204 which form part of the sector electrode structures 3150 and well electrode structures 3101, as discussed below. FIG. 21D further illustrates the auxiliary electrode contact pattern 3291.

FIGS. 21A-21C illustrate a multi-well plate 2000 having a 16×24 arrangement of 384 wells 3003. As discussed herein, the 384 wells may be arranged in 24 sectors of 16 (4×4) wells each. The following discussion, in many places, specifically refers to this arrangement of a 384 well plate. The disclosure, however, is not limited to this particular arrangement and encompasses any other suitable sectored arrangement of wells. For example, in a 384 well plate, more sectors with fewer wells (e.g., 8 (2×4) wells by 48 sectors, 4 (1×4 or 2×2) wells by 96 sectors, etc.) as well as fewer sectors with more wells (e.g., 24 (6×4) wells by 16 sectors, 32 (8×4) wells by 12 sectors, 64 (8×8) wells by 6 sectors, etc.) remain consistent with embodiments herein. Further, sectored multi-well assay plates described herein may include more or fewer total wells, e.g., 96 wells. The features discussed herein with respect to the 24 sector/16 well arrangement may be employed or used to facilitate assay plates with alternative sectoring arrangements. In addition, the multi-well assay plate 2000 described herein includes square-shaped wells with rounded corners. This shape is by way of example only, and further embodiments may include wells of any suitable shape, as discussed herein.

Each well 3003 corresponds to a well electrode structure 3101. Further, the wells 3003 and well electrode structures 3101 may be grouped into sectors defined by sector electrode structures 3150, as discussed below. In further embodiments, any suitable number of wells 3003 and well electrode structures 3101 may be provided. Additionally, the multi-well plate 2000 presented in FIGS. 21A-21C is an example only of one use of the well electrode structures 3101 described herein. The well electrode structures 3101 described herein may be used to form electrochemical cells 1000/1001 for various applications, including, for example, cartridge readers, plate-based analyzers, lateral flow-based test devices, etc.

In embodiments, the well electrode structures 3101 may be formed on the substrate 3100 in various ways, e.g., via a sequential screen printing process, stenciling, etching, deposition, lithography, and/or other methodologies for forming electrodes. In these examples, the well electrode structures 3101 may be printed down layer by layer on the substrate 3100, although other methodologies may be employed as well. In embodiments, the electrodes described throughout may be implemented on one or more circuits, such as, for example printed circuit boards (PCBs). Thus, although the discussion below may describe a 384 well plate employing 24 sectors of 16 wells arranged in a 4×4 fashion as manufactured via a screen printing process, other manufacturing technologies and other well/sector arrangements, as described herein, are encompassed within the scope of this disclosure. Further, different layering processes may be used in conjunction with one another as appropriate, e.g., some layers may be screen printed while other layers may be printed via stenciling, etc.

Additionally, the conductive and non-conductive layers discussed below may include any appropriate material, for example, carbon, carbon composite, silver, gold, silver chloride, as conductive materials as well as various non-conductive insulative dielectric materials (e.g., dielectric inks, polymer based coatings or films, etc.) where appropriate. In the embodiments discussed below, specific materials are discussed for specific layers. These are provided by way of example only, and other materials may be employed without departing from the scope of this disclosure.

Figure 22A:
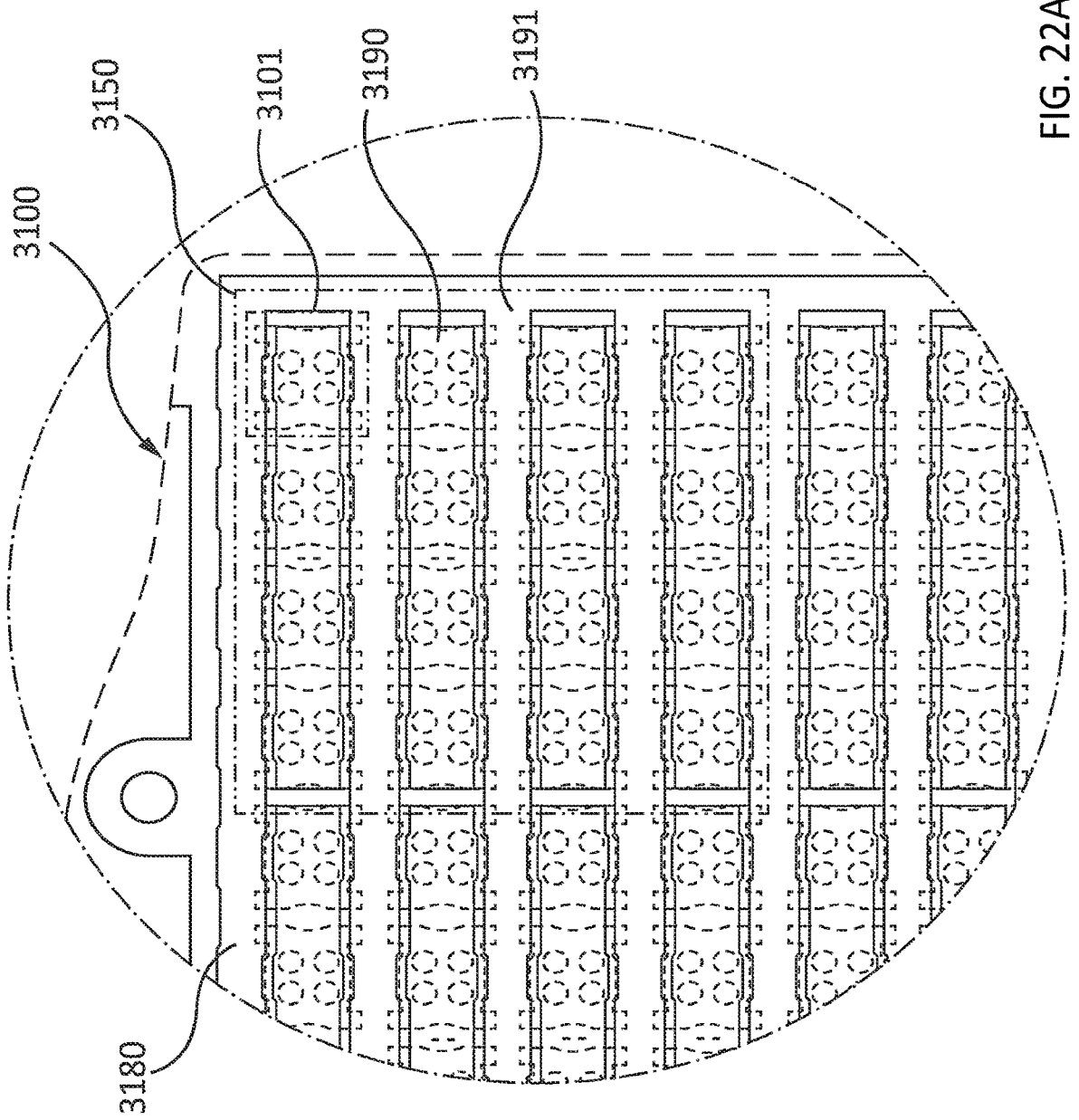
FIGS. 22A-22O illustrate aspects of the construction of electrochemical cells according to embodiments disclosed herein.

FIGS. 22A-22O illustrate the sector electrode structures 3150 and well electrode structures 3101 and aspects of the layering process. The layering process discussed below with respect to FIGS. 22A-22O includes a screen printing process. In certain screen printing processes, screen printing can employ screens or meshes with portions made impermeable by use of a blocking material. The screen is placed atop a substrate and ink or other substance is pushed through the screen to form a pattern on the substrate. Screen printing is merely one method of production and other layered printing processes may be used to print the patterns and layers discussed below.

In the following discussion of the layering process used to create the substrate 3100 various dimensions are discussed. As discussed below with respect to FIGS. 22A-22O nominal dimensions are discussed. It is understood that the description of these dimensions (whether or not the term nominal is used) includes variations based on manufacturing tolerances and limits. Further, the term approximate is also used to describe dimensions. As used below, approximate refers to variations in dimensions beyond those of manufacturing tolerances that do not interfere with the described functionality of the various structures. For example, approximate dimensions may vary by 10% or less, 5% or less, 3% or less, 2% or less, and/or by 1% or less.

The dimensions described below with respect to FIGS. 22A-22O are selected to permit the arrangement of all the required features in the space permitted without interference between features. Interference may refer to physical interference, e.g., two features that intersect in an unintended fashion, as well as electrical interference, e.g., two features that electrically influence one another in an unintended fashion. Dimensions described below are non-limiting and exemplary, selected to account for manufacturing tolerances and limits. Such concerns relate to both manufacturing tolerances within the production of a single layer, e.g., the tolerances involved in manufacturing the various screens and templates for printing as well as the tolerances involved in printing one or more features with a screen or template. The tolerances of concern are also related to the manufacturing tolerances spanning multiple layers, e.g., print-to-print registration tolerances involved in the alignment of one layer and a subsequent layer. Due to these types of manufacturing error, the potential for tolerance or error stack-up must be considered. For example, to meet a requirement that two features remain a specific distance apart in a final product, it may be necessary for a nominal distance between the two features to be larger than that specific distance to account for variance in the manufacturing process within a single layer. Further, if those features are located on different layers on the substrate, the nominal distance must be selected to also account for potential print-to-print registration errors.

FIG. 22A illustrates an electrode pattern for a portion of a top surface 3180 of a substrate 3100. The illustrated portion shows the features of several well electrode structures 3101 and several sector electrode structures 3150 disposed on the top surface 3180 of the substrate 3100. Features belonging to one well electrode structure 3101 are shown outlined with a dashed border. Features belonging to one sector electrode structure 3150 are also shown with a dashed border. As discussed below, the features of the well electrode structures 3101 and the sector electrode structures 3150 are patterned on the top surface 3180 and the bottom surface 3210 (shown in FIG. 22C) of the substrate 3100. Each sector electrode structure 3150 includes one or more well electrode structures 3101, illustrated in greater detail in FIG. 22B. The sector electrode structures 3150 each include one or more electrode bus bars 3190 and a portion of an auxiliary electrode pattern 3191 that spans the substrate 3100, as discussed further below.

Figure 22B:
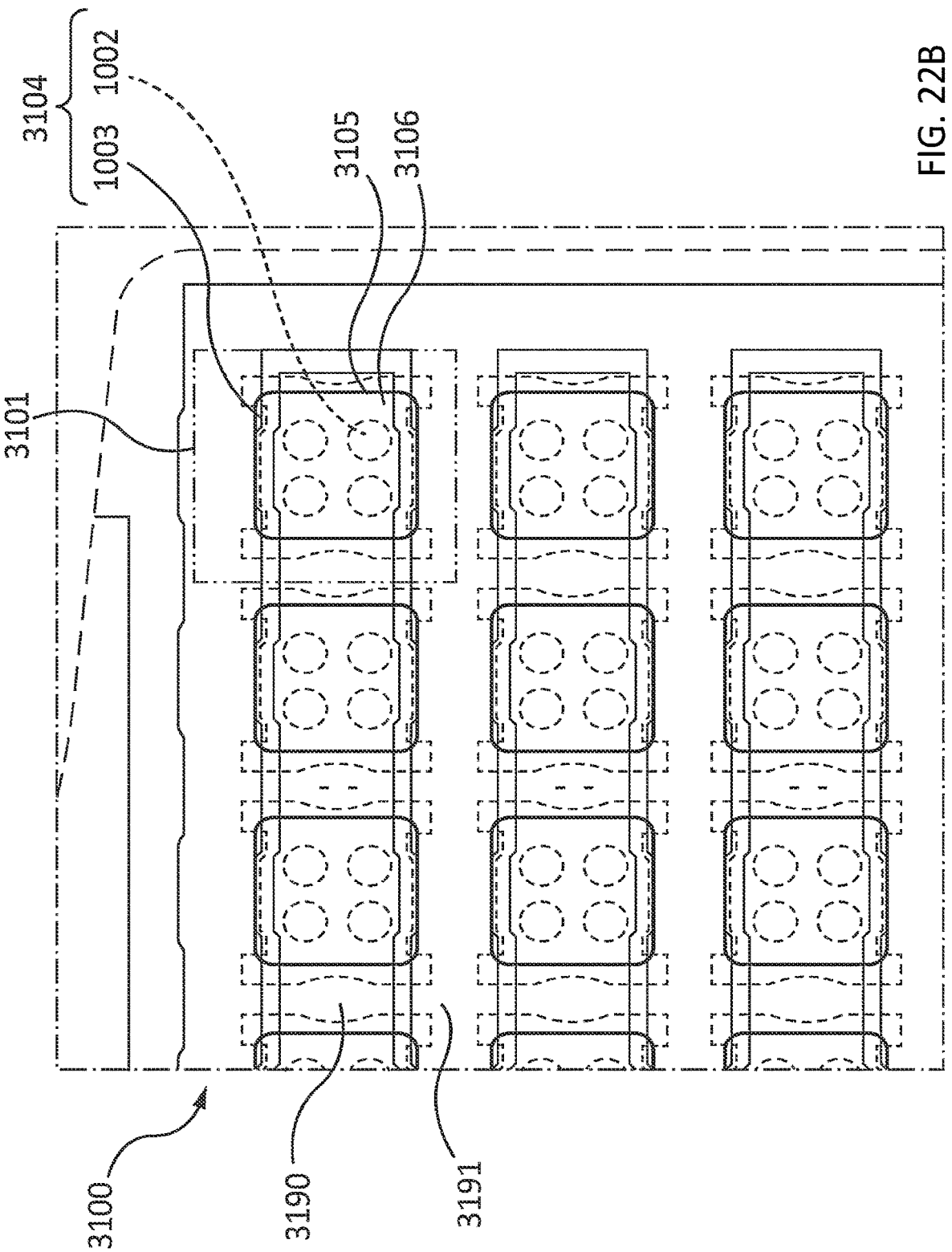

FIG. 22B illustrates a close-up view of several well electrode structures 3101. The well electrode structures 3101 each include an electrode zone grouping 3104 including a plurality of working electrode zones 1002 and one or more auxiliary electrode zones 1003. The working electrode zones 1002 are formed by isolating portions of working electrode bus bars 3190 at the surface of the substrate 3100, as discussed below. The auxiliary electrode zones 1003 are formed by isolating portions of the auxiliary electrode pattern 3191, as discussed below.

The electrode groupings 3104 are disposed within a well area 3106 defined by a well perimeter 3105. The well perimeter 3105 corresponds to the electrochemical cell border 1004. When the substrate 3100 is adhered to the top plate 3001, the well areas 3106 are configured to correspond to the top plate openings 3002 to form the bottom of the wells 3003.

As shown in FIGS. 22A and 22B, the working electrode zones 1002 of each well electrode structure 3101 of a sector electrode structure 3150 are in electrical communication with one another (via the working electrode bus bars 3190) and the auxiliary electrode zones 1003 of each well electrode structure 3101 of a sector electrode structure 3150 are in electrical communication with one another (via the auxiliary electrode pattern 3191). This structure permits all working electrode zones 1002 of a sector electrode structure 3150 to be addressed, excited, and/or energized concurrently or simultaneously. The interconnected auxiliary electrode zones 1003 may thus serve as a counter or ground electrode to all excited working electrode zones 1002. FIG. 22A illustrates a 4×4 sector of 16 wells. In an embodiment, a 384 well plate may be arranged with sectors in a 6×4 sector arrangement. This patterning is by way of example only, and more or fewer wells may be included in a sector.

Figure 22C:
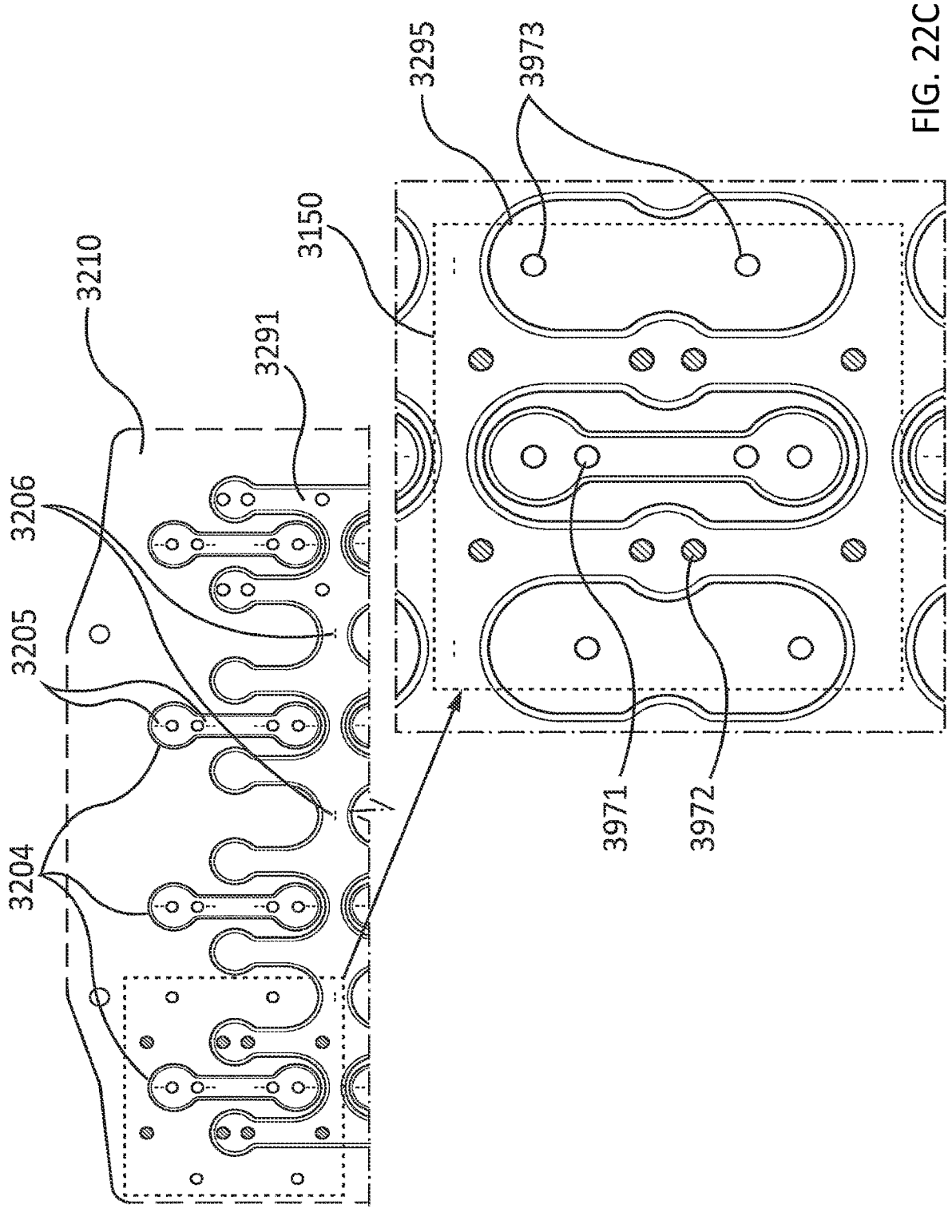

FIG. 22C illustrates an electrode contact pattern for a portion of the bottom surface 3210 of the substrate 3100. The electrode contact pattern is arranged according to sector electrode structure 3150. Each sector electrode structure 3150 includes a working electrode contact 3204 and a portion of an auxiliary electrode contact pattern 3291 that is patterned on the bottom surface 3210 of the substrate 3100. The working electrode contacts 3204 each correspond to the electrode bus bars 3190 of a sector electrode structure 3150. The auxiliary electrode contact pattern 3291 corresponds to the auxiliary electrode pattern 3191.

The portions of the sector electrode structures 3150 patterned on the top surface 3180 of the substrate 3100 are connected to the portions of the sector electrode structures 3150 on the bottom surface 3210 of the substrate by a plurality of vias (e.g., conductor filled holes). The vias include two different types, working electrode vias 3205 and auxiliary electrode vias 3206. The working electrode vias 3205 connect the working electrode contacts 3204 to the respective electrode bus bars 3190 on the top surface 3180 of the substrate 3100. As shown in FIG. 21C, four pairs of working electrode vias 3205 (one for each respective electrode bus bar 3190 of the sector electrode structure 3150) may connect the working electrode contacts 3204 to the respective electrode bus bars 3190. The auxiliary electrode vias 3206 connect the auxiliary electrode contact pattern 3291 to the auxiliary electrode pattern 3191 on the top surface 3180 of the substrate 3100. The auxiliary electrode vias 3206 may be provided in rows, e.g., with one row of auxiliary electrode vias 3206 provided between each row of sector electrode structures 3150. Each row of auxiliary electrode vias 3206 may include three pairs of auxiliary electrode vias 3206.

In some embodiments, vias may be provided in different patterns or amounts than those illustrated in FIG. 22C. For example, vias may be provided singularly, rather than in pairs. In further embodiments, more or fewer vias may be provided. The vias described herein provide the function of connecting the auxiliary electrode contact pattern 3291 to the auxiliary electrode pattern 3191 and the working electrode contacts 3204 to the respective electrode bus bars 3190. Any suitable number of vias that may accomplish this functionality may be within the scope of this disclosure.

For illustrative purposes, FIG. 22C further shows an example pattern of pin contact points that may be used for electrical connection with a multi-well assay plate employing the substrate 3100. When used in a plate reader or other instrument, contact pins of the instrument are placed in contact with the working electrode contacts 3204 and the auxiliary electrode pattern 3191. The instrument is configured to electrically address the various wells and working electrode zones of the multi-well assay plate via the contact pins. FIG. 22C illustrates an example pattern of pin contact points (3971, 3972, 3973) showing where contact pins of an example instrument may contact the bottom surface 3210 of the substrate 3100. FIG. 22C illustrates a pin contact point arrangement for a single sector of wells, showing working electrode pin contact points 3971 configured for contact with the working electrode contacts 3204 and auxiliary electrode pin contact points 3972 configured for contact with the auxiliary electrode contact pattern 3291. 384-well multi-well assay plates consistent with embodiments described herein may be configured for use with plate readers having different contact pin arrangements (e.g., for use with multiple different types and designs of plates). For example, some plate readers may include additional electrode pins used for electrode contacts in alternate plate designs. Such pins may contact the substrate at additional working electrode pin contact points 3973. In embodiments, multi-well assay plates consistent with embodiments herein may include cut-outs 3295 (e.g., spaces, gaps, and/or voids) in the auxiliary electrode contact pattern 3291 to accommodate the placement of such additional working electrode pin contact points 3973 without permitting contact between the additional working electrode pins and the auxiliary electrode contact pattern 3291. As noted above, multi-well assay plates consistent with embodiments herein may further include different numbers or arrangements of wells. Further, multi-well assay plates consistent with embodiments herein may be configured with different electrode contact patterns to accommodate readers or systems with alternate contact pin arrangements.

Thus, as described in FIGS. 22A-22C, each sector electrode structure 3150 includes at least a plurality of electrode bus bars 3190, a portion of an auxiliary electrode pattern 3191, a portion of an auxiliary electrode contact pattern 3291, a working electrode contact 3204, and a plurality of working electrode vias 3205. The auxiliary electrode vias 3206 are not included within each sector electrode structures 3150 and there may be fewer auxiliary electrode vias 3206 than sector electrode structures 3150. Each well electrode structure 3101 includes an electrode grouping 3104 (include one or more working electrode zones 1002 and one or more auxiliary electrode zones 1003). The well electrode structures 3101 may form the electrochemical cells 1001, as discussed herein.

FIGS. 22D-22M illustrate the individual layers related to the construction of the sector electrode structure 3150 and the well electrode structures 3101 according to embodiments disclosed herein.

Figure 22D:
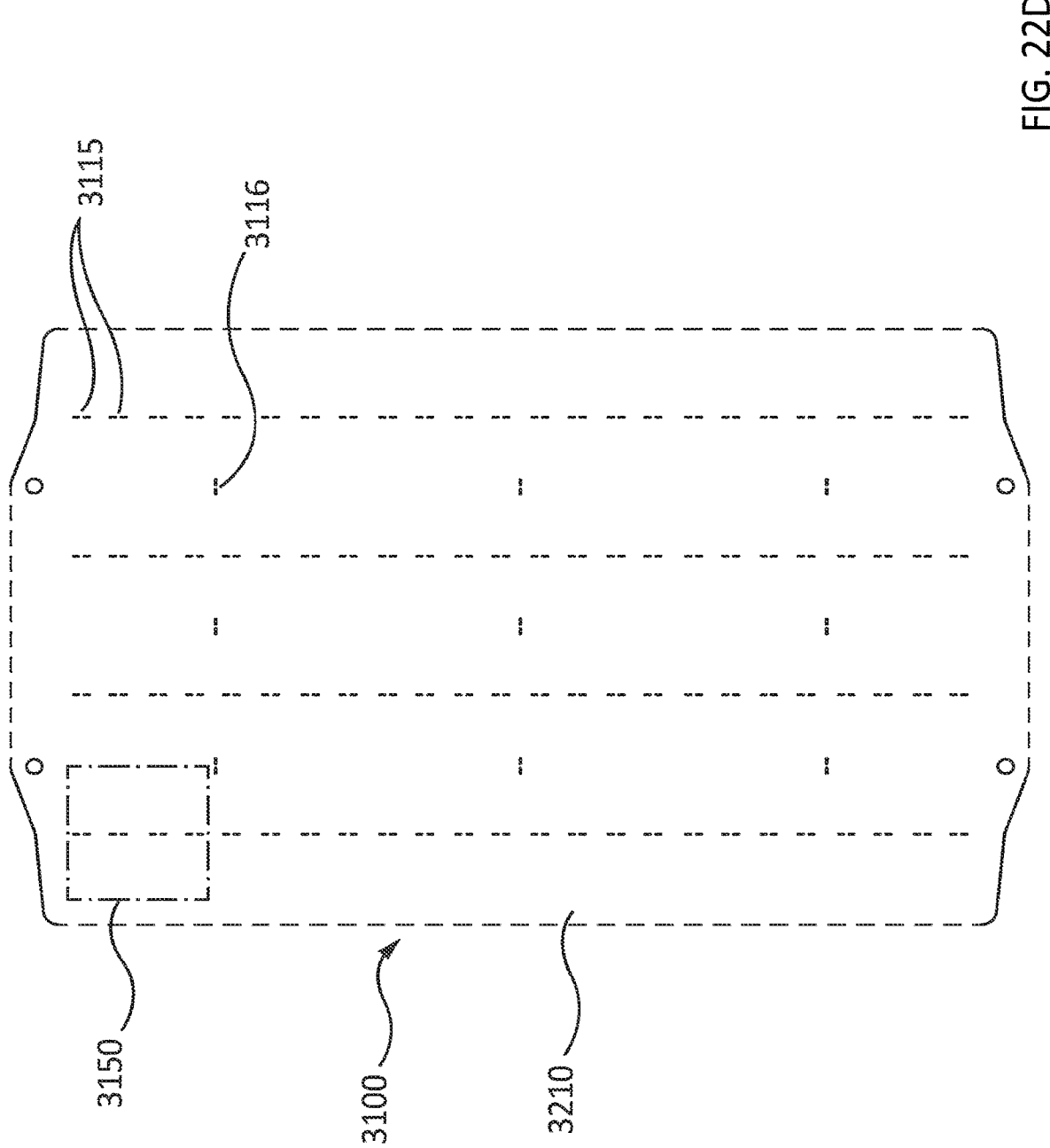
Figure 22D:
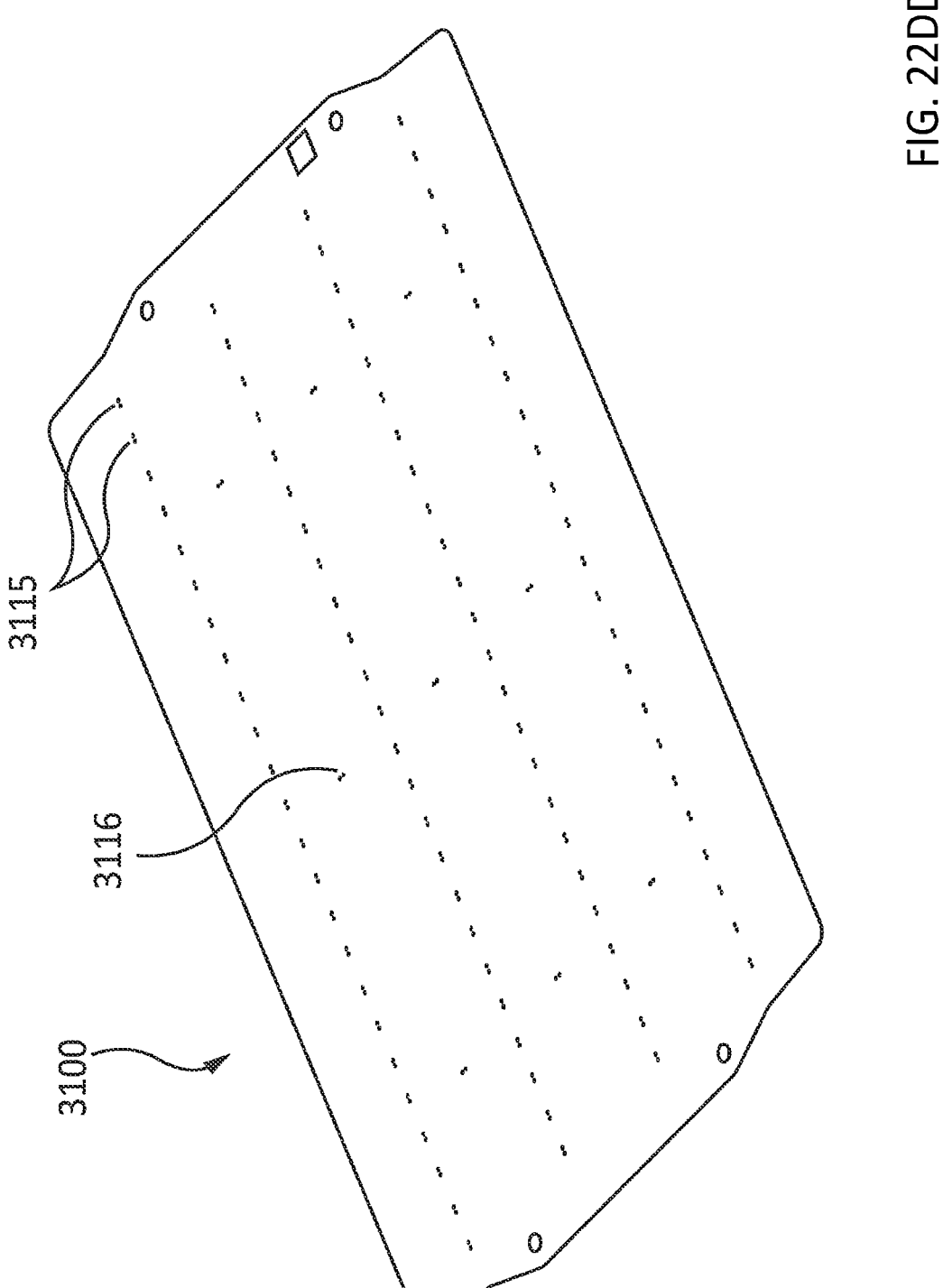

FIG. 22D and 22DD illustrate a pattern of holes formed in the substrate. FIG. 22D shows a plan view while FIG. 22DD shows a perspective view. The holes 3115 and 3116 are formed in the substrate 3100. The holes 3115/3116 may be laser cut, micro-drilled, or formed by any other suitable method. The holes 3115 are formed in pairs, with one pair corresponding to each pair of working electrode vias 3205, for redundancy purposes. The holes 3116 are also formed in pairs, with one pair corresponding to each pair of auxiliary electrode vias 3206. The pairs of holes 3115 may be formed in rows or columns, wherein each row or columns includes six sets of four pairs of holes, where each set of four pairs corresponds to a sector electrode structure 3150 and each pair corresponds to a working electrode bus bar 3190 (not shown) and a working electrode contact 3204 (not shown). The substrate 3100 may include four rows or columns of holes 3115, each row or columns including six sets of four pairs of holes, to provide a total of twenty four sets of holes, four pairs each. The substrate 3100 may further include holes 3116, arranged in pairs, corresponding to the auxiliary electrode pattern 3191 and the auxiliary electrode contact pattern 3291. The substrate 3100 may include nine or more pairs of holes 3116 corresponding to the auxiliary electrode pattern 3191 and the auxiliary electrode contact pattern 3291. A discussed below, the auxiliary electrode pattern 3191 and the auxiliary electrode contact pattern 3291 are continuous across the top surface 3180 and the bottom surface 3210, respectively, of the substrate 3100. Accordingly, many suitable numbers and patterns of holes 3116 (e.g., singles, pairs, triples, etc., as well as more or fewer rows and/or columns of holes 3116) for connecting the auxiliary electrode pattern 3191 and the auxiliary electrode contact pattern 3291 may be provided.

Figure 22E:
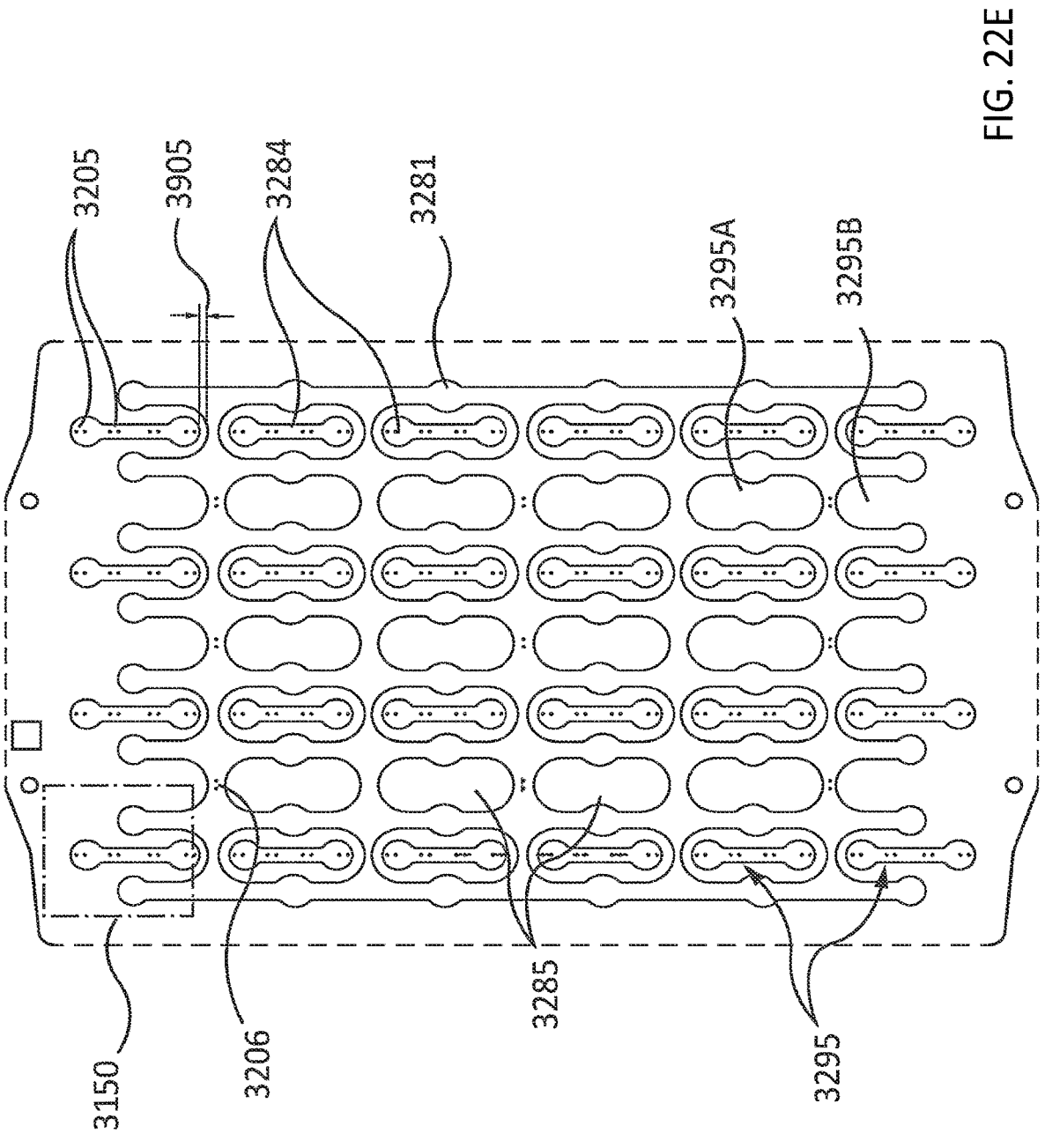

FIG. 22E illustrates a pattern of a layer applied to a bottom surface 3210 of the substrate 3100 to fill the holes 3115 to form the working electrode vias 3205 and the auxiliary electrode vias 3206. A conductive layer is applied to the bottom surface 3210 of the substrate 3100. The conductive layer flows through the holes 3115 and 3116 and fills the same to form the electrically conductive working electrode vias 3205 and the electrically conductive auxiliary electrode vias 3206. The conductive layer is arranged to form the working electrode contact bases 3284 and the auxiliary electrode contact pattern base 3281. In embodiments, the conductive layer of FIG. 22E may be silver or another conductive material, such as, for example other metals (e.g., gold, platinum, nickel, steel, iridium, copper, aluminum), conductive inks, conductive alloys, or the like.

The conductive layer forms the working electrode contact bases 3284. Each working electrode contact base 3284 is an elongated dogbone shape, having enlarged circular ends and a bridge or connector between the circular ends. Each working electrode contact base 3284 corresponds to a sector electrode structure 3150 and encompasses four pairs of holes 3115 that, when filled with the electrically conductive layer, form the working electrode vias 3205 that correspond to the electrode bus bars 3190 of the sector electrode structure. In further detail, a total of 24 working electrode contact bases 3284 are provided on the bottom surface 3210 of the substrate 3100.

The conductive layer further forms the auxiliary electrode contact pattern base 3281. The auxiliary electrode contact pattern base 3281 forms a continuous base for the auxiliary electrode contact pattern 3291 across the bottom surface 3210 of the substrate 3100. The auxiliary electrode contact pattern base 3281 includes a plurality of regularly spaced cut-outs 3295 representing gaps or voids in the pattern base 3281. The auxiliary electrode contact pattern base 3281 may include a six by seven (or seven by six) pattern of cut-outs 3295. Each cut-out 3295 represents a gap in the pattern base 3281 and may be completely or partially surrounded by the auxiliary electrode contact pattern base 3281. As used herein, "completely surrounded" may refer to an example in which an entire perimeter of the cut-out 3295 is occupied or bordered by the auxiliary electrode contact pattern 3291. Thus, a line drawn in any direction from any point on the cut-out 3295 will intersect the auxiliary electrode contact pattern 3291. For example, the cut-out 3295A is completely surrounded. As used herein, "partially surrounded" may refer to an example in which a portion of the perimeter of the cut-out 3295 is occupied or bordered by the auxiliary electrode contact pattern 3291. For example, partially surrounded may refer to an example in which greater than 40%, greater than 50%, greater than 60%, greater than 70%, greater than 80%, greater than 90%, greater than 95%, and/or greater than 99% of a perimeter (but less than 100%) is occupied or bordered by the surrounding body. For example, the cut-out 3295B is partially surrounded. The cut-outs 3295 may take the form of pinched ovals (or halves of pinched ovals), having straight sides and rounded ends, with an indent (circular or other shape) along each of the straight sides (optionally, in the middle of each straight side). At the ends of the auxiliary electrode contact pattern base 3281, the cut-outs 3295 may be formed as halves of pinched ovals and be partially surrounded by the auxiliary electrode contact pattern base 3281. The indents in the sides of the pinched ovals may be formed to accommodate the auxiliary electrode pin contact points 3972, e.g., to provide a greater contact area to account for potential registration errors during contact. The cut-outs 3295 may accommodate the locations of the working electrode contact bases 3284 (i.e. by a first plurality of the cut-outs 3295) as well as provide nonconductive areas 3285, also referred to as isolation zones 3285 (e.g., by a second plurality of the cut-outs 3295), that may be contacted by additional electrode contact pin points 3973, as discussed above. In further embodiments, alternate shapes for cut-outs 3295 that still provide clearance for the working electrode contact bases 3284 and additional electrode contact pin points 3973 are contemplated as well.

The working electrode contact bases 3284, disposed within all or some of the cut-outs 3295, are configured to provide contact points to establish electrical communication with a first or active set of one or more working electrode contact pins so as to permit the energization of the working electrode bus bars 3190. The nonconductive areas 3285 disposed within all or some of the cut-outs 3295 are configured to provide contact points to isolate a second or inactive set of one or more working electrode contact pins so as to prevent the inactive set of one or more working electrode contact pins from energizing any features of the multi-well assay plate. In embodiments, the nonconductive areas 3285 and the working electrode contact bases 3284 may be disposed in alternating columns of the cut-outs 3295, as shown, e.g., in FIG. 22E. In further embodiments, the nonconductive areas 3285 and the working electrode contact bases 3284 may be disposed in different patterns to appropriately accommodate active and inactive working electrode contact pins. As used herein, the "active" and "inactive" state of working electrode contact pins refers to the state of the electrode pins as determined according to their contact with the multiwell assay plate 2000. The working electrode contact bases 3284 are configured to render a set of working electrode contact pins as active, such that they are in electrical communication with the working electrode bus bars 3190, permitting energization of the working electrode bus bars 3190 when the active working electrode contact pins are activated (e.g., supplied with voltage) by an assay system. The nonconductive areas 3285 are configured to render a set of working electrode contact pins as inactive, such that they are isolated from and not in electrical communication with any electrodes of the multiwell assay plate 2000, thus preventing the inactive working electrode contact pins from energizing any aspects of the multiwell assay plate 2000, even when they are activated (e.g., supplied with voltage) by an assay system.

Thus, a multiwell assay plate 2000 using the auxiliary electrode contact pattern base 3281 may be configured to permit use with assay systems designed or configured with an alternate contact pin pattern than that required by multiwell assay plate 2000. The auxiliary electrode contact pattern 3281 is configured to render one or more working electrode contact pins of an assay system inactive and to render one or more working electrode contact pins active. In embodiments, the auxiliary electrode contact pattern 3281 may be further configured to render one or more auxiliary electrode contact pins of an assay system inactive and to render one or more auxiliary electrode contact pins active.

The ends of the working electrode contact bases 3284 are set apart from the auxiliary electrode contact pattern base 3281 by the nominal dimension 3905 of 0.040". The nominal dimension 3905 is well within the tolerancing limits of screen printing to ensure that the working electrode contact bases 3284 do not overlap the auxiliary electrode contact pattern base 3281.

Figure 22F:
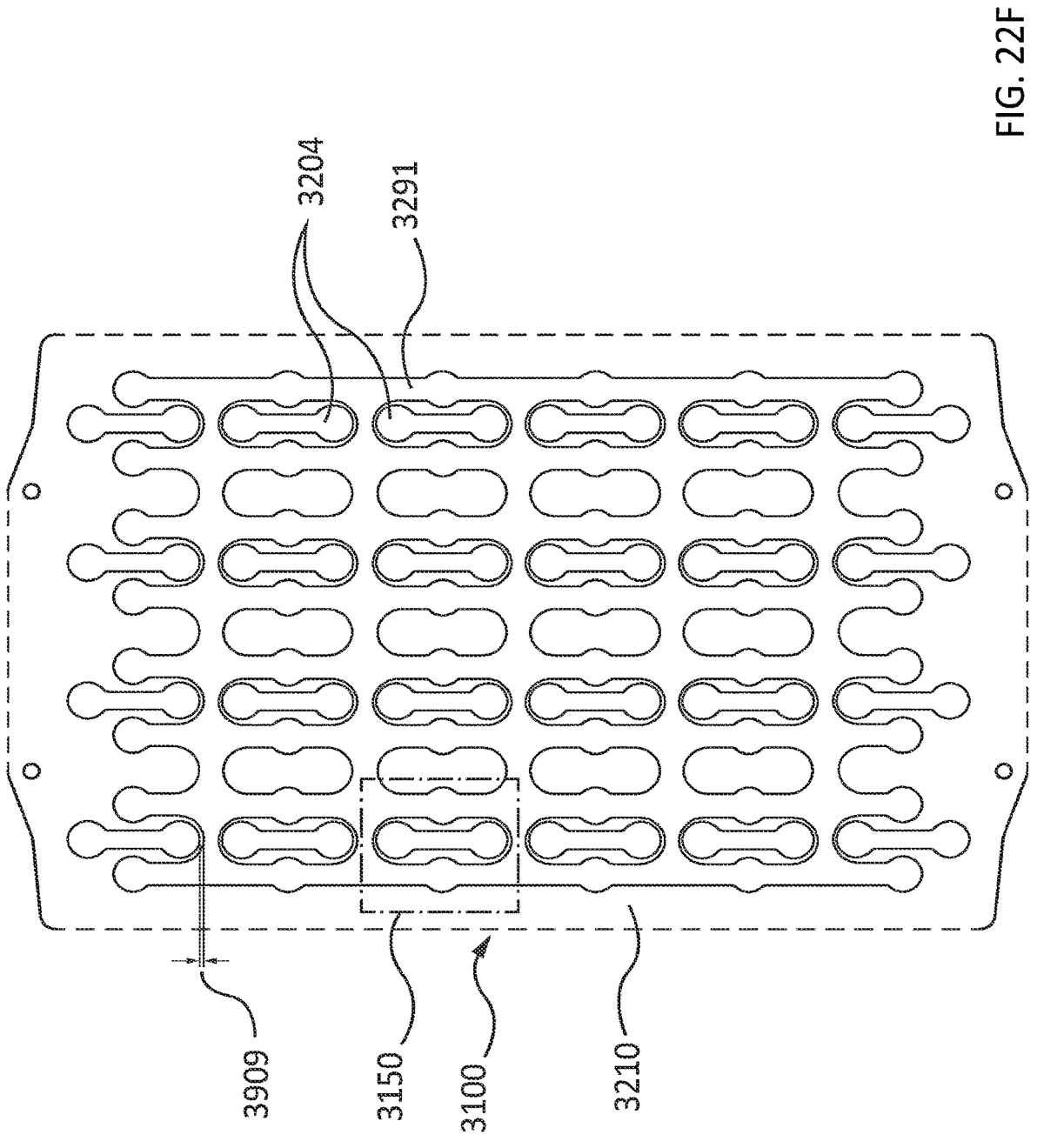

FIG. 22F illustrates a carbon layer applied to a bottom surface of the substrate to form the working electrode contacts 3204 and the auxiliary electrode contact pattern 3291. The carbon layer further serves to ensure that the vias 3205 and 3206 are completely filled, e.g., if the previously applied conductive layer did not completely fill the holes 3115 and 3116. A conductive layer is applied to the bottom surface 3210 of the substrate 3100. The conductive layer is made of carbon and is configured to provide the working electrode contacts 3204, with each working electrode contact 3204 encompassing four pairs of working electrode vias 3205. In further detail, a total of 24 working electrode contacts 3204 may be positioned on the bottom surface 3210 of the substrate 3100. Additionally, the carbon conductive layer provides the auxiliary electrode contact pattern 3291.

The ends of the working electrode contacts 3204 are set apart from the auxiliary electrode contact pattern 3291 by the nominal dimension 3909 of 0.015". The nominal dimension 3909 is well within the tolerancing limits of screen printing to ensure that the working electrode contacts 3204 do not overlap the auxiliary electrode contact pattern 3291.

The carbon layer illustrated in FIG. 22F is configured to cover the silver conducting layer of FIG. 22E. The carbon layer of FIG. 22F is configured to extend beyond the borders/boundaries of the silver conductive layer of FIG. 22E. The nominal extension of the working electrode contacts 3204 working electrode contact bases 3284 is approximately 0.010" and the nominal extension of the auxiliary electrode contact pattern 3291 over the auxiliary electrode contact pattern base 3281 is approximately 0.015". These values exceed the print-to-print registration tolerance of 0.008" and therefore ensure complete coverage of the silver conductive layer of FIG. 22E with the carbon layer of FIG. 22F within the tolerancing limits of the screen printing process with respect to registration between the layers. Thus, the carbon layer providing the working electrode contacts 3204 and the auxiliary electrode contact pattern 3291 is defined by the same shapes as discussed above with respect to the working electrode contact bases 3284 and the auxiliary electrode contact pattern base 3281.

Figure 22G:
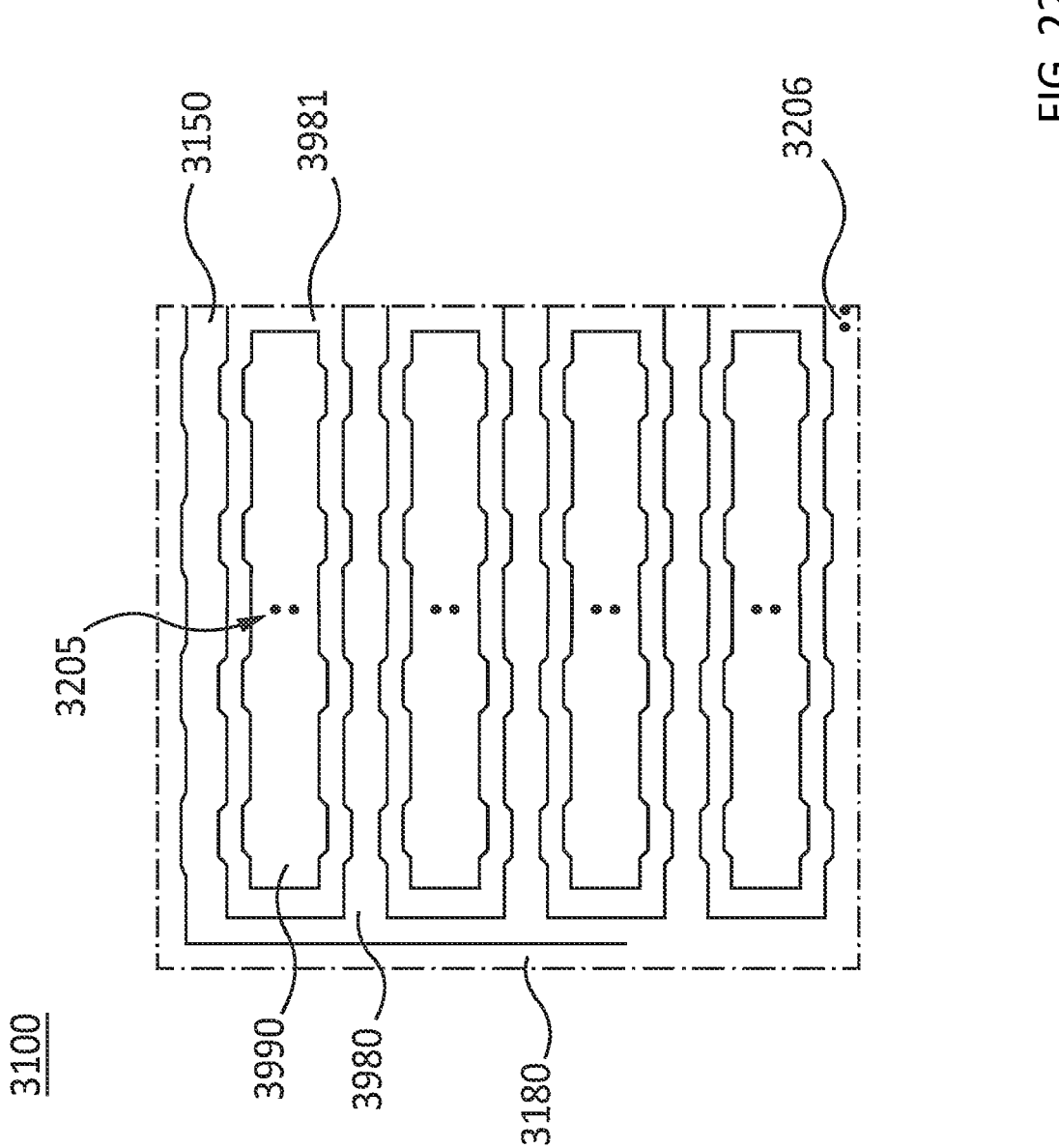
Figure 22G:
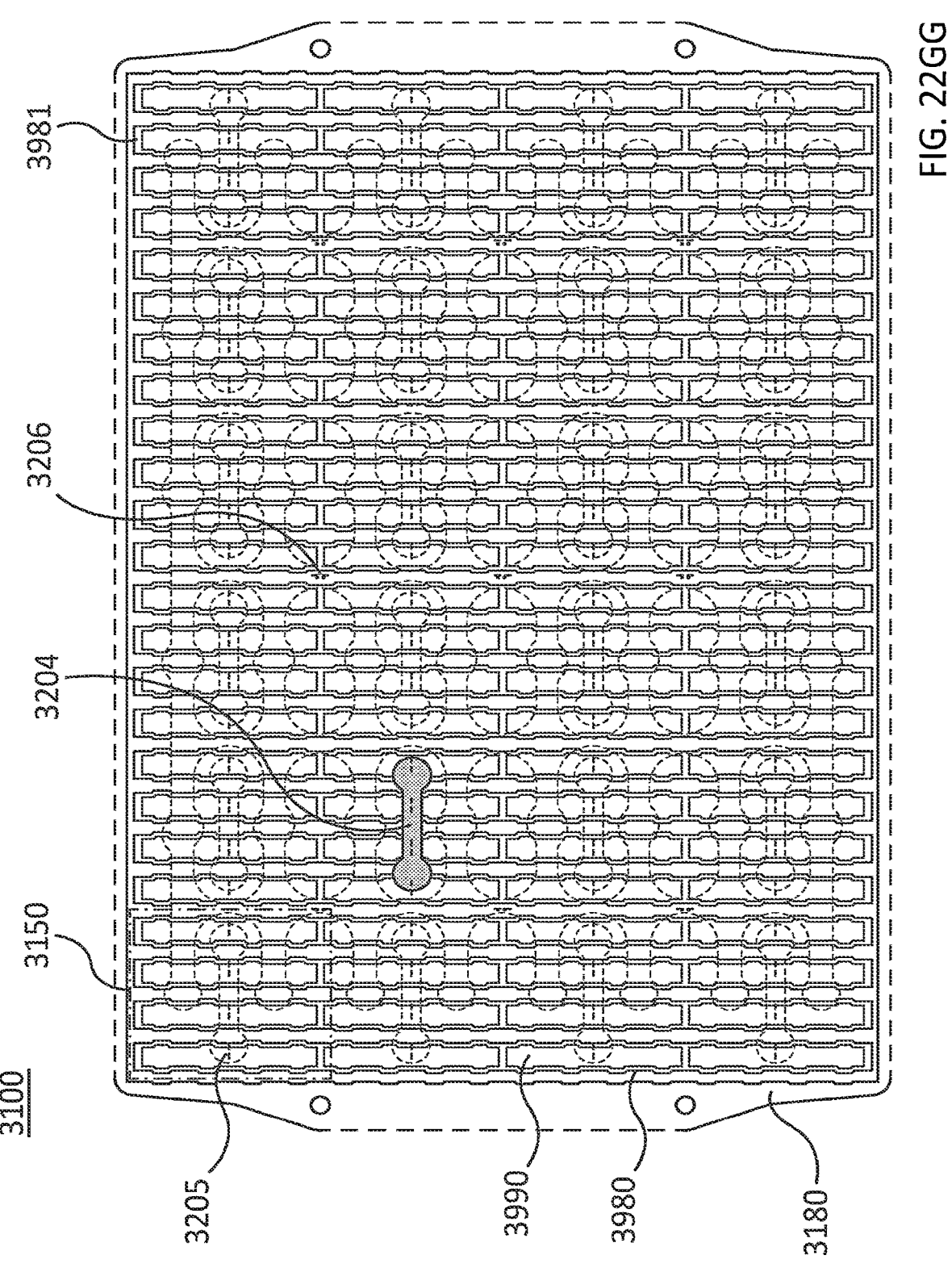

FIGS. 22G and 22GG illustrate a conductive layer pattern made of silver applied to a top surface 3180 of the substrate 3100 to form the working electrode bus bar bases 3990 and the auxiliary electrode pattern base 3980. The working electrode bus bar bases 3990 provide the foundation of the working electrode bus bars 3190, described further below. Each working electrode bus bar base 3990 corresponds to a pair of working electrode vias 3205 and is configured to extend laterally in both directions from the corresponding working electrode via 3205. The working electrode bus bar bases 3990 may be any suitable shape. In an embodiment, the working electrode bus bar bases 3990 are substantially rectangular and include a series of extensions that provide a greater width to the rectangle at regular intervals along its length. Thus, the long sides of the substantially rectangular working electrode bus bar bases 3990 are crenellated. The widened extensions may correspond to individual well electrode structures 3101, as explained in greater detail below.

The working electrode bus bar bases 3990 are provided in 24 rows of 4 working electrode bus bar bases 3990 per row, for a total of 96 working electrode bus bar bases 3990. The working electrode bus bar bases 3990 may be grouped into sector electrode structures 3150. Each sector electrode structure 3150 may include four working electrode bus bar bases 3990, one each from four consecutive rows. Thus, the substrate 3100 may include a four by six pattern of sector electrode structures 3150. The four pairs of working electrode vias 3205 corresponding to the four working electrode bus bar bases 3990 of a sector electrode structure 3150 may correspond to a single working electrode contact 3204 (one is shown in solid black) located on the bottom surface 3210 of the substrate 3100. Thus, the four working electrode bus bar bases 3990 of a sector electrode structure 3150 may be in electrical communication with one another, permitting addressing of each of the four working electrode bus bar bases 3990 concurrently.

The auxiliary electrode pattern base 3980 is a continuous pattern of conductive silver. The auxiliary electrode pattern base 3980 includes a substantially rectangular sheet of conductive silver covering the entire substrate 3100 with a plurality of openings 3981 configured to accommodate the working electrode bus bar bases 3990. Each working electrode bus bar base 3990 has a corresponding opening 3981 in the auxiliary electrode pattern base 3980. The shape of each opening 3981 is a larger version of the crenelated rectangle shape of the working electrode bus bar bases 3990.

In embodiments, the conductive silver may flow into the holes 3115/3116 and connect to the conductive silver applied to the bottom surface 3210 of the substrate 3100 to complete formation of the vias 3205 and 3206. In further embodiments, any other suitable conductive material may be used in place of the conductive silver, such as, for example, other metals, (such as gold, platinum, nickel, steel, iridium, copper, aluminum), a conductive alloy, or the like.

FIG. 22G and 22GG illustrate the conductive silver layer applied to a substrate 3100 to form the 4-spot embodiment of the sectored multi-well assay plate 2000 as described herein. In further embodiments, e.g., to form the 1-spot embodiment of the sectored multi-well assay plate 2000, an alternative conductive silver layer may be applied. The 1-spot embodiment conductive silver layer may have similar features to that of the 4-spot embodiment, with alternative dimensions. The 1-spot conductive silver layer is illustrated, for example, in FIG. 23FFF.

Figure 22H:
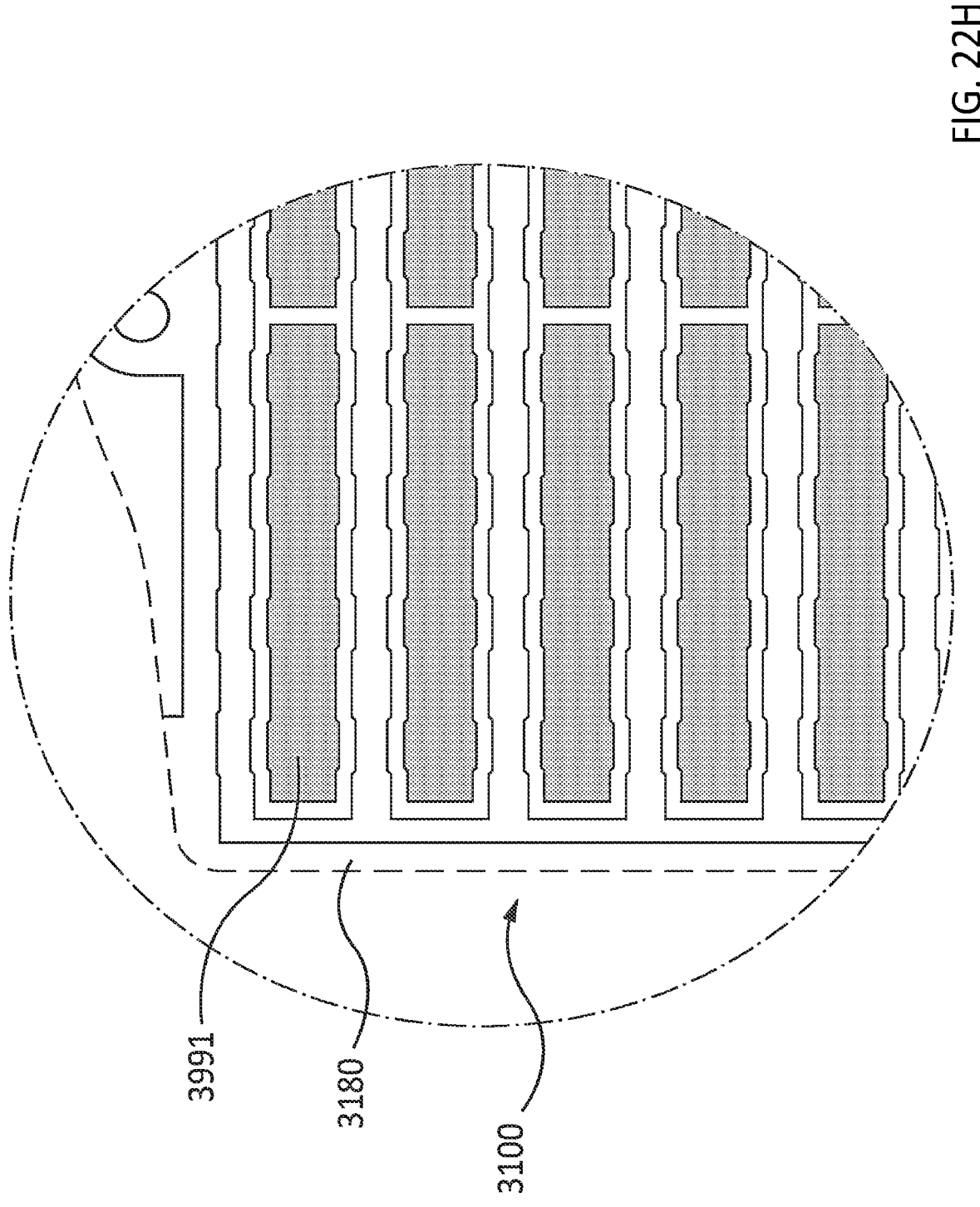

FIG. 22H illustrates a conductive carbon layer pattern applied to a top surface of the working electrode bus bar bases 3990 to form working electrode bus bar carbon layer 3991. The conductive layer illustrated in FIG. 22H, forming the working electrode bus bar carbon layer 3991, is configured to extend beyond the working electrode bus bar bases 3990. The nominal dimension accounts for potential registration errors between the conductive layer of FIG. 22H and the conductive layer of FIG. 22G. Thus, the shape of the working electrode bus bar carbon layer 3991 corresponds to the crenellated rectangle shape of the working electrode bus bar bases 3990.

FIG. 22H illustrates the conductive carbon layer applied to a substrate 3100 to form the 4-spot embodiment of the sectored multi-well assay plate 2000 as described herein. In further embodiments, e.g., to form the 1-spot embodiment of the sectored multi-well assay plate 2000, an alternative conductive carbon layer may be applied. The 1-spot embodiment conductive carbon layer may have similar features to that of the 4-spot embodiment, with alternative dimensions. The 1-spot conductive carbon layer is illustrated, for example, in FIG. 23HHH.

Figure 22I:
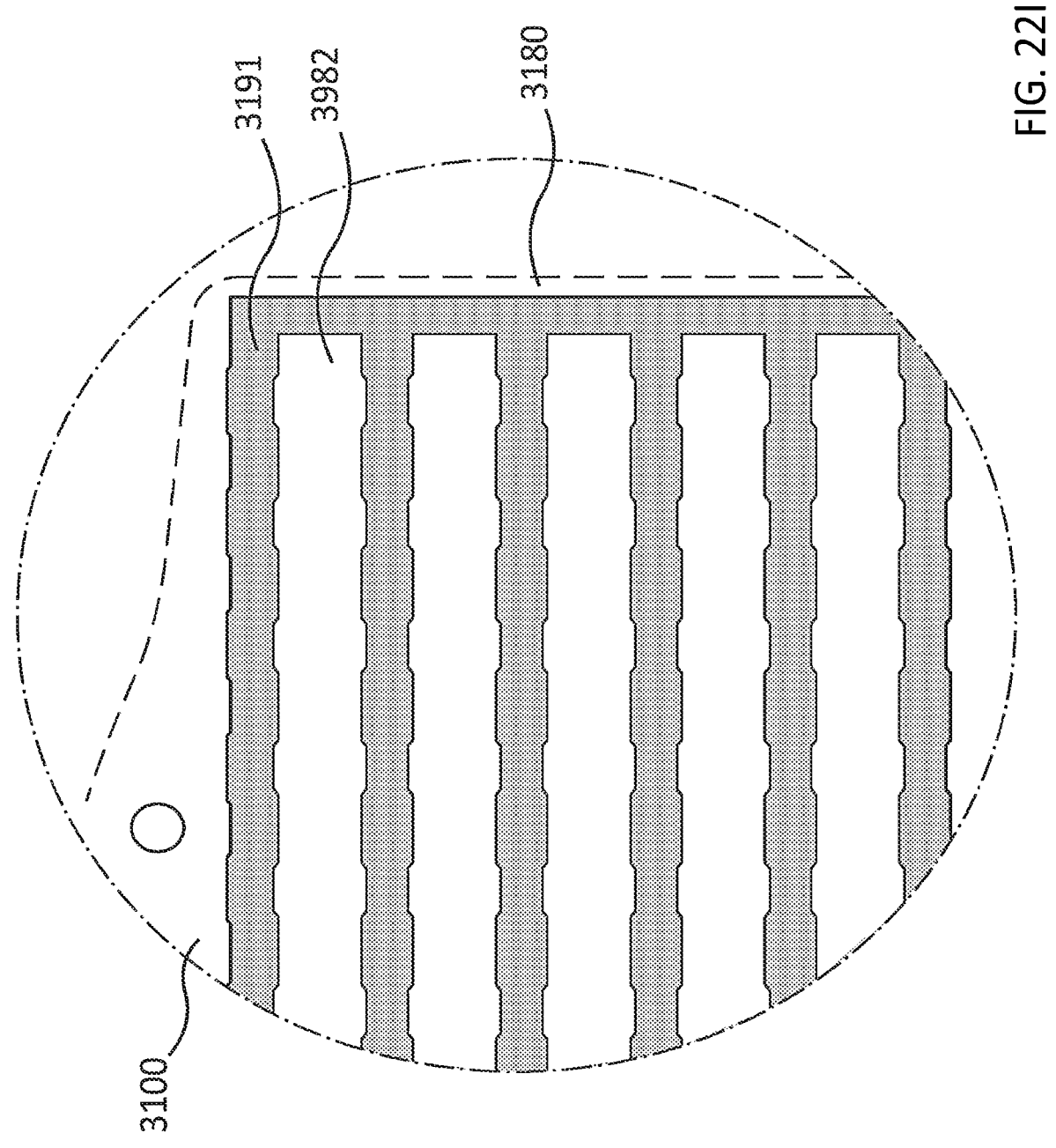

FIG. 22I illustrates a conductive layer of silver chloride (AgCl) applied to the top surface 3180 of the substrate 3100 to form the auxiliary electrode pattern 3191. The auxiliary electrode pattern 3191 overlays the auxiliary electrode pattern base 3980 and extends beyond the auxiliary electrode pattern base 3980. The nominal dimension accounts for potential registration errors between the conductive layer of FIG. 22I and the conductive layer of FIG. 22G. Thus, the auxiliary electrode pattern 3191 corresponds to the shape of the auxiliary electrode pattern base 3980, including a substantially rectangular outline with a plurality of crenellated rectangular openings 3982 (corresponding to the openings 3981) to accommodate the working electrode bus bars 3190.

FIG. 22I illustrates the conductive AgCl layer applied to a substrate 3100 to form the 4-spot embodiment of the sectored multi-well assay plate 2000 as described herein. In further embodiments, e.g., to form the 1-spot embodiment of the sectored multi-well assay plate 2000, an alternative conductive AgCl layer may be applied. The 1-spot embodiment conductive AgCl layer may have similar features to that of the 4-spot embodiment, with alternative dimensions. The 1-spot conductive silver layer is illustrated, for example, in FIG. 23JJJ.

Figure 22J:
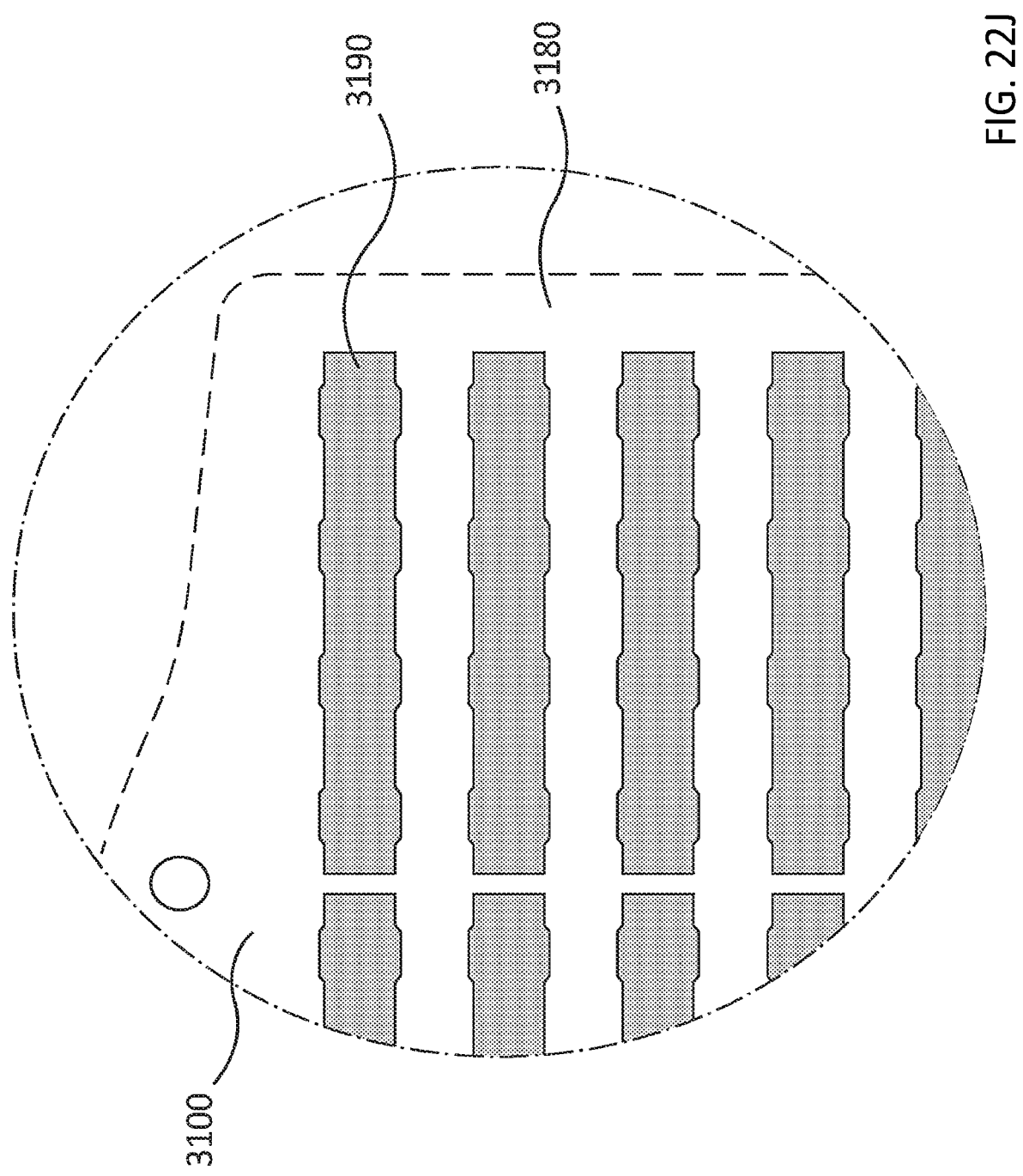

FIG. 22J illustrates a second conductive carbon layer pattern applied to a top surface of the working electrode bus bar carbon layer 3991 to form the working electrode bus bars 3190. The conductive carbon layer illustrated in FIG. 22J, forming the working electrode bus bars 3190, is configured to extend beyond the working electrode bus bar carbon layer 3991. The nominal dimension accounts for potential registration errors between the conductive layer of FIG. 22J and the conductive layer of FIG. 22H. Thus, the shape of the working electrode bus bar 3190 corresponds to the crenellated rectangle shape of the working electrode bus bar carbon layer 3991.

FIG. 22J illustrates the second conductive carbon layer applied to a substrate 3100 to form the 4-spot embodiment of the sectored multi-well assay plate 2000 as described herein. In further embodiments, e.g., to form the 1-spot embodiment of the sectored multi-well assay plate 2000, an alternative second conductive carbon layer may be applied. The 1-spot embodiment second conductive carbon layer may have similar features to that of the 4-spot embodiment, with alternative dimensions. The 1-spot second conductive carbon layer is illustrated, for example, in FIG. 23LLL.

Figure 22K:
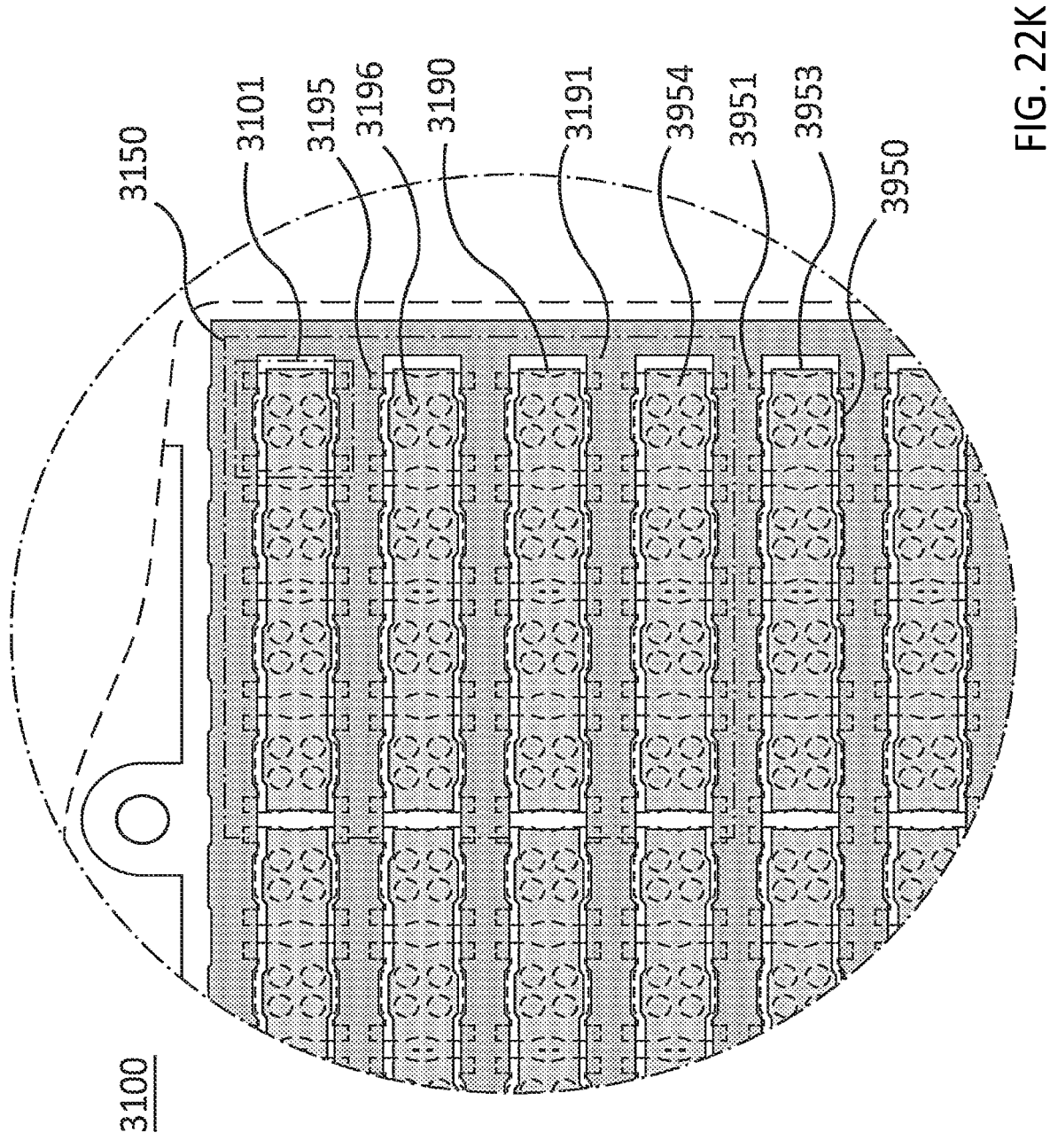

FIG. 22K illustrates a dielectric layer applied to the top surface 3180 of the substrate 3100 to physically isolate portions of the substrate surface that will form the working electrode zones 3102 and the auxiliary electrode zones 3103 in a four spot embodiment. FIG. 22K illustrates the dielectric layer applied for the four-spot well embodiment consistent with FIG. 20B. Each well electrode structure 3101 of the substrate 3100 includes a dielectric mask 3195. Accordingly, each sector electrode structure 3150 may include sixteen dielectric masks 3195. In further embodiments, sector electrode structures 3150 may include more or fewer well electrode structures 3101, and correspondingly more or fewer dielectric masks 3195. Each dielectric mask 3195 includes a rectangular core 3954 with a pair of extensions 3950, four tabs 3951, four working electrode openings 3196, and a pair of indentations 3953. The rectangular core 3954 includes extensions 3950 on two opposing sides that correspond to the crenelations of the working electrode bus bars 3190 over which the dielectric mask 3195 is layered. The remaining two opposing sides of the rectangular core 3954 include indentations 3953. Each corner of the rectangular core 3954 further includes a tab 3951 extending away from the core. Finally, each dielectric mask 3195 includes a plurality of working electrode openings 3196. As shown in FIG. 22K, the dielectric masks 3195 may each include four working electrode openings 3196 to form the four working electrode zones 1002 of the four spot electrochemical cell 1001.

Figure 22L:
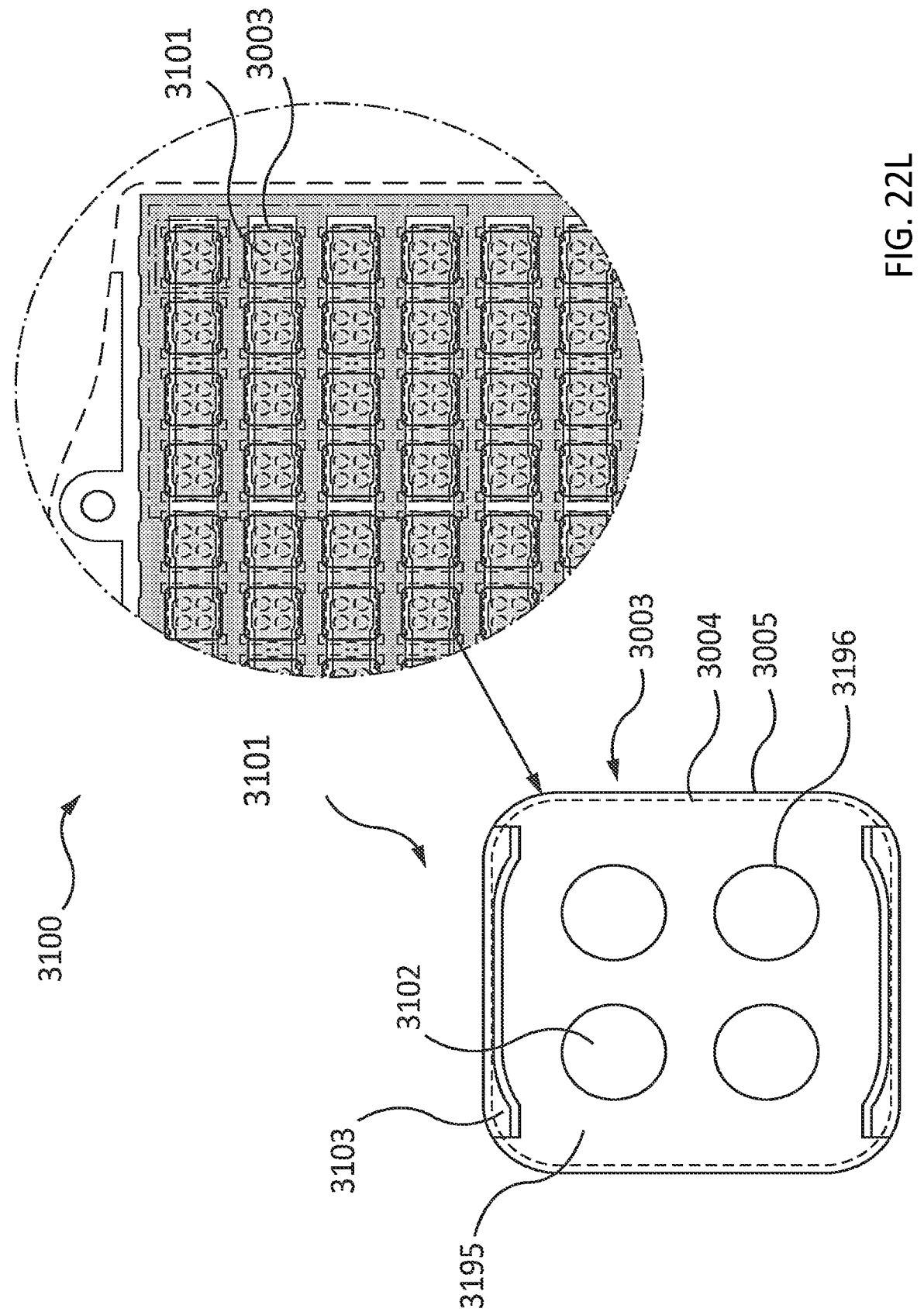

When the top plate 3001 is adhered to the substrate 3100, the openings 3002 in the top plate 3001 define wells 3003. FIG. 22L illustrates the substrate 3100 and the defined wells 3003. Each opening 3002 in the top plate 3001 corresponds to a well electrode structure 3101. The openings 3002 include well walls 3004 that define the wells 3003. Also illustrated is the adhesive edge 3005, provided to surround the wells 3003 and adhere the top plate 3001 to the substrate 3100. Each well 3003 includes a plurality (in this case, four) of working electrode zones 3102 and one or more (in this case two) auxiliary electrode zones 3103 that remain exposed after application of the dielectric mask 3195. In embodiments, for example as shown in FIG. 22L, a ratio of working electrode zone area to auxiliary electrode zone area is approximately 3.24 (as used herein, approximately indicates that the ratio may vary by less than 5%, 3%, 1%).

Figure 22M:
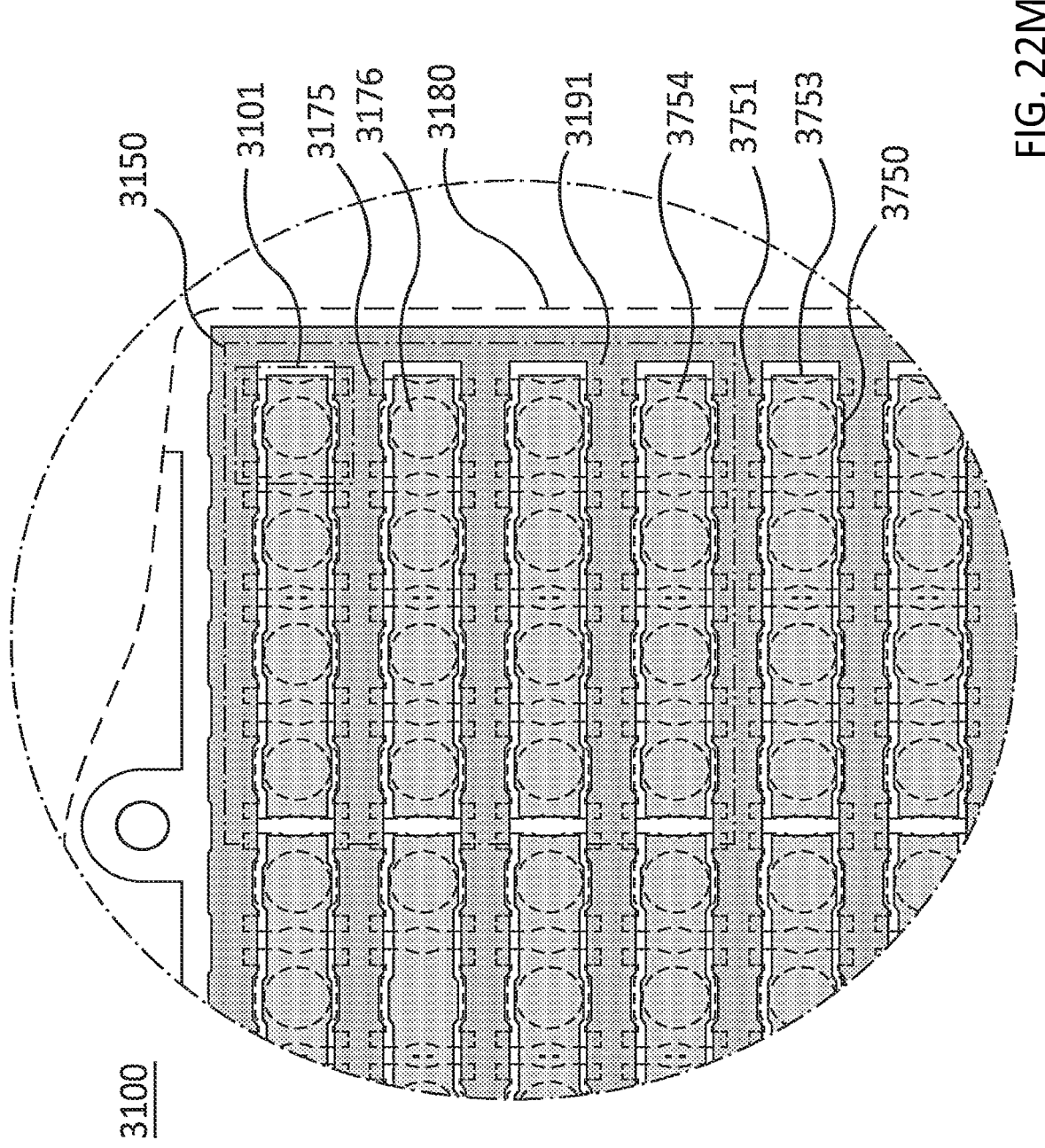

FIG. 22M illustrates a dielectric layer applied to the top surface 3180 of the substrate 3100 to physically isolate portions of the substrate surface that will form the working electrode zone 3102 and the auxiliary electrode zones 3103 in a one-spot embodiment. FIG. 22M illustrates the dielectric layer applied for the one-spot well embodiment consistent with FIG. 20A. Each one-spot well electrode structure 3301 of the substrate 3100 includes a dielectric mask 3175. Accordingly, each sector electrode structure 3350 may include sixteen dielectric masks 3175. In further embodiments, sector electrode structures 3150 may include more or fewer well electrode structures 3101, and correspondingly more or fewer dielectric masks 3175. Each dielectric mask 3175 is similar to the dielectric masks 3195, and includes a rectangular core 3754 with a pair of extensions 3750, four tabs 3751, a working electrode opening 3176, and a pair of indentations 3753. The rectangular core 3754 includes extensions 3750 on two opposing sides that correspond to the crenelations of the working electrode bus bars 3190 over which the dielectric mask 3175 is layered. The remaining two opposing sides of the rectangular core 3754 include indentations 3753. Each corner of the rectangular core further includes a tab 3751 extending away from the core. Finally, each dielectric mask 3175 includes a single working electrode opening 3176. As shown in FIG. 22M, the dielectric masks 3175 each include one working electrode openings 3176 to form the one working electrode zone 1002 of the one spot electrochemical cell 1000.

Figure 22N:
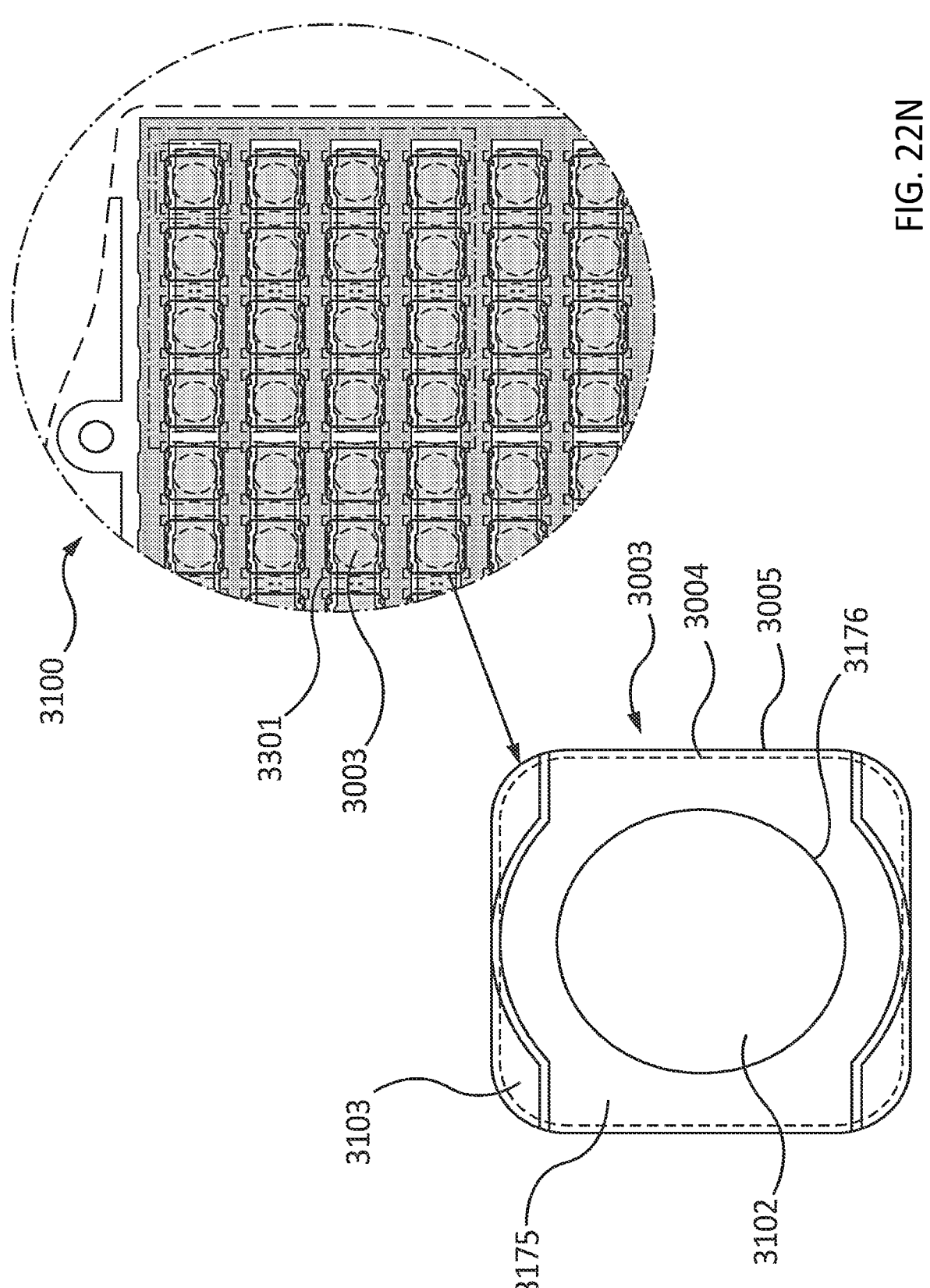

When the top plate 3001 is adhered to the substrate 3100, the openings 3002 in the top plate 3001 define wells 3003. FIG. 22N illustrates the substrate 3100 and the defined wells 3003. Each opening 3002 in the top plate 3001 corresponds to a well electrode structure 3301. The openings 3002 include well walls 3004 that define the wells 3003. Also illustrated is the adhesive edge 3005, provided to surround the wells 3003 and adhere the top plate 3001 to the substrate 3100. Each well 3003 includes one working electrode zone 3102 and one or more (in this case four) auxiliary electrode zones 3103 that remain exposed after application of the dielectric mask 3175. In embodiments, for example as shown in FIG. 22N, a ratio of working electrode zone area to auxiliary electrode zone area is approximately 3.78 (as used herein, approximately indicates that the ratio may vary by less than 5%, 3%, 1%).

The well electrode structures 3101/3301 are configured such that the working electrode zones 3102 and the auxiliary electrode zones 3103 of a specific sector electrode structure 3150 are in electrical communication with the other respective working electrode zones 3102 and auxiliary electrode zones 3103. The working electrode zones 3102 of different sector electrode structures 3150 are isolated from one another. The auxiliary electrode zones 3103 of different sector electrode structures 3150 are in electrical communication with each other.

The layers of substrate 3100 are configured, as discussed above, with selected nominal dimensions to achieve the above described functionality. The nominal dimensions may be selected to permit all of the various features and aspects of substrate 3100 to be located within close proximity of one another without compromising the isolation properties discussed herein. The nominal dimensions are selected to accommodate manufacturing tolerances and increase the likelihood that the manufactured substrates will meet the functional requirements discussed herein. The nominal dimensions discussed herein are by way of example only and provide one example of dimensioning that produces a substrate 3100 having the properties discussed herein. In further embodiments, alternative nominal dimensions may be employed to produce the required functionality without departing from the scope of this disclosure.

FIG. 22O illustrates a cross section of the substrate 3100 after each of the above-discussed layers has been added in the one-spot embodiment. FIG. 22O illustrates a dielectric layer 5000 (corresponding with the dielectric masks 3175 discussed with respect to FIG. 22N), holes 3115 (corresponding with the holes 3115 discussed with respect to FIG. 22D), a first bottom surface conductive layer 5001 (corresponding with the working electrode contact bases 3284 and the auxiliary electrode contact pattern base 3281 discussed with respect to FIG. 22E), a second bottom surface conductive layer 5002 (corresponding with the working electrode contacts 3204 and the auxiliary electrode contact pattern 3291 discussed with respect to FIG. 22F), a first electrode trace conductive layer 5003 (corresponding with the working electrode bus bar bases 3990 and the auxiliary electrode pattern base 3980 features discussed with respect to FIG. 22G), a first working electrode conductive layer 5004 (corresponding with the working electrode bus bar carbon layer 3991 feature discussed with respect to FIG. 22H), a second working electrode conductive layer 5005 (corresponding with the working electrode bus bars 3190 of FIG. 22J), and an auxiliary electrode conductive layer 5006 (corresponding with the auxiliary electrode pattern 3191 discussed with respect to FIG. 22I). Example values of thicknesses for these layers are shown below in Table 9. The provided values are examples only, and may vary by 1%, 5%, 10%, etc., based on manufacturing process tolerances. In further examples, alternative values may be used without departing from the scope of this disclosure, including values that vary by 1%, 5%, 10%, 15%, 20%, and more.

TABLE 9

|  | Thickness (mils) | Thickness (microns) |
| --- | --- | --- |
| Dielectric Layer 5000 | 0.5 | 13 |
| First Bottom Surface Conductive Layer 5001 | 0.4 | 10 |
| Second Bottom Surface Conductive Layer 5002 | 0.4 | 10 |
| First Electrode Trace Conductive Layer 5003 | 0.3 | 8 |
| First Working Electrode Conductive Layer 5004 | 0.4 | 10 |
| Second Working Electrode Conductive Layer 5005 | 0.4 | 10 |
| Auxiliary Electrode Conductive Layer 5006 | 0.4 | 10 |
| Substrate 3100 | 4.8 | 122 |

Figure 23A:
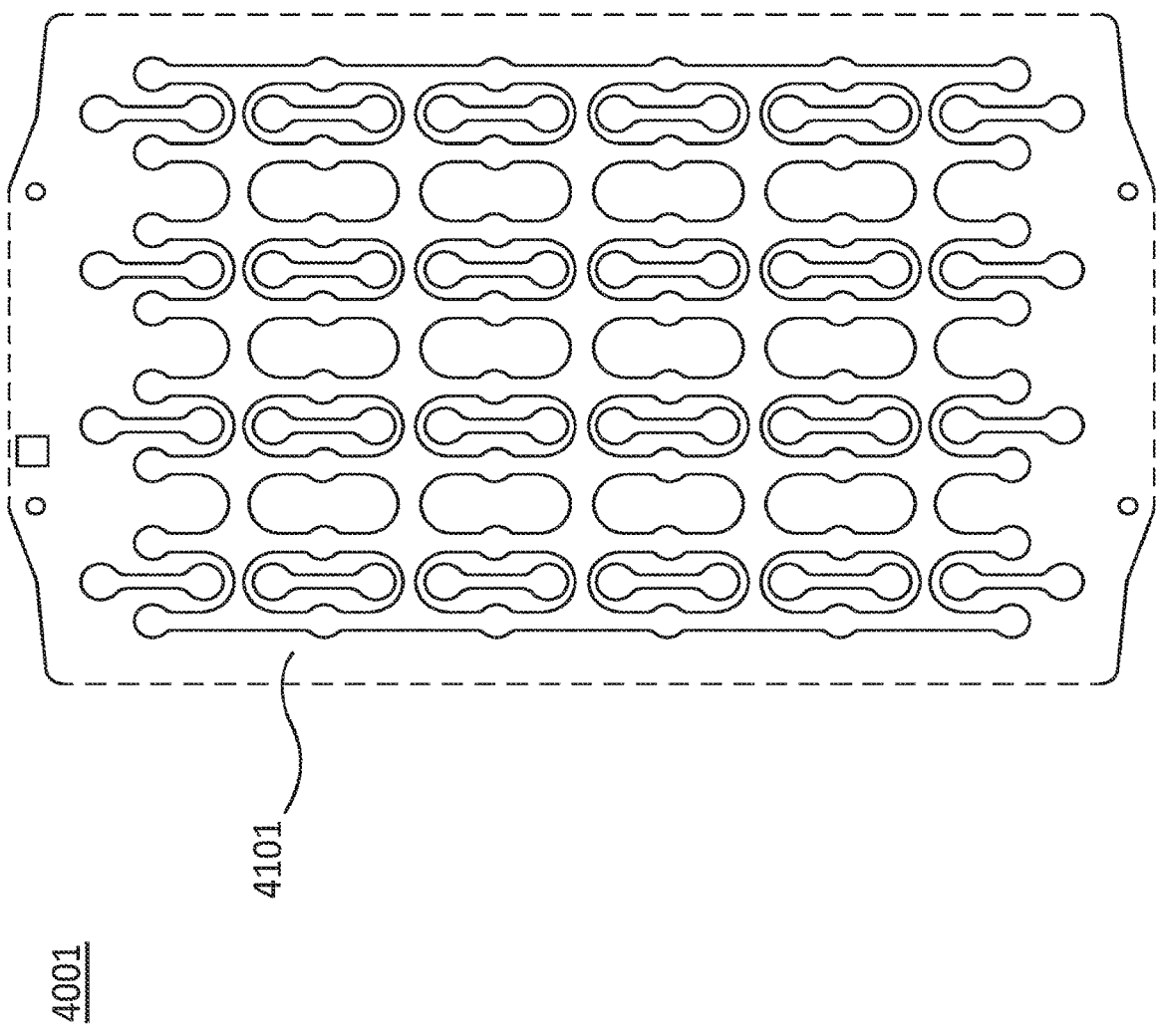
FIGS. 23A-23PP illustrate aspects of the construction of a substrate including multiple electrochemical cells according to embodiments disclosed herein.
Figure 23B:
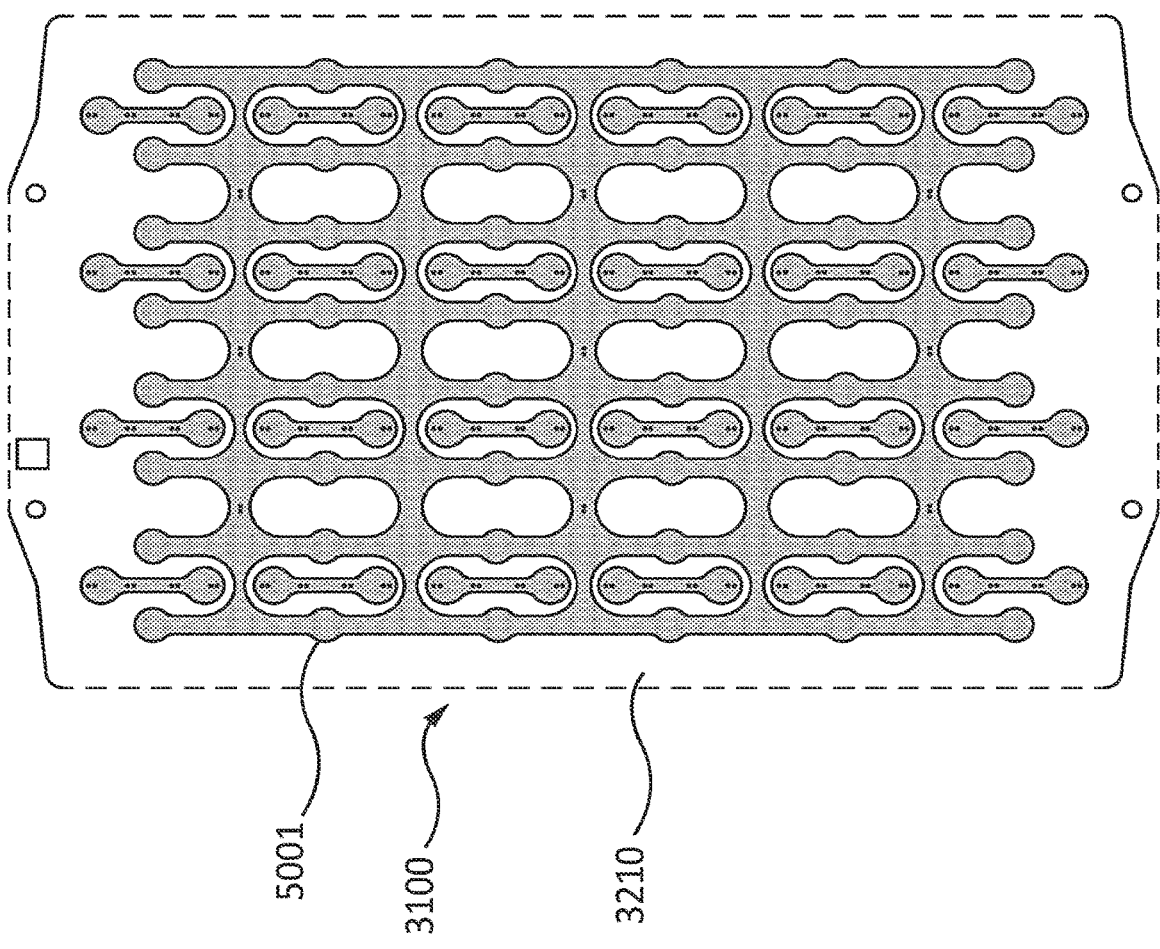
Figure 23B:
Figure 23C:
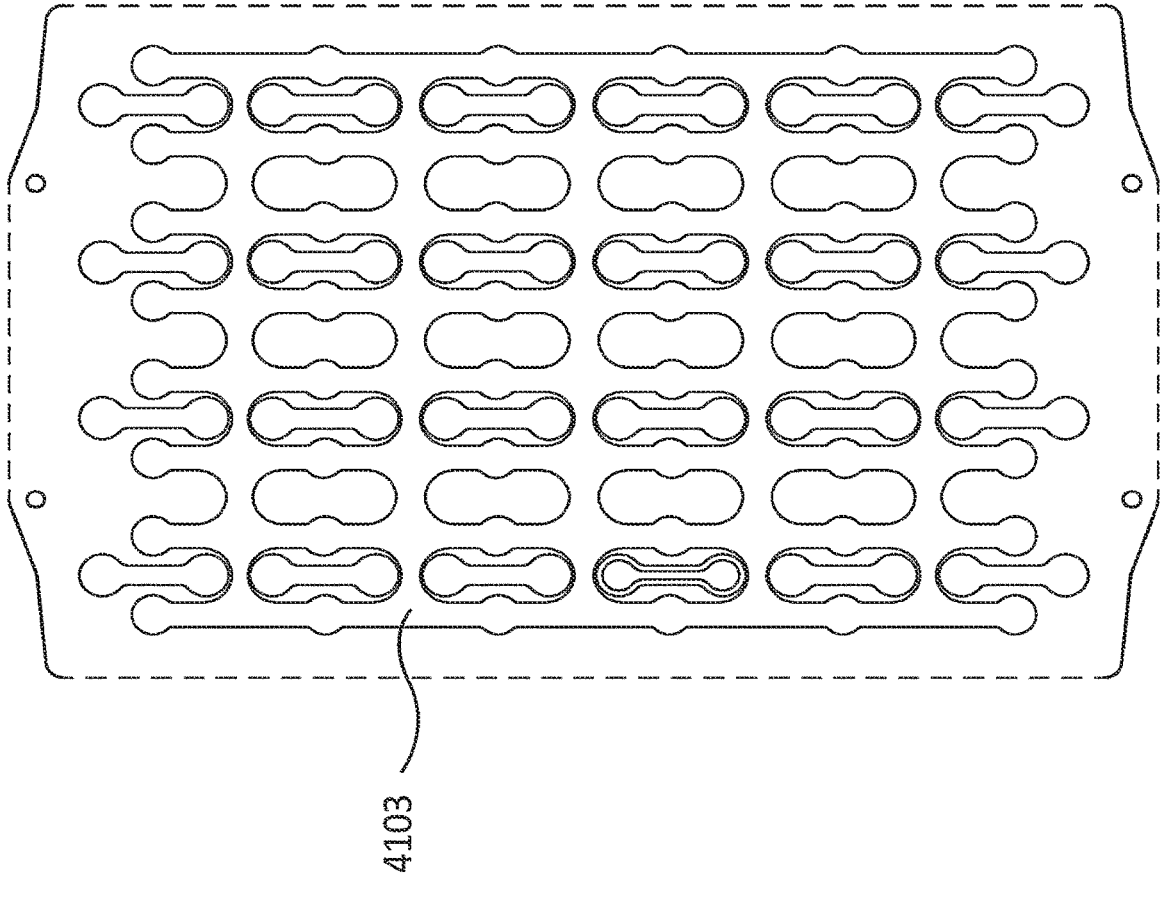
Figure 23D:
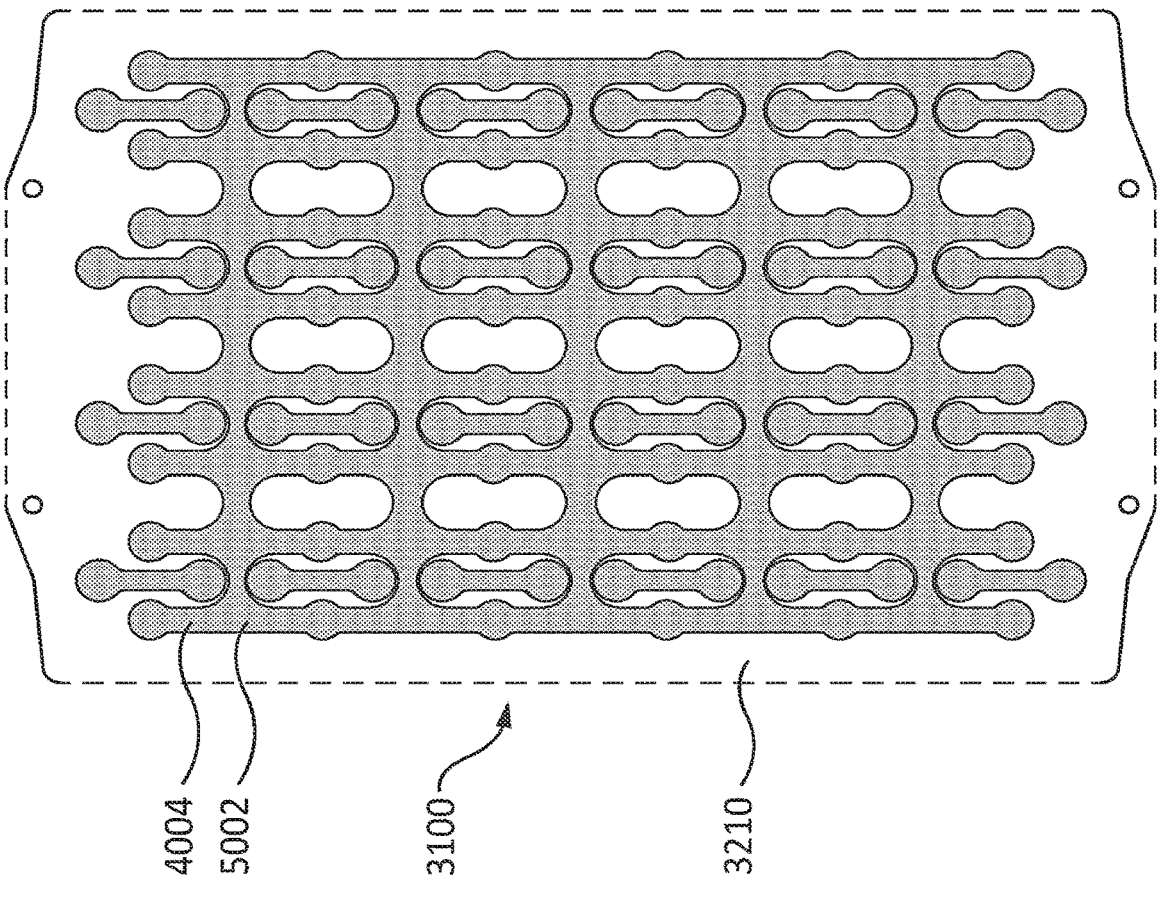
Figure 23D:
Figure 23E:
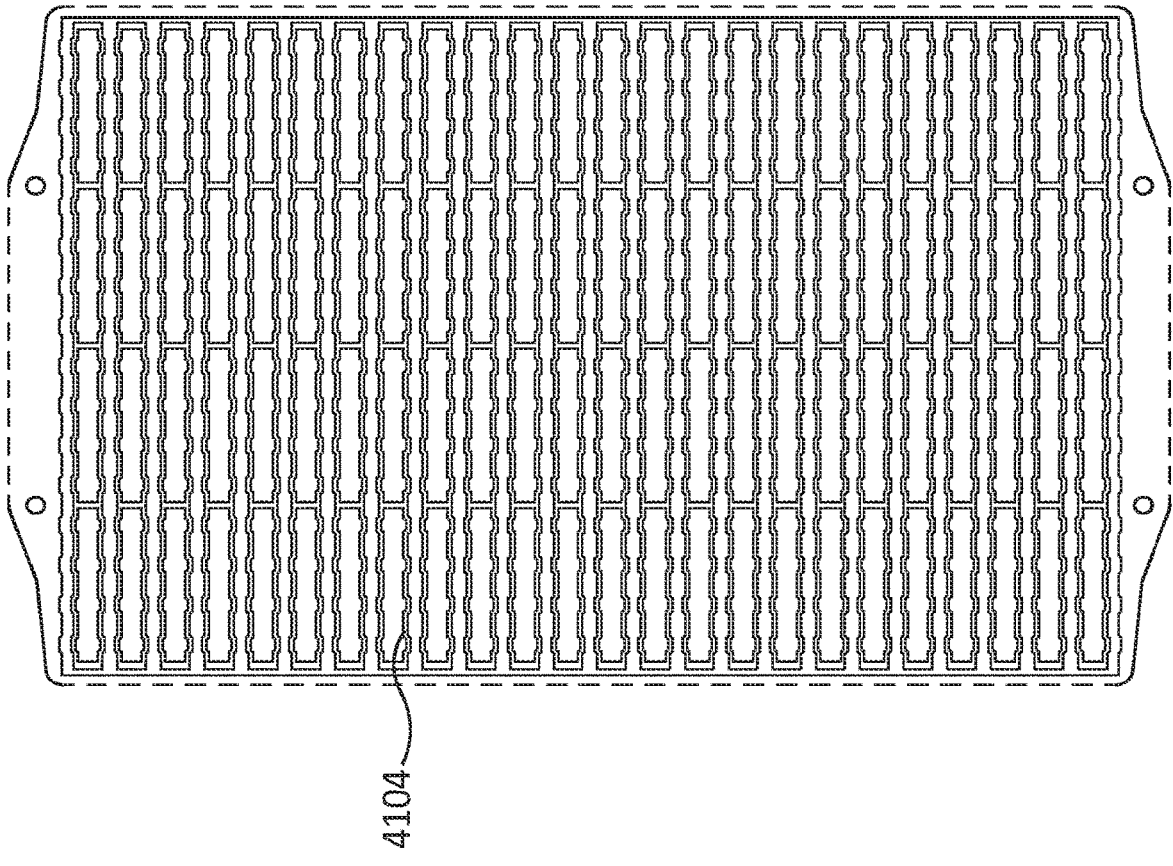
Figure 23F:
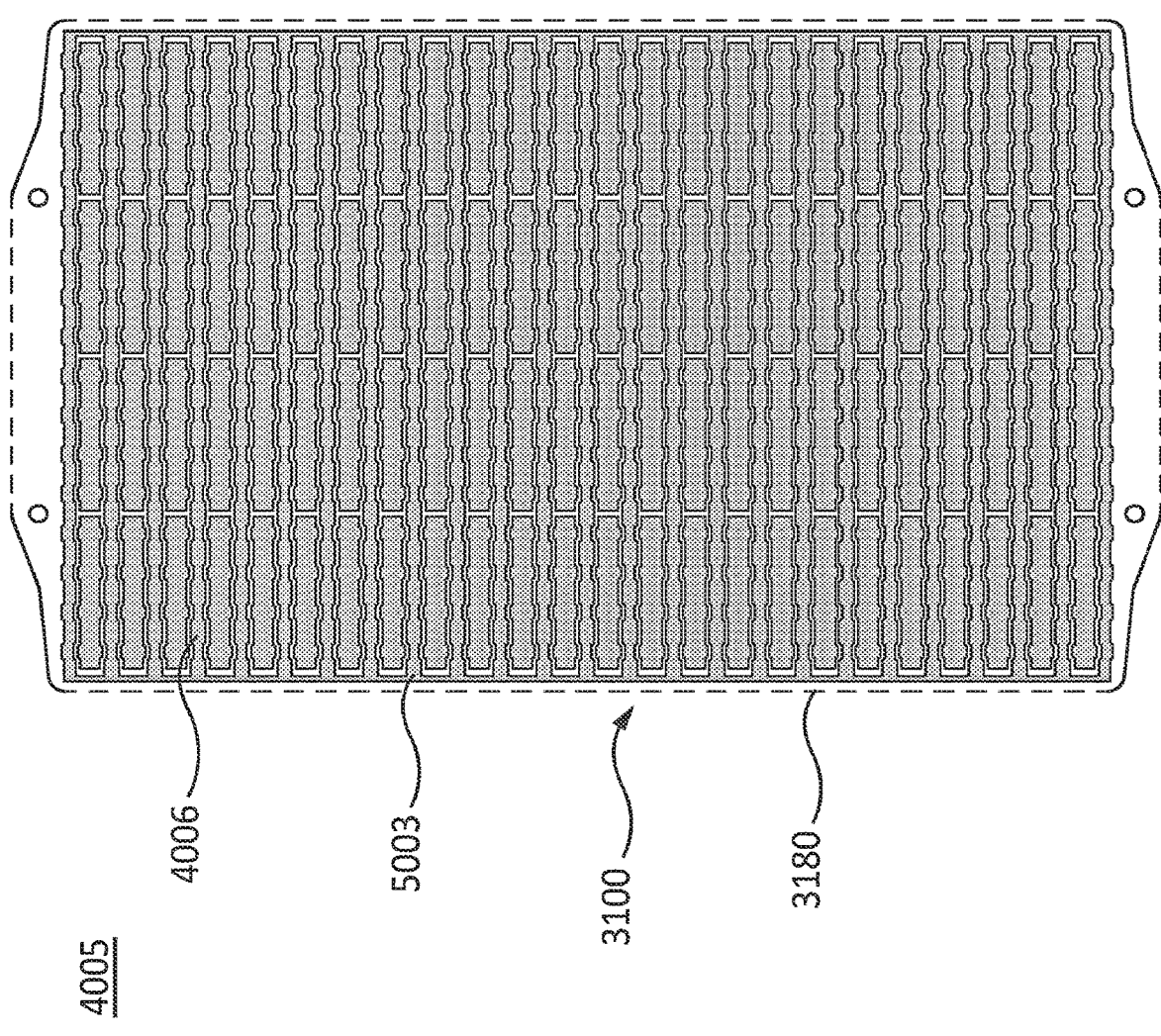
Figure 23F:
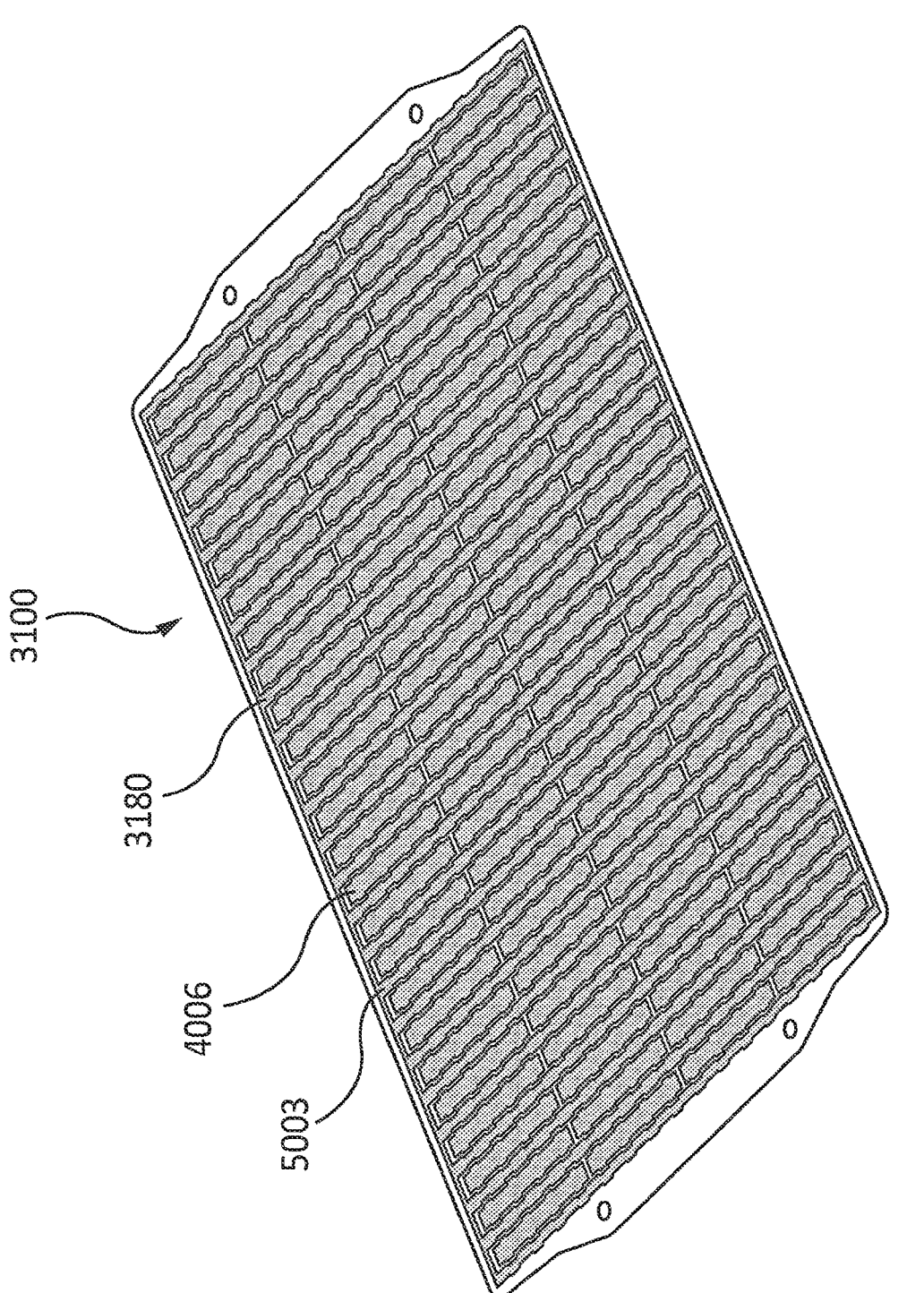
Figure 23G:
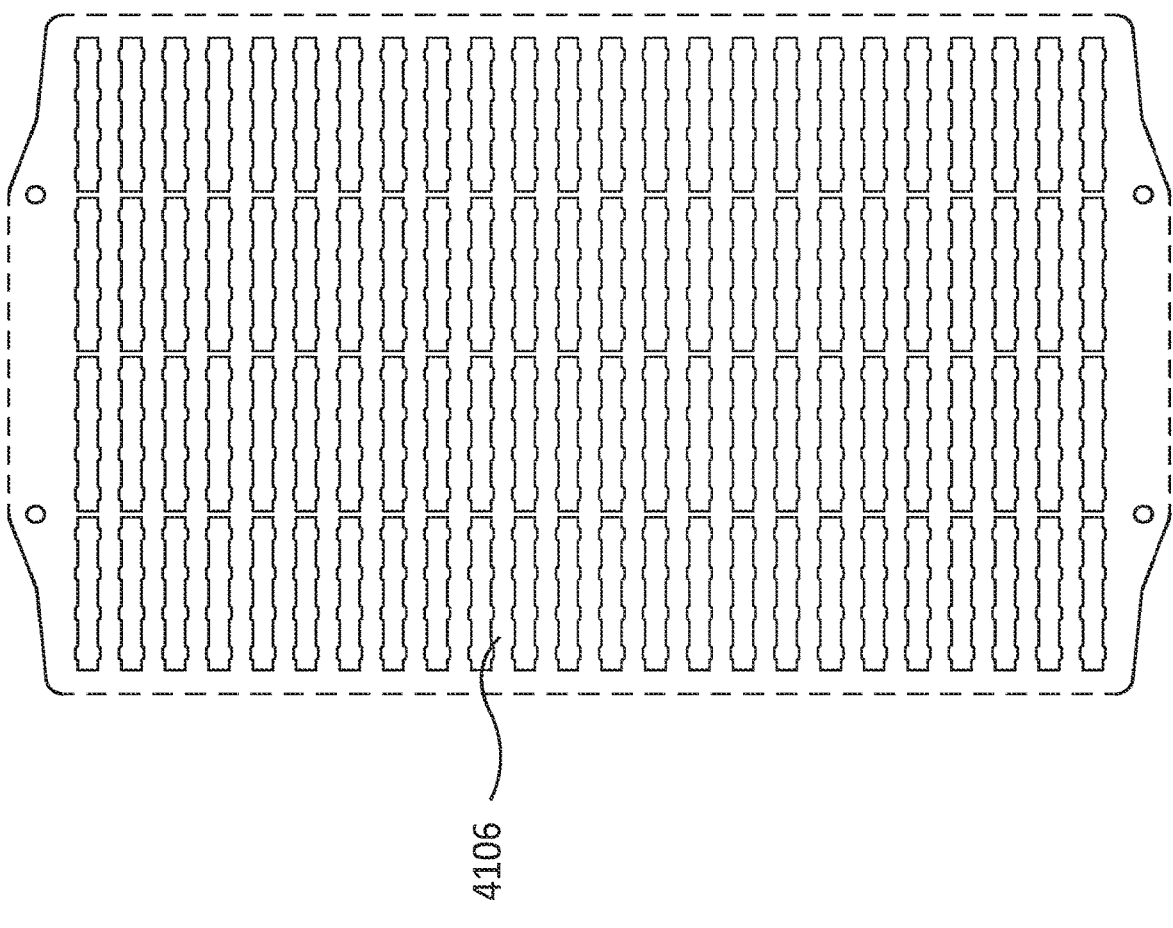
Figure 23H:
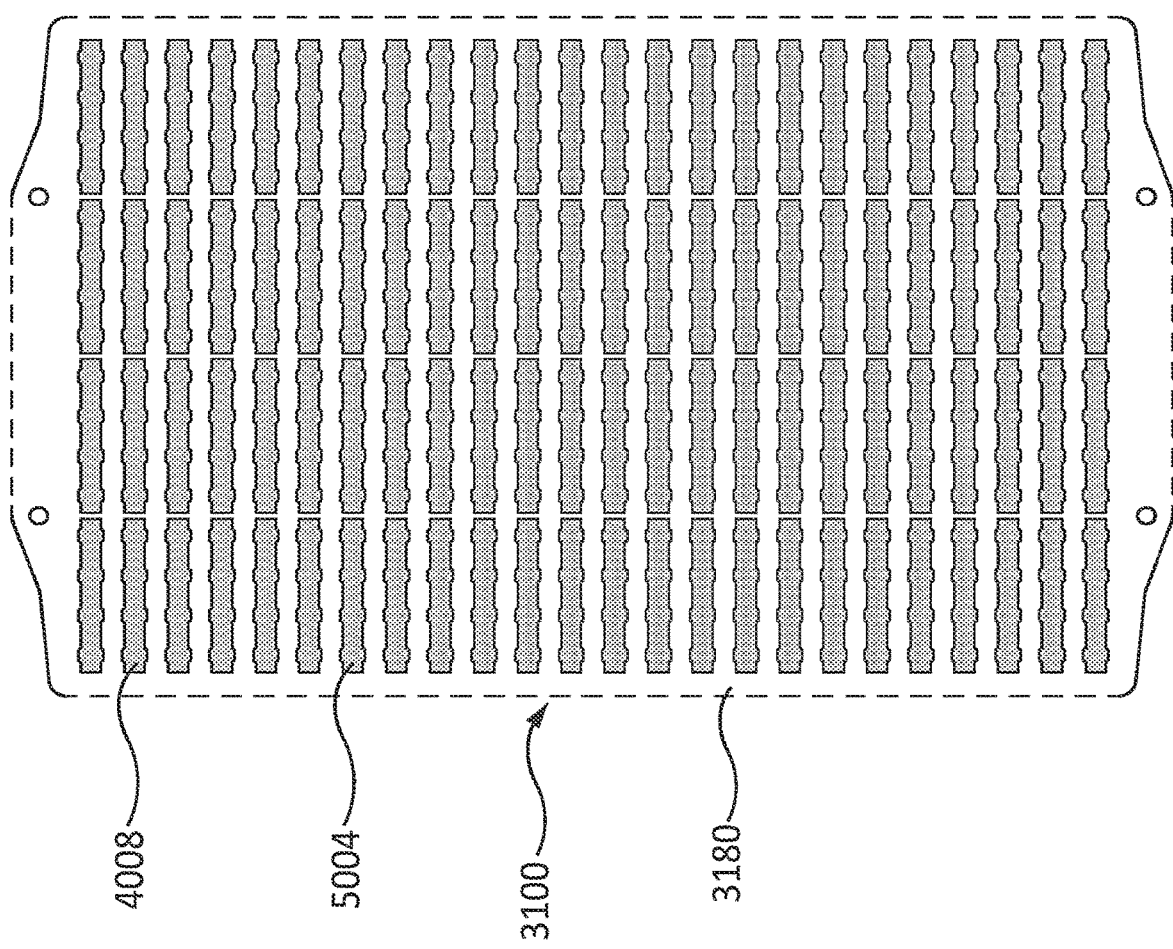
Figure 23H:
Figure 23I:
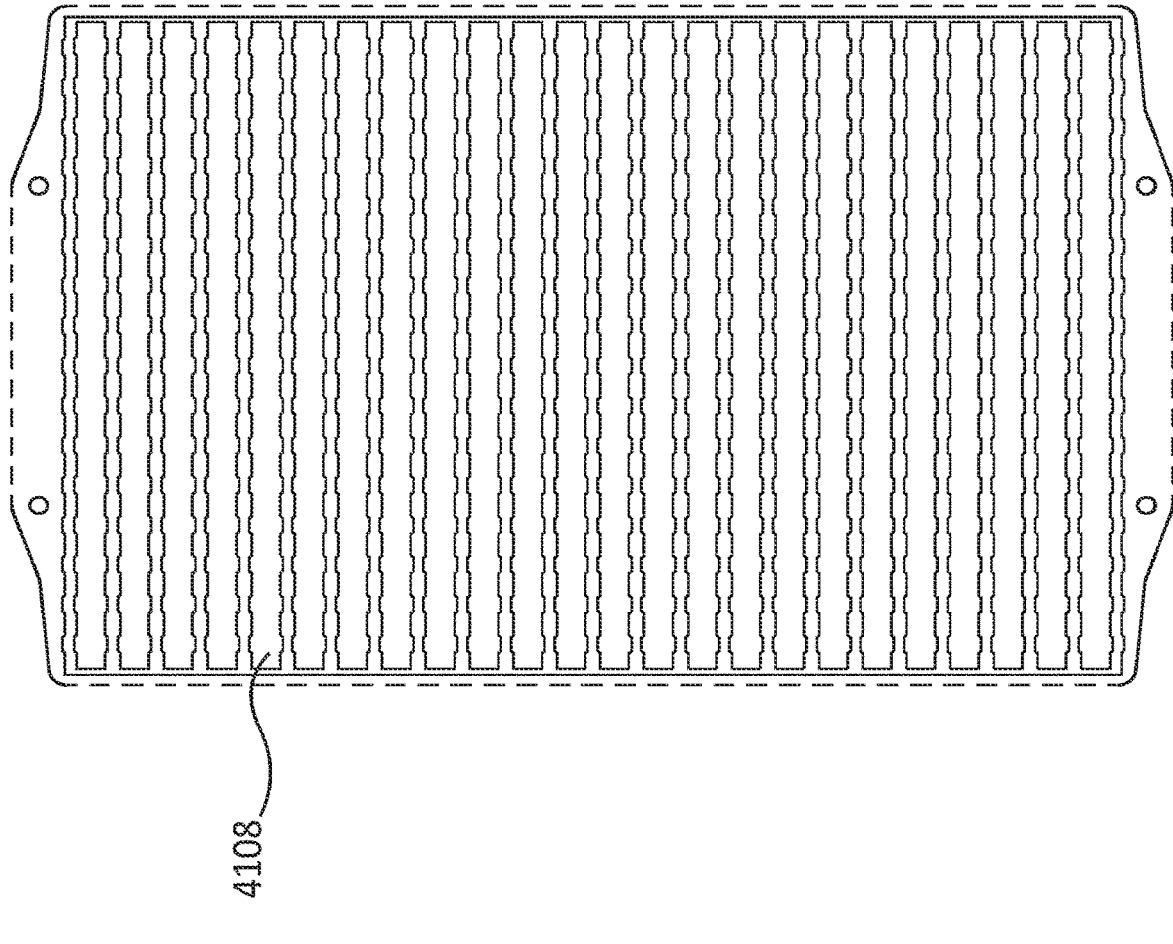
Figure 23J:
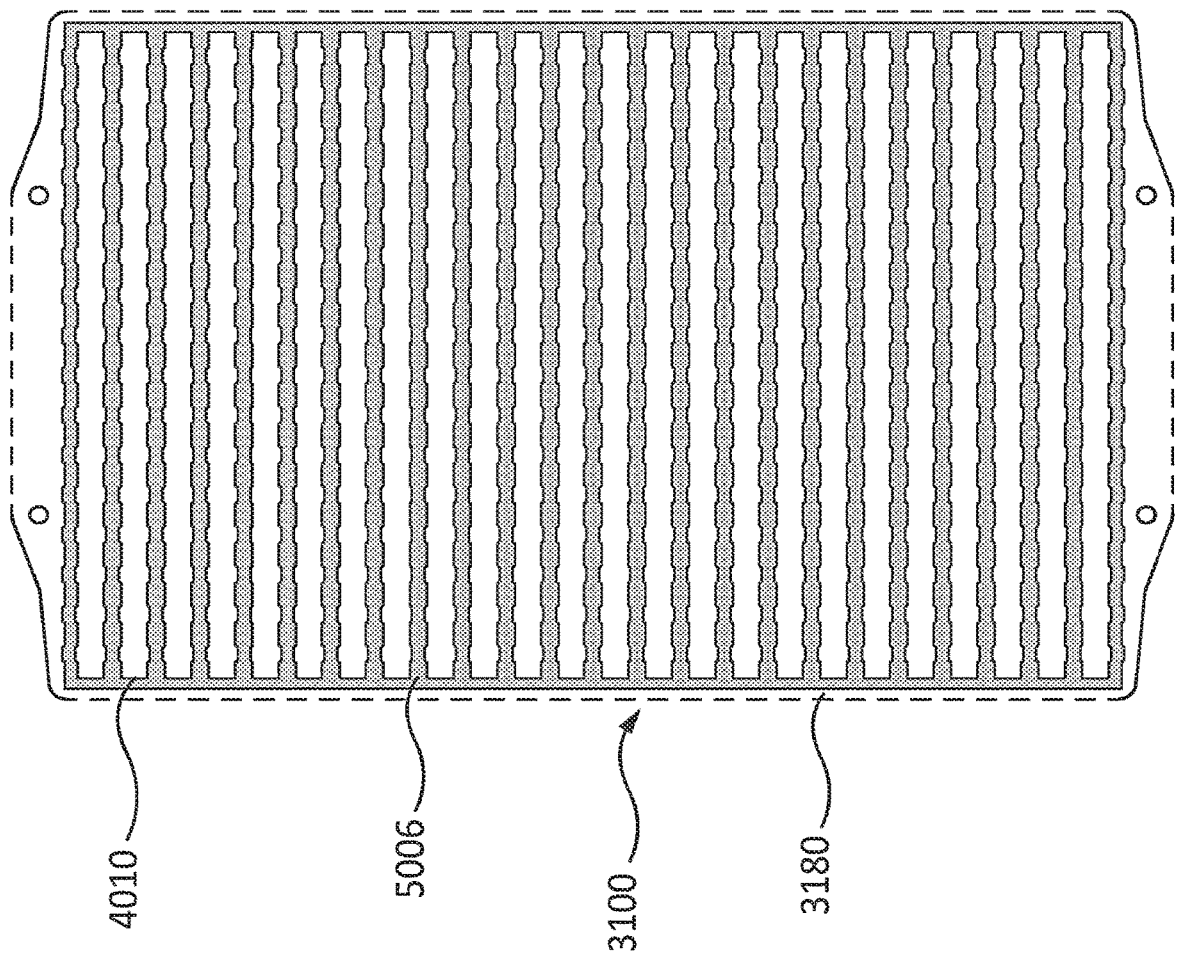
Figure 23J:
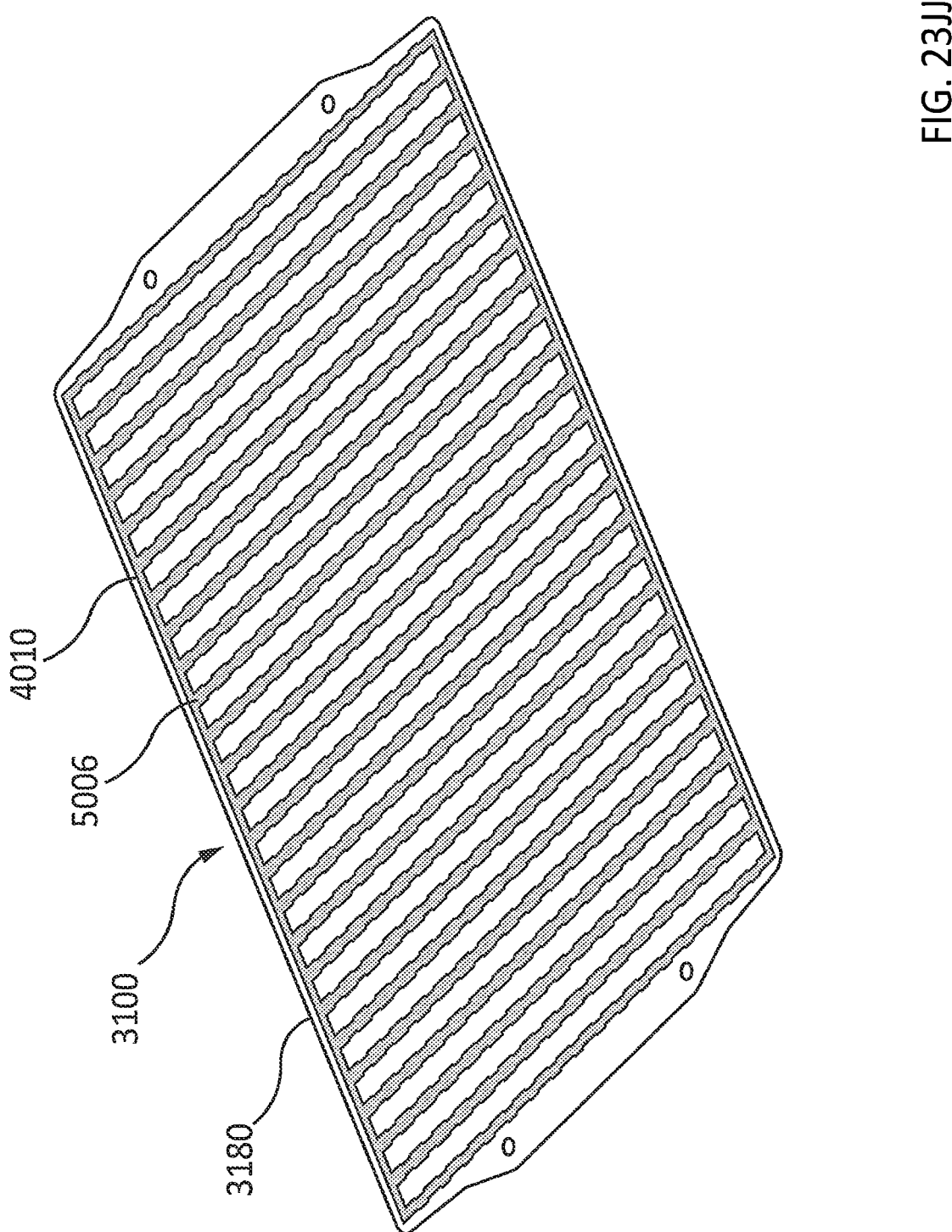
Figure 23K:
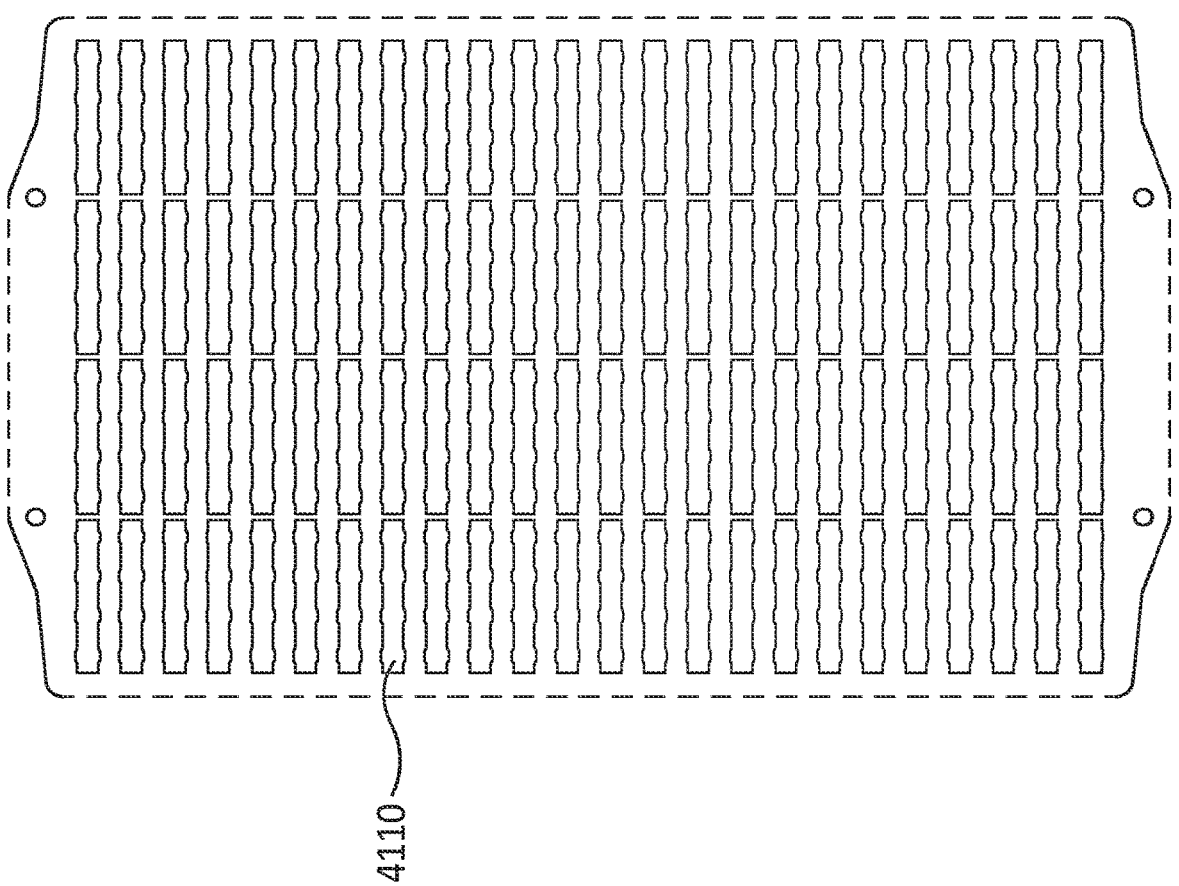
Figure 23L:
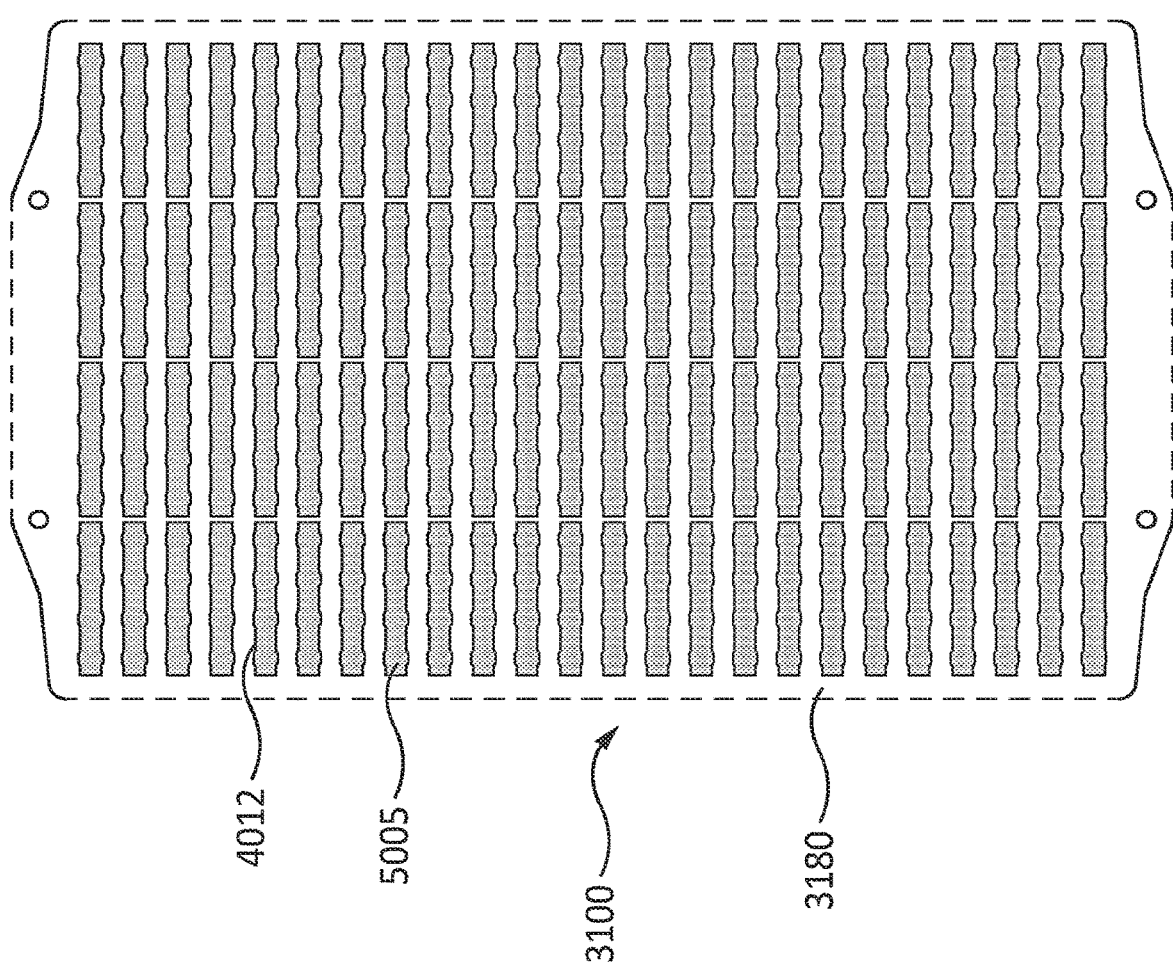
Figure 23L:
Figure 23M:
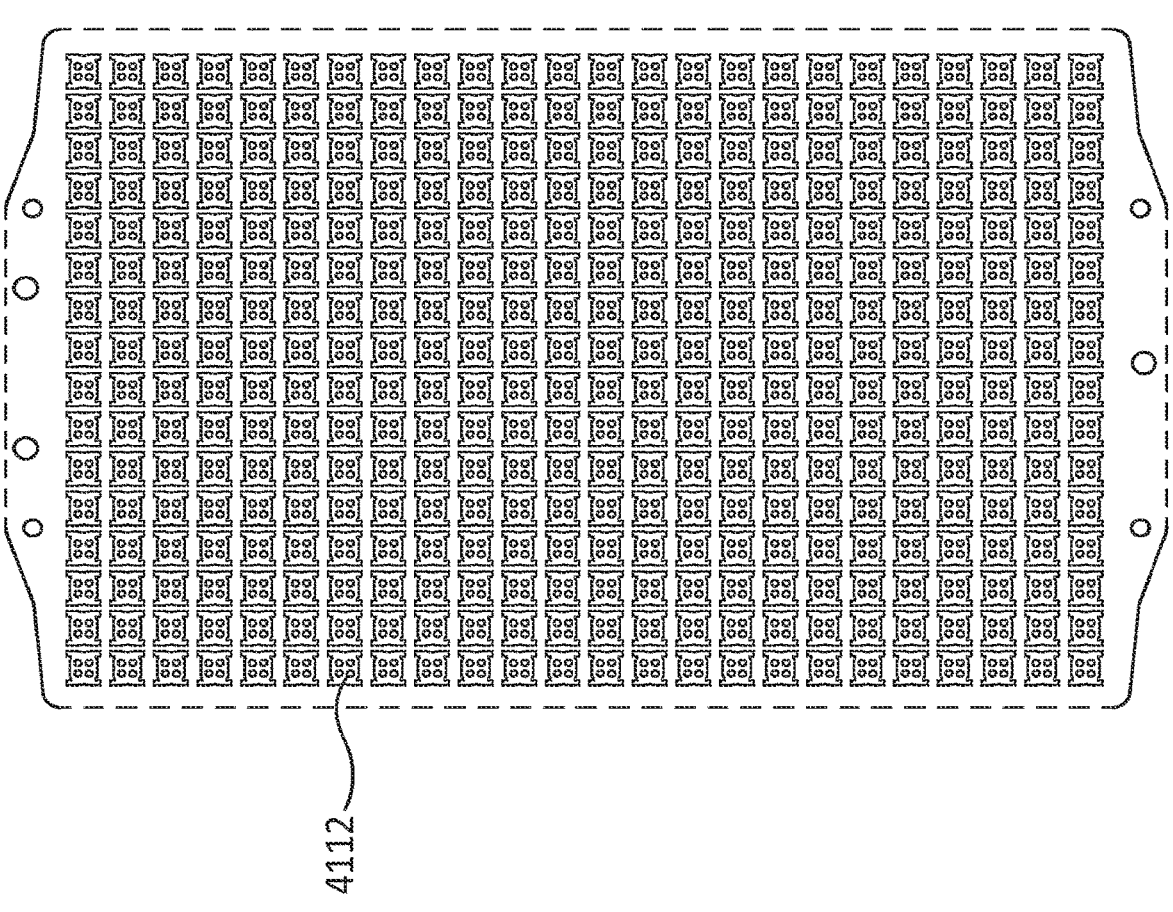
Figure 23N:
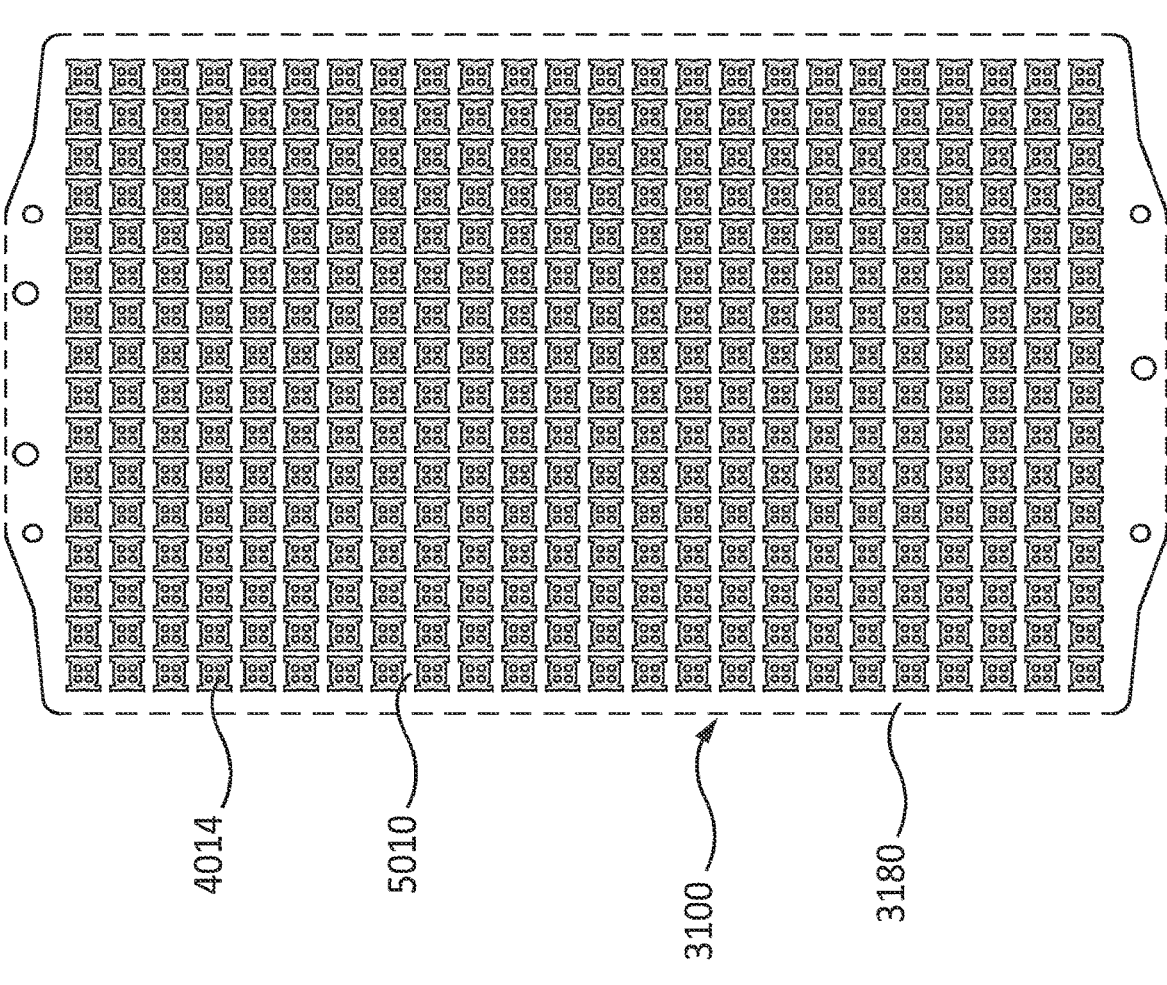
Figure 23N:
Figure 23P:
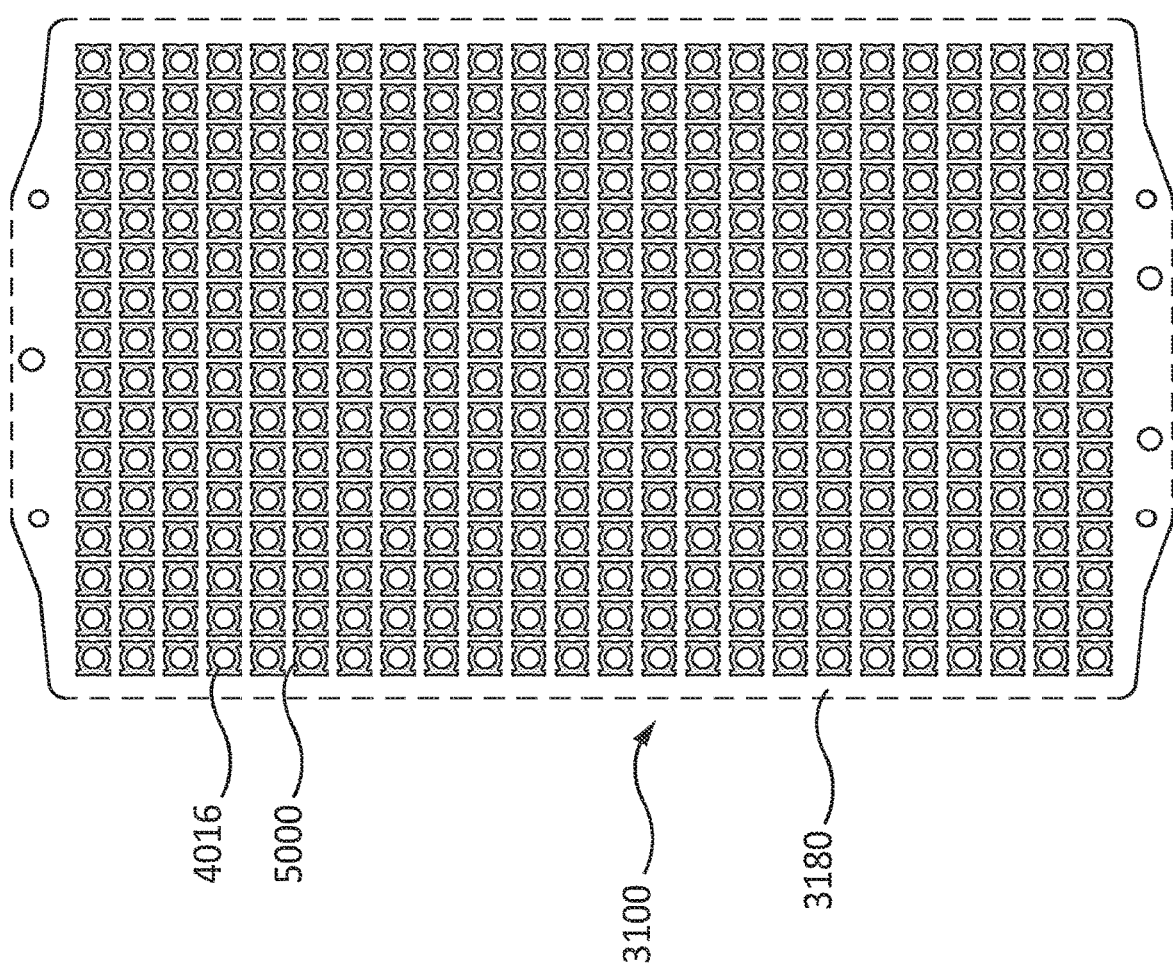
Figure 23P:

FIGS. 23A-23PP illustrate aspects of the construction of a substrate including multiple working electrode structures (forming multiple individually addressable electrode electrochemical cells) according to embodiments disclosed herein. FIGS. 23A-23PP illustrate various patterns (e.g., formed by screens) that may be employed in one or more processes to form these structures (e.g., a screen printing process to print the various layers required of a working electrode structure and the printed pattern resulting from use of the respective screens).

FIGS. 23A, 23B, and 23BB respectively, illustrate a first bottom surface conductive screen 4001, the bottom surface conductive layer 5001 resulting from use of the first bottom surface conductive screen 4001 in printing a first conductive layer on a bottom surface of a substrate, and the bottom surface conductive layer 5001 in perspective. The patterns of FIG. 23B correspond to the features illustrated in FIG. 22E. FIG. 23A illustrate a first bottom surface conductive screen 4001. The first bottom surface conductive screen pattern 4101 is provided on the first bottom surface conductive screen 4001, which may be manufactured of, e.g., stainless steel, nylon, polyester, etc. The first bottom surface conductive screen pattern 4101 is configured to mask a substrate and permit a screen printed ink to pass through the first bottom surface conductive screen pattern 4101 to create the bottom surface conductive layer 5001 forming the working electrode contact bases 3284 and the auxiliary electrode contact pattern base 3281, as shown in FIG. 23B. Further details of bottom surface conductive layer 5001 created through use of the first bottom surface conductive screen 4001 are provided above with respect to FIG. 22E. As illustrated in FIG. 23A, the first bottom surface conductive screen pattern 4101 may be configured for the printing the working electrode contact bases 3284 and the auxiliary electrode contact pattern base 3281 corresponding to 384 wells of a 16 well by 24 well plate. Further embodiments may include screens configured to print the via tab screen pattern 4101 across smaller plates (e.g., 96 well plates, etc.) and/or across multiple plates (e.g., 2, 3, 4, or more 384 well plates). Further illustrated in FIG. 23A are exemplary dimensions for the first bottom surface conductive screen 4001. The illustrated dimensions are nominal dimensions provided by way of example only.

FIGS. 23C, 23D, and 23DD, respectively, illustrate a second screen (second bottom surface conductive screen) 4003, a second printed pattern (corresponding to the second bottom surface conductive layer 5002) 4004 resulting from use of the second screen 4003 in printing the second bottom surface conductive layer 5002 on a bottom surface 3210 of a substrate 3100, and the second bottom surface conductive layer 5002 in perspective. The patterns of FIG. 23D correspond to the features illustrated in FIG. 22F. FIG. 23C illustrates a second screen pattern (second bottom surface conductive screen pattern) 4103. The second screen pattern 4103 is provided on the second screen 4003, which may be manufactured of, e.g., stainless steel, nylon, polyester, etc. The second screen 4003 is configured to mask a substrate and permit a screen printed ink to pass through second screen pattern 4103 to deposit the bottom surface conductive layer 5002, forming the working electrode contacts 3204 and the auxiliary electrode contact pattern 3291, as shown in FIG. 23D. Further details of the second printed pattern 4004 created through use of the second screen 4003 are provided above with respect to FIG. 22F. As illustrated in FIG. 23C, the second screen pattern 4103 may be configured for the printing of the working electrode contacts 3204 and the auxiliary electrode contact pattern 3291 corresponding to 384 wells of a 16 well by 24 well plate. Further embodiments may include screens configured to print the second printed pattern 4004 across smaller plates (e.g., 96 well plates, etc.) and/or across multiple plates (e.g., 2, 3, 4, or more 384 well plates). Further illustrated in FIG. 23C are exemplary dimensions for the first bottom surface conductive screen 4001. The illustrated dimensions are nominal dimensions provided by way of example only.

FIGS. 23E, 23F, and 23FF, respectively, illustrate a third screen (bus bar base screen) 4005, a third printed pattern (bus bar trace base pattern, corresponding to the first electrode trace conductive layer 5003) 4006 resulting from use of the third screen 4005 in printing the first electrode trace conductive layer 5003 on a top surface 3180 of a substrate 3100, and the first electrode trace conductive layer 5003 in perspective. The patterns of FIG. 23F correspond to the features illustrated in FIG. 22G and 22GG. FIG. 23E illustrates a third screen pattern (bus bar base screen pattern) 4104. The third screen pattern 4104 is provided on the third screen 4005, which may be manufactured of, e.g., stainless steel, nylon, polyester, etc. The third screen 4005 is configured to mask a substrate and permit a screen printed ink to pass through the third screen pattern 4104, as shown in FIG. 23F, forming the working electrode bus bar bases 3990 and the auxiliary electrode pattern base 3980. Further details of the third printed pattern 4006 created through use of the third screen 4005 are provided above with respect to FIG. 22G and 22GG. As illustrated in FIG. 23E, the third screen pattern 4104 may be configured for the printing of the working electrode bus bar bases 3990 and the auxiliary electrode pattern base 3980 corresponding to 384 wells of a 16 well by 24 well plate. Further embodiments may include screens configured to print the third pattern 4006 across smaller plates (e.g., 96 well plates, etc.) and/or across multiple plates (e.g., 2, 3, 4, or more 384 well plates).

FIGS. 23E, 23F, and 23FF illustrate patterns and layers to form the 4-spot embodiment of the sectored multi-well assay plate 2000 as described herein. In further embodiments, e.g., to form the 1-spot embodiment of the sectored multi-well assay plate 2000, alternative patterns and layers may be used. FIG. 23FFF illustrates the 1-spot first electrode trace conductive layer 5003. In the 1-spot embodiment, the first electrode trace conductive layer 5003 may have similar features to that of the 4-spot embodiment, with alternative dimensions.

FIGS. 23G, 23H, and 23HH, respectively, illustrate a fourth screen (bus bar base screen) 4007, a fourth printed pattern (bus bar base pattern) 4008 resulting from use of the fourth screen 4007 in printing the first working electrode conductive layer 5004 on a top surface of a substrate, and a perspective view of the first working electrode conductive layer 5004. The patterns of FIG. 23H correspond to the features illustrated in FIG. 22H. FIG. 23G illustrates a fourth screen pattern (bus bar base screen pattern) 4106. The fourth screen pattern 4106 is provided on the fourth screen 4007, which may be manufactured of, e.g., stainless steel, nylon, polyester, etc. The fourth screen 4007 is configured to mask a substrate 3100 and permit a screen printed ink to pass through the fourth screen pattern 4106 to form the first working electrode conductive layer 5004, as shown in FIG. 23H, forming the working electrode bus bar carbon layer 3991. Further details of the fourth printed pattern 4008 created through use of the fourth screen 4007 are provided above with respect to FIG. 22H. As illustrated in FIG. 23G, the fourth screen pattern 4106 may be configured for the printing of the working electrode bus bar carbon layer 3991 corresponding to 384 wells of a 16 well by 24 well plate. Further embodiments may include screens configured to print the fourth pattern 4008 across smaller plates (e.g., 96 well plates, etc.) and/or across multiple plates (e.g., 2, 3, 4, or more 384 well plates).

FIGS. 23G, 23H, and 23HH illustrate patterns and layers to form the 4-spot embodiment of the sectored multi-well assay plate 2000 as described herein. In further embodiments, e.g., to form the 1-spot embodiment of the sectored multi-well assay plate 2000, alternative patterns and layers may be used. FIG. 23HHH illustrates the 1-spot first working electrode conductive layer 5004. In the 1-spot embodiment, the first working electrode conductive layer 5004 may have similar features to that of the 4-spot embodiment, with alternative dimensions.

FIGS. 23I, 23J, and 23JJ, respectively, illustrate a fifth screen (auxiliary electrode pattern screen) 4009, a fifth printed pattern (auxiliary electrode pattern) 4010 resulting from use of the fifth screen 4009 in printing the auxiliary electrode conductive layer 5006 on a top surface 3180 of a substrate 3100, and the auxiliary electrode conductive layer 5006 in perspective. The patterns of FIG. 23J correspond to the features illustrated in FIG. 22I. FIG. 23J illustrates fifth screen pattern (auxiliary electrode screen pattern) 4108. The fifth screen pattern 4108 is provided on the fifth screen 4009, which may be manufactured of, e.g., stainless steel, nylon, polyester, etc. The fifth screen 4009 is configured to mask a substrate and permit a screen printed ink to pass through the fifth screen pattern 4108 to form the auxiliary electrode conductive layer 5006, forming the auxiliary electrode pattern 3191. Further details of the fifth printed pattern 4010 created through use of the fifth screen 4009 are provided above with respect to FIG. 221. As illustrated in FIG. 23J, the fifth screen pattern 4108 may be configured for the printing the auxiliary electrode pattern 3191 corresponding to 384 wells of a 16 well by 24 well plate. Further embodiments may include screens configured to print the fifth pattern 4010 across smaller plates (e.g., 96 well plates, etc.) and/or across multiple plates (e.g., 2, 3, 4, or more 384 well plates).

FIGS. 231, 23J, and 23JJ illustrate patterns and layers to form the 4-spot embodiment of the sectored multi-well assay plate 2000 as described herein. In further embodiments, e.g., to form the 1-spot embodiment of the sectored multi-well assay plate 2000, alternative patterns and layers may be used. FIG. 23JJ) illustrates the 1-spot auxiliary electrode conductive layer 5006. In the 1-spot embodiment, the auxiliary electrode conductive layer 5006 may have similar features to that of the 4-spot embodiment, with alternative dimensions.

FIGS. 23K, 23L, and 23LL, respectively, illustrate a sixth screen (bus bar screen) 4011, a sixth printed pattern (bus bar pattern) 4012 resulting from use of the sixth screen in printing the second working electrode conductive layer 5005 on a top surface 3180 of a substrate 3100, and a perspective view of the second working electrode conductive layer 5005. The patterns of FIG. 23L correspond to the features illustrated in FIG. 22J. FIG. 23K illustrates a sixth screen pattern (bus bar screen pattern) 4110. The sixth screen pattern 4110 is provided on the sixth screen 4011, which may be manufactured of, e.g., stainless steel, nylon, polyester, etc. The sixth screen 4011 is configured to mask a substrate and permit a screen printed ink to pass through the sixth screen pattern 4110 to create the second working electrode conductive layer 5005, as shown in FIG. 23L, forming the plurality of working electrode bus bars 3190. Further details of the sixth printed pattern 4012 created through use of the sixth screen 4011 are provided above with respect to FIG. 221. As illustrated in FIG. 23K, the sixth screen pattern 4110 may be configured for the printing of the plurality of working electrode bus bars 3190 corresponding to 384 wells of a 16 well by 24 well plate. Further embodiments may include screens configured to print the sixth pattern 4012 across smaller plates (e.g., 96 well plates, etc.) and/or across multiple plates (e.g., 2, 3, 4, or more 384 well plates).

FIGS. 23K, 23L, and 23LL illustrate patterns and layers to form the 4-spot embodiment of the sectored multi-well assay plate 2000 as described herein. In further embodiments, e.g., to form the 1-spot embodiment of the sectored multi-well assay plate 2000, alternative patterns and layers may be used. FIG. 23LLL illustrates the 1-spot second working electrode conductive layer 5005. In the 1-spot embodiment, the second working electrode conductive layer 5005 may have similar features to that of the 4-spot embodiment, with alternative dimensions.

FIGS. 23M, 23N, and 23NN, respectively, illustrate a seventh screen (four spot dielectric screen) 4013, a seventh printed pattern (four spot dielectric pattern) 4014 resulting from use of the seventh screen 4013 in printing the four spot dielectric layer 5010 on a top surface 3180 of a substrate 3100, and the four spot dielectric layer 5010 in perspective. The patterns of FIG. 23N correspond to the features illustrated in FIG. 22K. FIG. 23M illustrates a seventh screen pattern (four spot dielectric screen pattern) 4112. The seventh screen pattern 4112 is patterned on the seventh screen 4013, which may be manufactured of, e.g., stainless steel, nylon, polyester, etc. The seventh screen 4013 is configured to mask a substrate and permit a screen printed ink (e.g., dielectric material) to pass through the seventh screen pattern 4112 to create the dielectric layer, as shown in FIG. 23N, providing surface isolation to the substrate 3100. Further details of the seventh printed pattern 4014 created through use of the seventh screen 4013 are provided above with respect to FIGS. 22K and 22L. As illustrated in FIG. 23M, the seventh printed pattern 4014 may be configured to provide the four spot dielectric layer 5010 corresponding to 384 wells of a 16 well by 24 well plate. Further embodiments may include screens configured for smaller plates (e.g., 96 well plates, etc.) and/or for multiple plates (e.g., 2, 3, 4, or more 384 well plates).

Figure 230:
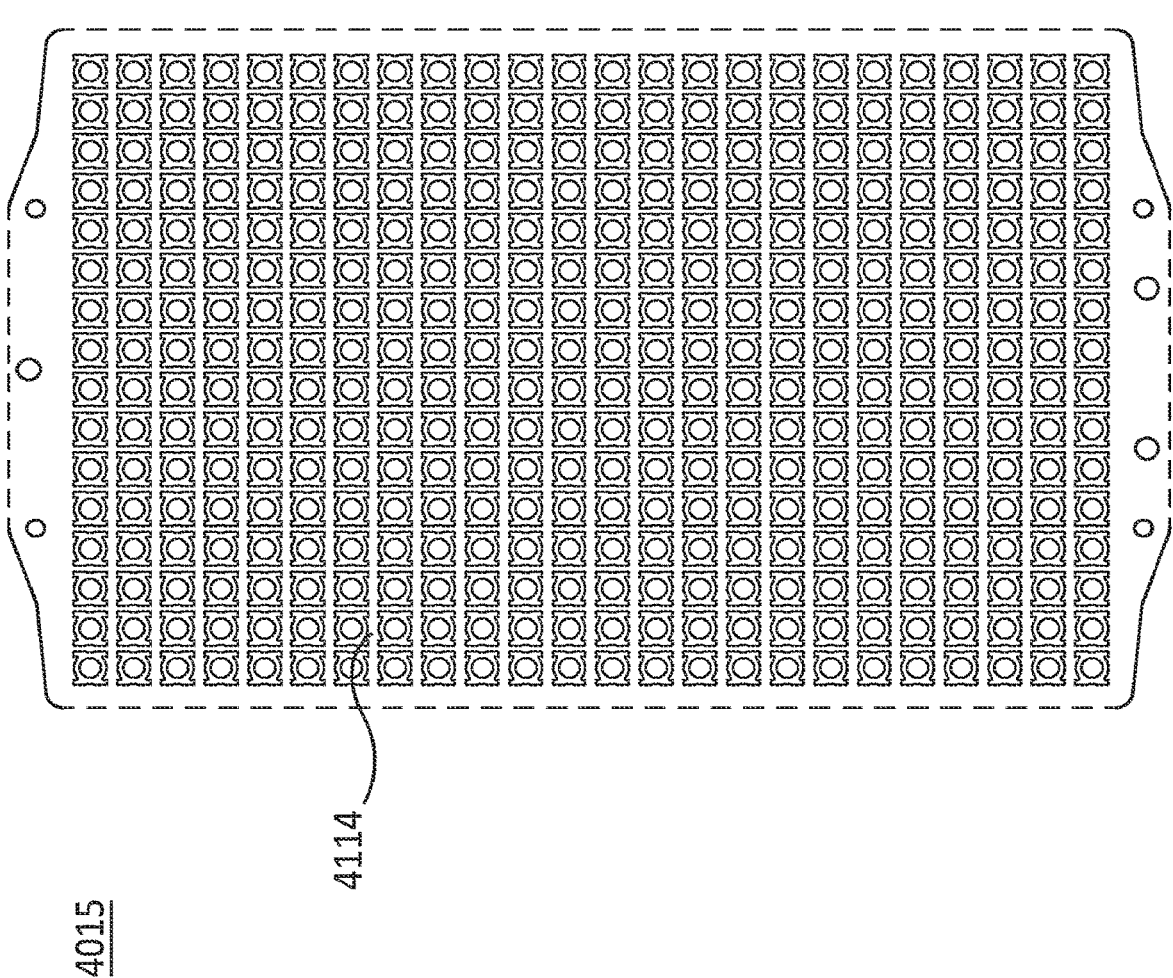

FIGS. 230, 23P, 23PP, respectively, illustrate an eighth screen (one spot dielectric screen) 4015, an eighth printed pattern (one spot dielectric pattern) 4014 resulting from use of the eighth screen 4015 in printing the one spot dielectric layer 5000 on a top surface 3180 of a substrate 3100, and the one spot dielectric layer 5000 in perspective. The patterns of FIG. 230 correspond to the features illustrated in FIG. 22M. FIG. 230 illustrates an eighth screen pattern (one spot dielectric screen pattern) 4114. The eighth screen pattern 4114 is patterned on the eighth screen 4015, which may be manufactured of, e.g., stainless steel, nylon, polyester, etc. The eighth screen 4015 is configured to mask a substrate and permit a screen printed ink (e.g., dielectric material) to pass through the eighth screen pattern 4114 to create the dielectric layer 5000, as shown in FIG. 23P, providing surface isolation to the substrate 3100. Further details of the eighth printed pattern 4016 created through use of the eighth screen 4015 are provided above with respect to FIGS. 22M and 22N. As illustrated in FIG. 230, the eighth printed pattern 4016 may be configured to provide the one spot dielectric layer 5000 corresponding to 384 wells of a 16 well by 24 well plate. Further embodiments may include screens configured for smaller plates (e.g., 96 well plates, etc.) and/or for multiple plates (e.g., 2, 3, 4, or more 384 well plates).

In embodiments, the present invention may be embodied as a computer program product that may include a computer readable storage medium (or media) and/or a computer readable storage device. Such computer readable storage medium or device may store computer readable program instructions for causing a processor to carry out one or more methodologies described here. In one embodiment, the computer readable storage medium or device includes a tangible device that can retain and store instructions for use by an instruction execution device. Examples of the computer readable storage medium or device may include, but is not limited to, an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, but not limited to only those examples. The computer readable medium can comprise both computer readable storage media (as described above) or computer readable transmission media, which can include, for example, coaxial cables, copper wire, and fiber optics. Computer readable transmission media may also take the form of acoustic or light waves, such as those generated during radio frequency, infrared, wireless, or other media including electric, magnetic, or electromagnetic waves.

The terms "computer system" as may be used in the present application may include a variety of combinations of fixed and/or portable computer hardware, software, peripherals, mobile, and storage devices. The computer system may include a plurality of individual components that are networked or otherwise linked to perform collaboratively or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Further embodiments of the present disclosure include at least the following.

Embodiment 1 is a multi-well assay plate including: a top plate having top plate opening defining wells of the multi-well assay plate arranged in a well pattern, each well being defined by a well area; a base plate including a substrate having a top surface and a bottom surface, the top surface being mated to the top plate; and a plurality of sector electrode structures forming a plurality of well electrode structures, each of the plurality of sector electrode structures including: at least one working electrode bus bar deposited on the top surface and a portion of an auxiliary electrode pattern deposited on the top surface; a working electrode contact patterned on the bottom surface in electrical communication with the at least one working electrode bus bar; and an auxiliary electrode contact pattern in communication with the auxiliary electrode pattern.

Embodiment 2 is the plate of embodiment 1, wherein the at least one working electrode bus bar of a first sector electrode structure is configured to be electrically energized in isolation from electrical energization of the at least one working electrode bus bars of remaining ones of the plurality of sector electrode structures.

Embodiment 3 is the plate of embodiments 1 or 2, wherein the at least one working electrode bus bar of each sector electrode structure includes a plurality of working electrode bus bars configured to be electrically energized concurrently.

Embodiment 4 is the plate of embodiments 1 to 3, wherein the top surface further includes an adhesive layer corresponding to the well pattern on the top surface, wherein the well areas are free of adhesive.

Embodiment 5 is the plate of embodiments 1 to 4, wherein the working electrode contact is in electrical communication with the at least one working electrode bus bar through at least one via.

Embodiment 6 is the plate of embodiment 5, wherein the at least one via includes a plurality of vias respectively corresponding to a plurality of working electrode bus bars included in the at least one working electrode bus bar.

Embodiment 7 is the plate of embodiment 6, wherein the plurality of vias includes two vias connecting each of the plurality of working electrode contacts with each of the plurality of working electrode bus bars.

Embodiment 8 is the plate of embodiments 1 to 13, the auxiliary electrode is disposed at an approximate center of the well area, the working electrodes are arranged in a circle approximately equidistant from the auxiliary electrode.

Embodiment 9 is the plate of embodiments 1 to 8, wherein each well electrode structure includes four working electrode zones formed from one of the at least one working electrode bus bar.

Embodiment 10 is the plate of embodiments 1 to 9, wherein each well electrode structure includes two auxiliary electrode zones formed from the auxiliary electrode pattern.

Embodiment 11 is the plate of embodiments 1 to 8, wherein each well electrode structure includes one working electrode zone formed from one of the at least one working electrode bus bar.

Embodiment 12 is the plate of embodiments 1 to 8 and 11, wherein each well electrode structure includes four auxiliary electrode zones formed from the auxiliary electrode pattern.

Embodiment 13 is the plate of embodiments 1 to 12, wherein the top surface of the substrate further includes an insulating layer disposed in a pattern that exposes working electrode zones and auxiliary electrode zones of each well electrode structure and covers a remainder of the top surface of the substrate within each well.

Embodiment 14 is the plate of embodiments 1 to 13, wherein the plurality of sector electrode structures includes 24 sector electrode structures.

Embodiment 15 is the plate of embodiments 1 to 14, wherein the well pattern includes a 16×24 arrangement of 384 wells organized in 24 sector electrode structures including 16 wells each.

Embodiment 16 is a method of using a multi-well assay plate, the multi-well assay plate including: a plurality of wells arranged in a well pattern; a plurality of sector electrode structures forming a plurality of well electrode structures corresponding to the plurality of wells, each of the plurality of sector electrode structures including: at least one working electrode bus bar deposited on the top surface forming a plurality of working electrode zones; and a portion of an auxiliary electrode pattern deposited on the top surface forming a plurality of auxiliary electrode zones; a working electrode contact patterned on the bottom surface in electrical communication with the at least one working electrode bus bar; and an auxiliary electrode contact pattern in communication with the auxiliary electrode pattern; the method including: generating a voltage potential between the plurality of working electrode zones formed by the at least one working electrode bus bar associated with a selected sector electrode structure and the plurality of auxiliary electrode zones associated with the selected sector electrode structure; maintaining substantial electrical isolation between the plurality of working electrode zones of the selected sector electrode structure and a remainder of working electrode zones of a remainder of sector electrode structures; and measuring a response to the voltage potential.

Embodiment 17 is the method of embodiment 16, wherein generating the voltage potential and measuring the response are performed substantially simultaneously.

Embodiment 18 is the method of embodiments 16 to 17, further including: subsequent to measuring the response, sequentially for previously unenergized working electrode zones of the remainder of the sector electrode structures: generating sequential voltage potentials in each of the remainder of the sector electrode structures; maintaining substantial electrical isolation of currently unenergized sector electrode structures with a currently energized sector electrode structures; and measuring a plurality of responses to the sequential voltage potentials.

Embodiment 19 is the method of embodiments 16 to 18, wherein the multi-well assay plate further includes a plurality of working electrode contacts deposited on a bottom surface of the multi-well assay plate electrically connected to corresponding working electrode bus bars and an auxiliary electrode contact pattern deposited on the bottom surface electrically connected to the auxiliary electrode pattern, and wherein generating the voltage potential includes: contacting the working electrode contact with one or more working electrode contact pins and contacting the auxiliary electrode pattern with one or more auxiliary electrode contact pins, and applying a voltage across the one or more working electrode contact pins and the one or more auxiliary electrode contact pins.

Embodiment 20 is the method of embodiments 16 to 19, further comprising depositing a biological sample in at least one well of the plurality of wells.

Embodiment 21 is a method of making a multi-well assay plate including a plurality of wells, the method including: forming a plurality of holes in a substrate; applying a first conductive layer of material on a first side of the substrate, the first conductive layer filling the plurality of holes to form a plurality of vias and provide a plurality of working electrode contact bases and an auxiliary electrode contact pattern base; applying a second conductive layer of material on the first side of the substrate, the second conductive layer overlaying the first conductive layer to form a plurality of working electrode contacts and an auxiliary electrode contact pattern; applying a third conductive layer of material on a second side of the substrate, the third conductive layer forming a plurality of working electrode bus bar bases and an auxiliary electrode pattern base; applying a fourth conductive layer of material on the second side of the substrate, the fourth conductive layer forming a plurality of working electrode bus bar carbon layers; applying a fifth conductive layer of material overlaying the fourth conductive layer on the second side of the substrate forming a plurality of working electrode bus bars; applying a sixth conductive layer of material overlaying the auxiliary electrode pattern base on the second side of the substrate, the sixth conductive layer forming auxiliary electrode pattern; applying an insulating layer of material on the second side of the substrate, the insulating layer exposing a plurality of auxiliary electrode zones and a plurality of working electrode zones and insulating a remainder of the plurality of wells; and adhering the substrate to a top plate having top plate openings defining the wells of the multi-well assay plate arranged in a well pattern, each well being defined by a well area.

Embodiment 22 is the method of embodiment 21, wherein the plurality of vias include working electrode vias connecting the working electrode contacts to the working electrode bus bars and auxiliary electrode vias connecting the auxiliary electrode contact pattern to the auxiliary electrode pattern.

Embodiment 23 is the method of embodiments 21 and 22, wherein the plurality of working electrode zones includes four working electrode zones corresponding to each well.

Embodiment 24 is the method of embodiments 21 and 22, wherein the plurality of working electrode zones includes one working electrode zone corresponding to each well.

Embodiment 25 is the method of embodiments 21 to 24, wherein adhering the substrate to the top plate includes applying an adhesive to the second side of the substrate outside of the well areas.

Embodiment 26 is a substrate including a plurality of electrochemical cells for performing electrochemical analysis, the plurality of electrochemical cells including: one or more working electrode zones disposed on a surface of the cell; and at least one auxiliary electrode disposed on the surface of the cell, wherein each of the one or more working electrode zones are in electrical communication with one another.

Embodiment 27 is the substrate of embodiment 26, wherein the plurality of electrochemical cells are arranged in sectors, each sector including a grouping of electrochemical cells, wherein the one or more working electrode zones of in the grouping of electrochemical cells of a sector are in electrical communication with one another.

Embodiment 28 is the substrate of embodiments 26 and 27, wherein the one or more working electrode zones of each sector are isolated from working electrode zones of each other sector.

Embodiment 29 the substrate of embodiments 26 to 28, wherein the substrate is part of a plate.

Embodiment 30 is the substrate of embodiments 26 to 28, wherein the substrate is part of a cartridge.

Embodiment 31 is the substrate of embodiments 26 to 28, wherein the substrate is part of a flow cell.

Embodiment 32 is the substrate of embodiments 26 to 31, wherein the electrochemical analysis includes electrochemiluminescence (ECL) analysis.

Embodiment 33 is a multi-well assay plate comprising: a top plate having top plate opening defining wells of the multi-well assay plate arranged in a well pattern, each well being defined by a well area; a base plate including a substrate having a top surface and a bottom surface, the top surface being mated to the top plate; and a plurality of sector electrode structures forming a plurality of well electrode structures. Each of the plurality of sector electrode structures a plurality of sector electrode structures forming a plurality of well electrode structures, each of the plurality of sector electrode structures including at least one working electrode bus bar deposited on the top surface and a portion of an auxiliary electrode pattern deposited on the top surface. The assay plate further includes at least one working electrode contact patterned on the bottom surface in electrical communication with the at least one working electrode bus bar; and an auxiliary electrode contact pattern in electrical communication with the auxiliary electrode pattern. The auxiliary electrode contact pattern includes a first plurality of cut-outs and a second plurality of cut-outs. The first plurality of cut-outs are configured to accommodate the at least one working electrode contact and the second plurality of cut-outs are configured to create a plurality of isolation zones.

Embodiment 34 is the multi-well assay plate of embodiment 33, wherein the at least one working electrode contact is configured to make electrical contact with a first plurality of working electrode pins and the plurality of isolation zones are configured to electrically isolate a second plurality of electrode pin contacts from the auxiliary electrode pattern and the at least one working electrode bus bar.

Embodiment 35 is the multi-well assay plate of embodiment 33 or 34, wherein each cut-out of the first plurality of cut-outs and the second plurality of cut-outs represents a gap in the auxiliary electrode pattern and is surrounded by the auxiliary electrode pattern.

Embodiment 36 is the multi-well assay plate of any of embodiments 33 to 35, wherein the first plurality of cut-outs and the second plurality of cut-outs are disposed in an alternating arrangement.

Embodiment 37 is the multi-well assay plate of any of embodiments 33 to 36, wherein the at least one working electrode bus bar of a first sector electrode structure is configured to be electrically energized in isolation from electrical energization of the at least one working electrode bus bars of remaining ones of the plurality of sector electrode structures.

Embodiment 38 is the multi-well assay plate of any of embodiments 33 to 37, wherein the at least one working electrode bus bar of each sector electrode structure includes a plurality of working electrode bus bars configured to be electrically energized concurrently.

Embodiment 39 is the muti-well assay plate of any of embodiments 33 to 38, wherein the top surface further includes an adhesive layer corresponding to the well pattern on the top surface, wherein the well areas are free of adhesive.

Embodiment 40 is the multi-well assay plate of any of embodiments 33 to 39, wherein the working electrode contact is in electrical communication with the at least one working electrode bus bar through at least one via.

Embodiment 41 is the multi-well assay plate of any of embodiments 33 to 40, wherein an auxiliary electrode zone electrically connected to the auxiliary electrode pattern is disposed at an approximate center of the well area and working electrode zones electrically connected to the at least one working electrode bus bar are arranged in a circle approximately equidistant from the auxiliary electrode.

Embodiment 42 is the multi-well assay plate of any of embodiments 33 to 41, wherein each well electrode structure includes four working electrode zones formed from one of the at least one working electrode bus bar.

Embodiment 43 is the multi-well assay plate of any of embodiments 33 to 42, wherein each well electrode structure includes two auxiliary electrode zones formed from the auxiliary electrode pattern.

Embodiment 44 is the multi-well assay plate of any of embodiments 33 to 43, wherein each well electrode structure includes one working electrode zone formed from one of the at least one working electrode bus bar.

Embodiment 45 is the multi-well assay plate of any of embodiments 33 to 44, wherein each well electrode structure includes four auxiliary electrode zones formed from the auxiliary electrode pattern.

Embodiment 46 is the multi-well assay plate of any of embodiments 33 to 45, wherein the top surface of the substrate further includes an insulating layer disposed in a pattern that exposes working electrode zones and auxiliary electrode zones of each well electrode structure and covers a remainder of the top surface of the substrate within each well.

Embodiment 47 is a method of using a multi-well assay plate. The multi-well assay plate includes a plurality of wells arranged in a well pattern; a plurality of sector electrode structures forming a plurality of well electrode structures corresponding to the plurality of wells, each of the plurality of sector electrode structures including: at least one working electrode bus bar deposited on a top surface of a substrate of the multi-well assay plate forming a plurality of working electrode zones; and a portion of an auxiliary electrode pattern deposited on the top surface forming a plurality of auxiliary electrode zones, an auxiliary electrode contact pattern in communication with the auxiliary electrode pattern and including a first plurality of cut-outs and a second plurality of cut-outs, a plurality of working electrode contacts deposited on a bottom surface of the multi-well assay plate in the first plurality of cut-outs and electrically connected to corresponding working electrode bus bars, and a plurality of isolation zones disposed within the second plurality of cut-outs. The method includes generating a voltage potential between the plurality of working electrode zones formed by the at least one working electrode bus bar associated with a selected sector electrode structure and the plurality of auxiliary electrode zones associated with the selected sector electrode structure, maintaining substantial electrical isolation between the plurality of working electrode zones of the selected sector electrode structure and a remainder of working electrode zones of a remainder of sector electrode structures, and measuring a response to the voltage potential.

Embodiment 48 is the method of embodiment 47, wherein generating the voltage potential and measuring the response are performed substantially simultaneously.

Embodiment 49 is the method of embodiment 48, further including: subsequent to measuring the response, sequentially for previously unenergized working electrode zones of the remainder of the sector electrode structures: generating sequential voltage potentials in each of the remainder of the sector electrode structures; maintaining substantial electrical isolation of currently unenergized sector electrode structures with a currently energized sector electrode structures; and measuring a plurality of responses to the sequential voltage potentials.

Embodiment 50 is the method of embodiment 48 or 49, wherein generating the voltage potential includes: contacting the plurality of working electrode contacts with one or more active working electrode contact pins, contacting the plurality of isolation zones with one or more inactive working electrode contact pins, contacting the auxiliary electrode pattern with one or more auxiliary electrode contact pins, and applying a voltage across the one or more active working electrode contact pins and the one or more auxiliary electrode contact pins.

Embodiment 51 is the method of any of embodiments 48 to 50, wherein the method is performed for electrochemiluminescence (ECL) analysis.

Embodiment 52 is a method of making a multi-well assay plate including a plurality of wells. The method includes forming a plurality of holes in a substrate, applying a first conductive layer of material on a first side of the substrate, the first conductive layer filling the plurality of holes to form a plurality of vias and provide a plurality of working electrode contact bases and an auxiliary electrode contact pattern base, applying a second conductive layer of material on the first side of the substrate, the second conductive layer overlaying the first conductive layer to form a plurality of working electrode contacts and an auxiliary electrode contact pattern having a first plurality of cut-outs and a second plurality of cut-outs, the working electrode contacts being formed within the first plurality of cut-outs and isolation zones being formed with the second plurality of cut-outs, applying a third conductive layer of material on a second side of the substrate, the third conductive layer forming a plurality of working electrode bus bar bases and an auxiliary electrode pattern base, applying a fourth conductive layer of material on the second side of the substrate, the fourth conductive layer forming a plurality of working electrode bus bar carbon layers, applying a fifth conductive layer of material overlaying the fourth conductive layer on the second side of the substrate forming a plurality of working electrode bus bars, applying a sixth conductive layer of material overlaying the auxiliary electrode pattern base on the second side of the substrate, the sixth conductive layer forming an auxiliary electrode pattern, applying an insulating layer of material on the second side of the substrate, the insulating layer exposing a plurality of auxiliary electrode zones and a plurality of working electrode zones and insulating a remainder of the plurality of wells, and adhering the substrate to a top plate having top plate openings defining the wells of the multi-well assay plate arranged in a well pattern, each well being defined by a well area.

Embodiment 53 is the method of embodiment 52, wherein the plurality of vias include working electrode vias connecting the working electrode contacts to the working electrode bus bars and auxiliary electrode vias connecting the auxiliary electrode contact pattern to the auxiliary electrode pattern.

Embodiment 54 is the method of embodiment 52 or 53, wherein the plurality of working electrode zones includes four working electrode zones corresponding to each well.

Embodiment 55 is the method of embodiment 53 or 54, wherein the plurality of working electrode zones includes one working electrode zone corresponding to each well.

Embodiment 56 is the method of any of embodiments 53 to 55, wherein adhering the substrate to the top plate includes applying an adhesive to the second side of the substrate outside of the well areas.

Embodiment 57 is a substrate having a top surface and a bottom surface. The substrate comprises a plurality of electrochemical cells disposed on the top surface for performing electrochemical analysis, the plurality of electrochemical cells each including: one or more working electrode zones disposed on a surface of the cell, wherein each of the one or more working electrode zones are in electrical communication with one another, and at least one auxiliary electrode disposed on the surface of the cell, and an auxiliary electrode contact pattern disposed on the bottom surface and in electrical communication with the at least one auxiliary electrode, the auxiliary electrode contact pattern including a first plurality of cut-outs and a second plurality of cut-outs, wherein the first plurality of cut-outs are configured to accommodate at least one working electrode contact in electrical communication with the one or more working electrode zones, and the second plurality of cut-outs are configured to create a plurality of isolation zones.

Embodiment 58 is the substrate of embodiment 57, wherein the plurality of electrochemical cells are arranged in sectors, each sector including a grouping of electrochemical cells, wherein the one or more working electrode zones of in the grouping of electrochemical cells of a sector are in electrical communication with one another.

Embodiment 59 is the substrate of embodiment 58, wherein the one or more working electrode zones of each sector are isolated from working electrode zones of each other sector.

Embodiment 60 is the substrate of embodiment 58 or 59, wherein the substrate is part of a plate, a cartridge, or a flow cell.

Embodiment 61 is the substrate of any of embodiments 57 to 60, wherein the electrochemical analysis includes electrochemiluminescence (ECL) analysis.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single module or unit for purposes of clarity, it should be understood that the features and functions described herein may be performed by any combination of units or modules. Thus, various changes and modifications may be affected by one skilled in the art without departing from the spirit or scope of the invention.

While various embodiments according to the present disclosure have been described above, it should be understood that they have been presented by way of illustration and example only, and not limitation. It will be apparent to persons skilled in the relevant art that various changes in form and detail may be made therein without departing from the spirit and scope of the present disclosure. Thus, the breadth and scope of the present disclosure should not be limited by any of the above-described exemplary embodiments but should be defined only in accordance with the appended claims and their equivalents. It will also be understood that each feature of each embodiment discussed herein, and of each reference cited herein, may be used in combination with the features of any other embodiment. Stated another way, aspects of the above multi-well plate may be used in any combination with other methods described herein or the methods may be used separately. All patents and publications discussed herein are incorporated by reference herein in their entirety.

The invention claimed is:

1. A multi-well assay plate comprising:

a top plate having top plate openings defining wells of the multi-well assay plate arranged in a well pattern, each well being defined by a well area;

a base plate including a substrate having a top surface and a bottom surface, the top surface being mated to the top plate;

a plurality of sector electrode structures forming a plurality of well electrode structures, each of the plurality of sector electrode structures including at least one working electrode bus bar deposited on the top surface and a portion of an auxiliary electrode pattern deposited on the top surface;

at least one working electrode contact patterned on the bottom surface in electrical communication with the at least one working electrode bus bar; and an auxiliary electrode contact pattern disposed on the bottom surface in electrical communication with the auxiliary electrode pattern, the auxiliary electrode contact pattern including a first plurality of cut-outs and a second plurality of cut-outs, wherein the first plurality of cut-outs are configured to accommodate the at least one working electrode contact and the second plurality of cut-outs are configured to create a plurality of isolation zones, and wherein each cut-out of the first plurality of cut-outs and the second plurality of cut-outs represents a gap in the auxiliary electrode contact pattern and is surrounded by the auxiliary electrode contact pattern.

2. The multi-well assay plate of claim 1, wherein the at least one working electrode contact is configured to make electrical contact with a first plurality of working electrode pins and the plurality of isolation zones are configured to electrically isolate a second plurality of electrode pin contacts from the auxiliary electrode pattern and the at least one working electrode bus bar.

3. The multi-well assay plate of claim 1, wherein the first plurality of cut-outs and the second plurality of cut-outs are disposed in an alternating arrangement.

4. The multi-well assay plate of claim 1, wherein the at least one working electrode bus bar of a first sector electrode structure is configured to be electrically energized in isolation from electrical energization of the at least one working electrode bus bars of remaining ones of the plurality of sector electrode structures.

5. The multi-well assay plate of claim 1, wherein the at least one working electrode bus bar of each sector electrode structure includes a plurality of working electrode bus bars configured to be electrically energized concurrently.

6. The multi-well assay plate of claim 1, wherein the top surface further includes an adhesive layer corresponding to the well pattern on the top surface, wherein the well areas are free of adhesive.

7. The multi-well assay plate of claim 1, wherein the at least one working electrode contact is in electrical communication with the at least one working electrode bus bar through at least one via.

8. The multi-well assay plate of claim 1, wherein an auxiliary electrode zone electrically connected to the auxiliary electrode pattern is disposed at an approximate center of the well area and working electrode zones electrically connected to the at least one working electrode bus bar are arranged in a circle approximately equidistant from the auxiliary electrode zone.

9. The multi-well assay plate of claim 1, wherein each well electrode structure includes four working electrode zones formed from one of the at least one working electrode bus bar.

10. The multi-well assay plate of claim 1, wherein each well electrode structure includes two auxiliary electrode zones formed from the auxiliary electrode pattern.

11. The multi-well assay plate of claim 1, wherein each well electrode structure includes one working electrode zone formed from one of the at least one working electrode bus bar.

12. The multi-well assay plate of claim 1, wherein each well electrode structure includes four auxiliary electrode zones formed from the auxiliary electrode pattern.

13. The multi-well assay plate of claim 1, wherein the top surface of the substrate further includes an insulating layer disposed in a pattern that exposes working electrode zones and auxiliary electrode zones of each well electrode structure and covers a remainder of the top surface of the substrate within each well.

14. A substrate having a top surface and a bottom surface, the substrate comprising:

a plurality of electrochemical cells disposed on the top surface for performing electrochemical analysis, the plurality of electrochemical cells each including:

one or more working electrode zones disposed on a surface of the cell, wherein each of the one or more working electrode zones are in electrical communication with one another, at least one auxiliary electrode disposed on the surface of the cell; and an auxiliary electrode contact pattern disposed on the bottom surface and in electrical communication with the at least one auxiliary electrode, the auxiliary electrode contact pattern including a first plurality of cut-outs and a second plurality of cut-outs, wherein the first plurality of cut-outs are configured to accommodate at least one working electrode contact in electrical communication with the one or more working electrode zones, and the second plurality of cut-outs are configured to create a plurality of isolation zones, and wherein each cut-out of the first plurality of cut-outs and the second plurality of cut-outs represents a gap in the auxiliary electrode contact pattern and is surrounded by the auxiliary electrode contact pattern.

15. The substrate of claim 14, wherein the plurality of electrochemical cells are arranged in sectors, each sector including a grouping of electrochemical cells, wherein the one or more working electrode zones in the grouping of electrochemical cells of a sector are in electrical communication with one another.

16. The substrate of claim 15, wherein the one or more working electrode zones of each sector are isolated from working electrode zones of each other sector.

17. The substrate of claim 15, wherein the substrate is part of a plate, a cartridge, or a flow cell.

18. The substrate of claim 14, wherein the electrochemical analysis includes electrochemiluminescence (ECL) analysis.

* * * * *